US010944725B2

(12) United States Patent
Gunasingam et al.

(10) Patent No.: US 10,944,725 B2
(45) Date of Patent: Mar. 9, 2021

(54) DATA PROCESSING SYSTEMS AND METHODS FOR USING A DATA MODEL TO SELECT A TARGET DATA ASSET IN A DATA MIGRATION

(71) Applicant: OneTrust, LLC, Atlanta, GA (US)

(72) Inventors: Arockia Gunasingam, Marietta, GA (US); Steven W. Finch, Kennesaw, GA (US); Saravanan Pitchaimani, Atlanta, GA (US); Kevin Jones, Atlanta, GA (US); Jonathan Blake Brannon, Smyrna, GA (US)

(73) Assignee: OneTrust, LLC, Atlanta, GA (US)

( * ) Notice: Subject to any disclaimer, the term of this patent is extended or adjusted under 35 U.S.C. 154(b) by 0 days.

(21) Appl. No.: 16/863,226

(22) Filed: Apr. 30, 2020

(65) Prior Publication Data

US 2020/0267125 A1    Aug. 20, 2020

Related U.S. Application Data

(63) Continuation-in-part of application No. 16/565,265, filed on Sep. 9, 2019, now Pat. No. 10,708,305, which
(Continued)

(51) Int. Cl.
*G06F 21/00* (2013.01)
*G06F 21/31* (2013.01)
(Continued)

(52) U.S. Cl.
CPC ........ *H04L 63/0414* (2013.01); *G06F 16/214* (2019.01); *G06F 21/6245* (2013.01)

(58) Field of Classification Search
CPC ............. G06F 21/6245; H04L 67/1097; H04L 63/1491; H04L 63/126; H04L 63/102; H04L 2463/144
(Continued)

(56) References Cited

U.S. PATENT DOCUMENTS 4,536,866 A    8/1985    Jerome et al.
5,193,162 A    3/1993    Bordsen et al.
(Continued)

FOREIGN PATENT DOCUMENTS

EP    1394698    3/2004
EP    2031540    3/2009
(Continued)

OTHER PUBLICATIONS

Written Opinion of the International Searching Authority, dated Oct. 3, 2017, from corresponding International Application No. PCT/US2017/036912.
(Continued)

*Primary Examiner* — Haresh N Patel
(74) *Attorney, Agent, or Firm* — Brient IP Law, LLC

(57) ABSTRACT

Data stored on a data asset may be migrated to another data asset while maintaining compliance to applicable regulations. A data asset may experience a failure. Based on the type of data stored by that data asset and the applicable regulations, requirements, and/or restrictions that relate to a transfer of that type data from that data asset, a target data asset may be determined. The data stored on the data asset may then be transferred to the target data asset. The disclosed systems may use data models and/or data maps in determining the requirements for a data transfer and selecting target data assets.

20 Claims, 52 Drawing Sheets

Related U.S. Application Data is a continuation-in-part of application No. 16/277,539, filed on Feb. 15, 2019, now Pat. No. 10,509,920, which is a continuation-in-part of application No. 16/159,566, filed on Oct. 12, 2018, now Pat. No. 10,454,973, which is a continuation-in-part of application No. 16/055,083, filed on Aug. 4, 2018, now Pat. No. 10,289,870, which is a continuation-in-part of application No. 15/996,208, filed on Jun. 1, 2018, now Pat. No. 10,181,051, which is a continuation-in-part of application No. 15/853,674, filed on Dec. 22, 2017, now Pat. No. 10,019,597, which is a continuation-in-part of application No. 15/619,455, filed on Jun. 10, 2017, now Pat. No. 9,851,966, which is a continuation-in-part of application No. 15/254,901, filed on Sep. 1, 2016, now Pat. No. 9,729,583.

(60) Provisional application No. 62/728,437, filed on Sep. 7, 2018, provisional application No. 62/360,123, filed on Jul. 8, 2016, provisional application No. 62/353,802, filed on Jun. 23, 2016, provisional application No. 62/348,695, filed on Jun. 10, 2016, provisional application No. 62/541,613, filed on Aug. 4, 2017, provisional application No. 62/537,839, filed on Jul. 27, 2017, provisional application No. 62/547,530, filed on Aug. 18, 2017, provisional application No. 62/572,096, filed on Oct. 13, 2017, provisional application No. 62/728,435, filed on Sep. 7, 2018, provisional application No. 62/631,684, filed on Feb. 17, 2018, provisional application No. 62/631,703, filed on Feb. 17, 2018.

(51) Int. Cl.
  *H04L 29/06* (2006.01)
  *G06F 21/62* (2013.01)
  *G06F 16/21* (2019.01)

(58) Field of Classification Search
  USPC ......................................................... 726/28
  See application file for complete search history.

(56) References Cited

U.S. PATENT DOCUMENTS

| | | |
|---|---|---|
| 5,276,735 A | 1/1994 | Boebert et al. |
| 5,329,447 A | 7/1994 | Leedom, Jr. |
| 5,404,299 A | 4/1995 | Tsurubayashi et al. |
| 5,535,393 A | 7/1996 | Reeve et al. |
| 5,560,005 A | 9/1996 | Hoover et al. |
| 5,668,986 A | 9/1997 | Nilsen et al. |
| 5,761,529 A | 6/1998 | Raji |
| 5,764,906 A | 6/1998 | Edelstein et al. |
| 5,913,214 A | 6/1999 | Madnick et al. |
| 6,016,394 A | 1/2000 | Walker |
| 6,122,627 A | 9/2000 | Carey et al. |
| 6,148,342 A | 11/2000 | Ho |
| 6,240,416 B1 | 5/2001 | Immon et al. |
| 6,253,203 B1 | 6/2001 | OFlaherty et al. |
| 6,263,335 B1 | 7/2001 | Paik et al. |
| 6,272,631 B1 | 8/2001 | Thomlinson et al. |
| 6,275,824 B1 | 8/2001 | OFlaherty et al. |
| 6,282,548 B1 | 8/2001 | Burner et al. |
| 6,374,237 B1 | 4/2002 | Reese |
| 6,374,252 B1 | 4/2002 | Althoff et al. |
| 6,427,230 B1 | 7/2002 | Goiffon et al. |
| 6,442,688 B1 | 8/2002 | Moses et al. |
| 6,446,120 B1 | 9/2002 | Dantressangle |
| 6,484,180 B1 | 11/2002 | Lyons et al. |
| 6,519,571 B1 | 2/2003 | Guheen et al. |
| 6,591,272 B1 | 7/2003 | Williams |
| 6,601,233 B1 | 7/2003 | Underwood |
| 6,606,744 B1 | 8/2003 | Mikurak |
| 6,611,812 B2 | 8/2003 | Hurtado et al. |
| 6,625,602 B1 | 9/2003 | Meredith et al. |
| 6,662,192 B1 | 12/2003 | Rebane |
| 6,662,357 B1 | 12/2003 | Bowman-Amuah |
| 6,697,824 B1 | 2/2004 | Bowman-Amuah |
| 6,725,200 B1 | 4/2004 | Rost |
| 6,732,109 B2 | 5/2004 | Lindberg et al. |
| 6,755,344 B1 | 6/2004 | Mollett et al. |
| 6,757,888 B1 | 6/2004 | Knutson et al. |
| 6,816,944 B2 | 11/2004 | Peng |
| 6,826,693 B1 | 11/2004 | Yoshida et al. |
| 6,886,101 B2 | 4/2005 | Glazer et al. |
| 6,901,346 B2 | 5/2005 | Tracy et al. |
| 6,904,417 B2 | 6/2005 | Clayton et al. |
| 6,925,443 B1 | 8/2005 | Baggett, Jr. et al. |
| 6,938,041 B1 | 8/2005 | Brandow et al. |
| 6,978,270 B1 | 12/2005 | Carty et al. |
| 6,980,987 B2 | 12/2005 | Kaminer |
| 6,983,221 B2 | 1/2006 | Tracy et al. |
| 6,985,887 B1 | 1/2006 | Sunstein et al. |
| 6,990,454 B2 | 1/2006 | McIntosh |
| 6,993,448 B2 | 1/2006 | Tracy et al. |
| 6,993,495 B2 | 1/2006 | Smith, Jr. et al. |
| 6,996,807 B1 | 2/2006 | Vardi et al. |
| 7,003,560 B1 | 2/2006 | Mullen et al. |
| 7,013,290 B2 | 3/2006 | Ananian |
| 7,017,105 B2 | 3/2006 | Flanagin et al. |
| 7,039,654 B1 | 5/2006 | Eder |
| 7,047,517 B1 | 5/2006 | Brown et al. |
| 7,051,036 B2 | 5/2006 | Rosnow et al. |
| 7,051,038 B1 | 5/2006 | Yeh et al. |
| 7,058,970 B2 | 6/2006 | Shaw |
| 7,069,427 B2 | 6/2006 | Adler et al. |
| 7,076,558 B1 | 7/2006 | Dunn |
| 7,095,854 B1 | 8/2006 | Ginter et al. |
| 7,120,800 B2 | 10/2006 | Ginter et al. |
| 7,124,101 B1 | 10/2006 | Mikurak |
| 7,127,705 B2 | 10/2006 | Christfort et al. |
| 7,127,741 B2 | 10/2006 | Bandini et al. |
| 7,139,999 B2 | 11/2006 | Bowman-Amuah |
| 7,143,091 B2 | 11/2006 | Charnock et al. |
| 7,167,842 B1 | 1/2007 | Josephson, II et al. |
| 7,171,379 B2 | 1/2007 | Menninger et al. |
| 7,181,438 B1 | 2/2007 | Szabo |
| 7,203,929 B1 | 4/2007 | Vinodkrishnan et al. |
| 7,213,233 B1 | 5/2007 | Vinodkrishnan et al. |
| 7,216,340 B1 | 5/2007 | Vinodkrishnan et al. |
| 7,219,066 B2 | 5/2007 | Parks et al. |
| 7,223,234 B2 | 5/2007 | Stupp et al. |
| 7,225,460 B2 | 5/2007 | Barzilai et al. |
| 7,234,065 B2 | 6/2007 | Breslin et al. |
| 7,247,625 B2 | 7/2007 | Zhang et al. |
| 7,251,624 B1 | 7/2007 | Lee et al. |
| 7,260,830 B2 | 8/2007 | Sugimoto |
| 7,266,566 B1 | 9/2007 | Kennaley et al. |
| 7,275,063 B2 | 9/2007 | Horn |
| 7,281,020 B2 | 10/2007 | Fine |
| 7,284,232 B1 | 10/2007 | Bates et al. |
| 7,287,280 B2 | 10/2007 | Young |
| 7,290,275 B2 | 10/2007 | Baudoin et al. |
| 7,302,569 B2 | 11/2007 | Betz et al. |
| 7,313,575 B2 | 12/2007 | Carr et al. |
| 7,313,699 B2 | 12/2007 | Koga |
| 7,315,849 B2 | 1/2008 | Bakalash et al. |
| 7,330,850 B1 | 2/2008 | Seibel et al. |
| 7,340,447 B2 | 3/2008 | Ghatare |
| 7,340,776 B2 | 3/2008 | Zobel et al. |
| 7,343,434 B2 | 3/2008 | Kapoor et al. |
| 7,353,204 B2 | 4/2008 | Liu |
| 7,356,559 B1 | 4/2008 | Jacobs et al. |
| 7,367,014 B2 | 4/2008 | Griffin |
| 7,370,025 B1 | 5/2008 | Pandit |
| 7,380,120 B1 | 5/2008 | Garcia |
| 7,391,854 B2 | 6/2008 | Salonen et al. |
| 7,398,393 B2 | 7/2008 | Mont et al. |
| 7,401,235 B2 | 7/2008 | Mowers et al. |
| 7,403,942 B1 | 7/2008 | Bayliss |
| 7,409,354 B2 | 8/2008 | Putnam et al. |

(56) References Cited

U.S. PATENT DOCUMENTS

| | | |
|---|---|---|
| 7,412,402 B2 | 8/2008 | Cooper |
| 7,430,585 B2 | 9/2008 | Sibert |
| 7,454,457 B1 | 11/2008 | Lowery et al. |
| 7,454,508 B2 | 11/2008 | Mathew et al. |
| 7,478,157 B2 | 1/2009 | Bohrer et al. |
| 7,480,755 B2 | 1/2009 | Herrell et al. |
| 7,487,170 B2 | 2/2009 | Stevens |
| 7,493,282 B2 | 2/2009 | Manly et al. |
| 7,512,987 B2 | 3/2009 | Williams |
| 7,516,882 B2 | 4/2009 | Cucinotta |
| 7,523,053 B2 | 4/2009 | Pudhukottai et al. |
| 7,529,836 B1 | 5/2009 | Bolen |
| 7,548,968 B1 | 6/2009 | Bura et al. |
| 7,552,480 B1 | 6/2009 | Voss |
| 7,562,339 B2 | 7/2009 | Racca et al. |
| 7,567,541 B2 | 7/2009 | Karimi et al. |
| 7,584,505 B2 | 9/2009 | Mondri et al. |
| 7,590,705 B2 | 9/2009 | Mathew et al. |
| 7,590,972 B2 | 9/2009 | Axelrod et al. |
| 7,603,356 B2 | 10/2009 | Schran et al. |
| 7,606,783 B1 | 10/2009 | Carter |
| 7,606,790 B2 | 10/2009 | Levy |
| 7,607,120 B2 | 10/2009 | Sanyal et al. |
| 7,613,700 B1 | 11/2009 | Lobo et al. |
| 7,620,644 B2 | 11/2009 | Cote et al. |
| 7,630,874 B2 | 12/2009 | Fables et al. |
| 7,630,998 B2 | 12/2009 | Zhou et al. |
| 7,636,742 B1 | 12/2009 | Olavarrieta et al. |
| 7,640,322 B2 | 12/2009 | Wendkos et al. |
| 7,650,497 B2 | 1/2010 | Thornton et al. |
| 7,653,592 B1 | 1/2010 | Flaxman et al. |
| 7,657,476 B2 | 2/2010 | Barney |
| 7,657,694 B2 | 2/2010 | Mansell et al. |
| 7,665,073 B2 | 2/2010 | Meijer et al. |
| 7,668,947 B2 | 2/2010 | Hutchinson et al. |
| 7,673,282 B2 | 3/2010 | Amaru et al. |
| 7,681,034 B1 | 3/2010 | Lee et al. |
| 7,685,561 B2 | 3/2010 | Deem et al. |
| 7,685,577 B2 | 3/2010 | Pace et al. |
| 7,693,593 B2 | 4/2010 | Ishibashi et al. |
| 7,707,224 B2 | 4/2010 | Chastagnol et al. |
| 7,712,029 B2 | 5/2010 | Ferreira et al. |
| 7,716,242 B2 | 5/2010 | Pae et al. |
| 7,725,474 B2 | 5/2010 | Tamai et al. |
| 7,725,875 B2 | 5/2010 | Waldrep |
| 7,729,940 B2 | 6/2010 | Harvey et al. |
| 7,730,142 B2 | 6/2010 | Levasseur et al. |
| 7,752,124 B2 | 7/2010 | Green et al. |
| 7,756,987 B2 | 7/2010 | Wang et al. |
| 7,774,745 B2 | 8/2010 | Fildebrandt et al. |
| 7,788,212 B2 | 8/2010 | Beckmann et al. |
| 7,788,222 B2 | 8/2010 | Shah et al. |
| 7,788,632 B2 | 8/2010 | Kuester et al. |
| 7,788,726 B2 | 8/2010 | Teixeira |
| 7,801,758 B2 | 9/2010 | Gracie et al. |
| 7,822,620 B2 | 10/2010 | Dixon et al. |
| 7,827,523 B2 | 11/2010 | Ahmed et al. |
| 7,849,143 B2 | 12/2010 | Vuong |
| 7,853,468 B2 | 12/2010 | Callahan et al. |
| 7,853,470 B2 | 12/2010 | Sonnleithner et al. |
| 7,870,540 B2 | 1/2011 | Zare et al. |
| 7,870,608 B2 | 1/2011 | Shraim et al. |
| 7,873,541 B1 | 1/2011 | Klar et al. |
| 7,877,327 B2 | 1/2011 | Gwiazda et al. |
| 7,877,812 B2 | 1/2011 | Koved et al. |
| 7,885,841 B2 | 2/2011 | King |
| 7,895,260 B2 | 2/2011 | Archer et al. |
| 7,904,487 B2 | 3/2011 | Ghatare |
| 7,917,888 B2 | 3/2011 | Chong et al. |
| 7,917,963 B2 | 3/2011 | Goyal et al. |
| 7,921,152 B2 | 4/2011 | Ashley et al. |
| 7,930,197 B2 | 4/2011 | Ozzie et al. |
| 7,930,753 B2 | 4/2011 | Mellinger et al. |
| 7,953,725 B2 | 5/2011 | Burris et al. |
| 7,954,150 B2 | 5/2011 | Croft et al. |
| 7,958,087 B2 | 6/2011 | Blumenau |
| 7,958,494 B2 | 6/2011 | Chaar et al. |
| 7,962,900 B2 | 6/2011 | Barraclough et al. |
| 7,966,310 B2 | 6/2011 | Sullivan et al. |
| 7,966,599 B1 | 6/2011 | Malasky et al. |
| 7,966,663 B2 | 6/2011 | Strickland et al. |
| 7,975,000 B2 | 7/2011 | Dixon et al. |
| 7,991,559 B2 | 8/2011 | Dzekunov et al. |
| 7,996,372 B2 | 8/2011 | Rubel, Jr. |
| 8,010,612 B2 | 8/2011 | Costea et al. |
| 8,010,720 B2 | 8/2011 | Iwaoka et al. |
| 8,019,881 B2 | 9/2011 | Sandhu et al. |
| 8,032,721 B2 | 10/2011 | Murai |
| 8,037,409 B2 | 10/2011 | Jacob et al. |
| 8,041,913 B2 | 10/2011 | Wang |
| 8,069,161 B2 | 11/2011 | Bugir et al. |
| 8,069,471 B2 | 11/2011 | Boren |
| 8,082,539 B1 | 12/2011 | Schelkogonov |
| 8,095,923 B2 | 1/2012 | Harvey et al. |
| 8,099,709 B2 | 1/2012 | Baikov et al. |
| 8,103,962 B2 | 1/2012 | Embley et al. |
| 8,146,054 B2 | 3/2012 | Baker et al. |
| 8,146,074 B2 | 3/2012 | Ito et al. |
| 8,150,717 B2 | 4/2012 | Whitmore |
| 8,156,105 B2 | 4/2012 | Altounian et al. |
| 8,156,158 B2 | 4/2012 | Rolls et al. |
| 8,166,406 B1 | 4/2012 | Goldfeder et al. |
| 8,176,177 B2 | 5/2012 | Sussman et al. |
| 8,176,334 B2 | 5/2012 | Vainstein |
| 8,176,470 B2 | 5/2012 | Klumpp et al. |
| 8,180,759 B2 | 5/2012 | Hamzy |
| 8,185,409 B2 | 5/2012 | Putnam et al. |
| 8,196,176 B2 | 6/2012 | Berteau et al. |
| 8,239,244 B2 | 8/2012 | Ginsberg et al. |
| 8,250,051 B2 | 8/2012 | Bugir et al. |
| 8,255,468 B2 | 8/2012 | Vitaldevara et al. |
| 8,266,231 B1 | 9/2012 | Golovin et al. |
| 8,275,632 B2 | 9/2012 | Awaraji et al. |
| 8,275,793 B2 | 9/2012 | Ahmad et al. |
| 8,286,239 B1 | 10/2012 | Sutton |
| 8,312,549 B2 | 11/2012 | Goldberg et al. |
| 8,316,237 B1 | 11/2012 | Felsher et al. |
| 8,332,908 B2 | 12/2012 | Hatakeyama et al. |
| 8,346,929 B1 | 1/2013 | Lai |
| 8,364,713 B2 | 1/2013 | Pollard |
| 8,380,630 B2 | 2/2013 | Felsher |
| 8,380,743 B2 | 2/2013 | Convertino et al. |
| 8,381,180 B2 | 2/2013 | Rostoker |
| 8,418,226 B2 | 4/2013 | Gardner |
| 8,423,954 B2 | 4/2013 | Ronen et al. |
| 8,429,179 B1 | 4/2013 | Mirhaji |
| 8,429,597 B2 | 4/2013 | Prigge |
| 8,429,630 B2 | 4/2013 | Nickolov et al. |
| 8,429,758 B2 | 4/2013 | Chen et al. |
| 8,438,644 B2 | 5/2013 | Watters et al. |
| 8,463,247 B2 | 6/2013 | Misiag |
| 8,468,244 B2 | 6/2013 | Redlich et al. |
| 8,473,324 B2 | 6/2013 | Alvarez et al. |
| 8,474,012 B2 | 6/2013 | Ahmed et al. |
| 8,494,894 B2 | 7/2013 | Jaster et al. |
| 8,504,481 B2 | 8/2013 | Motahari et al. |
| 8,510,199 B1 | 8/2013 | Erlanger |
| 8,516,076 B2 | 8/2013 | Thomas |
| 8,533,746 B2 | 9/2013 | Nolan et al. |
| 8,539,359 B2 | 9/2013 | Rapaport et al. |
| 8,539,437 B2 | 9/2013 | Finlayson et al. |
| 8,560,956 B2 | 10/2013 | Curtis et al. |
| 8,561,153 B2 | 10/2013 | Grason et al. |
| 8,565,729 B2 | 10/2013 | Moseler et al. |
| 8,571,909 B2 | 10/2013 | Miller et al. |
| 8,578,036 B1 | 11/2013 | Holfelder et al. |
| 8,578,166 B2 | 11/2013 | De Monseignat et al. |
| 8,578,481 B2 | 11/2013 | Rowley |
| 8,578,501 B1 | 11/2013 | Ogilvie |
| 8,583,694 B2 | 11/2013 | Siegel et al. |
| 8,583,766 B2 | 11/2013 | Dixon et al. |
| 8,589,183 B2 | 11/2013 | Awaraji et al. |
| 8,601,467 B2 | 12/2013 | Hofhansl et al. |
| 8,601,591 B2 | 12/2013 | Krishnamurthy et al. |

(56) References Cited

U.S. PATENT DOCUMENTS

| | | |
|---|---|---|
| 8,606,746 B2 | 12/2013 | Yeap et al. |
| 8,612,420 B2 | 12/2013 | Sun et al. |
| 8,612,993 B2 | 12/2013 | Grant et al. |
| 8,615,731 B2 | 12/2013 | Doshi |
| 8,620,952 B2 | 12/2013 | Bennett et al. |
| 8,621,637 B2 | 12/2013 | Al-Harbi et al. |
| 8,627,114 B2 | 1/2014 | Resch et al. |
| 8,630,961 B2 | 1/2014 | Beilby et al. |
| 8,640,110 B2 | 1/2014 | Kopp et al. |
| 8,656,456 B2 | 2/2014 | Maxson et al. |
| 8,661,036 B2 | 2/2014 | Turski et al. |
| 8,667,074 B1 | 3/2014 | Farkas |
| 8,667,487 B1 | 3/2014 | Boodman et al. |
| 8,677,472 B1 | 3/2014 | Dotan et al. |
| 8,681,984 B2 | 3/2014 | Lee et al. |
| 8,682,698 B2 | 3/2014 | Cashman et al. |
| 8,683,502 B2 | 3/2014 | Shkedi et al. |
| 8,688,601 B2 | 4/2014 | Jaiswal |
| 8,700,699 B2 | 4/2014 | Shen et al. |
| 8,706,742 B1 | 4/2014 | Ravid et al. |
| 8,712,813 B2 | 4/2014 | King |
| 8,713,098 B1 | 4/2014 | Adya et al. |
| 8,713,638 B2 | 4/2014 | Hu et al. |
| 8,732,839 B2 | 5/2014 | Hohl |
| 8,744,894 B2 | 6/2014 | Christiansen et al. |
| 8,751,285 B2 | 6/2014 | Deb et al. |
| 8,763,071 B2 | 6/2014 | Sinha et al. |
| 8,767,947 B1 | 7/2014 | Ristock et al. |
| 8,769,671 B2 | 7/2014 | Shraim et al. |
| 8,788,935 B1 | 7/2014 | Hirsch et al. |
| 8,793,614 B2 | 7/2014 | Wilson et al. |
| 8,793,650 B2 | 7/2014 | Hilerio et al. |
| 8,793,809 B2 | 7/2014 | Falkenburg et al. |
| 8,805,707 B2 | 8/2014 | Schumann, Jr. et al. |
| 8,805,806 B2 | 8/2014 | Amarendran et al. |
| 8,805,925 B2 | 8/2014 | Price et al. |
| 8,812,342 B2 | 8/2014 | Barcelo et al. |
| 8,812,752 B1 | 8/2014 | Shih et al. |
| 8,812,766 B2 | 8/2014 | Kranendonk et al. |
| 8,819,253 B2 | 8/2014 | Simeloff et al. |
| 8,819,617 B1 | 8/2014 | Koenig et al. |
| 8,826,446 B1 | 9/2014 | Liu et al. |
| 8,832,649 B2 | 9/2014 | Bishop et al. |
| 8,832,854 B1 | 9/2014 | Staddon et al. |
| 8,839,232 B2 | 9/2014 | Taylor et al. |
| 8,843,487 B2 | 9/2014 | McGraw et al. |
| 8,856,534 B2 | 10/2014 | Khosravi et al. |
| 8,862,507 B2 | 10/2014 | Sandhu et al. |
| 8,875,232 B2 | 10/2014 | Blom et al. |
| 8,893,078 B2 | 11/2014 | Schaude et al. |
| 8,893,286 B1 | 11/2014 | Oliver |
| 8,893,297 B2 | 11/2014 | Eversoll et al. |
| 8,914,263 B2 | 12/2014 | Shimada et al. |
| 8,914,299 B2 | 12/2014 | Pesci-Anderson |
| 8,914,342 B2 | 12/2014 | Kalaboukis et al. |
| 8,914,902 B2 | 12/2014 | Moritz et al. |
| 8,918,306 B2 | 12/2014 | Cashman et al. |
| 8,918,392 B1 | 12/2014 | Brooker et al. |
| 8,918,632 B1 | 12/2014 | Sartor |
| 8,930,896 B1 | 1/2015 | Wiggins |
| 8,930,897 B2 | 1/2015 | Nassar |
| 8,935,198 B1 | 1/2015 | Phillips et al. |
| 8,935,266 B2 | 1/2015 | Wu |
| 8,935,342 B2 | 1/2015 | Patel |
| 8,935,804 B1 | 1/2015 | Clark et al. |
| 8,938,221 B2 | 1/2015 | Brazier et al. |
| 8,943,076 B2 | 1/2015 | Stewart et al. |
| 8,943,548 B2 | 1/2015 | Drokov et al. |
| 8,949,137 B2 | 2/2015 | Crapo et al. |
| 8,959,584 B2 | 2/2015 | Piliouras |
| 8,966,575 B2 | 2/2015 | McQuay et al. |
| 8,966,597 B1 | 2/2015 | Saylor et al. |
| 8,977,234 B2 | 3/2015 | Chava |
| 8,978,158 B2 | 3/2015 | Rajkumar et al. |
| 8,983,972 B2 | 3/2015 | Kriebel et al. |
| 8,984,031 B1 | 3/2015 | Todd |
| 8,990,933 B1 | 3/2015 | Magdalin |
| 8,996,417 B1 | 3/2015 | Channakeshava |
| 8,996,480 B2 | 3/2015 | Agarwala et al. |
| 8,997,213 B2 | 3/2015 | Papakipos et al. |
| 9,003,295 B2 | 4/2015 | Baschy |
| 9,003,552 B2 | 4/2015 | Goodwin et al. |
| 9,009,851 B2 | 4/2015 | Droste et al. |
| 9,021,469 B2 | 4/2015 | Hilerio et al. |
| 9,026,526 B1 | 5/2015 | Bau et al. |
| 9,030,987 B2 | 5/2015 | Bianchetti et al. |
| 9,032,067 B2 | 5/2015 | Prasad et al. |
| 9,043,217 B2 | 5/2015 | Cashman et al. |
| 9,043,480 B2 | 5/2015 | Barton et al. |
| 9,047,463 B2 | 6/2015 | Porras |
| 9,047,582 B2 | 6/2015 | Hutchinson et al. |
| 9,049,314 B2 | 6/2015 | Pugh et al. |
| 9,055,071 B1 | 6/2015 | Gates et al. |
| 9,064,033 B2 | 6/2015 | Jin et al. |
| 9,069,940 B2 | 6/2015 | Hars |
| 9,076,231 B1 | 7/2015 | Hill et al. |
| 9,092,796 B2 | 7/2015 | Eversoll et al. |
| 9,094,434 B2 | 7/2015 | Williams et al. |
| 9,098,515 B2 | 8/2015 | Richter et al. |
| 9,100,778 B2 | 8/2015 | Stogaitis et al. |
| 9,106,691 B1 | 8/2015 | Burger et al. |
| 9,111,105 B2 | 8/2015 | Barton et al. |
| 9,111,295 B2 | 8/2015 | Tietzen et al. |
| 9,123,339 B1 | 9/2015 | Shaw et al. |
| 9,129,311 B2 | 9/2015 | Schoen et al. |
| 9,135,261 B2 | 9/2015 | Maunder et al. |
| 9,141,823 B2 | 9/2015 | Dawson |
| 9,152,820 B1 | 10/2015 | Pauley, Jr. et al. |
| 9,154,514 B1 | 10/2015 | Prakash |
| 9,154,556 B1 | 10/2015 | Dotan et al. |
| 9,158,655 B2 | 10/2015 | Wadhwani et al. |
| 9,170,996 B2 | 10/2015 | Lovric et al. |
| 9,172,706 B2 | 10/2015 | Krishnamurthy et al. |
| 9,177,293 B1 | 11/2015 | Gagnon et al. |
| 9,178,901 B2 | 11/2015 | Xue et al. |
| 9,183,100 B2 | 11/2015 | Gventer et al. |
| 9,189,642 B2 | 11/2015 | Perlman |
| 9,201,572 B2 | 12/2015 | Lyon et al. |
| 9,201,770 B1 | 12/2015 | Duerk |
| 9,202,085 B2 | 12/2015 | Mawdsley et al. |
| 9,215,076 B1 | 12/2015 | Roth et al. |
| 9,215,252 B2 | 12/2015 | Smith et al. |
| 9,224,009 B1 | 12/2015 | Liu et al. |
| 9,231,935 B1 | 1/2016 | Bridge et al. |
| 9,232,040 B2 | 1/2016 | Barash et al. |
| 9,235,476 B2 | 1/2016 | McHugh et al. |
| 9,240,987 B2 | 1/2016 | Barrett-Bowen et al. |
| 9,241,259 B2 | 1/2016 | Daniela et al. |
| 9,245,126 B2 | 1/2016 | Christodorescu et al. |
| 9,253,609 B2 | 2/2016 | Hosier, Jr. |
| 9,264,443 B2 | 2/2016 | Weisman |
| 9,280,581 B1 * | 3/2016 | Grimes ............... G06F 16/212 |
| 9,286,282 B2 | 3/2016 | Ling, III et al. |
| 9,288,118 B1 | 3/2016 | Pattan |
| 9,288,556 B2 | 3/2016 | Kim et al. |
| 9,317,697 B2 | 4/2016 | Maier et al. |
| 9,317,715 B2 | 4/2016 | Schuette et al. |
| 9,336,324 B2 | 5/2016 | Lomme et al. |
| 9,336,332 B2 | 5/2016 | Davis et al. |
| 9,336,400 B2 | 5/2016 | Milman et al. |
| 9,338,188 B1 | 5/2016 | Ahn |
| 9,344,297 B2 | 5/2016 | Shah et al. |
| 9,344,424 B2 | 5/2016 | Tenenboym et al. |
| 9,348,802 B2 | 5/2016 | Massand |
| 9,348,862 B2 | 5/2016 | Kawecki, III |
| 9,349,016 B1 | 5/2016 | Brisebois et al. |
| 9,350,718 B2 | 5/2016 | Sondhi et al. |
| 9,355,157 B2 | 5/2016 | Mohammed et al. |
| 9,356,961 B1 | 5/2016 | Todd et al. |
| 9,369,488 B2 | 6/2016 | Woods et al. |
| 9,384,199 B2 | 7/2016 | Thereska et al. |
| 9,384,357 B2 | 7/2016 | Patil et al. |
| 9,386,104 B2 | 7/2016 | Adams et al. |
| 9,396,332 B2 | 7/2016 | Abrams et al. |

(56) References Cited

U.S. PATENT DOCUMENTS

| | | |
|---|---|---|
| 9,401,900 B2 | 7/2016 | Levasseur et al. |
| 9,411,967 B2 | 8/2016 | Parecki et al. |
| 9,411,982 B1 | 8/2016 | Dippenaar et al. |
| 9,417,859 B2 | 8/2016 | Gounares et al. |
| 9,424,021 B2 | 8/2016 | Zamir |
| 9,426,177 B2 | 8/2016 | Wang et al. |
| 9,460,136 B1 | 10/2016 | Todd et al. |
| 9,460,307 B2 | 10/2016 | Breslau et al. |
| 9,462,009 B1 | 10/2016 | Kolman et al. |
| 9,465,702 B2 | 10/2016 | Gventer et al. |
| 9,465,800 B2 | 10/2016 | Lacey |
| 9,473,446 B2 | 10/2016 | Vijay et al. |
| 9,473,535 B2 | 10/2016 | Sartor |
| 9,477,523 B1 | 10/2016 | Warman et al. |
| 9,477,660 B2 | 10/2016 | Scott et al. |
| 9,477,942 B2 | 10/2016 | Adachi et al. |
| 9,483,659 B2 | 11/2016 | Bao et al. |
| 9,489,366 B2 | 11/2016 | Scott et al. |
| 9,507,960 B2 | 11/2016 | Bell et al. |
| 9,509,674 B1 | 11/2016 | Nasserbakht et al. |
| 9,509,702 B2 | 11/2016 | Grigg et al. |
| 9,521,166 B2 | 12/2016 | Wilson |
| 9,529,989 B2 | 12/2016 | Kling et al. |
| 9,536,108 B2 | 1/2017 | Powell et al. |
| 9,537,546 B2 | 1/2017 | Cordeiro et al. |
| 9,542,568 B2 | 1/2017 | Francis et al. |
| 9,549,047 B1 | 1/2017 | Fredinburg et al. |
| 9,552,395 B2 | 1/2017 | Bayer et al. |
| 9,552,470 B2 | 1/2017 | Turgeman et al. |
| 9,553,918 B1 | 1/2017 | Manion et al. |
| 9,558,497 B2 | 1/2017 | Carvalho |
| 9,569,752 B2 | 2/2017 | Deering et al. |
| 9,571,509 B1 | 2/2017 | Satish et al. |
| 9,571,526 B2 | 2/2017 | Sartor |
| 9,571,991 B1 | 2/2017 | Brizendine et al. |
| 9,578,173 B2 | 2/2017 | Sanghavi et al. |
| 9,582,681 B2 | 2/2017 | Mishra |
| 9,589,110 B2 | 3/2017 | Carey et al. |
| 9,600,181 B2 | 3/2017 | Patel et al. |
| 9,602,529 B2 | 3/2017 | Jones et al. |
| 9,606,971 B2 | 3/2017 | Seolas et al. |
| 9,607,041 B2 | 3/2017 | Himmelstein |
| 9,619,652 B2 | 4/2017 | Slater |
| 9,619,661 B1 | 4/2017 | Finkelstein |
| 9,621,357 B2 | 4/2017 | Williams et al. |
| 9,621,566 B2 | 4/2017 | Gupta et al. |
| 9,642,008 B2 | 5/2017 | Wyatt et al. |
| 9,646,095 B1 | 5/2017 | Gottlieb et al. |
| 9,648,036 B2 | 5/2017 | Seiver et al. |
| 9,652,314 B2 | 5/2017 | Mahiddini |
| 9,654,506 B2 | 5/2017 | Barrett |
| 9,654,541 B1 | 5/2017 | Kapczynski et al. |
| 9,665,722 B2 | 5/2017 | Nagasundaram |
| 9,672,053 B2 | 6/2017 | Tang et al. |
| 9,672,355 B2 | 6/2017 | Titonis et al. |
| 9,691,090 B1 | 6/2017 | Barday |
| 9,704,103 B2 | 7/2017 | Suskind et al. |
| 9,705,840 B2 | 7/2017 | Pujare et al. |
| 9,721,078 B2 | 8/2017 | Cornick et al. |
| 9,721,108 B2 | 8/2017 | Krishnamurthy et al. |
| 9,727,751 B2 | 8/2017 | Oliver et al. |
| 9,729,583 B1 | 8/2017 | Barday |
| 9,740,985 B2 | 8/2017 | Byron et al. |
| 9,740,987 B2 | 8/2017 | Dolan |
| 9,749,408 B2 | 8/2017 | Subramani et al. |
| 9,760,620 B2 | 9/2017 | Nachnani et al. |
| 9,760,635 B2 | 9/2017 | Bliss et al. |
| 9,760,697 B1 | 9/2017 | Walker |
| 9,760,849 B2 | 9/2017 | Vinnakota et al. |
| 9,762,553 B2 | 9/2017 | Ford et al. |
| 9,767,202 B2 | 9/2017 | Darby et al. |
| 9,767,309 B1 | 9/2017 | Patel et al. |
| 9,769,124 B2 | 9/2017 | Yan |
| 9,785,795 B2 | 10/2017 | Grondin et al. |
| 9,798,749 B2 | 10/2017 | Saner |
| 9,798,826 B2 | 10/2017 | Wilson et al. |
| 9,800,605 B2 | 10/2017 | Baikalov et al. |
| 9,800,606 B1 | 10/2017 | Yumer |
| 9,804,649 B2 | 10/2017 | Cohen et al. |
| 9,804,928 B2 | 10/2017 | Davis et al. |
| 9,805,381 B2 | 10/2017 | Frank et al. |
| 9,811,532 B2 | 11/2017 | Parkison et al. |
| 9,817,850 B2 | 11/2017 | Dubbels et al. |
| 9,817,978 B2 | 11/2017 | Marsh et al. |
| 9,825,928 B2 | 11/2017 | Lelcuk et al. |
| 9,836,598 B2 | 12/2017 | Iyer et al. |
| 9,838,407 B1 | 12/2017 | Oprea et al. |
| 9,838,839 B2 | 12/2017 | Vudali et al. |
| 9,842,349 B2 | 12/2017 | Sawczuk et al. |
| 9,852,150 B2 | 12/2017 | Sharpe et al. |
| 9,853,959 B1 | 12/2017 | Kapczynski et al. |
| 9,860,226 B2 | 1/2018 | Thormaehlen |
| 9,864,735 B1 | 1/2018 | Lamprecht |
| 9,877,138 B1 | 1/2018 | Franklin |
| 9,882,935 B2 | 1/2018 | Barday |
| 9,892,441 B2 | 2/2018 | Barday |
| 9,892,442 B2 | 2/2018 | Barday |
| 9,892,443 B2 | 2/2018 | Barday |
| 9,892,444 B2 | 2/2018 | Barday |
| 9,894,076 B2 | 2/2018 | Li et al. |
| 9,898,613 B1 | 2/2018 | Swerdlow et al. |
| 9,898,769 B2 | 2/2018 | Barday |
| 9,912,625 B2 | 3/2018 | Mutha et al. |
| 9,912,810 B2 | 3/2018 | Segre et al. |
| 9,916,703 B2 | 3/2018 | Douillard et al. |
| 9,922,124 B2 | 3/2018 | Rathod |
| 9,923,927 B1 | 3/2018 | McClintock et al. |
| 9,928,379 B1 | 3/2018 | Hoffer |
| 9,934,544 B1 | 4/2018 | Whitfield et al. |
| 9,942,244 B2 | 4/2018 | Lahoz et al. |
| 9,942,276 B2 | 4/2018 | Sartor |
| 9,946,897 B2 | 4/2018 | Lovin |
| 9,948,663 B1 | 4/2018 | Wang et al. |
| 9,953,189 B2 | 4/2018 | Cook et al. |
| 9,959,582 B2 | 5/2018 | Sukman et al. |
| 9,961,070 B2 | 5/2018 | Tang |
| 9,973,518 B2 | 5/2018 | Lee et al. |
| 9,973,585 B2 | 5/2018 | Ruback et al. |
| 9,977,904 B2 | 5/2018 | Khan et al. |
| 9,983,936 B2 | 5/2018 | Dornemann et al. |
| 9,984,252 B2 | 5/2018 | Pollard |
| 9,990,499 B2 | 6/2018 | Chan et al. |
| 9,992,213 B2 | 6/2018 | Sinnema |
| 10,001,975 B2 | 6/2018 | Bharthulwar |
| 10,002,064 B2 | 6/2018 | Muske |
| 10,007,895 B2 | 6/2018 | Vanasco |
| 10,013,577 B1 | 7/2018 | Beaumont et al. |
| 10,015,164 B2 | 7/2018 | Hamburg et al. |
| 10,019,339 B2 | 7/2018 | Von Hanxleden et al. |
| 10,019,588 B2 | 7/2018 | Garcia et al. |
| 10,019,741 B2 | 7/2018 | Hesselink |
| 10,021,143 B2 | 7/2018 | Cabrera et al. |
| 10,025,804 B2 | 7/2018 | Vranyes et al. |
| 10,028,226 B2 | 7/2018 | Ayyagari et al. |
| 10,032,172 B2 | 7/2018 | Barday |
| 10,044,761 B2 | 8/2018 | Ducatel et al. |
| 10,055,426 B2 | 8/2018 | Arasan et al. |
| 10,061,847 B2 | 8/2018 | Mohammed et al. |
| 10,069,914 B1 | 9/2018 | Smith |
| 10,073,924 B2 | 9/2018 | Karp et al. |
| 10,075,451 B1 | 9/2018 | Hall et al. |
| 10,091,312 B1 | 10/2018 | Khanwalkar et al. |
| 10,102,533 B2 | 10/2018 | Barday |
| 10,108,409 B2 | 10/2018 | Pirzadeh et al. |
| 10,122,760 B2 | 11/2018 | Terrill et al. |
| 10,127,403 B2 | 11/2018 | Kong et al. |
| 10,129,211 B2 | 11/2018 | Heath |
| 10,140,666 B1 | 11/2018 | Wang et al. |
| 10,142,113 B2 | 11/2018 | Zaidi et al. |
| 10,158,676 B2 | 12/2018 | Barday |
| 10,165,011 B2 | 12/2018 | Barday |
| 10,176,503 B2 | 1/2019 | Barday et al. |
| 10,181,043 B1 | 1/2019 | Pauley, Jr. et al. |
| 10,181,051 B2 | 1/2019 | Barday et al. |

(56) References Cited

U.S. PATENT DOCUMENTS

| | | |
|---|---|---|
| 10,187,363 B2 | 1/2019 | Smirnoff et al. |
| 10,204,154 B2 | 2/2019 | Barday et al. |
| 10,212,175 B2 | 2/2019 | Seul et al. |
| 10,223,533 B2 | 3/2019 | Dawson |
| 10,250,594 B2 | 4/2019 | Chathoth et al. |
| 10,255,602 B2 | 4/2019 | Wang |
| 10,257,127 B2 | 4/2019 | Dotan-Cohen et al. |
| 10,257,181 B1 | 4/2019 | Sherif et al. |
| 10,268,838 B2 | 4/2019 | Yadgiri et al. |
| 10,275,614 B2 | 4/2019 | Barday et al. |
| 10,282,370 B1 | 5/2019 | Barday et al. |
| 10,284,604 B2 | 5/2019 | Barday et al. |
| 10,289,857 B1 | 5/2019 | Brinskelle |
| 10,289,866 B2 | 5/2019 | Barday et al. |
| 10,289,867 B2 | 5/2019 | Barday et al. |
| 10,289,870 B2 | 5/2019 | Barday et al. |
| 10,311,042 B1 | 6/2019 | Kumar |
| 10,311,492 B2 | 6/2019 | Gelfenbeyn et al. |
| 10,318,761 B2 | 6/2019 | Barday et al. |
| 10,324,960 B1 | 6/2019 | Skvortsov et al. |
| 10,326,768 B2 | 6/2019 | Verweyst et al. |
| 10,333,975 B2 | 6/2019 | Soman et al. |
| 10,346,186 B2 | 7/2019 | Kalyanpur |
| 10,346,635 B2 | 7/2019 | Kumar et al. |
| 10,348,726 B2 | 7/2019 | Caluwaert |
| 10,353,673 B2 | 7/2019 | Barday et al. |
| 10,361,857 B2 | 7/2019 | Woo |
| 10,373,119 B2 | 8/2019 | Driscoll et al. |
| 10,373,409 B2 | 8/2019 | White et al. |
| 10,375,115 B2 | 8/2019 | Mallya |
| 10,387,657 B2 | 8/2019 | Belfiore, Jr. et al. |
| 10,387,952 B1 | 8/2019 | Sandhu et al. |
| 10,404,729 B2 | 9/2019 | Turgeman |
| 10,417,401 B2 | 9/2019 | Votaw et al. |
| 10,430,608 B2 | 10/2019 | Peri et al. |
| 10,437,860 B2 | 10/2019 | Barday et al. |
| 10,438,016 B2 | 10/2019 | Barday et al. |
| 10,445,508 B2 | 10/2019 | Sher-Jan et al. |
| 10,445,526 B2 | 10/2019 | Barday et al. |
| 10,452,864 B2 | 10/2019 | Barday et al. |
| 10,452,866 B2 | 10/2019 | Barday et al. |
| 10,454,934 B2 | 10/2019 | Parimi et al. |
| 10,481,763 B2 | 11/2019 | Bartkiewicz et al. |
| 10,510,031 B2 | 12/2019 | Barday et al. |
| 10,534,851 B1 | 1/2020 | Chan et al. |
| 10,536,475 B1 | 1/2020 | McCorkle, Jr. et al. |
| 10,546,135 B1 | 1/2020 | Kassoumeh et al. |
| 10,558,821 B2 | 2/2020 | Barday et al. |
| 10,564,815 B2 | 2/2020 | Soon-Shiong |
| 10,564,935 B2 | 2/2020 | Barday et al. |
| 10,564,936 B2 | 2/2020 | Barday et al. |
| 10,565,161 B2 | 2/2020 | Barday et al. |
| 10,565,236 B1 | 2/2020 | Barday et al. |
| 10,572,684 B2 | 2/2020 | Lafever et al. |
| 10,574,705 B2 | 2/2020 | Barday et al. |
| 10,592,648 B2 | 3/2020 | Barday et al. |
| 10,613,971 B1 | 4/2020 | Vasikarla |
| 10,628,553 B1 | 4/2020 | Murrish et al. |
| 10,671,749 B2 | 6/2020 | Felice-Steele et al. |
| 10,671,760 B2 | 6/2020 | Esmailzadeh et al. |
| 10,726,153 B2 | 7/2020 | Nerurkar et al. |
| 10,732,865 B2 | 8/2020 | Jain et al. |
| 10,776,510 B2 | 9/2020 | Antonelli et al. |
| 10,785,173 B2 | 9/2020 | Willett et al. |
| 10,791,150 B2 | 9/2020 | Barday et al. |
| 10,796,260 B2 | 10/2020 | Brannon et al. |
| 10,834,590 B2 | 11/2020 | Turgeman et al. |
| 2002/0077941 A1 | 6/2002 | Halligan et al. |
| 2002/0103854 A1 | 8/2002 | Okita |
| 2002/0129216 A1 | 9/2002 | Collins |
| 2002/0161594 A1 | 10/2002 | Bryan et al. |
| 2002/0161733 A1 | 10/2002 | Grainger |
| 2003/0041250 A1 | 2/2003 | Proudler |
| 2003/0097451 A1 | 5/2003 | Bjorksten et al. |
| 2003/0097661 A1 | 5/2003 | Li et al. |
| 2003/0115142 A1 | 6/2003 | Brickell et al. |
| 2003/0130893 A1 | 7/2003 | Farmer |
| 2003/0131001 A1 | 7/2003 | Matsuo |
| 2003/0131093 A1 | 7/2003 | Aschen et al. |
| 2003/0167216 A1 | 9/2003 | Brown et al. |
| 2003/0212604 A1 | 11/2003 | Cullen |
| 2004/0025053 A1 | 2/2004 | Hayward |
| 2004/0088235 A1 | 5/2004 | Ziekle et al. |
| 2004/0098366 A1 | 5/2004 | Sinclair et al. |
| 2004/0098493 A1 | 5/2004 | Rees |
| 2004/0111359 A1 | 6/2004 | Hudock |
| 2004/0186912 A1 | 9/2004 | Harlow et al. |
| 2004/0193907 A1 | 9/2004 | Patanella |
| 2005/0022198 A1 | 1/2005 | Olapurath et al. |
| 2005/0033616 A1 | 2/2005 | Vavul et al. |
| 2005/0076294 A1 | 4/2005 | Dehamer et al. |
| 2005/0114343 A1 | 5/2005 | Wesinger, Jr. et al. |
| 2005/0144066 A1 | 6/2005 | Cope et al. |
| 2005/0197884 A1 | 9/2005 | Mullen, Jr. |
| 2005/0198177 A1 | 9/2005 | Black |
| 2005/0246292 A1 | 11/2005 | Sarcanin |
| 2005/0278538 A1 | 12/2005 | Fowler |
| 2006/0031078 A1 | 2/2006 | Pizzinger et al. |
| 2006/0075122 A1 | 4/2006 | Lindskog et al. |
| 2006/0149730 A1 | 7/2006 | Curtis |
| 2006/0156052 A1 | 7/2006 | Bodnar et al. |
| 2006/0206375 A1 | 9/2006 | Scott et al. |
| 2006/0224422 A1 | 10/2006 | Cohen |
| 2006/0253597 A1 | 11/2006 | Mujica |
| 2007/0027715 A1 | 2/2007 | Gropper et al. |
| 2007/0061393 A1 | 3/2007 | Moore |
| 2007/0130101 A1 | 6/2007 | Anderson et al. |
| 2007/0130323 A1 | 6/2007 | Landsman et al. |
| 2007/0157311 A1 | 7/2007 | Meier et al. |
| 2007/0173355 A1 | 7/2007 | Klein |
| 2007/0179793 A1 | 8/2007 | Bagchi et al. |
| 2007/0180490 A1 | 8/2007 | Renzi et al. |
| 2007/0192438 A1 | 8/2007 | Goei |
| 2007/0266420 A1 | 11/2007 | Hawkins et al. |
| 2007/0283171 A1 | 12/2007 | Breslin et al. |
| 2008/0015927 A1 | 1/2008 | Ramirez |
| 2008/0028065 A1 | 1/2008 | Caso et al. |
| 2008/0028435 A1 | 1/2008 | Strickland et al. |
| 2008/0047016 A1 | 2/2008 | Spoonamore |
| 2008/0120699 A1 | 5/2008 | Spear |
| 2008/0195436 A1 | 8/2008 | Whyte |
| 2008/0235177 A1 | 9/2008 | Kim et al. |
| 2008/0270203 A1 | 10/2008 | Holmes et al. |
| 2008/0281649 A1 | 11/2008 | Morris |
| 2008/0282320 A1 | 11/2008 | Denovo et al. |
| 2008/0288271 A1 | 11/2008 | Faust |
| 2009/0012896 A1 | 1/2009 | Arnold |
| 2009/0022301 A1 | 1/2009 | Mudaliar |
| 2009/0037975 A1 | 2/2009 | Ishikawa et al. |
| 2009/0158249 A1 | 6/2009 | Tomkins et al. |
| 2009/0172705 A1 | 7/2009 | Cheong |
| 2009/0182818 A1 | 7/2009 | Krywaniuk |
| 2009/0187764 A1 | 7/2009 | Astakhov et al. |
| 2009/0204452 A1 | 8/2009 | Iskandar et al. |
| 2009/0204820 A1 | 8/2009 | Brandenburg et al. |
| 2009/0210347 A1 | 8/2009 | Sarcanin |
| 2009/0216610 A1 | 8/2009 | Chorny |
| 2009/0249076 A1 | 10/2009 | Reed et al. |
| 2009/0303237 A1 | 12/2009 | Liu et al. |
| 2010/0082533 A1 | 4/2010 | Nakamura et al. |
| 2010/0094650 A1 | 4/2010 | Tran et al. |
| 2010/0100398 A1 | 4/2010 | Auker et al. |
| 2010/0121773 A1 | 5/2010 | Currier et al. |
| 2010/0192201 A1 | 7/2010 | Shimoni et al. |
| 2010/0205057 A1 | 8/2010 | Hook et al. |
| 2010/0223349 A1 | 9/2010 | Thorson |
| 2010/0228786 A1* | 9/2010 | Torok ............... G06F 16/28 707/802 |
| 2010/0235297 A1 | 9/2010 | Mamorsky |
| 2010/0235915 A1 | 9/2010 | Memon et al. |
| 2010/0268628 A1 | 10/2010 | Pitkow et al. |
| 2010/0281313 A1 | 11/2010 | White et al. |
| 2010/0287114 A1 | 11/2010 | Bartko et al. |
| 2010/0333012 A1 | 12/2010 | Adachi et al. |

(56) References Cited

U.S. PATENT DOCUMENTS

| | | | |
|---|---|---|---|
| 2011/0006996 A1 | 1/2011 | Smith et al. | |
| 2011/0010202 A1 | 1/2011 | Neale | |
| 2011/0022711 A1* | 1/2011 | Cohn | H04L 41/04 709/225 |
| 2011/0082794 A1 | 4/2011 | Blechman | |
| 2011/0137696 A1 | 6/2011 | Meyer et al. | |
| 2011/0138116 A1* | 6/2011 | Lipinski | G06F 3/0674 711/103 |
| 2011/0191664 A1 | 8/2011 | Sheleheda et al. | |
| 2011/0208850 A1 | 8/2011 | Sheleheda et al. | |
| 2011/0209067 A1 | 8/2011 | Bogess et al. | |
| 2011/0231896 A1 | 9/2011 | Tovar | |
| 2012/0005220 A1* | 1/2012 | Schindlauer | G06F 16/245 707/769 |
| 2012/0084151 A1 | 4/2012 | Kozak et al. | |
| 2012/0084349 A1 | 4/2012 | Lee et al. | |
| 2012/0102543 A1 | 4/2012 | Kohli et al. | |
| 2012/0110674 A1 | 5/2012 | Belani et al. | |
| 2012/0116923 A1 | 5/2012 | Irving et al. | |
| 2012/0131438 A1 | 5/2012 | Li et al. | |
| 2012/0143650 A1 | 6/2012 | Crowley et al. | |
| 2012/0144499 A1 | 6/2012 | Tan et al. | |
| 2012/0226621 A1 | 9/2012 | Petran et al. | |
| 2012/0239557 A1 | 9/2012 | Weinflash et al. | |
| 2012/0254320 A1 | 10/2012 | Dove et al. | |
| 2012/0259752 A1 | 10/2012 | Agee | |
| 2012/0303739 A1* | 11/2012 | Ferris | H04L 69/329 709/217 |
| 2012/0323700 A1 | 12/2012 | Aleksandrovich et al. | |
| 2012/0330869 A1 | 12/2012 | Durham | |
| 2013/0004933 A1 | 1/2013 | Bhaskaran | |
| 2013/0018954 A1 | 1/2013 | Cheng | |
| 2013/0085801 A1 | 4/2013 | Sharpe et al. | |
| 2013/0103485 A1 | 4/2013 | Postrel | |
| 2013/0111323 A1 | 5/2013 | Taghaddos et al. | |
| 2013/0159351 A1* | 6/2013 | Hamann | G06Q 10/087 707/792 |
| 2013/0171968 A1 | 7/2013 | Wang | |
| 2013/0179982 A1 | 7/2013 | Bridges et al. | |
| 2013/0185806 A1 | 7/2013 | Hatakeyama | |
| 2013/0212351 A1* | 8/2013 | Tkac | G09B 29/106 711/206 |
| 2013/0218829 A1 | 8/2013 | Martinez | |
| 2013/0219459 A1 | 8/2013 | Bradley | |
| 2013/0254649 A1 | 9/2013 | ONeill | |
| 2013/0254699 A1 | 9/2013 | Bashir et al. | |
| 2013/0282466 A1 | 10/2013 | Hampton | |
| 2013/0290169 A1 | 10/2013 | Bathula et al. | |
| 2013/0298071 A1 | 11/2013 | Wine | |
| 2013/0311224 A1 | 11/2013 | Heroux et al. | |
| 2013/0318207 A1 | 11/2013 | Dotter | |
| 2013/0326112 A1 | 12/2013 | Park et al. | |
| 2013/0332362 A1 | 12/2013 | Ciurea | |
| 2013/0340086 A1 | 12/2013 | Blom | |
| 2014/0006355 A1 | 1/2014 | Kirihata | |
| 2014/0006616 A1 | 1/2014 | Aad et al. | |
| 2014/0012833 A1 | 1/2014 | Humprecht | |
| 2014/0019561 A1 | 1/2014 | Belity et al. | |
| 2014/0032259 A1 | 1/2014 | Lafever et al. | |
| 2014/0032265 A1 | 1/2014 | Paprocki | |
| 2014/0040134 A1 | 2/2014 | Ciurea | |
| 2014/0040161 A1 | 2/2014 | Berlin | |
| 2014/0040979 A1 | 2/2014 | Barton et al. | |
| 2014/0047551 A1 | 2/2014 | Nagasundaram et al. | |
| 2014/0052463 A1 | 2/2014 | Cashman et al. | |
| 2014/0074645 A1 | 3/2014 | Ingram | |
| 2014/0089027 A1 | 3/2014 | Brown | |
| 2014/0089039 A1 | 3/2014 | McClellan | |
| 2014/0108173 A1 | 4/2014 | Cooper et al. | |
| 2014/0142988 A1 | 5/2014 | Grosso et al. | |
| 2014/0143011 A1 | 5/2014 | Mudugu et al. | |
| 2014/0164476 A1 | 6/2014 | Thomson | |
| 2014/0188956 A1 | 7/2014 | Subba et al. | |
| 2014/0196143 A1 | 7/2014 | Fliderman et al. | |
| 2014/0208418 A1 | 7/2014 | Libin | |
| 2014/0244309 A1 | 8/2014 | Francois | |
| 2014/0244325 A1 | 8/2014 | Cartwright | |
| 2014/0244399 A1 | 8/2014 | Orduna et al. | |
| 2014/0257917 A1 | 9/2014 | Spencer et al. | |
| 2014/0258093 A1 | 9/2014 | Gardiner et al. | |
| 2014/0278663 A1 | 9/2014 | Samuel et al. | |
| 2014/0278730 A1 | 9/2014 | Muhart et al. | |
| 2014/0283027 A1 | 9/2014 | Orona et al. | |
| 2014/0283106 A1 | 9/2014 | Stahura et al. | |
| 2014/0288971 A1 | 9/2014 | Whibbs, III | |
| 2014/0289862 A1 | 9/2014 | Gorfein et al. | |
| 2014/0317171 A1 | 10/2014 | Fox et al. | |
| 2014/0324480 A1 | 10/2014 | Dufel et al. | |
| 2014/0337466 A1 | 11/2014 | Li et al. | |
| 2014/0344015 A1 | 11/2014 | Puértolas-Montañés et al. | |
| 2015/0012363 A1 | 1/2015 | Grant et al. | |
| 2015/0019530 A1 | 1/2015 | Felch | |
| 2015/0033112 A1 | 1/2015 | Norwood et al. | |
| 2015/0066577 A1 | 3/2015 | Christiansen et al. | |
| 2015/0106867 A1 | 4/2015 | Liang | |
| 2015/0106948 A1 | 4/2015 | Holman et al. | |
| 2015/0106949 A1 | 4/2015 | Holman et al. | |
| 2015/0134589 A1* | 5/2015 | Marrelli | G06F 16/258 707/602 |
| 2015/0143258 A1 | 5/2015 | Carolan et al. | |
| 2015/0149362 A1 | 5/2015 | Baum et al. | |
| 2015/0154520 A1 | 6/2015 | Federgreen et al. | |
| 2015/0169318 A1 | 6/2015 | Nash | |
| 2015/0178740 A1 | 6/2015 | Borawski et al. | |
| 2015/0199534 A1 | 7/2015 | Francis et al. | |
| 2015/0199541 A1 | 7/2015 | Koch et al. | |
| 2015/0229664 A1 | 8/2015 | Hawthorn | |
| 2015/0235049 A1 | 8/2015 | Cohen et al. | |
| 2015/0235050 A1 | 8/2015 | Wouhaybi et al. | |
| 2015/0242778 A1 | 8/2015 | Wilcox et al. | |
| 2015/0242858 A1 | 8/2015 | Smith et al. | |
| 2015/0254597 A1 | 9/2015 | Jahagirdar | |
| 2015/0261887 A1 | 9/2015 | Joukov | |
| 2015/0264417 A1 | 9/2015 | Spitz et al. | |
| 2015/0269384 A1 | 9/2015 | Holman et al. | |
| 2015/0309813 A1 | 10/2015 | Patel | |
| 2015/0310227 A1 | 10/2015 | Ishida et al. | |
| 2015/0310575 A1 | 10/2015 | Shelton | |
| 2015/0348054 A1* | 12/2015 | Ogawa | G06Q 10/0635 705/317 |
| 2015/0356362 A1 | 12/2015 | Demos | |
| 2015/0379430 A1 | 12/2015 | Dirac et al. | |
| 2016/0012465 A1 | 1/2016 | Sharp | |
| 2016/0026394 A1 | 1/2016 | Goto | |
| 2016/0034918 A1 | 2/2016 | Bjelajac et al. | |
| 2016/0048700 A1 | 2/2016 | Stransky-Heilkron | |
| 2016/0050213 A1 | 2/2016 | Storr | |
| 2016/0063523 A1 | 3/2016 | Nistor et al. | |
| 2016/0063567 A1 | 3/2016 | Srivastava | |
| 2016/0071112 A1 | 3/2016 | Unser | |
| 2016/0092343 A1* | 3/2016 | Chhatwal | G06F 8/65 717/124 |
| 2016/0099963 A1 | 4/2016 | Mahaffey et al. | |
| 2016/0103963 A1 | 4/2016 | Mishra | |
| 2016/0125550 A1 | 5/2016 | Joao | |
| 2016/0125749 A1 | 5/2016 | Delacroix et al. | |
| 2016/0125751 A1 | 5/2016 | Barker et al. | |
| 2016/0140466 A1 | 5/2016 | Sidebottom et al. | |
| 2016/0143570 A1 | 5/2016 | Valacich et al. | |
| 2016/0148143 A1 | 5/2016 | Anderson et al. | |
| 2016/0162269 A1 | 6/2016 | Pogorelik et al. | |
| 2016/0164915 A1 | 6/2016 | Cook | |
| 2016/0180386 A1 | 6/2016 | Konig | |
| 2016/0188450 A1 | 6/2016 | Appusamy et al. | |
| 2016/0196189 A1* | 7/2016 | Miyagi | G06F 11/0709 714/19 |
| 2016/0225000 A1 | 8/2016 | Glasgow | |
| 2016/0232534 A1 | 8/2016 | Lacey et al. | |
| 2016/0234319 A1 | 8/2016 | Griffin | |
| 2016/0261631 A1 | 9/2016 | Vissamsetty et al. | |
| 2016/0262163 A1 | 9/2016 | Gonzalez Garrido et al. | |
| 2016/0292621 A1 | 10/2016 | Ciccone et al. | |
| 2016/0321582 A1 | 11/2016 | Broudou et al. | |

(56) References Cited

U.S. PATENT DOCUMENTS

| | | |
|---|---|---|
| 2016/0321748 A1 | 11/2016 | Mahatma et al. |
| 2016/0330237 A1 | 11/2016 | Edlabadkar |
| 2016/0342811 A1 | 11/2016 | Whitcomb et al. |
| 2016/0364736 A1 | 12/2016 | Maugans, III |
| 2016/0370954 A1 | 12/2016 | Burningham et al. |
| 2016/0378762 A1 | 12/2016 | Rohter |
| 2016/0381064 A1 | 12/2016 | Chan et al. |
| 2016/0381560 A1 | 12/2016 | Margaliot |
| 2017/0004055 A1 | 1/2017 | Horan et al. |
| 2017/0032395 A1 | 2/2017 | Kaufman et al. |
| 2017/0034101 A1 | 2/2017 | Kumar et al. |
| 2017/0041324 A1 | 2/2017 | Ionutescu et al. |
| 2017/0046399 A1 | 2/2017 | Sankaranarasimhan et al. |
| 2017/0046753 A1 | 2/2017 | Deupree, IV |
| 2017/0068785 A1 | 3/2017 | Experton et al. |
| 2017/0115864 A1 | 4/2017 | Thomas et al. |
| 2017/0124570 A1 | 5/2017 | Nidamanuri et al. |
| 2017/0140174 A1 | 5/2017 | Lacey et al. |
| 2017/0140467 A1 | 5/2017 | Neag et al. |
| 2017/0142158 A1 | 5/2017 | Laoutaris et al. |
| 2017/0142177 A1 | 5/2017 | Hu |
| 2017/0154188 A1 | 6/2017 | Meier et al. |
| 2017/0161520 A1 | 6/2017 | Lockhart, III et al. |
| 2017/0171235 A1 | 6/2017 | Mulchandani et al. |
| 2017/0177324 A1 | 6/2017 | Frank et al. |
| 2017/0180378 A1 | 6/2017 | Tyler et al. |
| 2017/0180505 A1 | 6/2017 | Shaw et al. |
| 2017/0193624 A1 | 7/2017 | Tsai |
| 2017/0201518 A1 | 7/2017 | Holmqvist et al. |
| 2017/0206707 A1 | 7/2017 | Guay et al. |
| 2017/0208084 A1 | 7/2017 | Steelman et al. |
| 2017/0220685 A1* | 8/2017 | Yan .......................... G06F 16/28 |
| 2017/0220964 A1 | 8/2017 | Datta Ray |
| 2017/0249710 A1 | 8/2017 | Guillama et al. |
| 2017/0269791 A1 | 9/2017 | Meyerzon et al. |
| 2017/0270318 A1 | 9/2017 | Ritchie |
| 2017/0278004 A1 | 9/2017 | McElhinney et al. |
| 2017/0278117 A1 | 9/2017 | Wallace et al. |
| 2017/0286719 A1 | 10/2017 | Krishnamurthy et al. |
| 2017/0287031 A1 | 10/2017 | Barday |
| 2017/0289199 A1 | 10/2017 | Barday |
| 2017/0308875 A1 | 10/2017 | O'Regan et al. |
| 2017/0316400 A1 | 11/2017 | Venkatakrishnan et al. |
| 2017/0330197 A1 | 11/2017 | DiMaggio et al. |
| 2017/0353404 A1 | 12/2017 | Hodge |
| 2018/0039975 A1 | 2/2018 | Hefetz |
| 2018/0041498 A1 | 2/2018 | Kikuchi |
| 2018/0046753 A1 | 2/2018 | Shelton |
| 2018/0063174 A1 | 3/2018 | Grill et al. |
| 2018/0063190 A1 | 3/2018 | Wright et al. |
| 2018/0082368 A1 | 3/2018 | Weinflash et al. |
| 2018/0083843 A1 | 3/2018 | Sambandam |
| 2018/0091476 A1 | 3/2018 | Jakobsson et al. |
| 2018/0131658 A1 | 5/2018 | Bhagwan et al. |
| 2018/0165637 A1 | 6/2018 | Romero et al. |
| 2018/0198614 A1 | 7/2018 | Neumann |
| 2018/0219917 A1 | 8/2018 | Chiang |
| 2018/0239500 A1 | 8/2018 | Allen et al. |
| 2018/0248914 A1 | 8/2018 | Sartor |
| 2018/0285887 A1 | 10/2018 | Maung |
| 2018/0307859 A1 | 10/2018 | Lafever et al. |
| 2018/0349583 A1 | 12/2018 | Turgeman et al. |
| 2018/0351888 A1 | 12/2018 | Howard |
| 2018/0352003 A1 | 12/2018 | Winn et al. |
| 2018/0357243 A1 | 12/2018 | Yoon |
| 2018/0365720 A1 | 12/2018 | Goldman et al. |
| 2018/0374030 A1 | 12/2018 | Barday et al. |
| 2018/0375814 A1 | 12/2018 | Hart |
| 2019/0005210 A1 | 1/2019 | Wiederspohn et al. |
| 2019/0012672 A1 | 1/2019 | Francesco |
| 2019/0019184 A1 | 1/2019 | Lacey et al. |
| 2019/0050547 A1 | 2/2019 | Welsh et al. |
| 2019/0108353 A1 | 4/2019 | Sadeh et al. |
| 2019/0130132 A1 | 5/2019 | Barbas et al. |
| 2019/0138496 A1* | 5/2019 | Yamaguchi ......... H04L 41/5019 |
| 2019/0156053 A1 | 5/2019 | Vogel et al. |
| 2019/0156058 A1 | 5/2019 | Van Dyne et al. |
| 2019/0182294 A1 | 6/2019 | Rieke et al. |
| 2019/0188402 A1 | 6/2019 | Wang et al. |
| 2019/0266201 A1 | 8/2019 | Barday et al. |
| 2019/0266350 A1 | 8/2019 | Barday et al. |
| 2019/0268343 A1 | 8/2019 | Barday et al. |
| 2019/0268344 A1 | 8/2019 | Barday et al. |
| 2019/0294818 A1 | 9/2019 | Barday et al. |
| 2019/0333118 A1 | 10/2019 | Crimmins et al. |
| 2019/0362268 A1 | 11/2019 | Fogarty et al. |
| 2019/0378073 A1 | 12/2019 | Lopez et al. |
| 2019/0384934 A1 | 12/2019 | Kim |
| 2019/0392170 A1 | 12/2019 | Barday et al. |
| 2019/0392171 A1 | 12/2019 | Barday et al. |
| 2020/0020454 A1 | 1/2020 | McGarvey et al. |
| 2020/0090197 A1 | 3/2020 | Rodriguez et al. |
| 2020/0092179 A1 | 3/2020 | Chieu et al. |
| 2020/0110589 A1 | 4/2020 | Bequet et al. |
| 2020/0143797 A1 | 5/2020 | Manoharan et al. |
| 2020/0183655 A1 | 6/2020 | Barday et al. |
| 2020/0186355 A1 | 6/2020 | Davies |
| 2020/0193022 A1 | 6/2020 | Lunsford et al. |
| 2020/0220901 A1 | 7/2020 | Barday et al. |
| 2020/0242719 A1 | 7/2020 | Lee |

FOREIGN PATENT DOCUMENTS

| | | |
|---|---|---|
| KR | 20130062500 | 6/2013 |
| WO | 2001033430 | 5/2001 |
| WO | 2005008411 | 1/2005 |
| WO | 2007002412 | 1/2007 |
| WO | 2012174659 | 12/2012 |
| WO | 2015116905 | 8/2015 |

OTHER PUBLICATIONS

Written Opinion of the International Searching Authority, dated Sep. 1, 2017, from corresponding International Application No. PCT/US2017/036896.

Written Opinion of the International Searching Authority, dated Sep. 12, 2018, from corresponding International Application No. PCT/US2018/037504.

www.truste.com (1), Feb. 7, 2001, Internet Archive Wayback Machine, www.archive.org,2_7_2015, p. 1 2015.

Yang et al, "DAC-MACS: Effective Data Access Control for Multiauthority Cloud Storage Systems," IEEE, pp. 1790-1801 (Year: 2013).

Yin et al, "Multibank Memory Optimization for Parallel Data Access in Multiple Data Arrays", ACM, pp. 1-8 (Year: 2016).

Yiu et al, "Outsourced Similarity Search on Metric Data Assets", IEEE, pp. 338-352 (Year: 2012).

Yu, "Using Data from Social Media Websites to Inspire the Design of Assistive Technology", ACM, pp. 1-2 (Year: 2016).

Yu, et al, "Performance and Fairness Issues in Big Data Transfers," ACM, pp. 9-11 (Year: 2014).

Zannone, et al, "Maintaining Privacy on Derived Objects," ACM, pp. 10-19 (Year: 2005).

Zeldovich, Nickolai, et al, Making Information Flow Explicit in HiStar, OSDI '06: 7th USENIX Symposium on Operating Systems Design and Implementation, USENIX Association, p. 263-278, 2006.

Zhang et al, "Data Transfer Performance Issues for a Web Services Interface to Synchrotron Experiments", ACM, pp. 59-65 (Year: 2007).

Zhang et al, "Dynamic Topic Modeling for Monitoring Market Competition from Online Text and Image Data", ACM, pp. 1425-1434 (Year: 2015).

Zhu, et al, "Dynamic Data Integration Using Web Services," IEEE, pp. 1-8 (Year: 2004).

Office Action, dated May 14, 2020, from corresponding U.S. Appl. No. 16/808,497.

Office Action, dated May 14, 2020, from corresponding U.S. Appl. No. 16/808,503.

(56) References Cited

OTHER PUBLICATIONS

Office Action, dated May 15, 2020, from corresponding U.S. Appl. No. 16/808,493.
Notice of Allowance, dated May 19, 2020, from corresponding U.S. Appl. No. 16/505,430.
Notice of Allowance, dated May 19, 2020, from corresponding U.S. Appl. No. 16/808,496.
Advisory Action, dated Jun. 2, 2020, from corresponding U.S. Appl. No. 16/404,491.
Advisory Action, dated May 21, 2020, from corresponding U.S. Appl. No. 16/557,392.
Ahmad et al, "Task-Oriented Access Model for Secure Data Sharing Over Cloud," ACM, pp. 1-7 (Year: 2015).
Carminati et al, "Enforcing Access Control Over Data Streams," ACM, pp. 21-30 (Year: 2007).
Cha et al, "A Data-Driven Security Risk Assessment Scheme for Personal Data Protection," IEEE, pp. 50510-50517 (Year: 2018).
Chowdhury et al, "Managing Data Transfers in Computer Clusters with Orchestra," ACM, pp. 98-109 (Year: 2011).
Golfarelli et al, "Beyond Data Warehousing: What's Next in Business Intelligence?," ACM, pp. 1-6 (Year: 2004).
Mesbah et al, "Crawling Ajax-Based Web Applications Through Dynamic Analysis of User Interface State Changes," ACM Transactions on the Web (TWEB) vol. 6, No. 1, Article 3, Mar. 2012, pp. 1-30 (Year: 2012).
Notice of Allowance, dated Jun. 1, 2020, from corresponding U.S. Appl. No. 16/813,321.
Notice of Allowance, dated Jun. 16, 2020, from corresponding U.S. Appl. No. 16/798,818.
Notice of Allowance, dated Jun. 17, 2020, from corresponding U.S. Appl. No. 16/656,895.
Notice of Allowance, dated Jun. 8, 2020, from corresponding U.S. Appl. No. 16/712,104.
Notice of Allowance, dated May 20, 2020, from corresponding U.S. Appl. No. 16/707,762.
Notice of Allowance, dated May 27, 2020, from corresponding U.S. Appl. No. 16/820,208.
Notice of Allowance, dated May 28, 2020, from corresponding U.S. Appl. No. 16/799,279.
Office Action, dated Jun. 1, 2020, from corresponding U.S. Appl. No. 16/862,952.
Office Action, dated May 29, 2020, from corresponding U.S. Appl. No. 16/862,944.
Office Action, dated May 29, 2020, from corresponding U.S. Appl. No. 16/862,948.
Pechenizkiy et al, "Process Mining Online Assessment Data," Educational Data Mining, pp. 279-288 (Year: 2009).
Ping et al, "Wide Area Placement of Data Replicas for Fast and Highly Available Data Access," ACM, pp. 1-8 (Year: 2011).
Sanzo et al, "Analytical Modeling of Lock-Based Concurrency Control with Arbitrary Transaction Data Access Patterns," ACM, pp. 69-78 (Year: 2010).
Srinivasan et al, "Descriptive Data Analysis of File Transfer Data," ACM, pp. 1-8 (Year: 2014).
Tsai et al, "Determinants of Intangible Assets Value: The Data Mining Approach," Knowledge Based System, pp. 67-77 http://www.elsevier.com/locate/knosys (Year: 2012).
Ye et al, "An Evolution-Based Cache Scheme for Scalable Mobile Data Access," ACM, pp. 1-7 (Year: 2007).
Office Action, dated Sep. 11, 2017, from corresponding U.S. Appl. No. 15/619,478.
Office Action, dated Sep. 16, 2019, from corresponding U.S. Appl. No. 16/277,715.
Office Action, dated Sep. 19, 2017, from corresponding U.S. Appl. No. 15/671,073.
Office Action, dated Sep. 22, 2017, from corresponding U.S. Appl. No. 15/619,278.
Office Action, dated Sep. 5, 2017, from corresponding U.S. Appl. No. 15/619,469.
Office Action, dated Sep. 6, 2017, from corresponding U.S. Appl. No. 15/619,479.
Office Action, dated Sep. 7, 2017, from corresponding U.S. Appl. No. 15/633,703.
Office Action, dated Sep. 8, 2017, from corresponding U.S. Appl. No. 15/619,251.
Abdullah et al, "The Mapping Process of Unstructured Data to the Structured Data", ACM, pp. 151-155 (Year: 2013).
Agar, Gunes, et al, The Web Never Forgets, Computer and Communications Security, ACM, Nov. 3, 2014, pp. 674-689.
Aghasian, Erfan, et al, Scoring Users' Privacy Disclosure Across Multiple Online Socialpage Networks,IEEE Access, Multidisciplinary Rapid Review Open Access Journal, Jul. 31, 2017, vol. 5, 2017, p. 1.
Agosti et al, "Access and Exchange of Hierarchically Structured Resources on the Web with the NESTOR Framework", IEEE, pp. 659-662 (Year: 2009).
Agrawal et al, "Securing Electronic Health Records Without Impeding the Flow of Information," International Journal of Medical Informatics 76, 2007, pp. 471-479 (Year: 2007).
Antunes et al, "Preserving Digital Data in Heterogeneous Environments", ACM, pp. 345-348, 2009 (Year: 2009).
Avepoint, AvePoint Privacy Impact Assessment 1: User Guide, Cumulative Update 2, Revision E, Feb. 2015, AvePoint, Inc., p. 1.
Bang et al, "Building an Effective and Efficient Continuous Web Application Security Program," 2016 International Conference on Cyber Security Situational Awareness, Data Analytics and Assessment (CyberSA), London, 2016, pp. 1-4 (Year: 2016).
Barker, "Personalizing Access Control by Generalizing Access Control," ACM, pp. 149-158 (Year: 2010).
Bayardo et al, "Technological Solutions for Protecting Privacy," Computer 36.9 (2003), pp. 115-118, (Year: 2003).
Berezovskiy et al, "A framework for dynamic data source identification and orchestration on the Web", ACM, pp. 1-8 (Year: 2010).
Bertino et al, "On Specifying Security Policies for Web Documents with an XML-based Language," ACM, pp. 57-65 (Year: 2001).
Bhargav-Spantzel et al., Receipt Management—Transaction History based Trust Establishment, 2007, ACM, p. 82-91.
Bhuvaneswaran et al, "Redundant Parallel Data Transfer Schemes for the Grid Environment", ACM, pp. 18 (Year: 2006).
Binns, et al, "Data Havens, or Privacy Sans Frontières? A Study of International Personal Data Transfers," ACM, pp. 273-274 (Year: 2002).
Brandt et al, "Efficient Metadata Management in Large Distributed Storage Systems," IEEE, pp. 1-9 (Year: 2003).
Byun, Ji-Won, Elisa Bertino, and Ninghui Li. "Purpose based access control of complex data for privacy protection." Proceedings of the tenth ACM symposium on Access control models and technologies. ACM, 2005. (Year: 2005), p. 1.
Carpineto et al, "Automatic Assessment of Website Compliance to the European Cookie Law with CooLCheck," Proceedings of the 2016 ACM on Workshop on Privacy in the Electronic Society, 2016, pp. 135-138 (Year: 2016).
Cerpzone, "How to Access Data on Data Archival Storage and Recovery System", https://www.saj.usace.army.mil/Portals/44/docs/Environmental/Lake%20O%20Watershed/15February2017/How%20To%20Access%20Model%20Data%20on%20DASR.pdf?ver=2017-02-16-095535-633, Feb. 16, 2017, p. 1.
Chapados et al, "Scoring Models for Insurance Risk Sharing Pool Optimization," 2008, IEEE, pp. 97-105 (Year: 2008).
Choi et al, "Retrieval Effectiveness of Table of Contents and Subject Headings," ACM, pp. 103-104 (Year: 2007).
Chowdhury et al, "A System Architecture for Subject-Centric Data Sharing", ACM, pp. 1-10 (Year: 2018).
Decision Regarding Institution of Post-Grant Review in Case PGR2018-00056 for U.S. Pat. No. 9,691,090 B1, Oct. 11, 2018.
Dimou et al, "Machine-Interpretable Dataset and Service Descriptions for Heterogeneous Data Access and Retrieval", ACM, pp. 145-152 (Year: 2015).
Dokholyan et al, "Regulatory and Ethical Considerations for Linking Clinical and Administrative Databases," American Heart Journal 157.6 (2009), pp. 971-982 (Year: 2009).

(56) References Cited

OTHER PUBLICATIONS

Dunkel et al, "Data Organization and Access for Efficient Data Mining", IEEE, pp. 522-529 (Year: 1999).
Emerson, et al, "A Data Mining Driven Risk Profiling Method for Road Asset Management," ACM, pp. 1267-1275 (Year: 2013).
Enck, William, et al, TaintDroid: An Information-Flow Tracking System for Realtime Privacy Monitoring on Smartphones, ACM Transactions on Computer Systems, vol. 32, No. 2, Article 5, Jun. 2014, p. 5:1-5:29.
Falahrastegar, Marjan, et al, Tracking Personal Identifiers Across the Web, Medical Image Computing and Computer-Assisted Intervention—Miccai 2015, 18th International Conference, Oct. 5, 2015, Munich, Germany, p. 1.
Final Written Decision Regarding Post-Grant Review in Case PGR2018-00056 for U.S. Pat. No. 9,691,090 B1, Oct. 10, 2019.
Francis, Andre, Business Mathematics and Statistics, South-Western Cengage Learning, 2008, Sixth Edition, p. 1.
Friedman et al, "Informed Consent in the Mozilla Browser: Implementing Value-Sensitive Design," Proceedings of the 35th Annual Hawaii International Conference on System Sciences, 2002, IEEE, pp. 1-10 (Year: 2002).
Frikken, Keith B., et al, Yet Another Privacy Metric for Publishing Micro-data, Miami University, Oct. 27, 2008, p. 117-121.
Fung et al, "Discover Information and Knowledge from Websites using an Integrated Summarization and Visualization Framework", IEEE, pp. 232-235 (Year: 2010).
Ghiglieri, Marco et al.; Personal DLP for Facebook, 2014 IEEE International Conference on Pervasive Computing and Communication Workshops (Percom Workshops); IEEE; Mar. 24, 2014; pp. 629-634.
Goni, Kyriaki, "Deletion Process_Only you can see my history: Investigating Digital Privacy, Digital Oblivion, and Control on Personal Data Through an Interactive Art Installation," ACM, 2016, retrieved online on Oct. 3, 2019, pp. 324-333. Retrieved from the Internet URL: http://delivery.acm.org/10.1145/2920000/291.
Gowadia et al, "RDF Metadata for XML Access Control," ACM, pp. 31-48 (Year: 2003).
Guo, et al, "OPAL: A Passe-partout for Web Forms," ACM, pp. 353-356 (Year: 2012).
Gustarini, et al, "Evaluation of Challenges in Human Subject Studies "In-the-Wild" Using Subjects' Personal Smartphones," ACM, pp. 1447-1456 (Year: 2013).
Notice of Allowance, dated Mar. 29, 2019, from corresponding U.S. Appl. No. 16/055,998.
Notice of Allowance, dated Mar. 31, 2020, from corresponding U.S. Appl. No. 16/563,744.
Notice of Allowance, dated May 1, 2020, from corresponding U.S. Appl. No. 16/586,202.
Notice of Allowance, dated May 11, 2020, from corresponding U.S. Appl. No. 16/186,196.
Notice of Allowance, dated May 21, 2018, from corresponding U.S. Appl. No. 15/896,790.
Notice of Allowance, dated May 28, 2019, from corresponding U.S. Appl. No. 16/277,568.
Notice of Allowance, dated May 5, 2017, from corresponding U.S. Appl. No. 15/254,901.
Notice of Allowance, dated May 5, 2020, from corresponding U.S. Appl. No. 16/563,754.
Notice of Allowance, dated May 7, 2020, from corresponding U.S. Appl. No. 16/505,426.
Notice of Allowance, dated Nov. 14, 2019, from corresponding U.S. Appl. No. 16/436,616.
Notice of Allowance, dated Nov. 2, 2018, from corresponding U.S. Appl. No. 16/054,762.
Notice of Allowance, dated Nov. 26, 2019, from corresponding U.S. Appl. No. 16/563,735.
Notice of Allowance, dated Nov. 27, 2019, from corresponding U.S. Appl. No. 16/570,712.
Notice of Allowance, dated Nov. 27, 2019, from corresponding U.S. Appl. No. 16/577,634.
Notice of Allowance, dated Nov. 5, 2019, from corresponding U.S. Appl. No. 16/560,965.
Notice of Allowance, dated Nov. 7, 2017, from corresponding U.S. Appl. No. 15/671,073.
Notice of Allowance, dated Nov. 8, 2018, from corresponding U.S. Appl. No. 16/042,642.
Notice of Allowance, dated Oct. 10, 2019, from corresponding U.S. Appl. No. 16/277,539.
Notice of Allowance, dated Oct. 17, 2018, from corresponding U.S. Appl. No. 15/896,790.
Notice of Allowance, dated Oct. 17, 2018, from corresponding U.S. Appl. No. 16/054,672.
Notice of Allowance, dated Oct. 17, 2019, from corresponding U.S. Appl. No. 16/563,741.
Notice of Allowance, dated Oct. 21, 2019, from corresponding U.S. Appl. No. 16/404,405.
Notice of Allowance, dated Oct. 3, 2019, from corresponding U.S. Appl. No. 16/511,700.
Notice of Allowance, dated Sep. 12, 2019, from corresponding U.S. Appl. No. 16/512,011.
Notice of Allowance, dated Sep. 13, 2018, from corresponding U.S. Appl. No. 15/894,809.
Notice of Allowance, dated Sep. 13, 2018, from corresponding U.S. Appl. No. 15/894,890.
Notice of Allowance, dated Sep. 18, 2018, from corresponding U.S. Appl. No. 15/894,819.
Notice of Allowance, dated Sep. 18, 2018, from corresponding U.S. Appl. No. 16/041,545.
Notice of Allowance, dated Sep. 27, 2017, from corresponding U.S. Appl. No. 15/626,052.
Notice of Allowance, dated Sep. 28, 2018, from corresponding U.S. Appl. No. 16/041,520.
Notice of Allowance, dated Sep. 4, 2018, from corresponding U.S. Appl. No. 15/883,041.
Notice of Filing Date for Petition for Post-Grant Review of related U.S. Pat. No. 9,691,090 dated Apr. 12, 2018.
O'Keefe et al, "Privacy-Preserving Data Linkage Protocols," Proceedings of the 2004 ACM Workshop on Privacy in the Electronic Society, 2004, pp. 94-102 (Year: 2004).
Olenski, Steve, for Consumers, Data Is a Matter of Trust, CMO Network, Apr. 18, 2016, https://www.forbes.com/sites/steveolenski/2016/04/18/for-consumers-data-is-a-matter-of-trust/#2e48496278b3, p. 1.
Petition for Post-Grant Review of related U.S. Pat. No. 9,691,090 dated Mar. 27, 2018.
Petrie et al, "The Relationship between Accessibility and Usability of Websites", ACM, pp. 397-406 (Year: 2007).
Pfeifle, Sam, The Privacy Advisor, IAPP and AvePoint Launch New Free PIA Tool, International Association of Privacy Professionals, Mar. 5, 2014, p. 1.
Pfeifle, Sam, The Privacy Advisor, IAPP Heads to Singapore with APIA Template in Tow, International Association of Privacy Professionals, https://iapp.org/news/a/iapp-heads-to-singapore-with-apia-template_in_tow/, Mar. 28, 2014, p. 1-3.
Popescu-Zeletin, "The Data Access and Transfer Support in a Local Heterogeneous Network (HMINET)", IEEE, pp. 147-152 (Year: 1979).
Porter, "De-Identified Data and Third Party Data Mining: The Risk of Re-Identification of Personal Information," Shidler JL Com. & Tech. 5, 2008, pp. 1-9 (Year: 2008).
Qing-Jiang et al, "The (P, a, K) Anonymity Model for Privacy Protection of Personal Information in the Social Networks," 2011 6th IEEE Joint International Information Technology and Artificial Intelligence Conference, vol. 2 IEEE, 2011, pp. 420-423 (Year: 2011).
Qiu, et al, "Design and Application of Data Integration Plattorm Based on Web Services and XML," IEEE, pp. 253-256 (Year: 2016).
Restriction Requirement, dated Apr. 10, 2019, from corresponding U.S. Appl. No. 16/277,715.
Restriction Requirement, dated Apr. 13, 2020, from corresponding U.S. Appl. No. 16/817,136.

(56) References Cited

OTHER PUBLICATIONS

Restriction Requirement, dated Apr. 24, 2019, from corresponding U.S. Appl. No. 16/278,122.
Restriction Requirement, dated Aug. 7, 2019, from corresponding U.S. Appl. No. 16/410,866.
Restriction Requirement, dated Aug. 9, 2019, from corresponding U.S. Appl. No. 16/404,399.
Restriction Requirement, dated Dec. 31, 2018, from corresponding U.S. Appl. No. 15/169,668.
Restriction Requirement, dated Dec. 9, 2019, from corresponding U.S. Appl. No. 16/565,395.
Restriction Requirement, dated Jan. 18, 2017, from corresponding U.S. Appl. No. 15/256,430.
Restriction Requirement, dated Jul. 28, 2017, from corresponding U.S. Appl. No. 15/169,658.
Restriction Requirement, dated May 5, 2020, from corresponding U.S. Appl. No. 16/808,489.
Restriction Requirement, dated Nov. 15, 2019, from corresponding U.S. Appl. No. 16/586,202.
Restriction Requirement, dated Nov. 21, 2016, from corresponding U.S. Appl. No. 15/254,901.
Restriction Requirement, dated Nov. 5, 2019, from corresponding U.S. Appl. No. 16/563,744.
Restriction Requirement, dated Oct. 17, 2018, from corresponding U.S. Appl. No. 16/055,984.
Restriction Requirement, dated Sep. 9, 2019, from corresponding U.S. Appl. No. 16/505,426.
Rozepz, "What is Google Privacy Checkup? Everything You Need to Know," Tom's Guide web post, Apr. 26, 2018, pp. 1-11 (Year: 2018).
Salim et al, "Data Retrieval and Security using Lightweight Directory Access Protocol", IEEE, pp. 685-688 (Year: 2009).
Santhisree, et al, "Web Usage Data Clustering Using Dbscan Algorithm and Set Similarities," IEEE, pp. 220-224 (Year: 2010).
Schwartz, Edward J., et al, 2010 IEEE Symposium on Security and Privacy: All You Ever Wanted to Know About Dynamic Analysis and forward Symbolic Execution (but might have been afraid to ask), Carnegie Mellon University, IEEE Computer Society, 2010, p. 317-331.
Srivastava, Agrima, et al, Measuring Privacy Leaks in Online Social Networks, International Conference on Advances in Computing, Communications and Informatics (ICACCI), 2013, p. 1.
Stern, Joanna, "iPhone Privacy Is Broken . . . and Apps Are to Blame", The Wall Street Journal, wsj.com, May 31, 2019, p. 1.
Symantec, Symantex Data Loss Prevention—Discover, monitor, and protect confidential data; 2008; Symantec Corporation; http://www.mssuk.com/images/Symantec%2014552315_IRC_BR_DLP_03.09_sngl.pdf, p. 1.
The Cookie Collective, Optanon Cookie Policy Generator, The Cookie Collective, Year 2016, http://web.archive.org/web/20160324062743/https:/optanon.com/, p. 1.
Thuraisingham, "Security Issues for the Semantic Web," Proceedings 27th Annual International Computer Software and Applications Conference, COMPSAC 2003, Dallas, TX, USA, 2003, pp. 633-638 (Year: 2003).
TRUSTe Announces General Availability of Assessment Manager for Enterprises to Streamline Data Privacy Management with Automation, PRNewswire, Mar. 4, 2015, p. 1 2015.
Tuomas Aura et al., Scanning Electronic Documents for Personally Identifiable Information, ACM, Oct. 30, 2006, retrieved online on Jun. 13, 2019, pp. 41-49. Retrieved from the Internet: URL: http://delivery.acm.org/10.1145/1180000/1179608/p41-aura.pdf? (Year: 2006).
Wang et al, "Revealing Key Non-Financial Factors for Online Credit-Scoring in E-Financing," 2013, IEEE, pp. 1-6 (Year: 2013).
Wang et al, "Secure and Efficient Access to Outsourced Data," ACM, pp. 55-65 (Year: 2009).
Weaver et al, "Understanding Information Preview in Mobile Email Processing", ACM, pp. 303-312, 2011 (Year: 2011).
Written Opinion of the International Searching Authority, dated Jun. 6, 2017, from corresponding International Application No. PCT/US2017/025611.
Written Opinion of the International Searching Authority, dated Aug. 15, 2017, from corresponding International Application No. PCT/US2017/036919.
Written Opinion of the International Searching Authority, dated Aug. 21, 2017, from corresponding International Application No. PCT/US2017/036914.
Written Opinion of the International Searching Authority, dated Aug. 29, 2017, from corresponding International Application No. PCT/US2017/036898.
Written Opinion of the International Searching Authority, dated Aug. 8, 2017, from corresponding International Application No. PCT/US2017/036889.
Written Opinion of the International Searching Authority, dated Aug. 8, 2017, from corresponding International Application No. PCT/US2017/036890.
Written Opinion of the International Searching Authority, dated Aug. 8, 2017, from corresponding International Application No. PCT/US2017/036893.
Written Opinion of the International Searching Authority, dated Aug. 8, 2017, from corresponding International Application No. PCT/US2017/036901.
Written Opinion of the International Searching Authority, dated Aug. 8, 2017, from corresponding International Application No. PCT/US2017/036913.
Written Opinion of the International Searching Authority, dated Aug. 8, 2017, from corresponding International Application No. PCT/US2017/036920.
Written Opinion of the International Searching Authority, dated Dec. 14, 2018, from corresponding International Application No. PCT/US2018/045296.
Written Opinion of the International Searching Authority, dated Jan. 14, 2019, from corresponding International Application No. PCT/US2018/046949.
Written Opinion of the International Searching Authority, dated Jan. 7, 2019, from corresponding International Application No. PCT/US2018/055772.
Written Opinion of the International Searching Authority, dated Jun. 21, 2017, from corresponding International Application No. PCT/US2017/025600.
Written Opinion of the International Searching Authority, dated Jun. 6, 2017, from corresponding International Application No. PCT/US2017/025605.
Written Opinion of the International Searching Authority, dated Mar. 14, 2019, from corresponding International Application No. PCT/US2018/055736.
Written Opinion of the International Searching Authority, dated Mar. 4, 2019, from corresponding International Application No. PCT/US2018/055773.
Written Opinion of the International Searching Authority, dated Mar. 4, 2019, from corresponding International Application No. PCT/US2018/055774.
Written Opinion of the International Searching Authority, dated Nov. 19, 2018, from corresponding International Application No. PCT/US2018/046939.
Written Opinion of the International Searching Authority, dated Oct. 11, 2018, from corresponding International Application No. PCT/US2018/043975.
Written Opinion of the International Searching Authority, dated Oct. 11, 2018, from corresponding International Application No. PCT/US2018/043976.
Written Opinion of the International Searching Authority, dated Oct. 11, 2018, from corresponding International Application No. PCT/US2018/043977.
Written Opinion of the International Searching Authority, dated Oct. 11, 2018, from corresponding International Application No. PCT/US2018/044026.
Written Opinion of the International Searching Authority, dated Oct. 11, 2018, from corresponding International Application No. PCT/US2018/045240.

(56) References Cited

OTHER PUBLICATIONS

Written Opinion of the International Searching Authority, dated Oct. 12, 2017, from corresponding International Application No. PCT/US2017/036888.
Written Opinion of the International Searching Authority, dated Oct. 12, 2018, from corresponding International Application No. PCT/US2018/044046.
Written Opinion of the International Searching Authority, dated Oct. 16, 2018, from corresponding International Application No. PCT/US2018/045243.
Written Opinion of the International Searching Authority, dated Oct. 18, 2018, from corresponding International Application No. PCT/US2018/045249.
Written Opinion of the International Searching Authority, dated Oct. 20, 2017, from corresponding International Application No. PCT/US2017/036917.
Jun et al, "Scalable Multi-Access Flash Store for Big Data Analytics," ACM, pp. 55-64 (Year: 2014).
Kirkam, et al, "A Personal Data Store for an Internet of Subjects," IEEE, pp. 92-97 (Year: 2011).
Korba, Larry et al.; "Private Data Discovery for Privacy Compliance in Collaborative Environments"; Cooperative Design, Visualization, and Engineering; Springer Berlin Heidelberg; Sep. 21, 2008; pp. 142-150.
Krol, Kat, et al, Control versus Effort in Privacy Warnings for Webforms, ACM, Oct. 24, 2016, pp. 13-23.
Lamb et al, "Role-Based Access Control for Data Service Integration", ACM, pp. 3-11 (Year: 2006).
Lebeau, Franck, et al, "Model-Based Vulnerability Testing for Web Applications," 2013 IEEE Sixth International Conference on Software Testing, Verification and Validation Workshops, pp. 445-452, IEEE, 2013 (Year: 2013).
Li, Ninghui, et al, t-Closeness: Privacy Beyond k-Anonymity and I-Diversity, IEEE, 2014, p. 106-115.
Liu, Kun, et al, A Framework for Computing the Privacy Scores of Users in Online Social Networks, ACM Transactions on Knowledge Discovery from Data, vol. 5, No. 1, Article 6, Dec. 2010, 30 pages.
Lizar et al, "Usable Consents: Tracking and Managing Use of Personal Data with a Consent Transaction Receipt," Proceedings of the 2014 ACM International Joint Conference on Pervasive and Ubiquitous Computing: Adjunct Publication, 2014, pp. 647-652 (Year: 2014).
Maret et al, "Multimedia Information Interchange: Web Forms Meet Data Servers", IEEE, pp. 499-505 (Year: 1999).
McGarth et al, "Digital Library Technology for Locating and Accessing Scientific Data", ACM, pp. 188-194 (Year: 1999).
Moiso et al, "Towards a User-Centric Personal Data Ecosystem The Role of the Bank of Individual's Data," 2012 16th International Conference on Intelligence in Next Generation Networks, Berlin, 2012, pp. 202-209 (Year: 2012).
Mudepalli et al, "An efficient data retrieval approach using blowfish encryption on cloud CipherText Retrieval in Cloud Computing" IEEE, pp. 267-271 (Year: 2017).
Mundada et al, "Half-Baked Cookies: Hardening Cookie-Based Authentication for the Modern Web," Proceedings of the 11th ACM on Asia Conference on Computer and Communications Security, 2016, pp. 675-685 (Year: 2016).
Newman, "Email Archive Overviews using Subject Indexes", ACM, pp. 652-653, 2002 (Year: 2002).
Notice of Allowance, dated Apr. 12, 2017, from corresponding U.S. Appl. No. 15/256,419.
Notice of Allowance, dated Apr. 17, 2020, from corresponding U.S. Appl. No. 16/593,639.
Notice of Allowance, dated Apr. 2, 2019, from corresponding U.S. Appl. No. 16/160,577.
Notice of Allowance, dated Apr. 25, 2018, from corresponding U.S. Appl. No. 15/883,041.
Notice of Allowance, dated Apr. 29, 2020, from corresponding U.S. Appl. No. 16/700,049.
Notice of Allowance, dated Apr. 30, 2020, from corresponding U.S. Appl. No. 16/565,265.
Notice of Allowance, dated Apr. 30, 2020, from corresponding U.S. Appl. No. 16/820,346.
Notice of Allowance, dated Apr. 8, 2019, from corresponding U.S. Appl. No. 16/228,250.
Notice of Allowance, dated Apr. 8, 2020, from corresponding U.S. Appl. No. 16/791,348.
Notice of Allowance, dated Apr. 9, 2020, from corresponding U.S. Appl. No. 16/791,075.
Notice of Allowance, dated Aug. 14, 2018, from corresponding U.S. Appl. No. 15/989,416.
Notice of Allowance, dated Aug. 18, 2017, from corresponding U.S. Appl. No. 15/619,455.
Notice of Allowance, dated Aug. 20, 2019, from corresponding U.S. Appl. No. 16/241,710.
Notice of Allowance, dated Aug. 24, 2018, from corresponding U.S. Appl. No. 15/619,479.
Notice of Allowance, dated Aug. 26, 2019, from corresponding U.S. Appl. No. 16/443,374.
Notice of Allowance, dated Aug. 28, 2019, from corresponding U.S. Appl. No. 16/278,120.
Notice of Allowance, dated Aug. 30, 2018, from corresponding U.S. Appl. No. 15/996,208.
Notice of Allowance, dated Aug. 9, 2018, from corresponding U.S. Appl. No. 15/882,989.
Notice of Allowance, dated Dec. 10, 2018, from corresponding U.S. Appl. No. 16/105,602.
Notice of Allowance, dated Dec. 11, 2019, from corresponding U.S. Appl. No. 16/278,122.
Notice of Allowance, dated Dec. 11, 2019, from corresponding U.S. Appl. No. 16/593,634.
Notice of Allowance, dated Dec. 12, 2017, from corresponding U.S. Appl. No. 15/169,643.
Notice of Allowance, dated Dec. 12, 2017, from corresponding U.S. Appl. No. 15/619,212.
Notice of Allowance, dated Dec. 12, 2017, from corresponding U.S. Appl. No. 15/619,382.
Notice of Allowance, dated Dec. 13, 2019, from corresponding U.S. Appl. No. 16/512,033.
Notice of Allowance, dated Dec. 16, 2019, from corresponding U.S. Appl. No. 16/505,461.
Notice of Allowance, dated Dec. 18, 2019, from corresponding U.S. Appl. No. 16/659,437.
Notice of Allowance, dated Dec. 23, 2019, from corresponding U.S. Appl. No. 16/656,835.
Notice of Allowance, dated Dec. 3, 2019, from corresponding U.S. Appl. No. 16/563,749.
Notice of Allowance, dated Dec. 31, 2018, from corresponding U.S. Appl. No. 16/159,634.
Notice of Allowance, dated Dec. 31, 2019, from corresponding U.S. Appl. No. 16/404,399.
Notice of Allowance, dated Dec. 4, 2019, from corresponding U.S. Appl. No. 16/594,670.
Notice of Allowance, dated Dec. 5, 2017, from corresponding U.S. Appl. No. 15/633,703.
Notice of Allowance, dated Dec. 6, 2017, from corresponding U.S. Appl. No. 15/619,451.
Notice of Allowance, dated Dec. 6, 2017, from corresponding U.S. Appl. No. 15/619,459.
Advisory Action, dated Jun. 19, 2020, from corresponding U.S. Appl. No. 16/595,342.
Liu et al, "Cross-Geography Scientific Data Transferring Trends and Behavior," ACM, pp. 267-278 (Year: 2018).
Moscoso-Zea et al, "Datawarehouse Design for Educational Data Mining," IEEE, pp. 1-6 (Year: 2016).
Newman et al, "High Speed Scientific Data Transfers using Software Defined Networking," ACM, pp. 1-9 (Year: 2015).
Notice of Allowance, dated Jul. 14, 2020, from corresponding U.S. Appl. No. 16/701,043.
Notice of Allowance, dated Jul. 15, 2020, from corresponding U.S. Appl. No. 16/791,006.

(56) References Cited

OTHER PUBLICATIONS

Notice of Allowance, dated Jul. 16, 2020, from corresponding U.S. Appl. No. 16/901,979.
Notice of Allowance, dated Jul. 17, 2020, from corresponding U.S. Appl. No. 16/778,709.
Notice of Allowance, dated Jul. 21, 2020, from corresponding U.S. Appl. No. 16/557,392.
Notice of Allowance, dated Jun. 22, 2020, from corresponding U.S. Appl. No. 16/791,337.
Hacigümüs, Hakan, et al, Executing SQL over Encrypted Data in the Database-Service-Provider Model, ACM, Jun. 4, 2002, pp. 216-227.
Hodge, et al, "Managing Virtual Data Marts with Metapointer Tables," pp. 1-7 (Year: 2002).
Huner et al, "Towards a Maturity Model for Corporate Data Quality Management", ACM, pp. 231-238, 2009 (Year: 2009).
Hunton & Williams LLP, The Role of Risk Management in Data Protection, Privacy Risk Framework and the Risk-based Approach to Privacy, Centre for Information Policy Leadership, Workshop II, Nov. 23, 2014, p. 1.
Huo et al, "A Cloud Storage Architecture Model for Data-Intensive Applications," IEEE, pp. 1-4 (Year: 2011).
App, Daily Dashboard, PIA Tool Stocked With New Templates for DPI, Infosec, International Association of Privacy Professionals, Apr. 22, 2014, p. 1.
Imran et al, "Searching in Cloud Object Storage by Using a Metadata Model", IEEE, 2014, retrieved online on Apr. 1, 2020, pp. 121-128. Retrieved from the Internet: URL: https://ieeeexplore.ieee.org/stamp/stamp.jsp? (Year: 2014).
International Search Report, dated Aug. 15, 2017, from corresponding International Application No. PCT/US2017/036919.
International Search Report, dated Aug. 21, 2017, from corresponding International Application No. PCT/US2017/036914.
International Search Report, dated Aug. 29, 2017, from corresponding International Application No. PCT/US2017/036898.
International Search Report, dated Aug. 8, 2017, from corresponding International Application No. PCT/US2017/036889.
International Search Report, dated Aug. 8, 2017, from corresponding International Application No. PCT/US2017/036890.
International Search Report, dated Aug. 8, 2017, from corresponding International Application No. PCT/US2017/036893.
International Search Report, dated Aug. 8, 2017, from corresponding International Application No. PCT/US2017/036901.
International Search Report, dated Aug. 8, 2017, from corresponding International Application No. PCT/US2017/036913.
International Search Report, dated Aug. 8, 2017, from corresponding International Application No. PCT/US2017/036920.
International Search Report, dated Dec. 14, 2018, from corresponding International Application No. PCT/US2018/045296.
International Search Report, dated Jan. 14, 2019, from corresponding International Application No. PCT/US2018/046949.
International Search Report, dated Jan. 7, 2019, from corresponding International Application No. PCT/US2018/055772.
International Search Report, dated Jun. 21, 2017, from corresponding International Application No. PCT/US2017/025600.
International Search Report, dated Jun. 6, 2017, from corresponding International Application No. PCT/US2017/025605.
International Search Report, dated Jun. 6, 2017, from corresponding International Application No. PCT/US2017/025611.
International Search Report, dated Mar. 14, 2019, from corresponding International Application No. PCT/US2018/055736.
International Search Report, dated Mar. 4, 2019, from corresponding International Application No. PCT/US2018/055773.
International Search Report, dated Mar. 4, 2019, from corresponding International Application No. PCT/US2018/055774.
International Search Report, dated Nov. 19, 2018, from corresponding International Application No. PCT/US2018/046939.
International Search Report, dated Oct. 11, 2018, from corresponding International Application No. PCT/US2018/043975.
International Search Report, dated Oct. 11, 2018, from corresponding International Application No. PCT/US2018/043976.
International Search Report, dated Oct. 11, 2018, from corresponding International Application No. PCT/US2018/043977.
International Search Report, dated Oct. 11, 2018, from corresponding International Application No. PCT/US2018/044026.
International Search Report, dated Oct. 11, 2018, from corresponding International Application No. PCT/US2018/045240.
International Search Report, dated Oct. 12, 2017, from corresponding International Application No. PCT/US2017/036888.
International Search Report, dated Oct. 12, 2018, from corresponding International Application No. PCT/US2018/044046.
International Search Report, dated Oct. 16, 2018, from corresponding International Application No. PCT/US2018/045243.
International Search Report, dated Oct. 18, 2018, from corresponding International Application No. PCT/US2018/045249.
International Search Report, dated Oct. 20, 2017, from corresponding International Application No. PCT/US2017/036917.
International Search Report, dated Oct. 3, 2017, from corresponding International Application No. PCT/US2017/036912.
International Search Report, dated Sep. 1, 2017, from corresponding International Application No. PCT/US2017/036896.
International Search Report, dated Sep. 12, 2018, from corresponding International Application No. PCT/US2018/037504.
Invitation to Pay Additional Search Fees, dated Aug. 10, 2017, from corresponding International Application No. PCT/US2017/036912.
Invitation to Pay Additional Search Fees, dated Aug. 10, 2017, from corresponding International Application No. PCT/US2017/036917.
Invitation to Pay Additional Search Fees, dated Aug. 24, 2017, from corresponding International Application No. PCT/US2017/036888.
Invitation to Pay Additional Search Fees, dated Jan. 18, 2019, from corresponding International Application No. PCT/US2018/055736.
Invitation to Pay Additional Search Fees, dated Jan. 7, 2019, from corresponding International Application No. PCT/US2018/055773.
Invitation to Pay Additional Search Fees, dated Jan. 8, 2019, from corresponding International Application No. PCT/US2018/055774.
Invitation to Pay Additional Search Fees, dated Oct. 23, 2018, from corresponding International Application No. PCT/US2018/045296.
Islam, et al, "Mixture Model Based Label Association Techniques for Web Accessibility," ACM, pp. 67-76 (Year: 2010).
Joel Reardon et al., Secure Data Deletion from Persistent Media, ACM, Nov. 4, 2013, retrieved online on Jun. 13, 2019, pp. 271-283. Retrieved from the Internet: URL: http://delivery.acm.org/10.1145/2520000/2516699/p271-reardon.pdf? (Year: 2013).
Joonbakhsh et al, "Mining and Extraction of Personal Software Process measures through IDE Interaction logs," ACM/IEEE, 2018, retrieved online on Dec. 2, 2019, pp. 78-81. Retrieved from the Internet: URL: http://delivery.acm.org/10.1145/3200000/3196462/p78-joonbakhsh.pdf? (Year: 2018).
Final Office Action, dated Apr. 23, 2020, from corresponding U.S. Appl. No. 16/572,347.
Final Office Action, dated Apr. 7, 2020, from corresponding U.S. Appl. No. 16/595,327.
Final Office Action, dated Dec. 9, 2019, from corresponding U.S. Appl. No. 16/410,336.
Final Office Action, dated Feb. 19, 2020, from corresponding U.S. Appl. No. 16/404,491.
Final Office Action, dated Feb. 3, 2020, from corresponding U.S. Appl. No. 16/557,392.
Final Office Action, dated Jan. 17, 2018, from corresponding U.S. Appl. No. 15/619,278.
Final Office Action, dated Jan. 21, 2020, from corresponding U.S. Appl. No. 16/410,762.
Final Office Action, dated Jan. 23, 2018, from corresponding U.S. Appl. No. 15/619,479.
Final Office Action, dated Jan. 23, 2020, from corresponding U.S. Appl. No. 16/505,430.
Final Office Action, dated Mar. 5, 2019, from corresponding U.S. Appl. No. 16/055,96t.
Final Office Action, dated Mar. 6, 2020, from corresponding U.S. Appl. No. 16/595,342.
Final Office Action, dated Nov. 29, 2017, from corresponding U.S. Appl. No. 15/619,237.

(56) References Cited

OTHER PUBLICATIONS

Final Office Action, dated Sep. 25, 2019, from corresponding U.S. Appl. No. 16/278,119.
Office Action, dated Apr. 18, 2018, from corresponding U.S. Appl. No. 15/894,819.
Office Action, dated Apr. 20, 2020, from corresponding U.S. Appl. No. 16/812,795.
Office Action, dated Apr. 22, 2019, from corresponding U.S. Appl. No. 16/241,710.
Office Action, dated Apr. 22, 2020, from corresponding U.S. Appl. No. 16/811,793.
Office Action, dated Apr. 28, 2020, from corresponding U.S. Appl. No. 16/798,818.
Office Action, dated Apr. 28, 2020, from corresponding U.S. Appl. No. 16/808,500.
Office Action, dated Apr. 29, 2020, from corresponding U.S. Appl. No. 16/791,337.
Office Action, dated Apr. 5, 2019, from corresponding U.S. Appl. No. 16/278,119.
Office Action, dated Apr. 7, 2020, from corresponding U.S. Appl. No. 16/788,633.
Office Action, dated Apr. 7, 2020, from corresponding U.S. Appl. No. 16/791,589.
Office Action, dated Aug. 13, 2019, from corresponding U.S. Appl. No. 16/505,430.
Office Action, dated Aug. 13, 2019, from corresponding U.S. Appl. No. 16/512,031.
Office Action, dated Aug. 15, 2019, from corresponding U.S. Appl. No. 16/505,461.
Office Action, dated Aug. 19, 2019, from corresponding U.S. Appl. No. 16/278,122.
Office Action, dated Aug. 23, 2017, from corresponding U.S. Appl. No. 15/626,052.
Office Action, dated Aug. 24, 2017, from corresponding U.S. Appl. No. 15/169,641.
Office Action, dated Aug. 24, 2017, from corresponding U.S. Appl. No. 15/619,451.
Office Action, dated Aug. 27, 2019, from corresponding U.S. Appl. No. 16/410,296.
Office Action, dated Aug. 29, 2017, from corresponding U.S. Appl. No. 15/619,237.
Office Action, dated Aug. 30, 2017, from corresponding U.S. Appl. No. 15/619,212.
Office Action, dated Aug. 30, 2017, from corresponding U.S. Appl. No. 15/619,382.
Office Action, dated Aug. 6, 2019, from corresponding U.S. Appl. No. 16/404,491.
Office Action, dated Dec. 11, 2019, from corresponding U.S. Appl. No. 16/578,712.
Office Action, dated Dec. 14, 2018, from corresponding U.S. Appl. No. 16/104,393.
Office Action, dated Dec. 15, 2016, from corresponding U.S. Appl. No. 15/256,419.
Office Action, dated Dec. 16, 2019, from corresponding U.S. Appl. No. 16/563,754.
Office Action, dated Dec. 16, 2019, from corresponding U.S. Appl. No. 16/565,265.
Office Action, dated Dec. 19, 2019, from corresponding U.S. Appl. No. 16/410,866.
Office Action, dated Dec. 2, 2019, from corresponding U.S. Appl. No. 16/560,963.
Office Action, dated Dec. 23, 2019, from corresponding U.S. Appl. No. 16/593,639.
Office Action, dated Dec. 3, 2018, from corresponding U.S. Appl. No. 16/055,998.
Office Action, dated Dec. 31, 2018, from corresponding U.S. Appl. No. 16/160,577.
Office Action, dated Feb. 15, 2019, from corresponding U.S. Appl. No. 16/220,899.
Office Action, dated Feb. 26, 2019, from corresponding U.S. Appl. No. 16/228,250.
Office Action, dated Feb. 5, 2020, from corresponding U.S. Appl. No. 16/586,202.
Office Action, dated Feb. 6, 2020, from corresponding U.S. Appl. No. 16/707,762.
Office Action, dated Jan. 18, 2019, from corresponding U.S. Appl. No. 16/055,984.
Ahmad, et al, "Performance of Resource Management Algorithms for Processable Bulk Data Transfer Tasks in Grid Environments," ACM, pp. 177-188 (Year: 2008).
Final Office Action, dated Aug. 10, 2020, from corresponding U.S. Appl. No. 16/791,589.
Final Office Action, dated Aug. 5, 2020, from corresponding U.S. Appl. No. 16/719,071.
Grolinger, et al, "Data Management in Cloud Environments: NoSQL and NewSQL Data Stores," Journal of Cloud Computing: Advances, Systems and Applications, pp. 1-24 (Year: 2013).
Leadbetter, et al, "Where Big Data Meets Linked Data: Applying Standard Data Models to Environmental Data Streams," IEEE, pp. 2929-2937 (Year: 2016).
Notice of Allowance, dated Aug. 10, 2020, from corresponding U.S. Appl. No. 16/671,444.
Notice of Allowance, dated Aug. 10, 2020, from corresponding U.S. Appl. No. 16/788,633.
Notice of Allowance, dated Aug. 12, 2020, from corresponding U.S. Appl. No. 16/719,488.
Notice of Allowance, dated Aug. 7, 2020, from corresponding U.S. Appl. No. 16/901,973.
Office Action, dated Aug. 6, 2020, from corresponding U.S. Appl. No. 16/862,956.
Office Action, dated Jul. 24, 2020, from corresponding U.S. Appl. No. 16/404,49t.
Office Action, dated Jul. 27, 2020, from corresponding U.S. Appl. No. 16/595,342.
Xu, et al, "GatorShare: A File System Framework for High-Throughput Data Management," ACM, pp. 776-786 (Year: 2010).
Zheng, et al, "Methodologies for Cross-Domain Data Fusion: An Overview," IEEE, pp. 16-34 (Year: 2015).
Office Action, dated Jan. 24, 2020, from corresponding U.S. Appl. No. 16/505,426.
Office Action, dated Jan. 24, 2020, from corresponding U.S. Appl. No. 16/700,049.
Office Action, dated Jan. 27, 2020, from corresponding U.S. Appl. No. 16/656,895.
Office Action, dated Jan. 28, 2020, from corresponding U.S. Appl. No. 16/712,104.
Office Action, dated Jan. 4, 2019, from corresponding U.S. Appl. No. 16/159,566.
Office Action, dated Jan. 4, 2019, from corresponding U.S. Appl. No. 16/159,628.
Office Action, dated Jan. 7, 2020, from corresponding U.S. Appl. No. 16/572,182.
Office Action, dated Jul. 18, 2019, from corresponding U.S. Appl. No. 16/410,762.
Office Action, dated Jul. 21, 2017, from corresponding U.S. Appl. No. 15/256,430.
Office Action, dated Jul. 23, 2019, from corresponding U.S. Appl. No. 16/436,616.
Office Action, dated Jun. 24, 2019, from corresponding U.S. Appl. No. 16/410,336.
Office Action, dated Jun. 27, 2019, from corresponding U.S. Appl. No. 16/404,405.
Office Action, dated Mar. 11, 2019, from corresponding U.S. Appl. No. 16/220,978.
Office Action, dated Mar. 12, 2019, from corresponding U.S. Appl. No. 16/221,153.
Office Action, dated Mar. 16, 2020, from corresponding U.S. Appl. No. 16/719,488.
Office Action, dated Mar. 17, 2020, from corresponding U.S. Appl. No. 16/565,395.
Office Action, dated Mar. 17, 2020, from corresponding U.S. Appl. No. 16/719,071.

(56) References Cited

OTHER PUBLICATIONS

Office Action, dated Mar. 20, 2020, from corresponding U.S. Appl. No. 16/778,709.
Office Action, dated Mar. 23, 2020, from corresponding U.S. Appl. No. 16/671,444.
Office Action, dated Mar. 25, 2019, from corresponding U.S. Appl. No. 16/278,121.
Office Action, dated Mar. 25, 2020, from corresponding U.S. Appl. No. 16/701,043.
Office Action, dated Mar. 25, 2020, from corresponding U.S. Appl. No. 16/791,006.
Office Action, dated Mar. 27, 2019, from corresponding U.S. Appl. No. 16/278,120.
Office Action, dated Mar. 30, 2018, from corresponding U.S. Appl. No. 15/894,890.
Office Action, dated Mar. 30, 2018, from corresponding U.S. Appl. No. 15/896,790.
Office Action, dated Mar. 4, 2019, from corresponding U.S. Appl. No. 16/237,083.
Office Action, dated May 16, 2018, from corresponding U.S. Appl. No. 15/882,989.
Office Action, dated May 17, 2019, from corresponding U.S. Appl. No. 16/277,539.
Office Action, dated May 2, 2018, from corresponding U.S. Appl. No. 15/894,809.
Office Action, dated May 2, 2019, from corresponding U.S. Appl. No. 16/104,628.
Office Action, dated May 5, 2020, from corresponding U.S. Appl. No. 16/410,336.
Office Action, dated Nov. 1, 2017, from corresponding U.S. Appl. No. 15/169,658.
Office Action, dated Nov. 15, 2018, from corresponding U.S. Appl. No. 16/059,911.
Office Action, dated Nov. 15, 2019, from corresponding U.S. Appl. No. 16/552,758.
Office Action, dated Nov. 18, 2019, from corresponding U.S. Appl. No. 16/560,885.
Office Action, dated Nov. 18, 2019, from corresponding U.S. Appl. No. 16/560,889.
Office Action, dated Nov. 18, 2019, from corresponding U.S. Appl. No. 16/572,347.
Office Action, dated Nov. 19, 2019, from corresponding U.S. Appl. No. 16/595,342.
Office Action, dated Nov. 20, 2019, from corresponding U.S. Appl. No. 16/595,327.
Office Action, dated Nov. 23, 2018, from corresponding U.S. Appl. No. 16/042,673.
Office Action, dated Oct. 10, 2018, from corresponding U.S. Appl. No. 16/041,563.
Office Action, dated Oct. 10, 2018, from corresponding U.S. Appl. No. 16/055,083.
Office Action, dated Oct. 10, 2018, from corresponding U.S. Appl. No. 16/055,944.
Office Action, dated Oct. 15, 2018, from corresponding U.S. Appl. No. 16/054,780.
Office Action, dated Oct. 16, 2019, from corresponding U.S. Appl. No. 16/557,392.
Office Action, dated Oct. 23, 2018, from corresponding U.S. Appl. No. 16/055,961.
Office Action, dated Oct. 26, 2018, from corresponding U.S. Appl. No. 16/041,468.
Office Action, dated Oct. 8, 2019, from corresponding U.S. Appl. No. 16/552,765.
Office Action, dated Sep. 1, 2017, from corresponding U.S. Appl. No. 15/619,459.
Office Action, dated Sep. 11, 2017, from corresponding U.S. Appl. No. 15/619,375.
Notice of Allowance, dated Dec. 9, 2019, from corresponding U.S. Appl. No. 16/565,261.
Notice of Allowance, dated Feb. 10, 2020, from corresponding U.S. Appl. No. 16/552,765.
Notice of Allowance, dated Feb. 12, 2020, from corresponding U.S. Appl. No. 16/572,182.
Notice of Allowance, dated Feb. 13, 2019, from corresponding U.S. Appl. No. 16/041,561.
Notice of Allowance, dated Feb. 14, 2019, from corresponding U.S. Appl. No. 16/226,272.
Notice of Allowance, dated Feb. 19, 2019, from corresponding U.S. Appl. No. 16/159,632.
Notice of Allowance, dated Feb. 25, 2020, from corresponding U.S. Appl. No. 16/714,355.
Notice of Allowance, dated Feb. 27, 2019, from corresponding U.S. Appl. No. 16/041,468.
Notice of Allowance, dated Feb. 27, 2019, from corresponding U.S. Appl. No. 16/226,290.
Notice of Allowance, dated Jan. 14, 2020, from corresponding U.S. Appl. No. 16/277,715.
Notice of Allowance, dated Jan. 18, 2018, from corresponding U.S. Appl. No. 15/619,478.
Notice of Allowance, dated Jan. 18, 2019 from corresponding U.S. Appl. No. 16/159,635.
Notice of Allowance, dated Jan. 2, 2020, from corresponding U.S. Appl. No. 16/410,296.
Notice of Allowance, dated Jan. 23, 2018, from corresponding U.S. Appl. No. 15/619,251.
Notice of Allowance, dated Jan. 26, 2018, from corresponding U.S. Appl. No. 15/619,469.
Notice of Allowance, dated Jan. 29, 2020, from corresponding U.S. Appl. No. 16/278,119.
Notice of Allowance, dated Jan. 8, 2020, from corresponding U.S. Appl. No. 16/600,879.
Notice of Allowance, dated Jul. 10, 2019, from corresponding U.S. Appl. No. 16/237,083.
Notice of Allowance, dated Jul. 10, 2019, from corresponding U.S. Appl. No. 16/403,358.
Notice of Allowance, dated Jul. 12, 2019, from corresponding U.S. Appl. No. 16/278,121.
Notice of Allowance, dated Jul. 17, 2019, from corresponding U.S. Appl. No. 16/055,961.
Notice of Allowance, dated Jul. 23, 2019, from corresponding U.S. Appl. No. 16/220,978.
Notice of Allowance, dated Jul. 26, 2019, from corresponding U.S. Appl. No. 16/409,673.
Notice of Allowance, dated Jul. 31, 2019, from corresponding U.S. Appl. No. 16/221,153.
Notice of Allowance, dated Jun. 12, 2019, from corresponding U.S. Appl. No. 16/278,123.
Notice of Allowance, dated Jun. 12, 2019, from corresponding U.S. Appl. No. 16/363,454.
Notice of Allowance, dated Jun. 18, 2019, from corresponding U.S. Appl. No. 16/410,566.
Notice of Allowance, dated Jun. 19, 2018, from corresponding U.S. Appl. No. 15/894,890.
Notice of Allowance, dated Jun. 19, 2019, from corresponding U.S. Appl. No. 16/042,673.
Notice of Allowance, dated Jun. 19, 2019, from corresponding U.S. Appl. No. 16/055,984.
Notice of Allowance, dated Jun. 21, 2019, from corresponding U.S. Appl. No. 16/404,439.
Notice of Allowance, dated Jun. 27, 2018, from corresponding U.S. Appl. No. 15/882,989.
Notice of Allowance, dated Jun. 4, 2019, from corresponding U.S. Appl. No. 16/159,566.
Notice of Allowance, dated Jun. 5, 2019, from corresponding U.S. Appl. No. 16/220,899.
Notice of Allowance, dated Jun. 5, 2019, from corresponding U.S. Appl. No. 16/357,260.
Notice of Allowance, dated Jun. 6, 2018, from corresponding U.S. Appl. No. 15/875,570.
Notice of Allowance, dated Jun. 6, 2019, from corresponding U.S. Appl. No. 16/159,628.

(56) References Cited

OTHER PUBLICATIONS

Notice of Allowance, dated Mar. 1, 2018, from corresponding U.S. Appl. No. 15/853,674.
Notice of Allowance, dated Mar. 1, 2019, from corresponding U.S. Appl. No. 16/059,911.
Notice of Allowance, dated Mar. 13, 2019, from corresponding U.S. Appl. No. 16/055,083.
Notice of Allowance, dated Mar. 14, 2019, from corresponding U.S. Appl. No. 16/055,944.
Notice of Allowance, dated Mar. 16, 2020, from corresponding U.S. Appl. No. 16/778,704.
Notice of Allowance, dated Mar. 17, 2020, from corresponding U.S. Appl. No. 16/560,885.
Notice of Allowance, dated Mar. 18, 2020, from corresponding U.S. Appl. No. 16/560,963.
Notice of Allowance, dated Mar. 2, 2018, from corresponding U.S. Appl. No. 15/858,802.
Notice of Allowance, dated Mar. 24, 2020, from corresponding U.S. Appl. No. 16/552,758.
Notice of Allowance, dated Mar. 25, 2019, from corresponding U.S. Appl. No. 16/054,780.
Notice of Allowance, dated Mar. 26, 2020, from corresponding U.S. Appl. No. 16/560,889.
Notice of Allowance, dated Mar. 26, 2020, from corresponding U.S. Appl. No. 16/578,712.
Notice of Allowance, dated Mar. 27, 2019, from corresponding U.S. Appl. No. 16/226,280.
Ball, et al., "Aspects of the Computer-Based Patient Record," Computers in Heathcare, Springer-Verlag New York Inc., pp. 1-23 (Year: 1992).
Final Office Action, dated Aug. 28, 2020, from corresponding U.S. Appl. No. 16/410,336.
Final Office Action, dated Sep. 8, 2020, from corresponding U.S. Appl. No. 16/410,866.
Notice of Allowance, dated Aug. 26, 2020, from corresponding U.S. Appl. No. 16/808,503.
Notice of Allowance, dated Sep. 4, 2020, from corresponding U.S. Appl. No. 16/808,500.
Notice of Allowance, dated Sep. 4, 2020, from corresponding U.S. Appl. No. 16/901,662.
Office Action, dated Aug. 20, 2020, from corresponding U.S. Appl. No. 16/817,136.
Office Action, dated Aug. 24, 2020, from corresponding U.S. Appl. No. 16/595,327.
Office Action, dated Sep. 4, 2020, from corresponding U.S. Appl. No. 16/989,086.
Notice of Allowance, dated Sep. 16, 2020, from corresponding U.S. Appl. No. 16/915,097.
Restriction Requirement, dated Sep. 15, 2020, from corresponding U.S. Appl. No. 16/925,628.
Final Office Action, dated Sep. 21, 2020, from corresponding U.S. Appl. No. 16/808,493.
Final Office Action, dated Sep. 21, 2020, from corresponding U.S. Appl. No. 16/862,944.
Final Office Action, dated Sep. 22, 2020, from corresponding U.S. Appl. No. 16/808,497.
Hauch, et al., "Information Intelligence: Metadata for Information Discovery, Access, and Integration," ACM, pp. 193-798 (Year: 2005).
Hernandez, et al, "Data Exchange with Data-Metadata Translations," ACM, pp. 260-273 (Year: 2008).
Notice of Allowance, dated Sep. 18, 2020, from corresponding U.S. Appl. No. 16/812,795.
Singh, et al, "A Metadata Catalog Service for Data Intensive Applications," ACM, pp. 1-17 (Year: 2003).
Slezak, et al, "Brighthouse: an Analytic Data Warehouse for Ad-hoc Queries," ACM, pp. 1337-1345 (Year: 2008).
Final Office Action, dated Sep. 23, 2020, from corresponding U.S. Appl. No. 16/862,948.
Final Office Action, dated Sep. 24, 2020, from corresponding U.S. Appl. No. 16/862,952.
Final Office Action, dated Sep. 28, 2020, from corresponding U.S. Appl. No. 16/565,395.
Hinde, "A Model to Assess Organisational Information Privacy Maturity Against the Protection of Personal Information Act" Dissertation University of Cape Town 2014, pp. 1-121 (Year: 2014).
Notice of Allowance, dated Sep. 23, 2020, from corresponding U.S. Appl. No. 16/811,793.
Notice of Allowance, dated Sep. 25, 2020, from corresponding U.S. Appl. No. 16/983,536.
Office Action, dated Oct. 14, 2020, from corresponding U.S. Appl. No. 16/927,658.
Office Action, dated Oct. 16, 2020, from corresponding U.S. Appl. No. 16/808,489.
Notice of Allowance, dated Nov. 3, 2020, from corresponding U.S. Appl. No. 16/719,071.
Notice of Allowance, dated Nov. 9, 2020, from corresponding U.S. Appl. No. 16/595,342.
Notice of Allowance, dated Oct. 21, 2020, from corresponding U.S. Appl. No. 16/834,812.
Office Action, dated Nov. 12, 2020, from corresponding U.S. Appl. No. 17/034,355.
Office Action, dated Nov. 12, 2020, from corresponding U.S. Appl. No. 17/034,772.
Alaa et al, "Personalized Risk Scoring for Critical Care Prognosis Using Mixtures of Gaussian Processes," Apr. 27, 2017, IEEE, vol. 65, issue 1, pp. 207-217 (Year: 2017).
Final Office Action, dated Dec. 7, 2020, from corresponding U.S. Appl. No. 16/862,956.
Gajare et al, "Improved Automatic Feature Selection Approach for Health Risk Prediction," Feb. 16, 2018, IEEE, pp. 816-819 (Year: 2018).
Horrall et al, "Evaluating Risk: IBM's Country Financial Risk and Treasury Risk Scorecards," Jul. 21, 2014, IBM, vol. 58, issue 4, pp. 2:1-2:9 (Year: 2014).
Notice of Allowance, dated Dec. 15, 2020, from corresponding U.S. Appl. No. 16/989,086.
Notice of Allowance, dated Dec. 7, 2020, from corresponding U.S. Appl. No. 16/817,136.
Notice of Allowance, dated Dec. 9, 2020, from corresponding U.S. Appl. No. 16/404,491.
Notice of Allowance, dated Nov. 23, 2020, from corresponding U.S. Appl. No. 16/791,589.
Notice of Allowance, dated Nov. 24, 2020, from corresponding U.S. Appl. No. 17/027,019.
Notice of Allowance, dated Nov. 25, 2020, from corresponding U.S. Appl. No. 17/019,771.
Office Action, dated Dec. 8, 2020, from corresponding U.S. Appl. No. 17/013,758.
Office Action, dated Dec. 8, 2020, from corresponding U.S. Appl. No. 17/068,198.
Office Action, dated Nov. 24, 2020, from corresponding U.S. Appl. No. 16/925,628.
Sedinic et al, "Security Risk Management in Complex Organization," May 29, 2015, IEEE, pp. 1331-1337 (Year: 2015).
Strodl, et al, "Personal & Soho Archiving," Vienna University of Technology, Vienna, Austria, JCDL '08, Jun. 16-20, 2008, Pittsburgh, Pennsylvania, USA, pp. 115-123 (Year: 2008).

\* cited by examiner

| Data Mapping > Assets 905 | | | | | |
|---|---|---|---|---|---|
| ☐ | Assets | Managing Organi... | Hosting Location | Type | Status |
| | | 910 | 915 | 920 | 925 |
| ☐ | 4th Asset | Sabourin DM79 | Tunisia | Database | New |
| ☐ | 5th Asset | Sabourin DM79 | United Arab Emira... | •••• | In Discovery |
| ☐ | 7th Asset | Sabourin DM79 | Algeria | Application | In Discovery |
| ☐ | Asset 1 | Sabourin DM79 | Afghanistan | •••• | In Discovery |
| ☐ | Asset 2 | Sabourin DM79 | United Arab Emira... | Database | In Discovery |
| ☐ | ThirdAsset | Sabourin DM79 | United Kingdom | •••• | |
| | + New Assets | | | | |

Showing 1-6 of 6

First, which service do you want to try?

Why we suggest trying one product at a time.

I want to try:
○ Email Marketing — What's included? | Pricing
○ Online Survey — What's included? | Pricing
○ Event Marketing — What's included? | Pricing Tell us about yourself.

First Name:
Last Name:
Organization Name:
Country: United States
State: Choose State
Phone Number:
Email: So we can get in touch about our free coaching.
Website: We'll send you an email to confirm your trial and verify your address.

DATA PROCESSING SYSTEMS AND METHODS FOR USING A DATA MODEL TO SELECT A TARGET DATA ASSET IN A DATA MIGRATION

CROSS-REFERENCE TO RELATED APPLICATIONS

This application is a continuation-in-part of U.S. patent application Ser. No. 16/565,265, filed Sep. 9, 2019, now U.S. Pat. No. 10,708,305, issued Jul. 7, 2020, which claims priority from U.S. Provisional Patent Application Ser. No. 62/728,437, filed Sep. 7, 2018, and is also a continuation-in-part of U.S. patent application Ser. No. 16/277,539, filed Feb. 15, 2019, now U.S. Pat. No. 10,509,920, issued Dec. 17, 2019, which claims priority from U.S. Provisional Patent Application Ser. No. 62/631,684, filed Feb. 17, 2018 and U.S. Provisional Patent Application Ser. No. 62/631,703, filed Feb. 17, 2018, and is also a continuation-in-part of U.S. patent application Ser. No. 16/159,566, filed Oct. 12, 2018, now U.S. Pat. No. 10,454,973, issued Oct. 22, 2019, which claims priority from U.S. Provisional Patent Application Ser. No. 62/572,096, filed Oct. 13, 2017 and U.S. Provisional Patent Application Ser. No. 62/728,435, filed Sep. 7, 2018, and is also a continuation-in-part of U.S. patent application Ser. No. 16/055,083, filed Aug. 4, 2018, now U.S. Pat. No. 10,289,870, issued May 14, 2019, which claims priority from U.S. Provisional Patent Application Ser. No. 62/547,530, filed Aug. 18, 2017, and is also a continuation-in-part of U.S. patent application Ser. No. 15/996,208, filed Jun. 1, 2018, now U.S. Pat. No. 10,181,051, issued Jan. 15, 2019, which claims priority from U.S. Provisional Patent Application Ser. No. 62/537,839, filed Jul. 27, 2017, and is also a continuation-in-part of U.S. patent application Ser. No. 15/853,674, filed Dec. 22, 2017, now U.S. Pat. No. 10,019,597, issued Jul. 10, 2018, which claims priority from U.S. Provisional Patent Application Ser. No. 62/541,613, filed Aug. 4, 2017, and is also a continuation-in-part of U.S. patent application Ser. No. 15/619,455, filed Jun. 10, 2017, now U.S. Pat. No. 9,851,966, issued Dec. 26, 2017, which is a continuation-in-part of U.S. patent application Ser. No. 15/254,901, filed Sep. 1, 2016, now U.S. Pat. No. 9,729,583, issued Aug. 8, 2017, which claims priority from: (1) U.S. Provisional Patent Application Ser. No. 62/360,123, filed Jul. 8, 2016; (2) U.S. Provisional Patent Application Ser. No. 62/353,802, filed Jun. 23, 2016; (3) U.S. Provisional Patent Application Ser. No. 62/348,695, filed Jun. 10, 2016. The disclosures of all of the above patent applications and patents are hereby incorporated herein by reference in their entirety.

BACKGROUND

Over the past years, privacy and security policies, and related operations have become increasingly important. Breaches in security, leading to the unauthorized access of personal data (which may include sensitive personal data) have become more frequent among companies and other organizations of all sizes. Such personal data may include, but is not limited to, personally identifiable information (PII), which may be information that directly (or indirectly) identifies an individual or entity. Examples of PII include names, addresses, dates of birth, social security numbers, and biometric identifiers such as a person's fingerprints or picture. Other personal data may include, for example, customers' Internet browsing habits, purchase history, or even their preferences (e.g., likes and dislikes, as provided or obtained through social media).

Many organizations that obtain, use, and transfer personal data, including sensitive personal data, have begun to address these privacy and security issues. To manage personal data, many companies have attempted to implement operational policies and processes that comply with legal and industry requirements. However, there is an increasing need for improved systems and methods to manage personal data in a manner that complies with such policies.

Similarly, as individuals have become more aware of the risks associated with the theft or misuse of their personal data, they have sought additional tools to help them manage which entities process their personal data. There is currently a need for improved tools that would allow individuals to minimize the number of entities that process their personal data—especially entities that the individual doesn't actively do business with.

When a device or a data center that stores personal data experiences a failure, the operator of such a device or data center will typically desire to migrate the stored personal data and any other data to a backup device or data center. However, transfers of such data may be subject to jurisdictional rules and regulations that may govern the storage locations of such data. There is currently a need for systems and methods that facilitate the migration of data subject to regulatory restrictions while ensuring compliance with such restrictions.

SUMMARY

A data subject access request processing system, according to various embodiments, comprises: one or more data subject access request management servers; a plurality of local storage nodes, each of the plurality of local storage nodes being physically located in a distinct geographic location; one or more processers; and memory. In some embodiments, the one or more processers are configured for: (1) receiving, from a remote computing device, at the one or more data subject access request management servers, a data subject access request for a data subject, the request comprising one or more request parameters; (2) identifying, based at least in part on the data subject access request, a particular local storage node of the plurality of local storage nodes; (3) routing the data subject access request from the one or more data subject access request management servers to the particular local storage node; (4) processing the request at the particular local storage node by identifying one or more pieces of personal data associated with the data subject, the one or more pieces of personal data being stored in one or more data repositories associated with a particular organization; and (5) taking one or more actions based at least in part on the data subject access request, the one or more actions including one or more actions related to the one or more pieces of personal data.

A computer-implemented data processing method for processing a data subject within a data system in order to fulfill a data subject access request, in particular embodiments, comprises: (1) receiving, by one or more processors, from a data subject, a data subject access request; identifying, based at least in part on the data subject access request, a particular local storage node of a plurality of local storage nodes; (2) routing the data subject access request to the particular local storage node; (3) processing the data subject access request at the local storage node by identifying the one or more pieces of personal data associated with the data subject, wherein identifying the one or more pieces of personal data associated with the data subject comprises scanning one or more data inventories stored within a data system for the one or more pieces of personal data; (4) in response to identifying the one or more pieces of personal data, at least temporarily storing the one or more pieces of personal data at the local storage node; and (5) providing access, to the data subject, to the one or more pieces of data at the local storage node.

A computer-implemented method for generating a visualization of one or more data transfers between one or more data assets, comprising: (1) identifying one or more data assets associated with a particular entity; (2) analyzing the one or more data assets to identify one or more data elements stored in the identified one or more data assets; (3) defining a plurality of physical locations and identifying, for each of the identified one or more data assets, a respective particular physical location of the plurality of physical locations; (4) analyzing the identified one or more data elements to determine one or more data transfers between the one or more data systems in different particular physical locations; (5) determining one or more regulations that relate to the one or more data transfers; and (6) generating a visual representation of the one or more data transfers based at least in part on the one or more regulations.

A computer-implemented method for assessing a risk associated with one or more data transfers between one or more data assets that comprises: (1) creating a data transfer record for a transfer of data between a first asset in a first location and a second asset in a second location; (2) accessing a set of data transfer rules that are associated with the data transfer record; (3) performing a data transfer assessment based at least in part on applying the set of data transfer rules on the data transfer record; (4) identifying one or more data transfer risks associated with the data transfer record, based at least in part on the data transfer assessment; (5) calculating a risk score for the data transfer based at least in part on the one or more data transfer risks associated with the data transfer record; (6) digitally storing the risk score for the data transfer.

A computer-implemented data processing method for identifying one or more pieces of personal data associated with a data subject within a data system in order to fulfill a data subject access request, according to various embodiments, comprises: (1) receiving, by one or more processors, from a data subject, a data subject access request; (2) determining, by one or more processors, based on the data subject access request, a location of the request; (3) routing, by one or more processors, the data subject access request to one or more local storage nodes based at least in part on the location of the request; (4) processing, by one or more processors at the one or more local storage nodes, the data subject access request by identifying the one or more pieces of personal data associated with the data subject. In some embodiments, identifying the one or more pieces of personal data associated with the data subject comprises accessing one or more data models defining a location of one or more data inventories stored within the data system for the one or more pieces of personal data. In some embodiments, the method further comprises, in response to identifying the one or more pieces of personal data, taking one or more actions such as, for example: deleting the one or more pieces of personal data from the data system; modifying at least one of the one or more pieces of personal data and storing the modified at least one of the one or more pieces of personal data in the data system; and generating a report comprising the one or more pieces of personal data and providing the report to the data subject.

A computer-implemented data processing method for automatically processing inquiries regarding how an entity handles personal data, according to particular embodiments, comprises: providing a chatbot executed by one or more computer processors that is configured for automatically processing one or more inquiries from one or more users regarding a general type of personal data that a particular entity stores for data subjects who have one or more specified types of relationships with a particular entity; receiving, via the chatbot, an inquiry regarding a process for submitting a DSAR to the particular entity, or what type of personal data the particular entity stores for a particular data subject; at least partially in response to receiving the request, using the chatbot to obtain generic information from the data subject comprising at least one relationship that the data subject has with the particular entity; determining, by one or more computer processors, based at least in part on the generic information, a general type of personal data that the particular entity stores for the data subject; and using the chatbot to communicate, to the data subject, the general type of personal data that the particular entity stores for the data subject.

In various embodiments, determining the general type of personal data that the particular entity stores for the data subject comprises determining the general type of personal data that the particular entity stores for data subjects that have the one or more relationships with the entity, as specified in the generic information. In various embodiments, using the generic information to determine the general type of personal data that the particular entity stores for the data subject is executed by the chatbot. In various embodiments, communicating the general type of personal data that the particular entity stores for the data subject is done in lieu of fulfilling a formal data subject access request. In particular embodiments, the relationship that the data subject has with the particular entity comprises at least one relationship selected from a group consisting of: (A) the data subject is a customer of the particular entity; (B) the data subject is on one or more mailing lists of the particular entity; and (C) the data subject uses one or more products or services of the particular entity. In various embodiments, one or more computer processors may further determine, based at least in part on the generic information, one or more ways that the particular entity uses the general type of personal data that the particular entity stores for the data subject, and using the chatbot to communicate, to the data subject, the one or more ways that the particular entity uses the general type of personal data that the particular entity stores for the data subject. In various embodiments, the data subject is a customer of the particular entity. In various embodiments, the data subject is on one or more mailing lists of the particular entity. In various embodiments, the inquiry comprises at least one question regarding the process for submitting a DSAR to the particular entity. In various embodiments, the inquiry comprises at least one question regarding what type of personal data the particular entity stores for a particular data subject. In various embodiments, the step of using the generic information to determine the general type of personal data that the particular entity stores for the data subject comprises using the generic information, in combination with data from a privacy-related data map, to determine the general type of personal data that the particular entity stores for entities that have generic information that corresponds to the generic information provided by the data subject. In various embodiments, the privacy-related data map identifies one or more electronic associations between at least two data assets within a data model comprising a respective digital inventory for each of the two or more data assets, each respective digital inventory comprising one or more respective inventory attributes selected from a group consisting of: one or more processing activities associated with each of the respective data assets; transfer data associated with each of the respective data assets; and respective identifiers of one or more pieces of personal data associated with each of the respective data assets.

A computer system for automatically processing inquiries regarding how a particular entity handles personal data, according to particular embodiments, comprises: at least one computer processor; and computer memory storing computer-executable instructions for: providing a chatbot that is executed by the at least one computer processor and that is configured for automatically processing one or more inquiries from one or more users regarding one or more privacy practices of the particular entity; receiving, via the chatbot, an inquiry regarding a process for submitting a DSAR to the particular entity, or to disclose what type of personal data the particular entity stores for a particular data subject; in response to receiving the request, using the chatbot to obtain particular information from the data subject comprising at least one relationship that the data subject has with the particular entity; using the particular information to determine one or more general types of personal data that the particular entity stores for the data subject; and using the chatbot to communicate, to the data subject, the one or more general types of personal data that the particular entity stores for the data subject.

In various embodiments, the particular information is generic information about the data subject, which is not usable to identify the data subject. In various embodiments, the step of using the generic information to determine the general type of personal data that the particular entity stores for the data subject comprises using the generic information, in combination with data from a privacy-related data map, to determine at least one general type of personal data that the particular entity stores for entities that have generic information that corresponds to the generic information provided by the data subject. In various embodiments, the privacy-related data map identifies one or more electronic associations between at least two data assets within a data model comprising a respective digital inventory for each of the two or more data assets, each respective digital inventory comprising one or more respective inventory attributes selected from a group consisting of: one or more processing activities associated with each of the respective data assets; transfer data associated with each of the respective data assets; and respective identifiers of one or more pieces of personal data associated with each of the respective data assets. In various embodiments, the step of using the information to determine the general type of personal data that the particular entity stores for the data subject is executed by the chatbot. In various embodiments, the relationship that the data subject has with the particular entity comprises at least one relationship selected from a group consisting of: (A) the data subject is a customer of the particular entity; (B) the data subject is on one or more mailing lists of the particular entity; and (C) the data subject uses one or more products of the particular entity. In various embodiments, the data subject is a customer of the particular entity. In various embodiments, the data subject is on one or more mailing lists of the particular entity. In various embodiments, the computer memory stores computer-executable instructions for: determining, by one or more computer processors, based at least in part on the particular information, one or more ways that the particular entity uses the one or more general types of personal data that the particular entity stores for the data subject; and using the chatbot to communicate, to the data subject, the one or more ways that the particular entity uses the one or more general types of personal data that the particular entity stores for the data subject. In various embodiments, the inquiry comprises at least one question regarding what general type of personal data the particular entity stores for a particular data subject.

A computer-readable medium storing computer-executable instructions, according to particular embodiments, comprises instructions for: providing a chatbot, executed by one or more computer processors, that is configured for automatically processing one or more inquiries from one or more users regarding a general type of personal data that a particular entity stores for data subjects who have one or more specified types of relationships with a particular entity; receiving, via the chatbot, an inquiry regarding what general type of personal data the particular entity stores for a particular data subject; in response to receiving the request, using the chatbot to obtain generic information from the data subject comprising at least one relationship that the data subject has with the particular entity; determining, by one or more computer processors, based at least in part on the generic information and at least one privacy-related data map, a general type of personal data that the particular entity stores for the data subject; and using the chatbot to communicate, to the data subject, the general type of personal data that the particular entity stores for the data subject, wherein: the privacy-related data map identifies one or more electronic associations between at least two data assets within a data model comprising a respective digital inventory for each of the two or more data assets, each respective digital inventory comprising one or more respective inventory attributes selected from a group consisting of: one or more processing activities associated with each of the respective data assets; transfer data associated with each of the respective data assets; and respective identifiers of one or more pieces of personal data associated with each of the respective data assets.

In various embodiments, communicating the general type of personal data that the particular entity stores for the data subject is done in lieu of fulfilling a formal data subject access request. In various embodiments, the step of using the generic information and at least one data map to determine the general type of personal data that the particular entity stores for the data subject is executed by the chatbot. In various embodiments, the relationship that the data subject has with the particular entity comprises at least one relationship selected from a group consisting of: (A) the data subject is a customer of the particular entity; (B) the data subject is on one or more mailing lists of the particular entity; and (C) the data subject uses one or more products of the particular entity. In various embodiments, the data subject is a customer of the particular entity. In various embodiments, the data subject is on one or more mailing lists of the particular entity. In various embodiments, the computer-executable instructions further comprise instructions for: determining, by one or more computer processors, based at least in part on the generic information, one or more ways that the particular entity uses the general type of personal data that the particular entity stores for the data subject; and using the chatbot to communicate, to the data subject, the one or more ways that the particular entity uses the general type of personal data that the particular entity stores for the data subject.

A computer-implemented data processing method for processing data subject access requests, according to particular embodiments, comprises: receiving, by at least one computer processor, a data subject access request that requests data regarding a particular data subject, the data subject access request comprising a request to execute at least one action selected from a group consisting of: deleting personal data of the data subject; modifying personal data of the data subject; and providing personal data of the data subject; at least partially in response to receiving the data subject access request, determining whether the data subject access request was initiated by an automated source; in response to determining that the data subject access request was initiated by an automated source, automatically taking at least one action, by at least one computer processor, to have the data subject access request reinitiated by a human source; and at least partially in response to determining that the data subject access request was initiated by a human, automatically facilitating the fulfillment of the data subject access request.

In various embodiments, determining that the data subject access request was initiated by an automated source comprises determining that that the data subject access request was submitted from a source that has been previously identified as an automated source of data subject access requests. In various embodiments, automatically taking at least one action, by at least one computer processor, to have the data subject access request reinitiated by a human source comprises taking at least one defensive action to block a successful submission of the data subject access request by the automated source. In various embodiments, the at least one defensive action comprises utilizing one or more HTML tagging techniques to at least partially prevent a bot tool from automatically matching a form for use in submitting one or more data subject access requests to a known form that the bot can complete. In various embodiments, the at least one defensive action comprises dynamically modifying a format of a form for use in submitting one or more data subject access requests. In various embodiments, determining that the data subject access request was initiated by an automated source comprises determining that that the data subject access request was submitted from a source that has submitted more than a predetermined number of data subject access requests to a particular data subject access processing system in the past. In various embodiments, a data processing method for processing data subject access requests may further comprise determining that the data subject access request was initiated by an automated source comprises determining that that the source submitted multiple data subject access requests at about the same time as the particular data subject access request was submitted. In various embodiments, automatically taking at least one action, by at least one computer processor, to have the data subject access request reinitiated by a human source comprises automatically taking at least one defensive action to block a successful submission of the data subject access request by the automated source. In various embodiments, automatically taking the at least one defensive action comprises, at least partially in response to receiving the data subject access request: (1) generating a unique URL; and (2) at least temporarily providing access to an electronic form for completing a data subject access request at the unique URL. In various embodiments, automatically taking the at least one defensive action comprises, at least partially in response to receiving the data subject access request: (1) setting a session cookie on the browser of a client computer that is attempting to submit the data subject access request; (2) using the session cookie to determine whether the data subject access request is being submitted from a domain associated with a third-party DSAR aggregator; and (3) in response to determining that the data subject access request is being submitted from a domain associated with a third-party DSAR aggregator, rejecting the data subject access request. In various embodiments, automatically taking the at least one defensive action comprises dynamically modifying a format of a form for use in submitting one or more data subject access requests. In various embodiments, automatically taking at least one defensive action comprises utilizing one or more HTML tagging techniques to at least partially prevent the automated source from automatically matching a form for use in submitting one or more data subject access requests to a known form that the automated source can complete.

A computer-readable medium may store computer-executable instructions, according to particular embodiments, for: receiving a data subject access request that requests data regarding a particular data subject, the data subject access request comprising a request to execute at least one action selected from a group consisting of: deleting personal data of the data subject; modifying personal data of the data subject; and providing information regarding the use, by a particular entity, of the data subject's personal data; at least partially in response to receiving the data subject access request, determining whether the data subject access request was initiated was initiated robotically; in response to determining that the data subject access request was initiated robotically, preventing fulfillment of the robotically-generated data subject access request; and at least partially in response to determining that the data subject access request was initiated by a human, automatically facilitating the fulfillment of the data subject access request.

In various embodiments, determining that the data subject access request was generated robotically comprises: analyzing data subject access submission activity from a particular source; and in response to determining that the data subject access submission activity is inconsistent with human data subject access submission activity, determining that the data subject access request was generated robotically. In various embodiments, automatically taking at least one action, by at least one computer processor, to have the data subject access request reinitiated by a human source comprises taking at least one defensive action to block a successful submission of the data subject access request by the automated source. In various embodiments, the at least one defensive action comprises utilizing one or more HTML tagging techniques to at least partially prevent a bot tool from automatically matching a form for use in submitting one or more data subject access requests to a known form that the bot can complete. In various embodiments, the at least one defensive action comprises dynamically modifying a format of a form for use in submitting one or more data subject access requests. In various embodiments, automatically taking at least one action, by at least one computer processor, to have the data subject access request reinitiated by a human source comprises automatically taking at least one defensive action to block a successful submission of the data subject access request by the automated source. In various embodiments, automatically taking the at least one defensive action comprises, at least partially in response to receiving the data subject access request: (1) generating a URL; and (2) at least temporarily providing access to an electronic form for completing a data subject access request at the URL. In various embodiments, the URL is unique to the data subject access request. In various embodiments, automatically taking the at least one defensive action comprises dynamically modifying a format of a form for use in submitting one or more data subject access requests. In various embodiments, automatically taking at least one defensive action comprises utilizing one or more HTML tagging techniques to at least partially prevent a bot tool from automatically matching a form for use in submitting one or more data subject access requests to a known form that the bot can complete.

A computer system for processing data subject access requests, according to particular embodiments, comprises: at least one computer processor; and computer memory storing computer-executable instructions that, when executed by the at least one computer processor, are operable for: receiving, by the at least one computer processor, a data subject access request that requests data regarding a particular data subject, the data subject access request comprising a request to execute at least one action selected from a group consisting of: deleting personal data of the data subject; modifying personal data of the data subject; and providing personal data of the data subject; at least partially in response to receiving the data subject access request, determining, by the at least one processor, whether the data subject access request was submitted by an automated source; in response to determining that the data subject access request was submitted by an automated source, automatically taking at least one action, by the at least one computer processor, to block a successful submission of the data subject access request by the automated source and to instead have the data subject access request resubmitted by a human source; and at least partially in response to determining that the data subject access request was submitted by a human, automatically facilitating the fulfillment of the data subject access request.

In various embodiments, the at least one action comprises utilizing one or more HTML tagging techniques to at least partially prevent an automated source from automatically matching a form for use in submitting one or more data subject access requests to a known form that the automated source can complete. In various embodiments, the at least one defensive action comprises dynamically modifying a format of a form for use in submitting one or more data subject access requests. In various embodiments, automatically taking the at least one defensive action comprises, at least partially in response to receiving the data subject access request: (1) generating a URL; and (2) at least temporarily providing access to an electronic form for completing a data subject access request at the URL. In various embodiments, the URL is unique to the data subject access request.

A computer-implemented data processing method for migrating personal data between data centers, according to various embodiments, may include: receiving, by one or more computer processors, an indication that data stored at a first data asset is to be migrated to a target data asset; at least partially in response to receiving the indication that the data stored at the first data asset is to be migrated to the target data asset: accessing, by one or more processors, a data model associated with the first data asset and a privacy-related data map, wherein the privacy-related data map identifies one or more electronic associations between the first data asset and the second data asset; determining, by one or more processors based at least in part on the data model associated with the first data asset, that the data stored at the first data asset comprises personal data; and selecting, by one or more processors based at least in part on the data model associated with the first data asset, the privacy-related data map, and the determination that the data stored at the first data asset comprises personal data, a second data asset as the target data asset; and initiating, by one or more processors, a transfer of the data stored at the first data asset to the second data asset.

In particular embodiments, the first data asset is located in a first data center at a first geographical location, wherein the second data asset is located in a second data center at a second geographical location, and wherein the first geographical location is distinct from the second geographical location. In particular embodiments, receiving the indication that data stored at the first data asset is to be migrated to the target data asset comprises receiving an indication that a data center in which the first data asset is located has failed or is anticipated to fail. In particular embodiments, selecting the second data asset as the target data asset comprises: determining, based at least in part on the data model associated with the first data asset, that the data stored at the first data asset is subject to one or more regulations associated with data transfers; and determining that the transfer of the data stored at the first data asset to the second data asset complies with the one or more regulations associated with data transfers. In particular embodiments, the method further includes determining based at least in part on the data model associated with the first data asset, regulatory requirements associated with the first data asset; and selecting the second data asset as the target data asset is further based at least in part on the regulatory requirements associated with the first data asset. In particular embodiments, the regulatory requirements associated with the first data asset are associated with a particular geographical location. In particular embodiments, selecting the second data asset as the target data asset comprises determining that the first data asset and the second data asset are located in a same regulatory jurisdiction.

A computer system for migrating personal data between data assets, according to various embodiments, may include: at least one computer processor; and computer memory storing computer-executable instructions that, when executed by the at least one computer processor, are operable for: detecting, by the at least one computer processor, an indication that a data center in which a first data asset is located has failed or is anticipated to fail; at least partially in response to detecting the indication that the data center in which the first data asset is located has failed or is anticipated to fail, determining, by the at least one computer processor, to migrate data from the first data asset to a target data asset; at least partially in response to determining to migrate the data from the first data asset to the target data asset: accessing, by the at least one computer processor, a data model associated with the first data asset; determining, by the at least one computer processor using the data model associated with the first data asset, one or more regulations associated with data transfers between the first data asset and a second data asset; determining, by the at least one computer processor using the data model associated with the first data asset, a type of data stored on the first data asset to be transferred to the target data asset; selecting, by the at least one computer processor based at least in part on the one or more regulations associated with data transfers between the first data asset and the second data asset and the type of data stored on the first data asset to be transferred to the target data asset, the second data asset as the target data asset; and transferring, by the at least one computer processor, the data from the first data asset to the second data asset.

In particular embodiments, determining the type of data stored on the first data asset to be transferred to the target data asset comprises using data from a privacy-related data map to determine the type of data stored on the first data asset to be transferred to the target data asset. In particular embodiments, determining the type of data stored on the first data asset to be transferred to the target data asset comprises determining that the data stored on the first data asset to be transferred to the target data asset comprises personal data. In particular embodiments, determining the one or more regulations associated with data transfers between the first data asset and the second data asset comprises using data from a privacy-related data map to determine the one or more regulations associated with data transfers between the first data asset and the second data asset. In particular embodiments, the privacy-related data map identifies one or more electronic associations between the first data asset and the second data asset within a data model. In particular embodiments, the first data asset comprises a plurality of storage assets managed as a single storage asset. In particular embodiments, the first data asset is operated by a first entity and the second data asset is operated by a second entity, and wherein the first entity is distinct from the second entity.

A non-transitory computer-readable medium, according to various embodiments, may store computer-executable instructions for: receiving, by one or more computer processors, an instruction to migrate data stored at a first data asset to a target data asset; determining, by one or more processors based at least in part on a data model associated with the first data asset, one or more data elements associated with the first data asset; determining, by one or more processors based at least in part on the data model associated with the first data asset, one or more respective attributes of each of the one or more data elements associated with the first data asset; determining, by one or more processors based at least in part on the one or more respective attributes of each of the one or more data elements associated with the first data asset, data transfer requirements associated with each of the one or more data elements associated with the first data asset, wherein the data transfer requirements comprise regulatory requirements for a jurisdiction in which the first data asset is located; selecting, by one or more processors based at least in part on the data transfer requirements associated with each of the one or more data elements associated with the first data asset, a second data asset as the target data asset; and initiating, by one or more processors, a transfer of a subset of the data stored at the first data asset to the second data asset.

In particular embodiments, determining the one or more respective attributes of each of the one or more data elements associated with the first data asset comprises determining that at least one of the one or more data elements associated with the first data asset is associated with personal data. In particular embodiments, determining the data transfer requirements associated with each of the one or more data elements associated with the first data asset comprises determining data transfer requirements associated with personal data. In particular embodiments, determining the data transfer requirements associated with personal data comprises: determining one or more regulations associated with data transfers of personal data based at least in part on the regulatory requirements for the jurisdiction in which the first data asset is located; and determining that the transfer of the subset of the data stored at the first data asset to the second data asset complies with the one or more regulations associated with data transfers of personal data. In particular embodiments, the second data asset is selected as the target data asset further based on the data model associated with the first data asset. In particular embodiments, the data model associated with the first data asset identifies one or more electronic associations between the first data asset and the second data asset.

A computer system for migrating personal data between data assets, according to various embodiments, may include: detection means for detecting an instruction to migrate data from a first data asset to a target data asset; data model storage means for storing a data model associated with the first data asset; privacy-related data map storage means for storing a privacy-related data map identifying one or more electronic associations between the first data asset and a second data asset; data access means for accessing the data model associated with the first data asset and the privacy-related data map; data type determination means for determining, based at least in part on the data model associated with the first data asset and the privacy-related data map, that the data stored on the first data asset to be transferred to the target data asset comprises personal data; regulation determination means for determining, based at least in part on the data model associated with the first data asset, the privacy-related data map, and the determination that the data stored on the first data asset comprises personal data, one or more regulations associated with data transfers between the first data asset and the second data asset; data asset selection means for selecting, based on the one or more regulations associated with data transfers between the first data asset and the second data asset and the type of data stored on the first data asset to be transferred to the target data asset, the second data asset as the target data asset; and data transfer means for transferring the data from the first data asset to the second data asset.

BRIEF DESCRIPTION OF THE DRAWINGS

Various embodiments of a data model generation and population system are described below. In the course of this description, reference will be made to the accompanying drawings, which are not necessarily drawn to scale, and wherein:

FIGS. 4-10 depict various exemplary visual representations of data models according to particular embodiments.

FIGS. 14-25 depict exemplary screen displays and graphical user interfaces (GUIs) according to various embodiments of the system, which may display information associated with the system or enable access to, or interaction with, the system by one or more users (e.g., to configure a questionnaire for populating one or more inventory attributes for one or more data models, complete one or more assessments, etc.).

FIGS. 30-31 depict exemplary screen displays and graphical user interfaces (GUIs) according to various embodiments of the system, which may display information associated with the system or enable access to, or interaction with, the system by one or more users (e.g., for the purpose of submitting a data subject access request or other suitable request).

Figure 32:
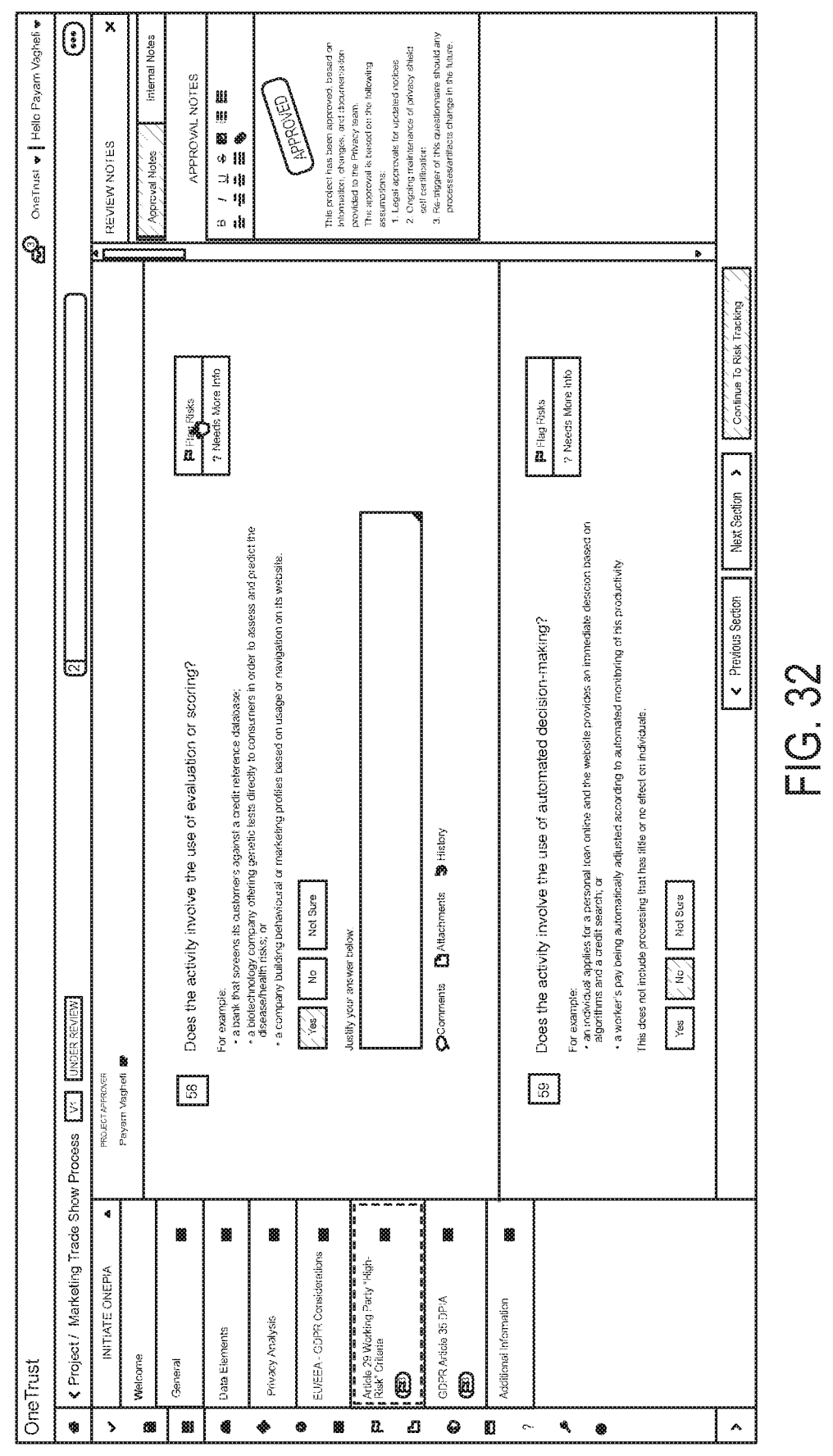
Figure 33:
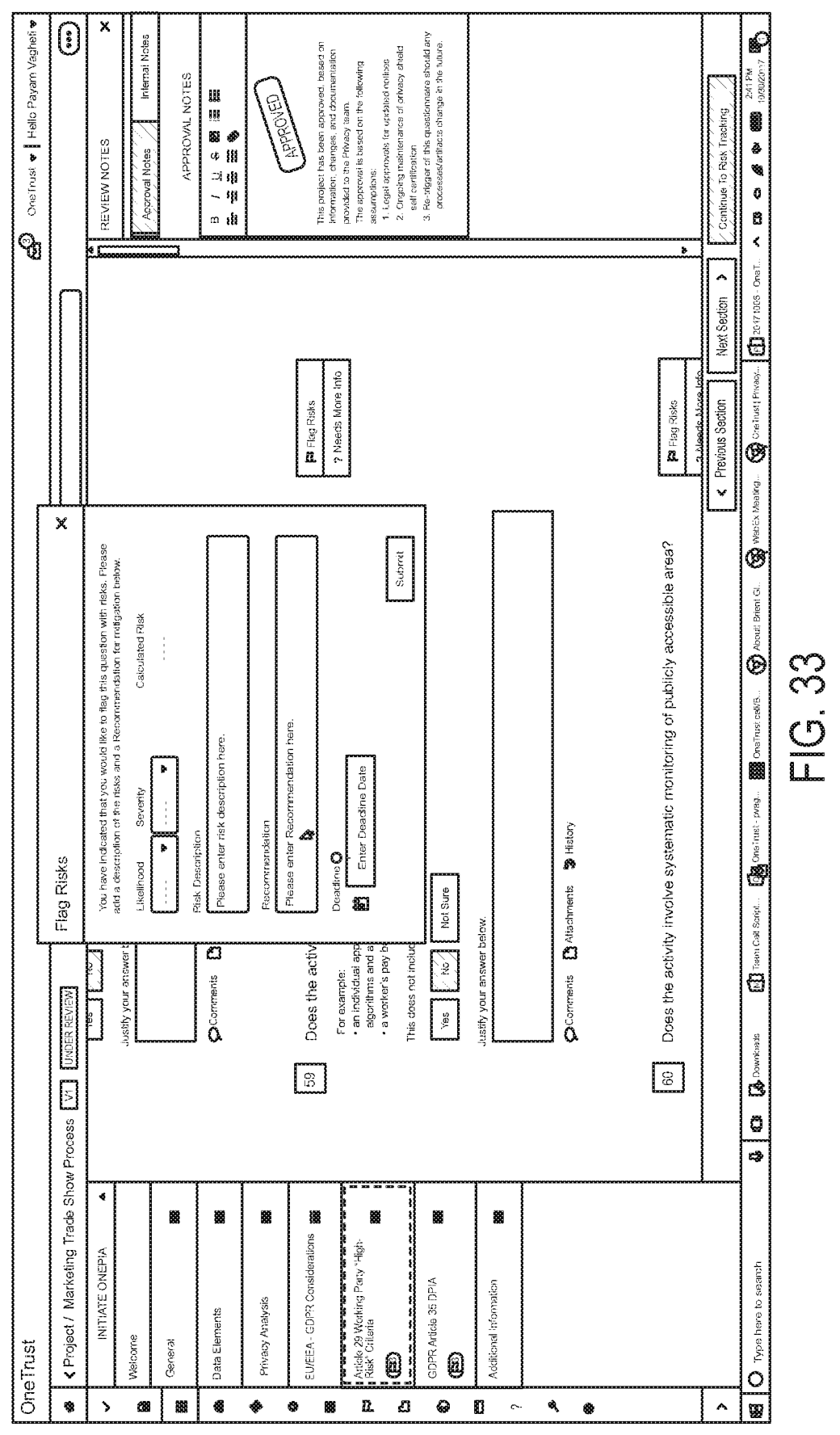
Figure 34:
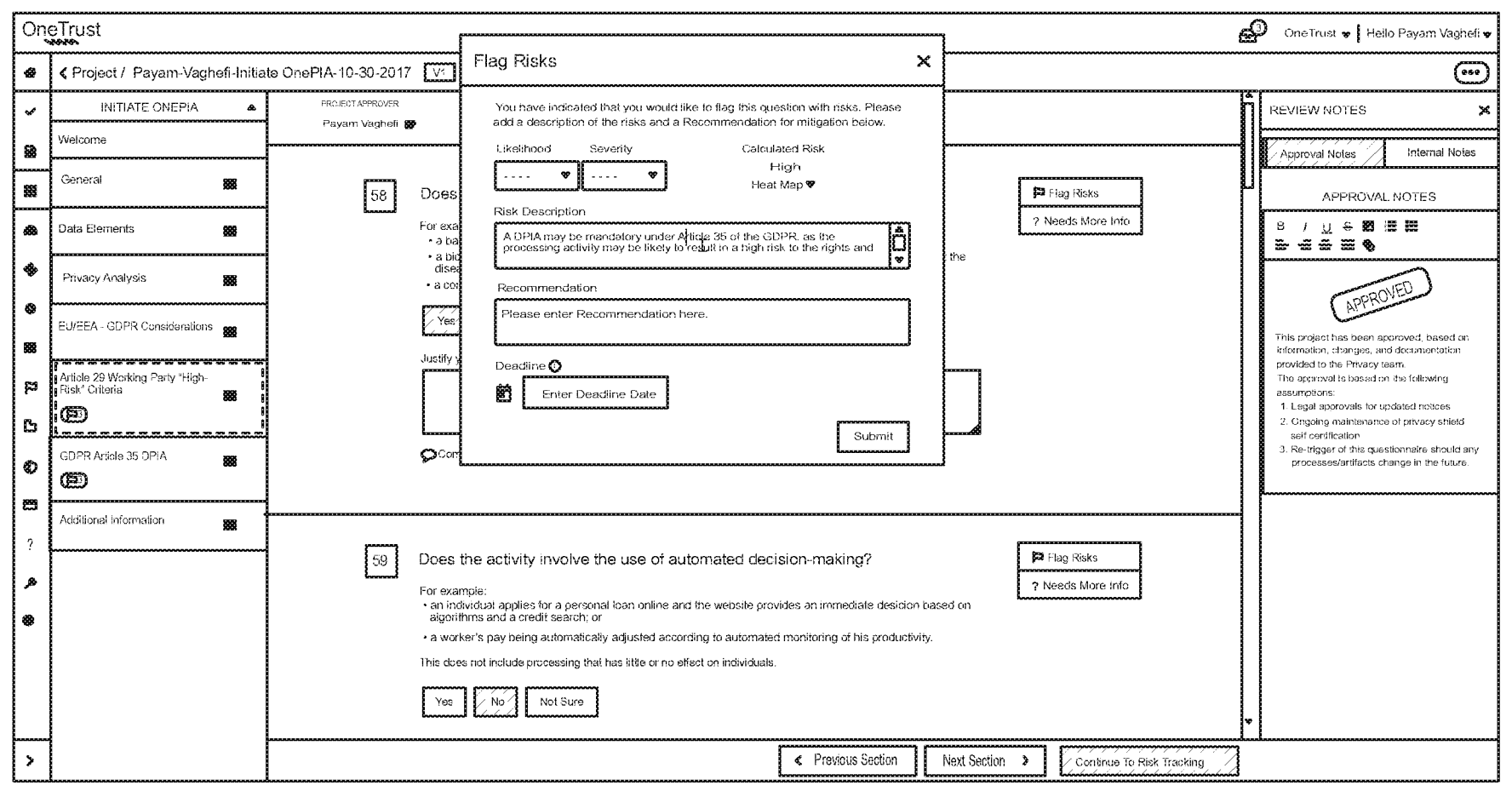
Figure 35:
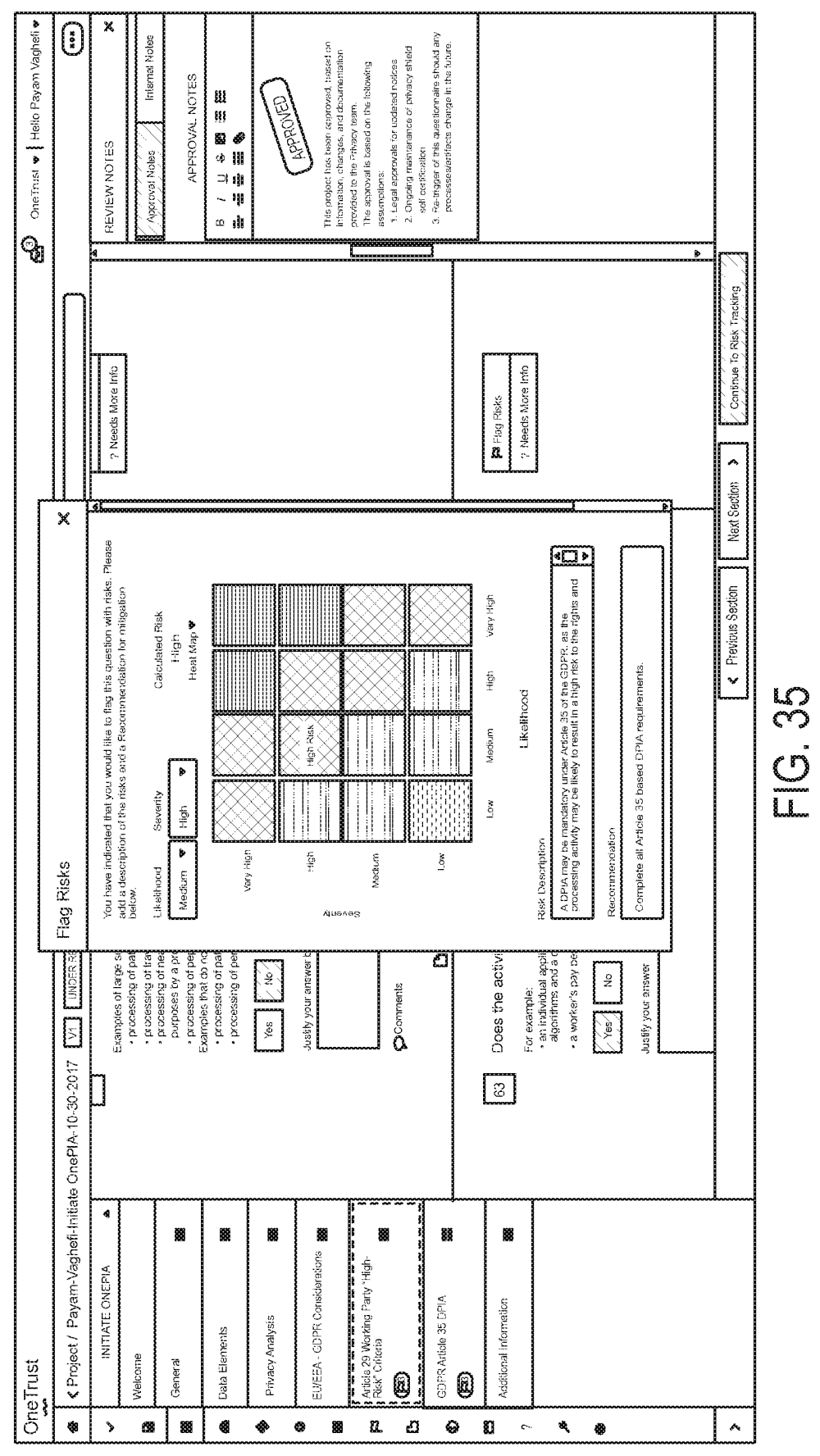

FIGS. 32-35 depict exemplary screen displays and graphical user interfaces (GUIs) according to various embodiments of the system, which may display information associated with the system or enable access to, or interaction with, the system by one or more users (e.g., for the purpose of flagging one or more risks associated with one or more particular questionnaire questions).

FIG. 40 depicts an exemplary screen display and graphical user interface (GUI) according to various embodiments of the system, which may display information associated with the system or enable access to, or interaction with, the system by one or more users.

FIG. 51 depicts an exemplary screen display and graphical user interface (GUI) according to various embodiments of the system, which may display information associated with the system or enable access to, or interaction with, the system by one or more users (e.g., for the purpose of modifying one or more data retention rules related to one or more pieces of data associated with one or more data subject access requests).

DETAILED DESCRIPTION

Figure 1:
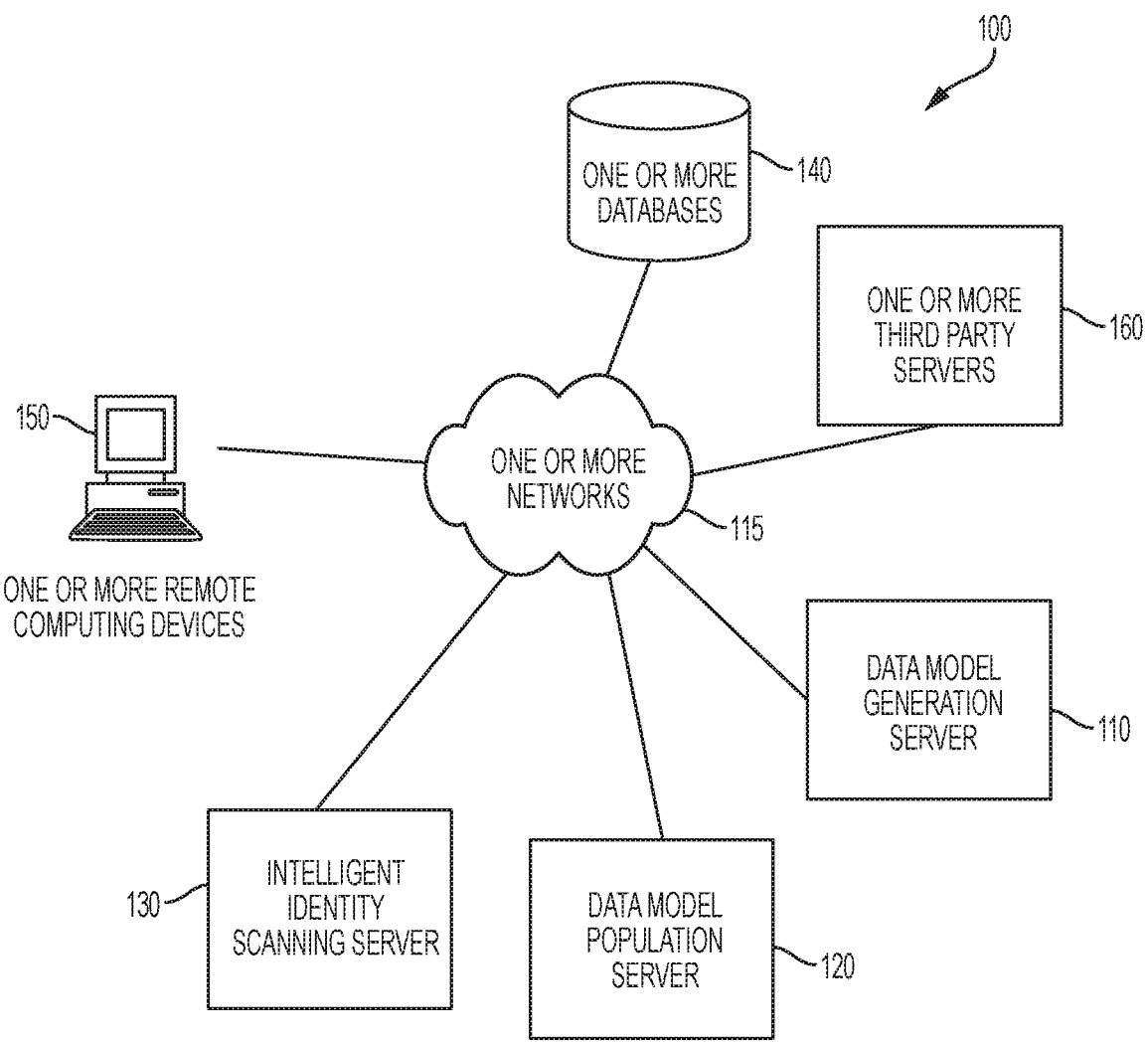
FIG. 1 depicts a data model generation and population system according to particular embodiments.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

In various embodiments, an organization, corporation, etc. may be required to provide information requested by an individual for whom the organization stores personal data. As a particular example, an organization may be required to provide an individual with a listing of, for example: (1) any personal data that the organization is processing for an individual, (2) an explanation of the categories of data being processed and the purpose of such processing; (3) categories of third parties to whom the data may be disclosed; (4) etc. In particular embodiments, when processing a data subject access request (e.g., a request for such information), a data subject access request processing system may be configured to: (1) receive a data subject access request from a data subject, the data subject access request comprising one or more requests related to the one or more rights described herein (e.g., a request for a copy of the data subject's personal data, a request regarding how long personal data associated with the data subject is being stored by the system, etc.); (2) process the request in any suitable manner described herein; (3) fulfill the request based at least in part on one or more request parameters; (4) store one or more pieces of metadata associated with the processing of, fulfillment of, and/or response to the request; and/or (5) archive one or more pieces of data associated with the request based on one or more data retention rules.

In various embodiments, a data subject access request processing system may be implemented in the context of any suitable privacy management system that is configured to ensure compliance with one or more legal or industry standards related to the collection and/or storage of private information (e.g., such as personal data). In various embodiments, a particular organization, sub-group, or other entity may initiate a privacy campaign or other activity (e.g., processing activity) as part of its business activities. In such embodiments, the privacy campaign may include any undertaking by a particular organization (e.g., such as a project or other activity) that includes the collection, entry, and/or storage (e.g., in computer memory) of any personal data associated with one or more individuals (e.g., data subjects). In particular embodiments, a privacy campaign may include any project undertaken by an organization that includes the use of personal data, or any other activity that could have an impact on the privacy of one or more individuals.

In any embodiment described herein, personal data may include, for example: (1) the name of a particular data subject (which may be a particular individual); (2) the data subject's address; (3) the data subject's telephone number; (4) the data subject's e-mail address; (5) the data subject's social security number; (6) information associated with one or more of the data subject's credit accounts (e.g., credit card numbers); (7) banking information for the data subject; (8) location data for the data subject (e.g., their present or past location); (9) internet search history for the data subject; and/or (10) any other suitable personal information, such as other personal information discussed herein. In particular embodiments, such personal data may include one or more cookies (e.g., where the individual is directly identifiable or may be identifiable based at least in part on information stored in the one or more cookies). In still other embodiments, the personal data may include any data which may be used either alone or in conjunction with other data or information to potentially identify a particular data subject (e.g., individual)

Various privacy and security policies (e.g., such as the European Union's General Data Protection Regulation, the California Consumer Privacy Act, and other such policies) may provide data subjects (e.g., individuals, organizations, or other entities) with certain rights related to the data subject's personal data that is collected, stored, or otherwise processed by an organization. These rights may include, for example: (1) a right to obtain confirmation of whether a particular organization is processing their personal data; (2) a right to obtain information about the purpose of the processing (e.g., one or more reasons for which the personal data was collected); (3) a right to obtain information about one or more categories of data being processed (e.g., what type of personal data is being collected, stored, etc.); (4) a right to obtain information about one or more categories of recipients with whom their personal data may be shared (e.g., both internally within the organization or externally); (5) a right to obtain information about a time period for which their personal data will be stored (e.g., or one or more criteria used to determine that time period); (6) a right to obtain a copy of any personal data being processed (e.g., a right to receive a copy of their personal data in a commonly used, machine-readable format); (7) a right to request erasure (e.g., the right to be forgotten), rectification (e.g., correction or deletion of inaccurate data), or restriction of processing of their personal data; and (8) any other suitable rights related to the collection, storage, and/or processing of their personal data (e.g., which may be provided by law, policy, industry or organizational practice, etc.).

As may be understood in light of this disclosure, a particular organization may undertake a plurality of different privacy campaigns, processing activities, etc. that involve the collection and storage of personal data. In some embodiments, each of the plurality of different processing activities may collect redundant data (e.g., may collect the same personal data for a particular individual more than once), and may store data and/or redundant data in one or more particular locations (e.g., on one or more different servers, in one or more different databases, etc.). In this way, a particular organization may store personal data in a plurality of different locations which may include one or more known and/or unknown locations. As such, complying with particular privacy and security policies related to personal data (e.g., such as responding to one or more requests by data subjects related to their personal data) may be particularly difficult (e.g., in terms of cost, time, etc.). In particular embodiments, the data subject access request fulfillment system may utilize one or more data model generation and population techniques to create a centralized data map with which the system can identify personal data stored, collected, or processed for a particular data subject, a reason for the processing, and any other information related to the processing.

In still other embodiments, as may be appreciated in light of this disclosure, the processing of particular data subject access request may result in the at least temporary storage of personal data (e.g., which may, for example, be subject to the same legal and/or industry standards related to the collection, processing, and storage of personal data). For example, when processing a particular data subject access request, the system may collect at least some personal data from a data subject (e.g., or other requestor on behalf of the data subject) in order to identify the data subject. As such, in order to fulfil the data subject access request (e.g., which may include a request to delete any data associated with the data subject), the system may need to collect identifying personal data from the data subject in order to use that data to determine what personal data the organization or system is storing that is associated with that data subject.

Accordingly, in light of the above, the system may be configured to utilize one or more local storage nodes in order to process a data subject access request on behalf of a data subject. In particular embodiments, the one or more local storage nodes may be local to the data subject making the request (e.g., in the same country as the data subject, in the same jurisdiction as the data subject, in the same geographic area as the data subject, etc.). The system may, for example, be configured to: (1) receive a data subject access request from a data subject (e.g., via a web form); (2) identify a suitable local storage node based at least in part on the request and/or the data subject; (3) route the data subject access request to the identified local storage node; and (4) process the data subject access request at the identified local storage node. In this way, the system may, for example, create a centralized, local record of any personal data that the system has stored regarding the particular data subject. This local processing and at least temporary storage of personal data at the local storage node may facilitate a more straightforward processing of data subject access requests that may, for example, originate from any of a plurality of data subjects that may reside throughout the world. The system may then fulfil the request at the one or more local storage nodes, which may, for example, avoid any additional interjurisdictional transfers or other processing of personal data (e.g., which may be subject to additional restrictions).

In various embodiments, an organization may be required to comply with one or more legal or industry requirements related to the storage of personal data (e.g., which may, for example, include personally identifiable information) even when responding to and fulfilling DSARs. In particular, when responding to a data subject access request, the system may compile one or more pieces of personal data for provision to a data subject. The system may, for example, store this compilation of personal data at least temporarily in order to provide access to the data to the data subject (e.g., or to another individual on behalf of the data subject). As such, the system may be configured to implement one or more data retention rules in order to ensure compliance with any legal or industry requirements related to the temporary storage of the collected data while still fulfilling any requirements related to providing the data to data subjects that request it, deleting the data at least partially in response to such a request, etc.

The system may then, for example, be configured to automatically archive personal data (e.g., personally identifiable information) associated with a data subject access request based on one or more data retention rules (e.g., one or more data retention rules designed to comply with one or more legal or industry standards while also enabling compliance with any request made by a data subject based on a right afforded by such standards). In particular embodiments, the system may then be configured to store metadata associated with a completed data subject access request which may, for example, include data related to the completion of the request, a date and time of the completion, what data was provided in response to the request, etc.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

FIG. 1 is a block diagram of a Data Model Generation and Population System 100 according to a particular embodiment. In various embodiments, the Data Model Generation and Population System 100 is part of a privacy compliance system (also referred to as a privacy management system), or other system, which may, for example, be associated with a particular organization and be configured to aid in compliance with one or more legal or industry regulations related to the collection and storage of personal data. In some embodiments, the Data Model Generation and Population System 100 is configured to: (1) generate a data model based on one or more identified data assets, where the data model includes a data inventory associated with each of the one or more identified data assets; (2) identify populated and unpopulated aspects of each data inventory; and (3) populate the unpopulated aspects of each data inventory using one or more techniques such as intelligent identity scanning, questionnaire response mapping, APIs, etc.

As may be understood from FIG. 1, the Data Model Generation and Population System 100 includes one or more computer networks 115, a Data Model Generation Server 110, a Data Model Population Server 120, an Intelligent Identity Scanning Server 130, One or More Databases 140 or other data structures, one or more remote computing devices 150 (e.g., a desktop computer, laptop computer, tablet computer, smartphone, etc.), and One or More Third Party Servers 160. In particular embodiments, the one or more computer networks 115 facilitate communication between the Data Model Generation Server 110, Data Model Population Server 120, Intelligent Identity Scanning Server 130, One or More Databases 140, one or more remote computing devices 150 (e.g., a desktop computer, laptop computer, tablet computer, smartphone, etc.), and One or More Third Party Servers 160. Although in the embodiment shown in FIG. 1, the Data Model Generation Server 110, Data Model Population Server 120, Intelligent Identity Scanning Server 130, One or More Databases 140, one or more remote computing devices 150 (e.g., a desktop computer, laptop computer, tablet computer, smartphone, etc.), and One or More Third Party Servers 160 are shown as separate servers, it should be understood that in other embodiments, one or more of these servers and/or computing devices may comprise a single server, a plurality of servers, one or more cloud-based servers, or any other suitable configuration. It should be further understood that although any particular name given to any particular server in the course of this description should not be understood to imply any limit to any functionality that such a server may provide to the system. For example, a scanning server may be implemented along with one or more other servers to generate, automate, execute, and/or fulfill one or more data subject access requests. Similarly, a data model population server may be configured to execute one or more scanning steps described herein, etc.

The one or more computer networks 115 may include any of a variety of types of wired or wireless computer networks such as the Internet, a private intranet, a public switch telephone network (PSTN), or any other type of network. The communication link between The Intelligent Identity Scanning Server 130 and the One or More Third Party Servers 160 may be, for example, implemented via a Local Area Network (LAN) or via the Internet. In other embodiments, the One or More Databases 140 may be stored either fully or partially on any suitable server or combination of servers described herein.

Figure 2:
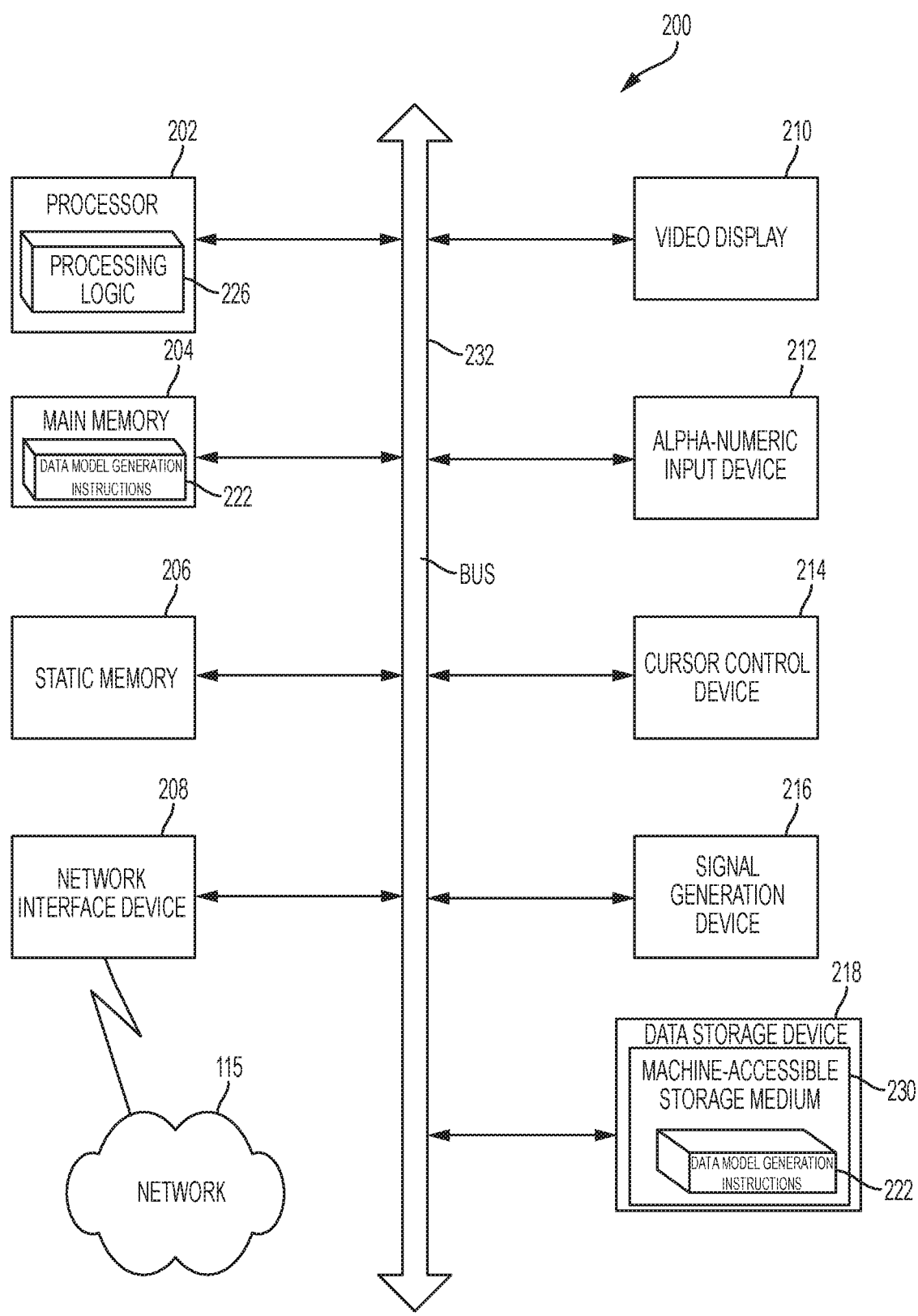
FIG. 2 is a schematic diagram of a computer (such as the data model generation server 110, or data model population server 120) that is suitable for use in various embodiments of the data model generation and population system shown in FIG. 1.

FIG. 2 illustrates a diagrammatic representation of a computer 200 that can be used within the Data Model Generation and Population System 100, for example, as a client computer (e.g., one or more remote computing devices 130 shown in FIG. 1), or as a server computer (e.g., Data Model Generation Server 110 shown in FIG. 1). In particular embodiments, the computer 200 may be suitable for use as a computer within the context of the Data Model Generation and Population System 100 that is configured to generate a data model and map one or more relationships between one or more pieces of data that make up the model.

In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The Computer 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 120 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software instructions 222 for data model generation) embodying any one or more of the methodologies or functions described herein. The software instructions 222 may also reside, completely or at least partially, within main memory 204 and/or within processing device 202 during execution thereof by computer 200-main memory 204 and processing device 202 also constituting computer-accessible storage media. The software instructions 222 may further be transmitted or received over a network 115 via network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc.

Exemplary System Platform

Various embodiments of a Data Model Generation and Population System 100 may be implemented in the context of any suitable system (e.g., a privacy compliance system). For example, the Data Model Generation and Population System 100 may be implemented to analyze a particular company or other organization's data assets to generate a data model for one or more processing activities, privacy campaigns, etc. undertaken by the organization. In particular embodiments, the system may implement one or more modules in order to at least partially ensure compliance with one or more regulations (e.g., legal requirements) related to the collection and/or storage of personal data. Various aspects of the system's functionality may be executed by certain system modules, including a Data Model Generation Module 300, Data Model Population Module 1100, Data Population Questionnaire Generation Module 1200, Intelligent Identity Scanning Module 2600, Data Subject Access Request Fulfillment Module 2900, Cross-Border Visualization Generation Module 3600, Adaptive Execution on a Data Model Module 3900, E-mail Scanning Module 4100, Webform Crawling Module 4300, and Data Asset and Webform Management Module 4400. These modules are discussed in greater detail below.

Although these modules are presented as a series of steps, it should be understood in light of this disclosure that various embodiments of the Data Model Generation Module 300, Data Model Population Module 1100, Data Population Questionnaire Generation Module 1200, Intelligent Identity Scanning Module 2600, Data Subject Access Request Fulfillment Module 2900, Cross-Border Visualization Generation Module 3600, Adaptive Execution on a Data Model Module 3900, E-mail Scanning Module 4100, Webform Crawling Module 4300, and Data Asset and Webform Management Module 4400 described herein may perform the steps described below in an order other than in which they are presented. In still other embodiments, the Data Model Generation Module 300, Data Model Population Module 1100, Data Population Questionnaire Generation Module 1200, Intelligent Identity Scanning Module 2600, Data Subject Access Request Fulfillment Module 2900, Cross-Border Visualization Generation Module 3600, Adaptive Execution on a Data Model Module 3900, E-mail Scanning Module 4100, Webform Crawling Module 4300, and Data Asset and Webform Management Module 4400 may omit certain steps described below. In various other embodiments, the Data Model Generation Module 300, Data Model Population Module 1100, Data Population Questionnaire Generation Module 1200, Intelligent Identity Scanning Module 2600, Data Subject Access Request Fulfillment Module 2900, Cross-Border Visualization Generation Module 3600, Adaptive Execution on a Data Model Module 3900, E-mail Scanning Module 4100, Webform Crawling Module 4300, and Data Asset and Webform Management Module 4400 may perform steps in addition to those described (e.g., such as one or more steps described with respect to one or more other modules, etc.).

In particular embodiments, the steps that the system executes when executing any of the modules described herein may be performed by any suitable computer server or combination of computer servers (e.g., any suitable computing device, server, or combination of computing device and/or server described herein).

Data Model Generation Module

In particular embodiments, a Data Model Generation Module 300 is configured to: (1) generate a data model (e.g., a data inventory) for one or more data assets utilized by a particular organization; (2) generate a respective data inventory for each of the one or more data assets; and (3) map one or more relationships between one or more aspects of the data inventory, the one or more data assets, etc. within the data model. In particular embodiments, a data asset (e.g., data system, software application, etc.) may include, for example, any entity that collects, processes, contains, and/or transfers data (e.g., such as a software application, "internet of things" computerized device, database, website, data-center, server, etc.). For example, a first data asset may include any software or device (e.g., server or servers) utilized by a particular entity for such data collection, processing, transfer, storage, etc.

In particular embodiments, a particular data asset, or collection of data assets, may be utilized as part of a particular data processing activity (e.g., direct deposit generation for payroll purposes). In various embodiments, a data model generation system may, on behalf of a particular organization (e.g., entity), generate a data model that encompasses a plurality of processing activities. In other embodiments, the system may be configured to generate a discrete data model for each of a plurality of processing activities undertaken by an organization.

Figure 3:
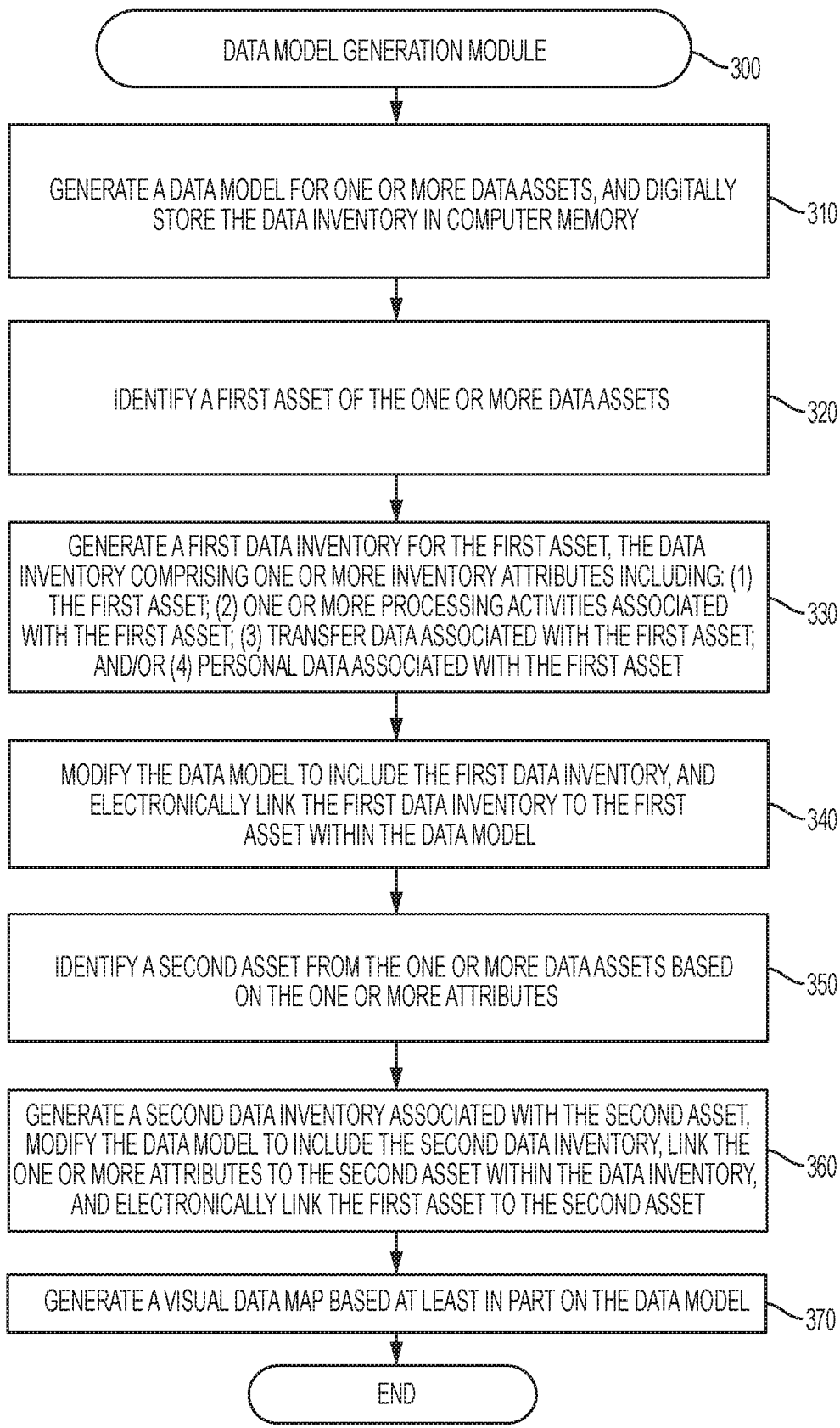
FIG. 3 is a flowchart showing an example of steps performed by a Data Model Generation Module according to particular embodiments.

Turning to FIG. 3, in particular embodiments, when executing the Data Model Generation Module 300, the system begins, at Step 310, by generating a data model for one or more data assets and digitally storing the data model in computer memory. The system may, for example, store the data model in the One or More Databases 140 described above (or any other suitable data structure). In various embodiments, generating the data model comprises generating a data structure that comprises information regarding one or more data assets, attributes and other elements that make up the data model. As may be understood in light of this disclosure, the one or more data assets may include any data assets that may be related to one another. In particular embodiments, the one or more data assets may be related by virtue of being associated with a particular entity (e.g., organization). For example, the one or more data assets may include one or more computer servers owned, operated, or utilized by the entity that at least temporarily store data sent, received, or otherwise processed by the particular entity.

In still other embodiments, the one or more data assets may comprise one or more third party assets which may, for example, send, receive and/or process personal data on behalf of the particular entity. These one or more data assets may include, for example, one or more software applications (e.g., such as Expensify to collect expense information, QuickBooks to maintain and store salary information, etc.).

Continuing to step 320, the system is configured to identify a first data asset of the one or more data assets. In particular embodiments, the first data asset may include, for example, any entity (e.g., system) that collects, processes, contains, and/or transfers data (e.g., such as a software application, "internet of things" computerized device, database, website, data-center, server, etc.). For example, the first data asset may include any software or device utilized by a particular organization for such data collection, processing, transfer, etc. In various embodiments, the first data asset may be associated with a particular processing activity (e.g., the first data asset may make up at least a part of a data flow that relates to the collection, storage, transfer, access, use, etc. of a particular piece of data (e.g., personal data)). Information regarding the first data asset may clarify, for example, one or more relationships between and/or among one or more other data assets within a particular organization. In a particular example, the first data asset may include a software application provided by a third party (e.g., a third party vendor) with which the particular entity interfaces for the purpose of collecting, storing, or otherwise processing personal data (e.g., personal data regarding customers, employees, potential customers, etc.).

In particular embodiments, the first data asset is a storage asset that may, for example: (1) receive one or more pieces of personal data form one or more collection assets; (2) transfer one or more pieces of personal data to one or more transfer assets; and/or (3) provide access to one or more pieces of personal data to one or more authorized individuals (e.g., one or more employees, managers, or other authorized individuals within a particular entity or organization). In a particular embodiment, the first data asset is a primary data asset associated with a particular processing activity around which the system is configured to build a data model associated with the particular processing activity.

In particular embodiments, the system is configured to identify the first data asset by scanning a plurality of computer systems associated with a particular entity (e.g., owned, operated, utilized, etc. by the particular entity). In various embodiments, the system is configured to identify the first data asset from a plurality of data assets identified in response to completion, by one or more users, of one or more questionnaires.

Advancing to Step 330, the system generates a first data inventory of the first data asset. The data inventory may comprise, for example, one or more inventory attributes associated with the first data asset such as, for example: (1) one or more processing activities associated with the first data asset; (2) transfer data associated with the first data asset (e.g., how and where the data is being transferred to and/or from); (3) personal data associated with the first data asset (e.g., what type of personal data is collected and/or stored by the first data asset; how, and from where, the data is collected, etc.); (4) storage data associated with the personal data (e.g., whether the data is being stored, protected and deleted); and (5) any other suitable attribute related to the collection, use, and transfer of personal data. In other embodiments, the one or more inventory attributes may comprise one or more other pieces of information such as, for example: (1) the type of data being stored by the first data asset; (2) an amount of data stored by the first data asset; (3) whether the data is encrypted; (4) a location of the stored data (e.g., a physical location of one or more computer servers on which the data is stored); etc. In particular other embodiments, the one or more inventory attributes may comprise one or more pieces of information technology data related to the first data asset (e.g., such as one or more pieces of network and/or infrastructure information, IP address, MAC address, etc.).

In various embodiments, the system may generate the data inventory based at least in part on the type of first data asset. For example, particular types of data assets may have particular default inventory attributes. In such embodiments, the system is configured to generate the data inventory for the first data asset, which may, for example, include one or more placeholder fields to be populated by the system at a later time. In this way, the system may, for example, identify particular inventory attributes for a particular data asset for which information and/or population of data is required as the system builds the data model.

As may be understood in light of this disclosure, the system may, when generating the data inventory for the first data asset, generate one or more placeholder fields that may include, for example: (1) the organization (e.g., entity) that owns and/or uses the first data asset (a primary data asset, which is shown in the center of the data model in FIG. 4); (2) one or more departments within the organization that are responsible for the first data asset; (3) one or more software applications that collect data (e.g., personal data) for storage in and/or use by the first data asset (e.g., or one or more other suitable collection assets from which the personal data that is collected, processed, stored, etc. by the first data asset is sourced); (4) one or more particular data subjects (or categories of data subjects) that information is collected from for use by the first data asset; (5) one or more particular types of data that are collected by each of the particular applications for storage in and/or use by the first data asset; (6) one or more individuals (e.g., particular individuals or types of individuals) that are permitted to access and/or use the data stored in, or used by, the first data asset; (7) which particular types of data each of those individuals are allowed to access and use; and (8) one or more data assets (destination assets) that the data is transferred to from the first data asset, and which particular data is transferred to each of those data assets.

As may be understood in light of this disclosure, the system may be configured to generate the one or more placeholder fields based at least in part on, for example: (1) the type of the first data asset; (2) one or more third party vendors utilized by the particular organization; (3) a number of collection or storage assets typically associated with the type of the first data asset; and/or (4) any other suitable factor related to the first data asset, its one or more inventory attributes, etc. In other embodiments, the system may substantially automatically generate the one or more placeholders based at least in part on a hierarchy and/or organization of the entity for which the data model is being built. For example, a particular entity may have a marketing division, legal department, human resources department, engineering division, or other suitable combination of departments that make up an overall organization. Other particular entities may have further subdivisions within the organization. When generating the data inventory for the first data asset, the system may identify that the first data asset will have both an associated organization and subdivision within the organization to which it is assigned. In this example, the system may be configured to store an indication in computer memory that the first data asset is associated with an organization and a department within the organization.

Next, at Step 340, the system modifies the data model to include the first data inventory and electronically links the first data inventory to the first data asset within the data model. In various embodiments, modifying the data model may include configuring the data model to store the data inventory in computer memory, and to digitally associate the data inventory with the first data asset in memory.

Figure 4:
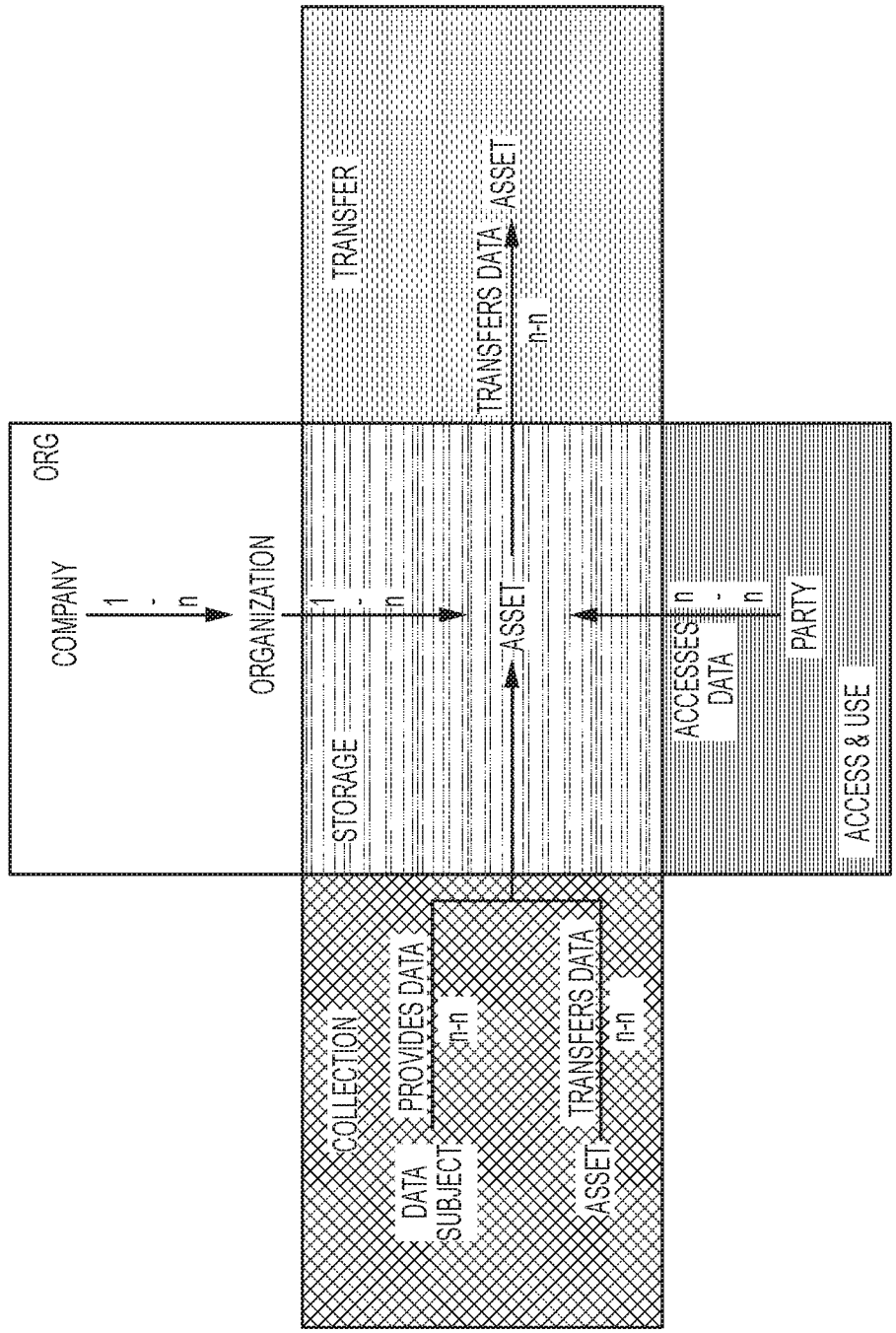
Figure 5:
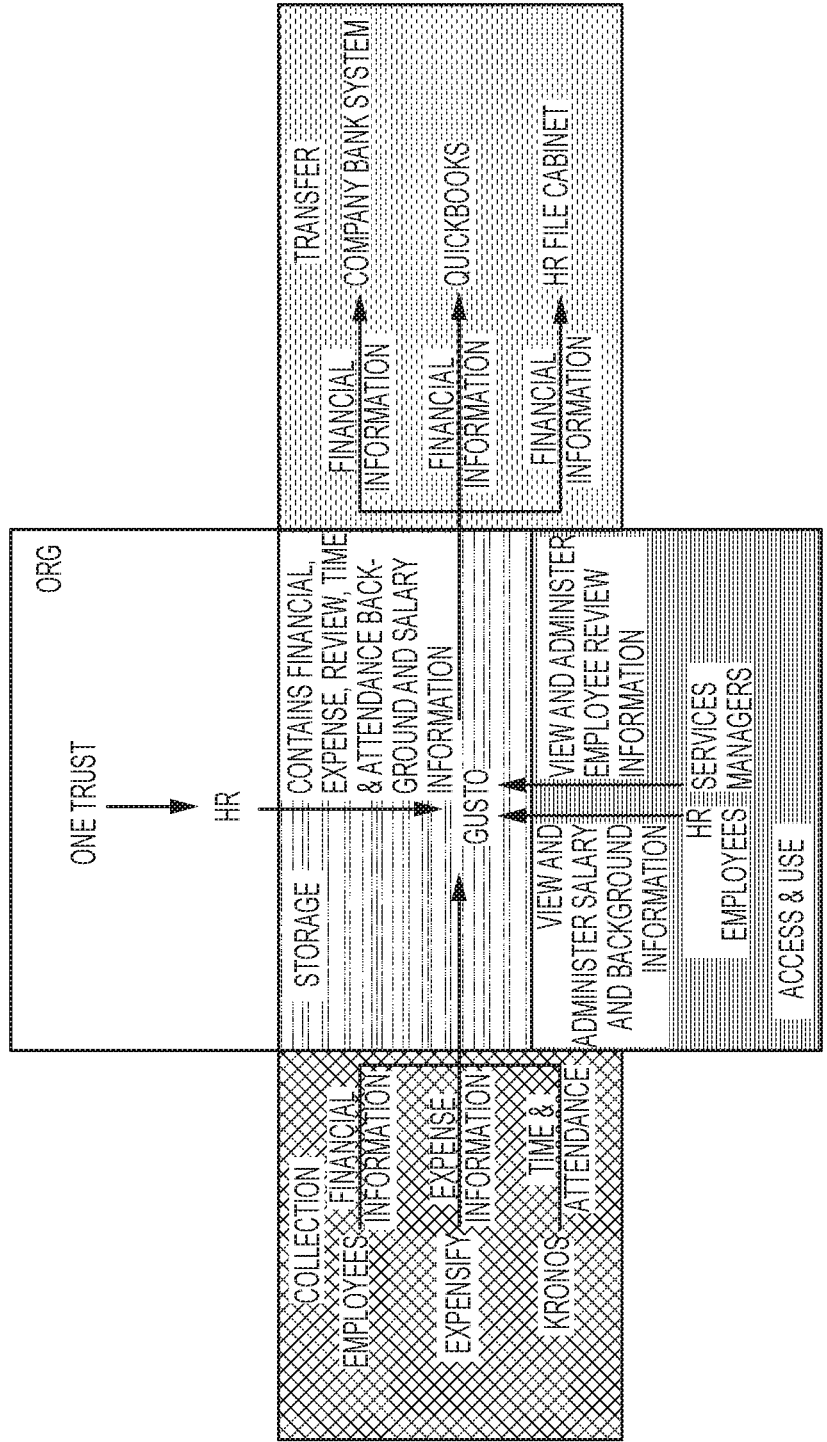
Figure 6:
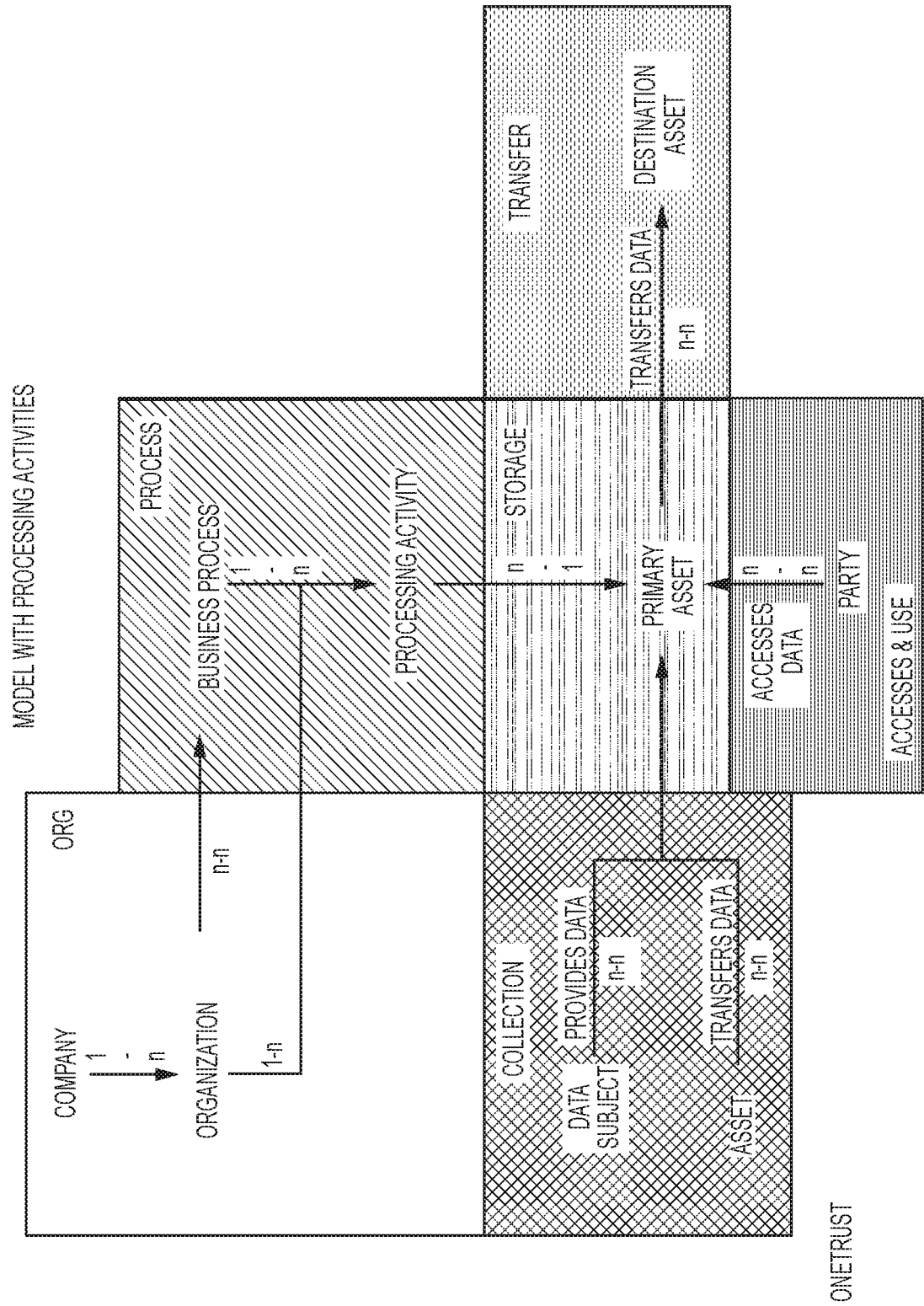
Figure 7:
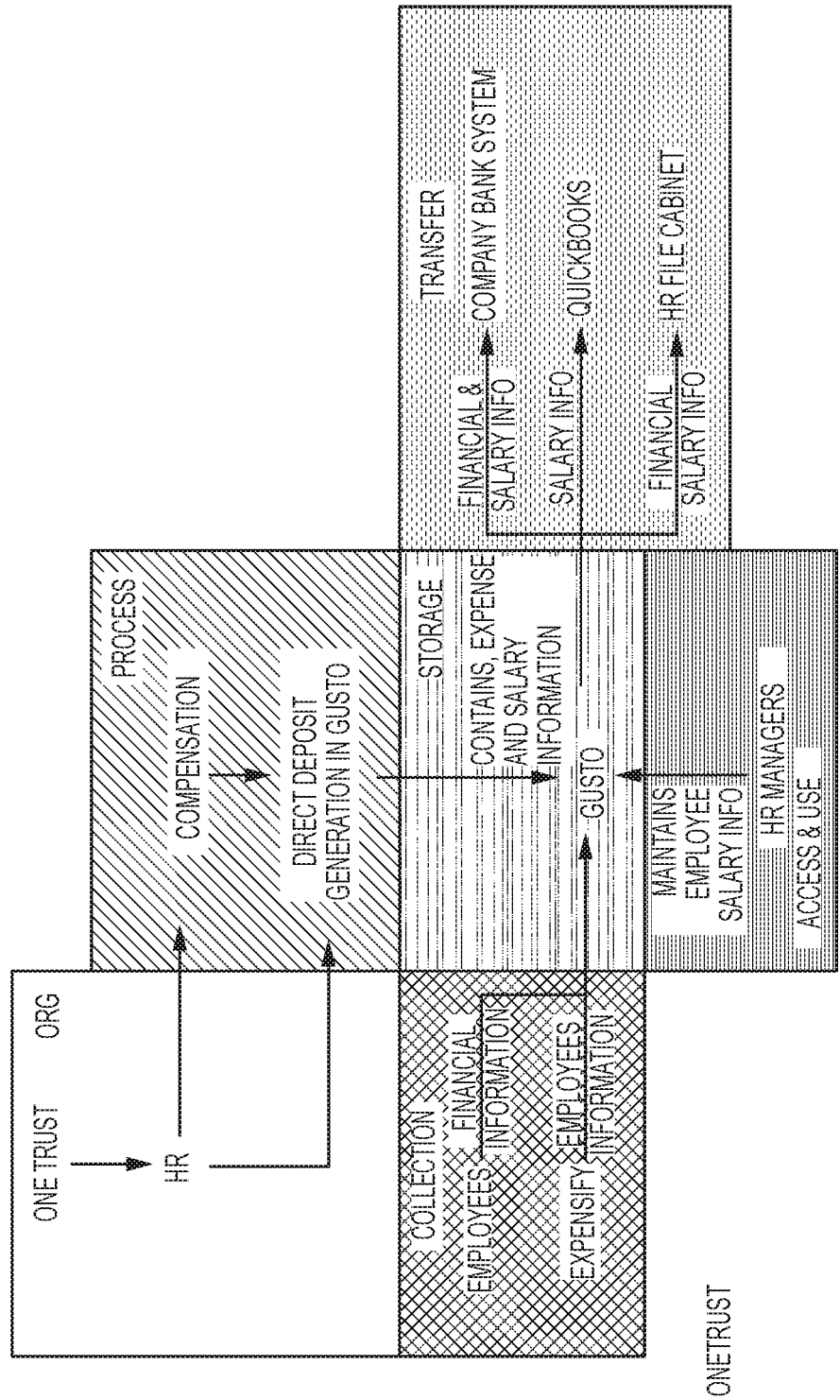

FIGS. 4 and 5 show a data model according to a particular embodiment. As shown in these figures, the data model may store the following information for the first data asset: (1) the organization that owns and/or uses the first data asset; (2) one or more departments within the organization that are responsible for the first data asset; (3) one or more applications that collect data (e.g., personal data) for storage in and/or use by the first data asset; (4) one or more particular data subjects that information is collected from for use by the first data asset; (5) one or more collection assets from which the first asset receives data (e.g., personal data); (6) one or more particular types of data that are collected by each of the particular applications (e.g., collection assets) for storage in and/or use by the first data asset; (7) one or more individuals (e.g., particular individuals, types of individuals, or other parties) that are permitted to access and/or use the data stored in or used by the first data asset; (8) which particular types of data each of those individuals are allowed to access and use; and (9) one or more data assets (destination assets) the data is transferred to for other use, and which particular data is transferred to each of those data assets. As shown in FIGS. 6 and 7, the system may also optionally store information regarding, for example, which business processes and processing activities utilize the first data asset.

As noted above, in particular embodiments, the data model stores this information for each of a plurality of different data assets and may include one or more links between, for example, a portion of the model that provides information for a first particular data asset and a second portion of the model that provides information for a second particular data asset.

Advancing to Step 350, the system next identifies a second data asset from the one or more data assets. In various embodiments, the second data asset may include one of the one or more inventory attributes associated with the first data asset (e.g., the second data asset may include a collection asset associated with the first data asset, a destination asset or transfer asset associated with the first data asset, etc.). In various embodiments, as may be understood in light of the exemplary data models described below, a second data asset may be a primary data asset for a second processing activity, while the first data asset is the primary data asset for a first processing activity. In such embodiments, the second data asset may be a destination asset for the first data asset as part of the first processing activity. The second data asset may then be associated with one or more second destination assets to which the second data asset transfers data. In this way, particular data assets that make up the data model may define one or more connections that the data model is configured to map and store in memory.

Returning to Step 360, the system is configured to identify one or more attributes associated with the second data asset, modify the data model to include the one or more attributes, and map the one or more attributes of the second data asset within the data model. The system may, for example, generate a second data inventory for the second data asset that comprises any suitable attribute described with respect to the first data asset above. The system may then modify the data model to include the one or more attributes and store the modified data model in memory. The system may further, in various embodiments, associate the first and second data assets in memory as part of the data model. In such embodiments, the system may be configured to electronically link the first data asset with the second data asset. In various embodiments, such association may indicate a relationship between the first and second data assets in the context of the overall data model (e.g., because the first data asset may serve as a collection asset for the second data asset, etc.).

Next, at Step 370, the system may be further configured to generate a visual representation of the data model. In particular embodiments, the visual representation of the data model comprises a data map. The visual representation may, for example, include the one or more data assets, one or more connections between the one or more data assets, the one or more inventory attributes, etc.

In particular embodiments, generating the visual representation (e.g., visual data map) of a particular data model (e.g., data inventory) may include, for example, generating a visual representation that includes: (1) a visual indication of a first data asset (e.g., a storage asset), a second data asset (e.g., a collection asset), and a third data asset (e.g., a transfer asset); (2) a visual indication of a flow of data (e.g., personal data) from the second data asset to the first data asset (e.g., from the collection asset to the storage asset); (3) a visual indication of a flow of data (e.g., personal data) from the first data asset to the third data asset (e.g., from the storage asset to the transfer asset); (4) one or more visual indications of a risk level associated with the transfer of personal data; and/or (5) any other suitable information related to the one or more data assets, the transfer of data between/among the one or more data assets, access to data stored or collected by the one or more data assets, etc.

In particular embodiments, the visual indication of a particular asset may comprise a box, symbol, shape, or other suitable visual indicator. In particular embodiments, the visual indication may comprise one or more labels (e.g., a name of each particular data asset, a type of the asset, etc.). In still other embodiments, the visual indication of a flow of data may comprise one or more arrows. In particular embodiments, the visual representation of the data model may comprise a data flow, flowchart, or other suitable visual representation.

In various embodiments, the system is configured to display (e.g., to a user) the generated visual representation of the data model on a suitable display device.

Exemplary Data Models and Visual Representations of Data Models (e.g., Data Maps)

FIGS. 4-10 depict exemplary data models according to various embodiments of the system described herein. FIG. 4, for example, depicts an exemplary data model that does not include a particular processing activity (e.g., that is not associated with a particular processing activity). As may be understood from the data model shown in this figure, a particular data asset (e.g., a primary data asset) may be associated with a particular company (e.g., organization), or organization within a particular company, sub-organization of a particular organization, etc. In still other embodiments, the particular asset may be associated with one or more collection assets (e.g., one or more data subjects from whom personal data is collected for storage by the particular asset), one or more parties that have access to data stored by the particular asset, one or more transfer assets (e.g., one or more assets to which data stored by the particular asset may be transferred), etc.

As may be understood from FIG. 4, a particular data model for a particular asset may include a plurality of data elements. When generating the data model for the particular asset, a system may be configured to substantially automatically identify one or more types of data elements for inclusion in the data model, and automatically generate a data model that includes those identified data elements (e.g., even if one or more of those data elements must remain unpopulated because the system may not initially have access to a value for the particular data element). In such cases, the system may be configured to store a placeholder for a particular data element until the system is able to populate the particular data element with accurate data.

As may be further understood from FIG. 4, the data model shown in FIG. 4 may represent a portion of an overall data model. For example, in the embodiment shown in this figure, the transfer asset depicted may serve as a storage asset for another portion of the data model. In such embodiments, the transfer asset may be associated with a respective one or more of the types of data elements described above. In this way, the system may generate a data model that may build upon itself to comprise a plurality of layers as the system adds one or more new data assets, attributes, etc.

As may be further understood from FIG. 4, a particular data model may indicate one or more parties that have access to and/or use of the primary asset (e.g., storage asset). In such embodiments, the system may be configured to enable the one or more parties to access one or more pieces of data (e.g., personal data) stored by the storage asset.

As shown in FIG. 4, the data model may further comprise one or more collection assets (e.g., one or more data assets or individuals from which the storage asset receives data such as personal data). In the exemplary data model (e.g., visual data map) shown in this figure, the collection assets comprise a data subject (e.g., an individual that may provide data to the system for storage in the storage asset) and a collection asset (e.g., which may transfer one or more pieces of data that the collection asset has collected to the storage asset).

FIG. 5 depicts a portion of an exemplary data model that is populated for the primary data asset Gusto. Gusto is a software application that, in the example shown in FIG. 5, may serve as a human resources service that contains financial, expense, review, time and attendance, background, and salary information for one or more employees of a particular organization (e.g., GeneriTech). In the example of FIG. 5, the primary asset (e.g., Gusto) may be utilized by the HR (e.g., Human Resources) department of the particular organization (e.g., GeneriTech). Furthermore, the primary asset, Gusto, may collect financial information from one or more data subjects (e.g., employees of the particular organization), receive expense information transferred from Expensify (e.g., expensing software), and receive time and attendance data transferred from Kronos (e.g., timekeeping software). In the example shown in FIG. 5, access to the information collected and/or stored by Gusto may include, for example: (1) an ability to view and administer salary and background information by HR employees, and (2) an ability to view and administer employee review information by one or more service managers. In the example shown in this figure, personal and other data collected and stored by Gusto (e.g., salary information, etc.) may be transferred to a company banking system, to QuickBooks, and/or to an HR file cabinet.

As may be understood from the example shown in FIG. 5, the system may be configured to generate a data model based around Gusto that illustrates a flow of personal data utilized by Gusto. The data model in this example illustrates, for example, a source of personal data collected, stored and/or processed by Gusto, a destination of such data, an indication of who has access to such data within Gusto, and an organization and department responsible for the information collected by Gusto. In particular embodiments, the data model and accompanying visual representation (e.g., data map) generated by the system as described in any embodiment herein may be utilized in the context of compliance with one or more record keeping requirements related to the collection, storage, and processing of personal data.

FIGS. 6 and 7 depict an exemplary data model and related example that is similar, in some respects, to the data model and example of FIGS. 4 and 5. In the example shown in FIGS. 6 and 7, the exemplary data model and related example include a specific business process and processing activity that is associated with the primary asset (Gusto). In this example, the business process is compensation and the specific processing activity is direct deposit generation in Gusto. As may be understood from this figure, the collection and transfer of data related to the storage asset of Gusto is based on a need to generate direct deposits through Gusto in order to compensate employees. Gusto generates the information needed to conduct a direct deposit (e.g., financial and salary information) and then transmits this information to: (1) a company bank system for execution of the direct deposit; (2) Quickbooks for use in documenting the direct deposit payment; and (3) HR File cabinet for use in documenting the salary info and other financial information.

As may be understood in light of this disclosure, when generating such a data model, particular pieces of data (e.g., data attributes, data elements) may not be readily available to the system. In such embodiment, the system is configured to identify a particular type of data, create a placeholder for such data in memory, and seek out (e.g., scan for and populate) an appropriate piece of data to further populate the data model. For example, in particular embodiments, the system may identify Gusto as a primary asset and recognize that Gusto stores expense information. The system may then be configured to identify a source of the expense information (e.g., Expensify).

Figure 8:
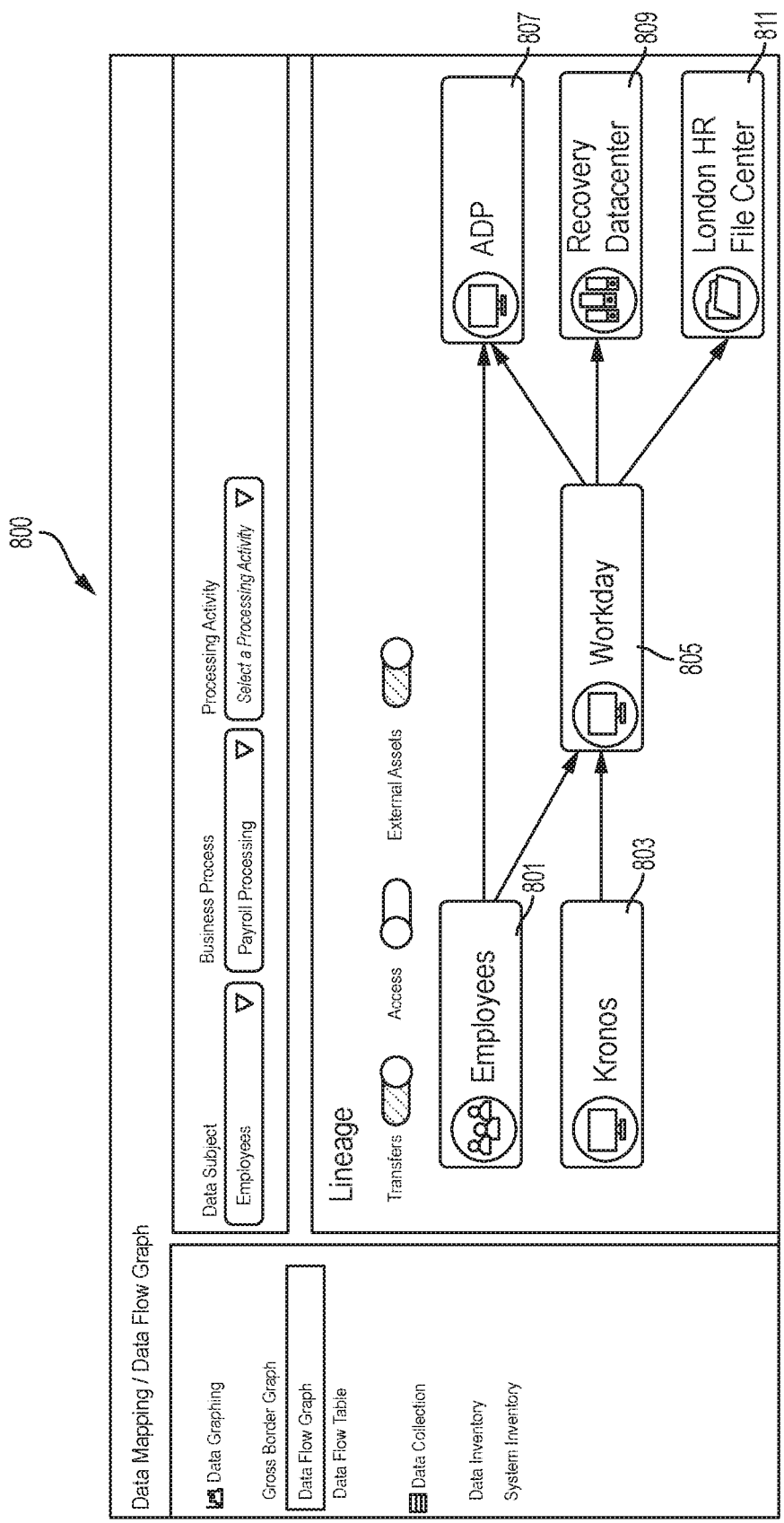

FIG. 8 depicts an exemplary screen display 800 that illustrates a visual representation (e.g., visual data map) of a data model (e.g., a data inventory). In the example shown in FIG. 8, the data map provides a visual indication of a flow of data collected from particular data subjects (e.g., employees 801). As may be understood from this figure, the data map illustrates that three separate data assets receive data (e.g., which may include personal data) directly from the employees 801. In this example, these three data assets include Kronos 803 (e.g., a human resources software application), Workday 805 (e.g., a human resources software application), and ADP 807 (e.g., a human resources software application and payment processor). As shown in FIG. 8, the transfer of data from the employees 801 to these assets is indicated by respective arrows.

As further illustrated in FIG. 8, the data map indicates a transfer of data from Workday 805 to ADP 807 as well as to a Recovery Datacenter 809 and a London HR File Center 811. As may be understood in light of this disclosure, the Recovery Datacenter 809 and London HR File Center 811 may comprise additional data assets in the context of the data model illustrated by the data map shown in FIG. 8. The Recover Datacenter 809 may include, for example, one or more computer servers (e.g., backup servers). The London HR File Center 811 may include, for example, one or more databases (e.g., such as the One or More Databases 140 shown in FIG. 1). As shown in FIG. 8, each particular data asset depicted in the data map may be shown along with a visual indication of the type of data asset. For example, Kronos 803, Workday 805, and ADP 807 are depicted adjacent a first icon type (e.g., a computer monitor), while Recover Datacenter 809 and London HR File Center 811 are depicted adjacent a second and third icon type respectively (e.g., a server cluster and a file folder). In this way, the system may be configured to visually indicate, via the data model, particular information related to the data model in a relatively minimal manner.

FIG. 9 depicts an exemplary screen display 900 that illustrates a data map of a plurality of assets 905 in tabular form (e.g., table form). As may be understood from this figure, a table that includes one or more inventory attributes of each particular asset 905 in the table may indicate, for example: (1) a managing organization 910 of each respective asset 905; (2) a hosting location 915 of each respective asset 905 (e.g., a physical storage location of each asset 905); (3) a type 920 of each respective asset 905, if known (e.g., a database, software application, server, etc.); (4) a processing activity 925 associated with each respective asset 905; and/or (5) a status 930 of each particular data asset 905. In various embodiments, the status 930 of each particular asset 905 may indicate a status of the asset 905 in the discovery process. This may include, for example: (1) a "new" status for a particular asset that has recently been discovered as an asset that processes, stores, or collects personal data on behalf of an organization (e.g., discovered via one or more suitable techniques described herein); (2) an "in discovery" status for a particular asset for which the system is populating or seeking to populate one or more inventory attributes, etc.

Figure 10:
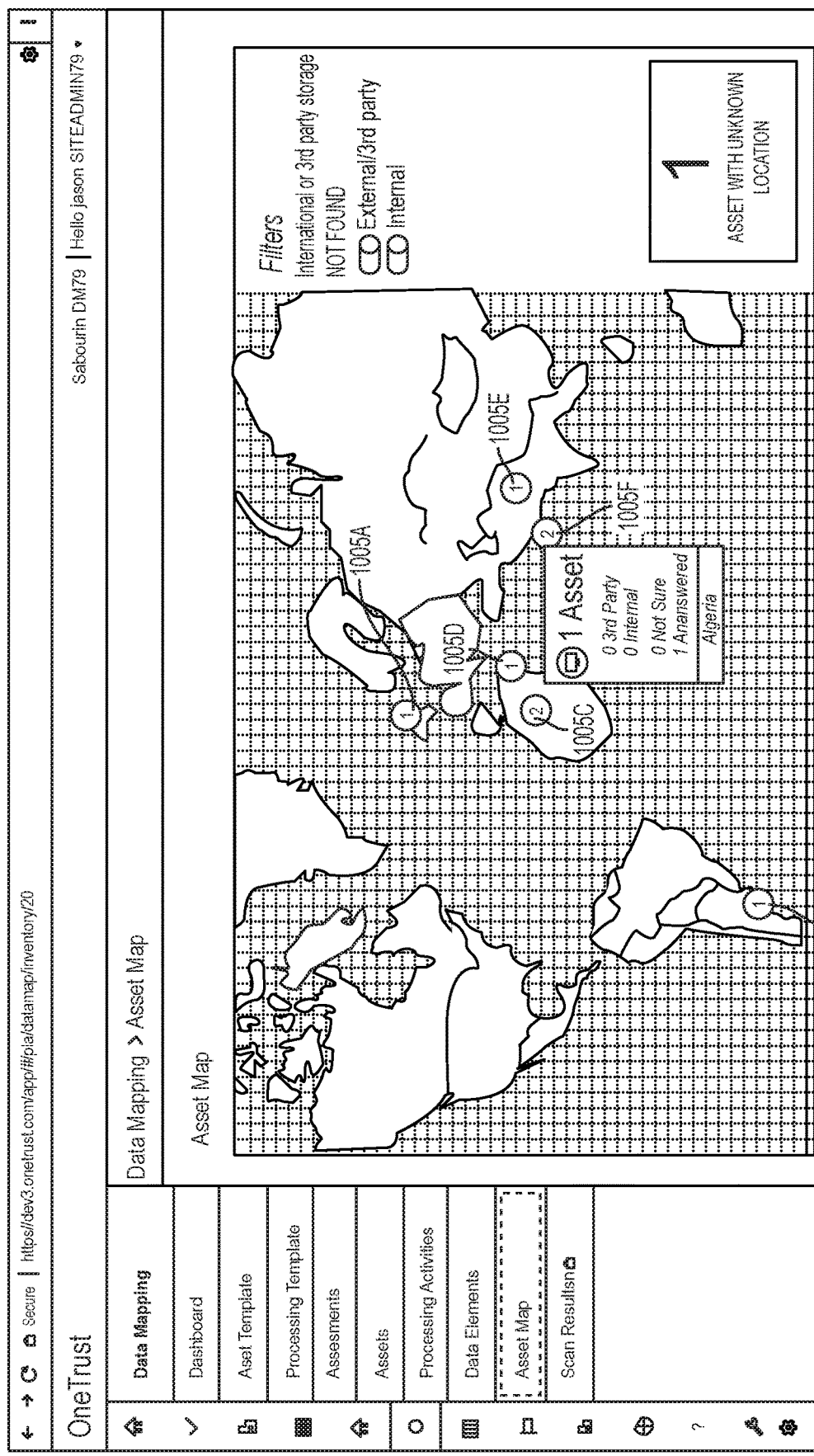

FIG. 10 depicts an exemplary data map 1000 that includes an asset map of a plurality of data assets 1005A-F, which may, for example, be utilized by a particular entity in the collection, storage, and/or processing of personal data. As may be understood in light of this disclosure, the plurality of data assets 1005A-F may have been discovered using any suitable technique described herein (e.g., one or more intelligent identity scanning techniques, one or more questionnaires, one or more application programming interfaces, etc.). In various embodiments, a data inventory for each of the plurality of data assets 1005A-F may define, for each of the plurality of data assets 1005A-F a respective inventory attribute related to a storage location of the data asset.

As may be understood from this figure, the system may be configured to generate a map that indicates a location of the plurality of data assets 1005A-F for a particular entity. In the embodiment shown in this figure, locations that contain a data asset are indicated by circular indicia that contain the number of assets present at that location. In the embodiment shown in this figure, the locations are broken down by country. In particular embodiments, the asset map may distinguish between internal assets (e.g., first party servers, etc.) and external/third party assets (e.g., third party owned servers or software applications that the entity utilizes for data storage, transfer, etc.).

In some embodiments, the system is configured to indicate, via the visual representation, whether one or more assets have an unknown location (e.g., because the data model described above may be incomplete with regard to the location). In such embodiments, the system may be configured to: (1) identify the asset with the unknown location; (2) use one or more data modeling techniques described herein to determine the location (e.g., such as pinging the asset, generating one or more questionnaires for completion by a suitable individual, etc.); and (3) update a data model associated with the asset to include the location.

Data Model Population Module

In particular embodiments, a Data Model Population Module 1100 is configured to: (1) determine one or more unpopulated inventory attributes in a data model; (2) determine one or more attribute values for the one or more unpopulated inventory attributes; and (3) modify the data model to include the one or more attribute values.

Figure 11:
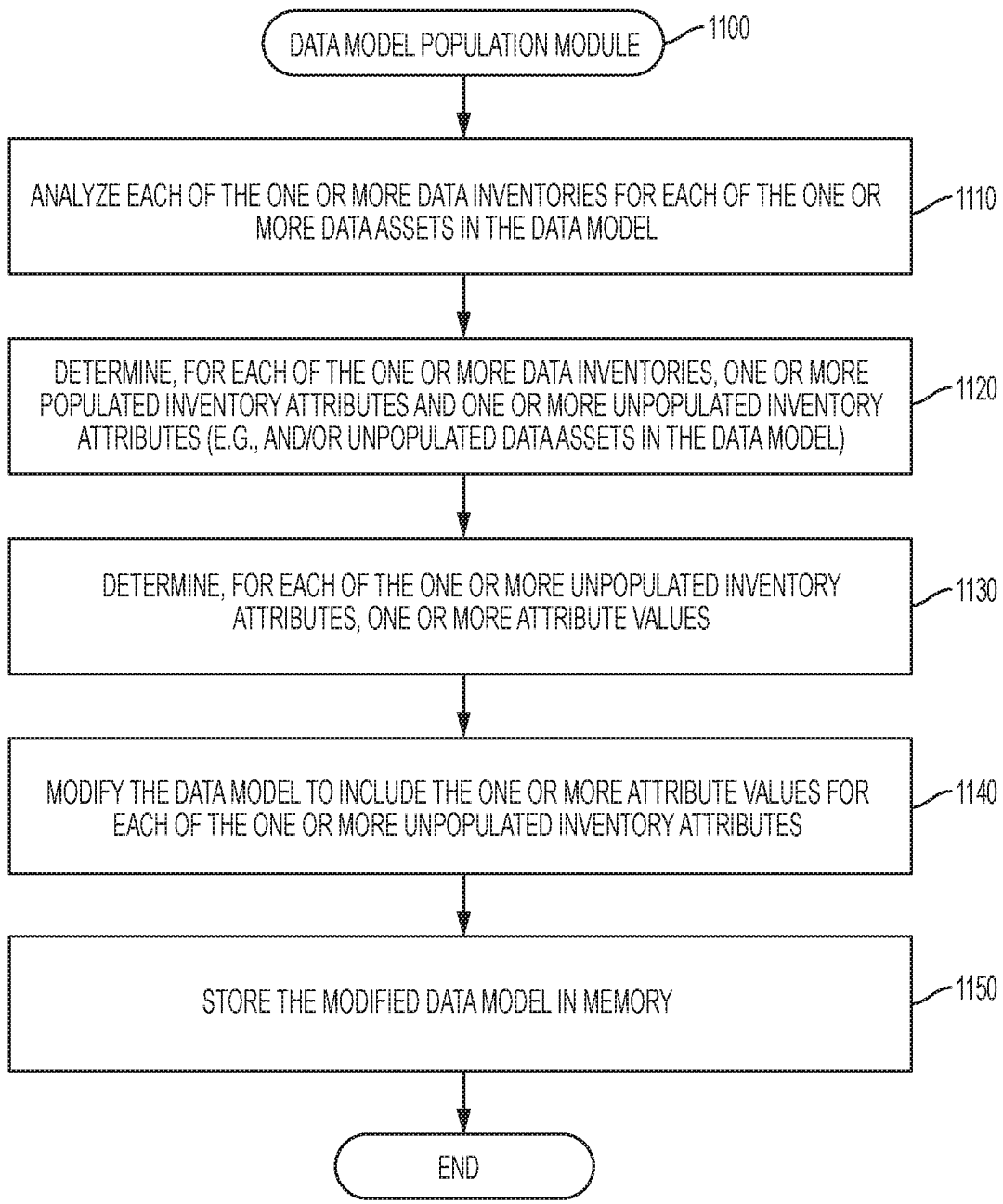
FIG. 11 is a flowchart showing an example of steps performed by a Data Model Population Module.

Turning to FIG. 11, in particular embodiments, when executing the Data Model Population Module 1100, the system begins, at Step 1110, by analyzing one or more data inventories for each of the one or more data assets in the data model. The system may, for example, identify one or more particular data elements (e.g., inventory attributes) that make up the one or more data inventories. The system may, in various embodiments, scan one or more data structures associated with the data model to identify the one or more data inventories. In various embodiments, the system is configured to build an inventory of existing (e.g., known) data assets and identify inventory attributes for each of the known data assets.

Continuing to Step 1120, the system is configured to determine, for each of the one or more data inventories, one or more populated inventory attributes and one or more unpopulated inventory attributes (e.g., and/or one or more unpopulated data assets within the data model). As a particular example related to an unpopulated data asset, when generating and populating a data model, the system may determine that, for a particular asset, there is a destination asset. In various embodiments, the destination asset may be known (e.g., and already stored by the system as part of the data model). In other embodiments, the destination asset may be unknown (e.g., a data element that comprises the destination asset may comprise a placeholder or other indication in memory for the system to populate the unpopulated inventory attribute (e.g., data element).

As another particular example, a particular storage asset may be associated with a plurality of inventory assets (e.g., stored in a data inventory associated with the storage asset). In this example, the plurality of inventory assets may include an unpopulated inventory attribute related to a type of personal data stored in the storage asset. The system may, for example, determine that the type of personal data is an unpopulated inventory asset for the particular storage asset.

Returning to Step 1130, the system is configured to determine, for each of the one or more unpopulated inventory attributes, one or more attribute values. In particular embodiments, the system may determine the one or more attribute values using any suitable technique (e.g., any suitable technique for populating the data model). In particular embodiments, the one or more techniques for populating the data model may include, for example: (1) obtaining data for the data model by using one or more questionnaires associated with a particular privacy campaign, processing activity, etc.; (2) using one or more intelligent identity scanning techniques discussed herein to identify personal data stored by the system and then map such data to a suitable data model; (3) using one or more application programming interfaces (API) to obtain data for the data model from another software application; and/or (4) using any other suitable technique. Exemplary techniques for determining the one or more attribute values are described more fully below. In other embodiments, the system may be configured to use such techniques or other suitable techniques to populate one or more unpopulated data assets within the data model.

Next, at Step 1140, the system modifies the data model to include the one or more attribute values for each of the one or more unpopulated inventory attributes. The system may, for example, store the one or more attributes values in computer memory, associate the one or more attribute values with the one or more unpopulated inventory attributes, etc. In still other embodiments, the system may modify the data model to include the one or more data assets identified as filling one or more vacancies left within the data model by the unpopulated one or more data assets.

Continuing to Step 1150, the system is configured to store the modified data model in memory. In various embodiments, the system is configured to store the modified data model in the One or More Databases 140, or in any other suitable location. In particular embodiments, the system is configured to store the data model for later use by the system in the processing of one or more data subject access requests. In other embodiments, the system is configured to store the data model for use in one or more privacy impact assessments performed by the system.

Data Model Population Questionnaire Generation Module

In particular embodiments, a Data Population Questionnaire Generation Module 1200 is configured to generate a questionnaire (e.g., one or more questionnaires) comprising one or more questions associated with one or more particular unpopulated data attributes, and populate the unpopulated data attributes based at least in part on one or more responses to the questionnaire. In other embodiments, the system may be configured to populate the unpopulated data attributes based on one or more responses to existing questionnaires.

In various embodiments, the one or more questionnaires may comprise one or more processing activity questionnaires (e.g., privacy impact assessments, data privacy impact assessments, etc.) configured to elicit one or more pieces of data related to one or more undertakings by an organization related to the collection, storage, and/or processing of personal data (e.g., processing activities). In particular embodiments, the system is configured to generate the questionnaire (e.g., a questionnaire template) based at least in part on one or more processing activity attributes, data asset attributes (e.g., inventory attributes), or other suitable attributes discussed herein.

Figure 12:
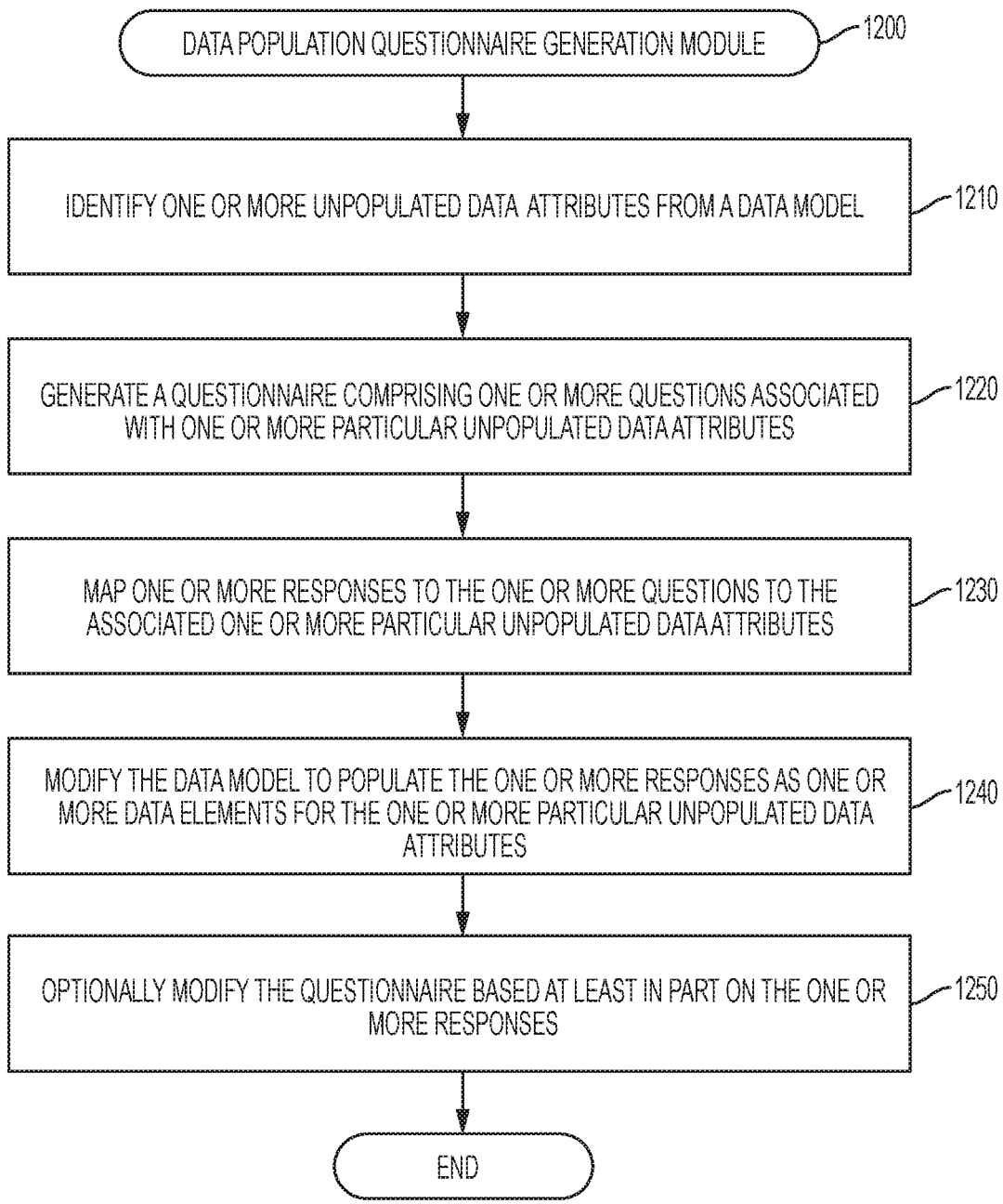
FIG. 12 is a flowchart showing an example of steps performed by a Data Population Questionnaire Generation Module.

Turning to FIG. 12, in particular embodiments, when executing the Data Population Questionnaire Generation Module 1200, the system begins, at Step 1210, by identifying one or more unpopulated data attributes from a data model. The system may, for example, identify the one or more unpopulated data attributes using any suitable technique described above. In particular embodiments, the one or more unpopulated data attributes may relate to, for example, one or more processing activity or asset attributes such as: (1) one or more processing activities associated with a particular data asset; (2) transfer data associated with the particular data asset (e.g., how and where the data stored and/or collected by the particular data asset is being transferred to and/or from); (3) personal data associated with the particular data assets asset (e.g., what type of personal data is collected and/or stored by the particular data asset; how, and from where, the data is collected, etc.); (4) storage data associated with the personal data (e.g., whether the data is being stored, protected and deleted); and (5) any other suitable attribute related to the collection, use, and transfer of personal data by one or more data assets or via one or more processing activities. In other embodiments, the one or more unpopulated inventory attributes may comprise one or more other pieces of information such as, for example: (1) the type of data being stored by the particular data asset; (2) an amount of data stored by the particular data asset; (3) whether the data is encrypted by the particular data asset; (4) a location of the stored data (e.g., a physical location of one or more computer servers on which the data is stored by the particular data asset); etc.

Continuing to Step 1220, the system generates a questionnaire (e.g., a questionnaire template) comprising one or more questions associated with one or more particular unpopulated data attributes. As may be understood in light of the above, the one or more particulate unpopulated data attributes may relate to, for example, a particular processing activity or a particular data asset (e.g., a particular data asset utilized as part of a particular processing activity). In various embodiments, the one or more questionnaires comprise one or more questions associated with the unpopulated data attribute. For example, if the data model includes an unpopulated data attribute related to a location of a server on which a particular asset stores personal data, the system may generate a questionnaire associated with a processing activity that utilizes the asset (e.g., or a questionnaire associated with the asset). The system may generate the questionnaire to include one or more questions regarding the location of the server.

Returning to Step 1230, the system maps one or more responses to the one or more questions to the associated one or more particular unpopulated data attributes. The system may, for example, when generating the questionnaire, associate a particular question with a particular unpopulated data attribute in computer memory. In various embodiments, the questionnaire may comprise a plurality of question/answer pairings, where the answer in the question/answer pairings maps to a particular inventory attribute for a particular data asset or processing activity.

In this way, the system may, at least partially in response to receiving a response to the particular question, substantially automatically populate the particular unpopulated data attribute. Accordingly, at Step 1240, the system modifies the data model to populate the one or more responses as one or more data elements for the one or more particular unpopulated data attributes. In particular embodiments, the system is configured to modify the data model such that the one or more responses are stored in association with the particular data element (e.g., unpopulated data attribute) to which the system mapped it at Step 1230. In various embodiments, the system is configured to store the modified data model in the One or More Databases 140, or in any other suitable location. In particular embodiments, the system is configured to store the data model for later use by the system in the processing of one or more data subject access requests. In other embodiments, the system is configured to store the data model for use in one or more privacy impact assessments performed by the system.

Continuing to optional Step 1250, the system may be configured to modify the questionnaire based at least in part on the one or more responses. The system may, for example, substantially dynamically add and/or remove one or more questions to/from the questionnaire based at least in part on the one or more responses (e.g., one or more response received by a user completing the questionnaire). For example, the system may, in response to the user providing a particular inventory attribute or new asset, generates additional questions that relate to that particular inventory attribute or asset. The system may, as the system adds additional questions, substantially automatically map one or more responses to one or more other inventory attributes or assets. For example, in response to the user indicating that personal data for a particular asset is stored in a particular location, the system may substantially automatically generate one or more additional questions related to, for example, an encryption level of the storage, who has access to the storage location, etc.

In still other embodiments, the system may modify the data model to include one or more additional assets, data attributes, inventory attributes, etc. in response to one or more questionnaire responses. For example, the system may modify a data inventory for a particular asset to include a storage encryption data element (which specifies whether the particular asset stores particular data in an encrypted format) in response to receiving such data from a questionnaire. Modification of a questionnaire is discussed more fully below with respect to FIG. 13.

Data Model Population via Questionnaire Process Flow

Figure 13:
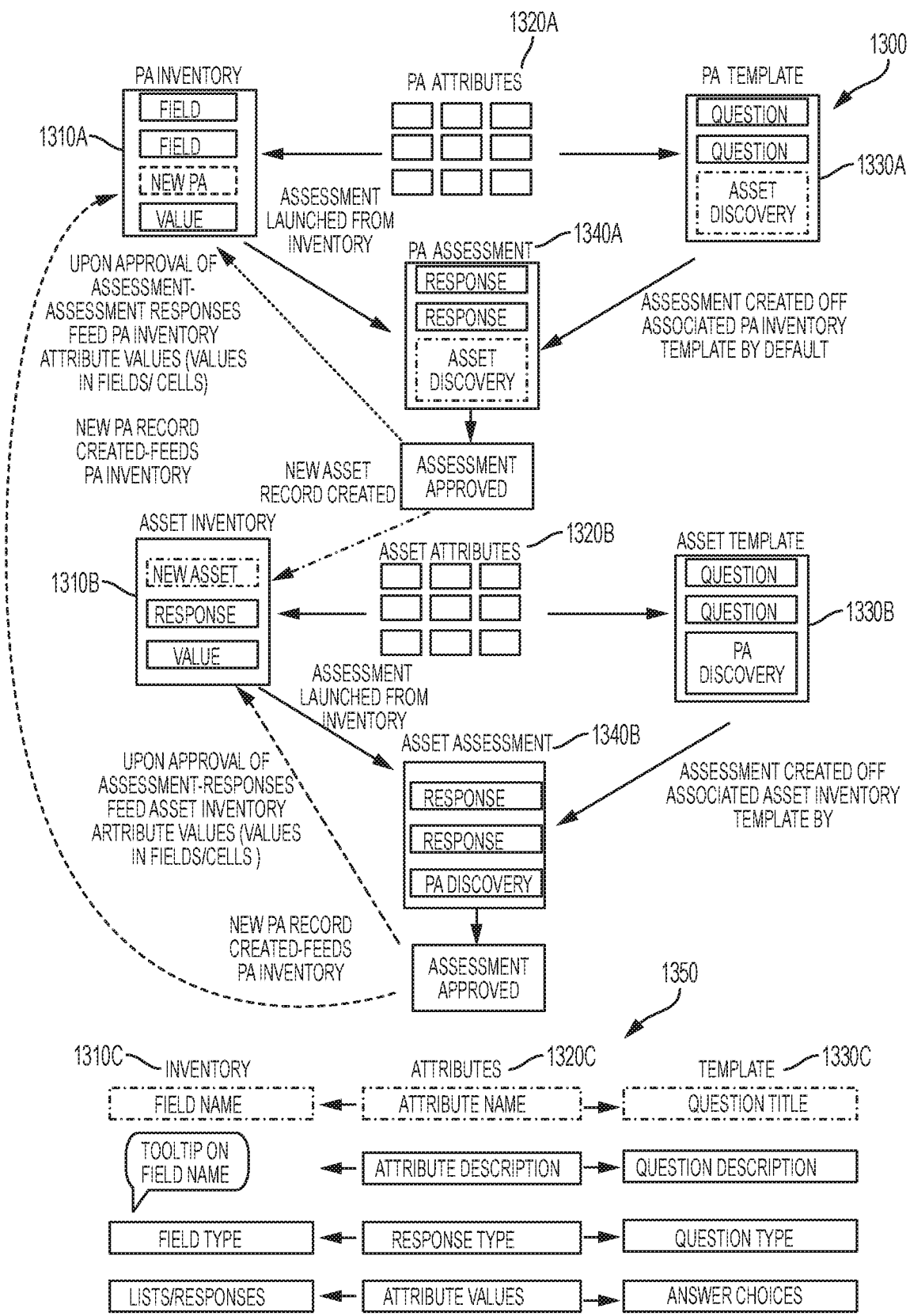
FIG. 13 is a process flow for populating a data inventory according to a particular embodiment using one or more data mapping techniques.

FIG. 13 depicts an exemplary process flow 1300 for populating a data model (e.g., modifying a data model to include a newly discovered data asset, populating one or more inventory attributes for a particular processing activity or data asset, etc.). In particular, FIG. 13 depicts one or more exemplary data relationships between one or more particular data attributes (e.g., processing activity attributes and/or asset attributes), a questionnaire template (e.g., a processing activity template and/or a data asset template), a completed questionnaire (e.g., a processing activity assessment and/or a data asset assessment), and a data inventory (e.g., a processing activity inventory and/or an asset inventory). As may be understood from this figure the system is configured to: (1) identify new data assets; (2) generate an asset inventory for identified new data assets; and (3) populate the generated asset inventories. Systems and methods for populating the generated inventories are described more fully below.

As may be understood from FIG. 13, a system may be configured to map particular processing activity attributes 1320A to each of: (1) a processing activity template 1330A; and (2) a processing activity data inventory 1310A. As may be understood in light of this disclosure, the processing activity template 1330A may comprise a plurality of questions (e.g., as part of a questionnaire), which may, for example, be configured to elicit discovery of one or more new data assets. The plurality of questions may each correspond to one or more fields in the processing activity inventory 1310A, which may, for example, define one or more inventory attributes of the processing activity.

In particular embodiments, the system is configured to provide a processing activity assessment 1340A to one or more individuals for completion. As may be understood from FIG. 13, the system is configured to launch the processing activity assessment 1340A from the processing activity inventory 1310A and further configured to create the processing activity assessment 1340A from the processing activity template 1330. The processing activity assessment 1340A may comprise, for example, one or more questions related to the processing activity. The system may, in various embodiments, be configured to map one or more responses provided in the processing activity assessment 1340A to one or more corresponding fields in the processing activity inventory 1310A. The system may then be configured to modify the processing activity inventory 1310A to include the one or more responses, and store the modified inventory in computer memory. In various embodiments, the system may be configured to approve a processing activity assessment 1340A (e.g., receive approval of the assessment) prior to feeding the processing activity inventory attribute values into one or more fields and/or cells of the inventory.

As may be further understood from FIG. 13, in response to creating a new asset record (e.g., which the system may create, for example, in response to a new asset discovery via the processing activity assessment 1340A described immediately above, or in any other suitable manner), the system may generate an asset inventory 1310B (e.g., a data asset inventory) that defines a plurality of inventory attributes for the new asset (e.g., new data asset).

As may be understood from FIG. 13, a system may be configured to map particular asset attributes 1320B to each of: (1) an asset template 1330BA; and (2) an asset inventory 1310A. As may be understood in light of this disclosure, the asset template 1330B may comprise a plurality of questions (e.g., as part of a questionnaire), which may, for example, be configured to elicit discovery of one or more processing activities associated with the asset and/or one or more inventory attributes of the asset. The plurality of questions may each correspond to one or more fields in the asset inventory 1310B, which may, for example, define one or more inventory attributes of the asset.

In particular embodiments, the system is configured to provide an asset assessment 1340B to one or more individuals for completion. As may be understood from FIG. 13, the system is configured to launch the asset assessment 1340B from the asset inventory 1310B and further configured to create the asset assessment 1340B from the asset template 1330B. The asset assessment 1340B may comprise, for example, one or more questions related to the data asset. The system may, in various embodiments, be configured to map one or more responses provided in the asset assessment 1340B to one or more corresponding fields in the asset inventory 1310B. The system may then be configured to modify the asset inventory 1310B (e.g., and/or a related processing activity inventory 1310A) to include the one or more responses, and store the modified inventory in computer memory. In various embodiments, the system may be configured to approve an asset assessment 1340B (e.g., receive approval of the assessment) prior to feeding the asset inventory attribute values into one or more fields and/or cells of the inventory.

FIG. 13 further includes a detail view 1350 of a relationship between particular data attributes 1320C with an exemplary data inventory 1310C and a questionnaire template 1330C. As may be understood from this detail view 1350, a particular attribute name may map to a particular question title in a template 1330C as well as to a field name in an exemplary data inventory 1310C. In this way, the system may be configured to populate (e.g., automatically populate) a field name for a particular inventory 1310C in response to a user providing a question title as part of a questionnaire template 1330C. Similarly, a particular attribute description may map to a particular question description in a template 1330C as well as to a tooltip on a fieldname in an exemplary data inventory 1310C. In this way, the system may be configured to provide the tooltip for a particular inventory 1310C that includes the question description provided by a user as part of a questionnaire template 1330C.

As may be further understood from the detail view 1350 of FIG. 13, a particular response type may map to a particular question type in a template 1330C as well as to a field type in an exemplary data inventory 1310C. A particular question type may include, for example, a multiple choice question (e.g., A, B, C, etc.), a freeform response, an integer value, a drop down selection, etc. A particular field type may include, for example, a memo field type, a numeric field type, an integer field type, a logical field type, or any other suitable field type. A particular data attribute may require a response type of, for example: (1) a name of an organization responsible for a data asset (e.g., a free form response); (2) a number of days that data is stored by the data asset (e.g., an integer value); and/or (3) any other suitable response type.

In still other embodiments, the system may be configured to map a one or more attribute values to one or more answer choices in a template 1330C as well as to one or more lists and/or responses in a data inventory 1310C. The system may then be configured to populate a field in the data inventory 1310C with the one or more answer choices provided in a response to a question template 1330C with one or more attribute values.

Exemplary Questionnaire Generation and Completion User Experience

Figure 14:
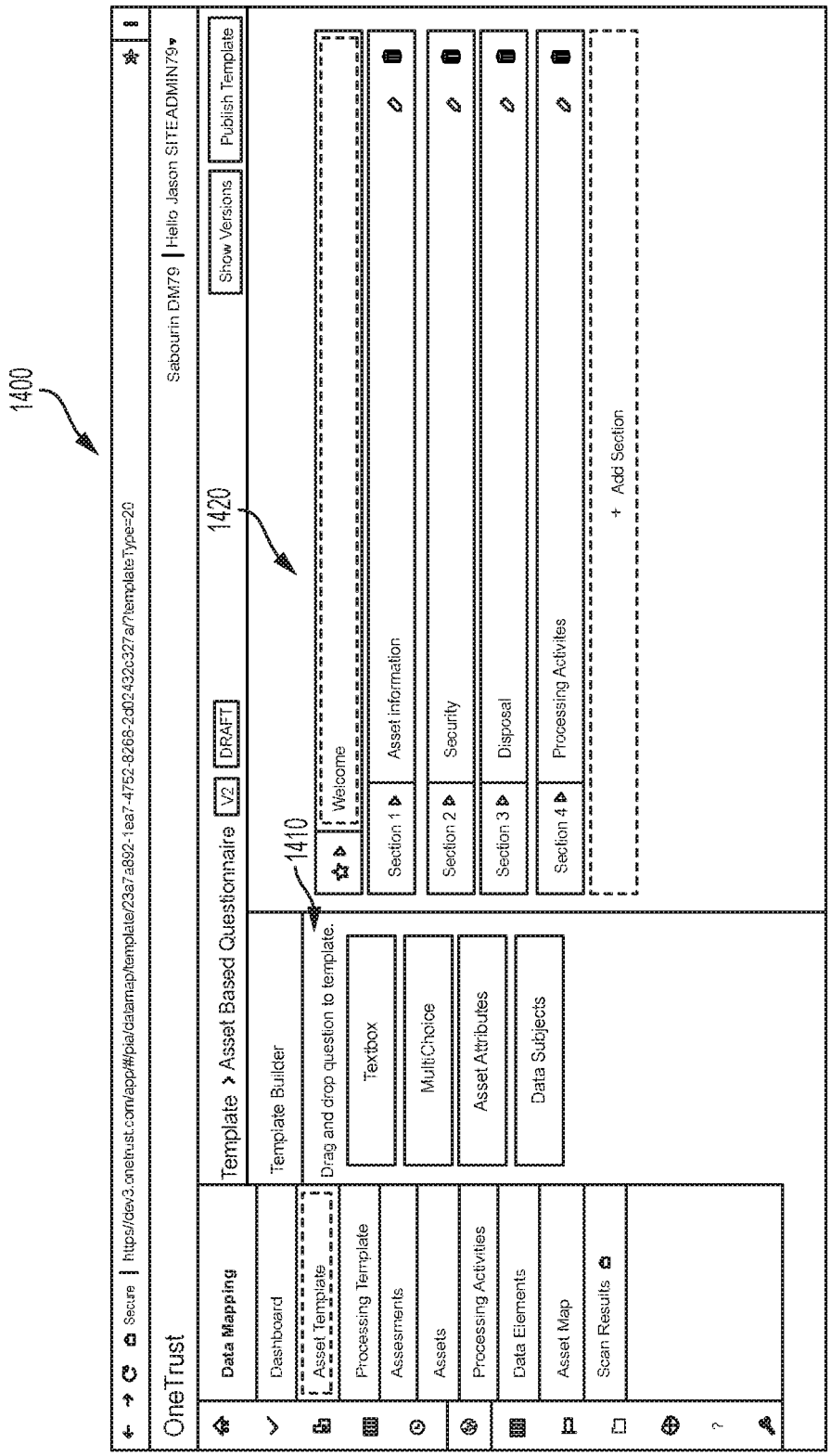

FIGS. 14-25 depict exemplary screen displays that a user may encounter when generating a questionnaire (e.g., one or more questionnaires and/or templates) for populating one or more data elements (e.g., inventory attributes) of a data model for a data asset and/or processing activity. FIG. 14, for example, depicts an exemplary asset based questionnaire template builder 1400. As may be understood from FIG. 14, the template builder may enable a user to generate an asset based questionnaire template that includes one or more sections 1420 related to the asset (e.g., asset information, security, disposal, processing activities, etc.). As may be understood in light of this disclosure, the system may be configured to substantially automatically generate an asset based questionnaire template based at least in part on the one or more unpopulated inventory attributes discussed above. The system may, for example, be configured to generate a template that is configured to populate the one or more unpopulated attributes (e.g., by eliciting responses, via a questionnaire to one or more questions that are mapped to the attributes within the data inventory).

In various embodiments, the system is configured to enable a user to modify a default template (e.g., or a system-created template) by, for example, adding additional sections, adding one or more additional questions to a particular section, etc. In various embodiments, the system may provide one or more tools for modifying the template. For example, in the embodiment shown in FIG. 14, the system may provide a user with a draft and drop question template 1410, from which the user may select a question type (e.g., textbox, multiple choice, etc.).

A template for an asset may include, for example: (1) one or more questions requesting general information about the asset; (2) one or more security-related questions about the asset; (3) one or more questions regarding how the data asset disposes of data that it uses; and/or (4) one or more questions regarding processing activities that involve the data asset. In various embodiments, each of these one or more sections may comprise one or more specific questions that may map to particular portions of a data model (e.g., a data map).

Figure 15:
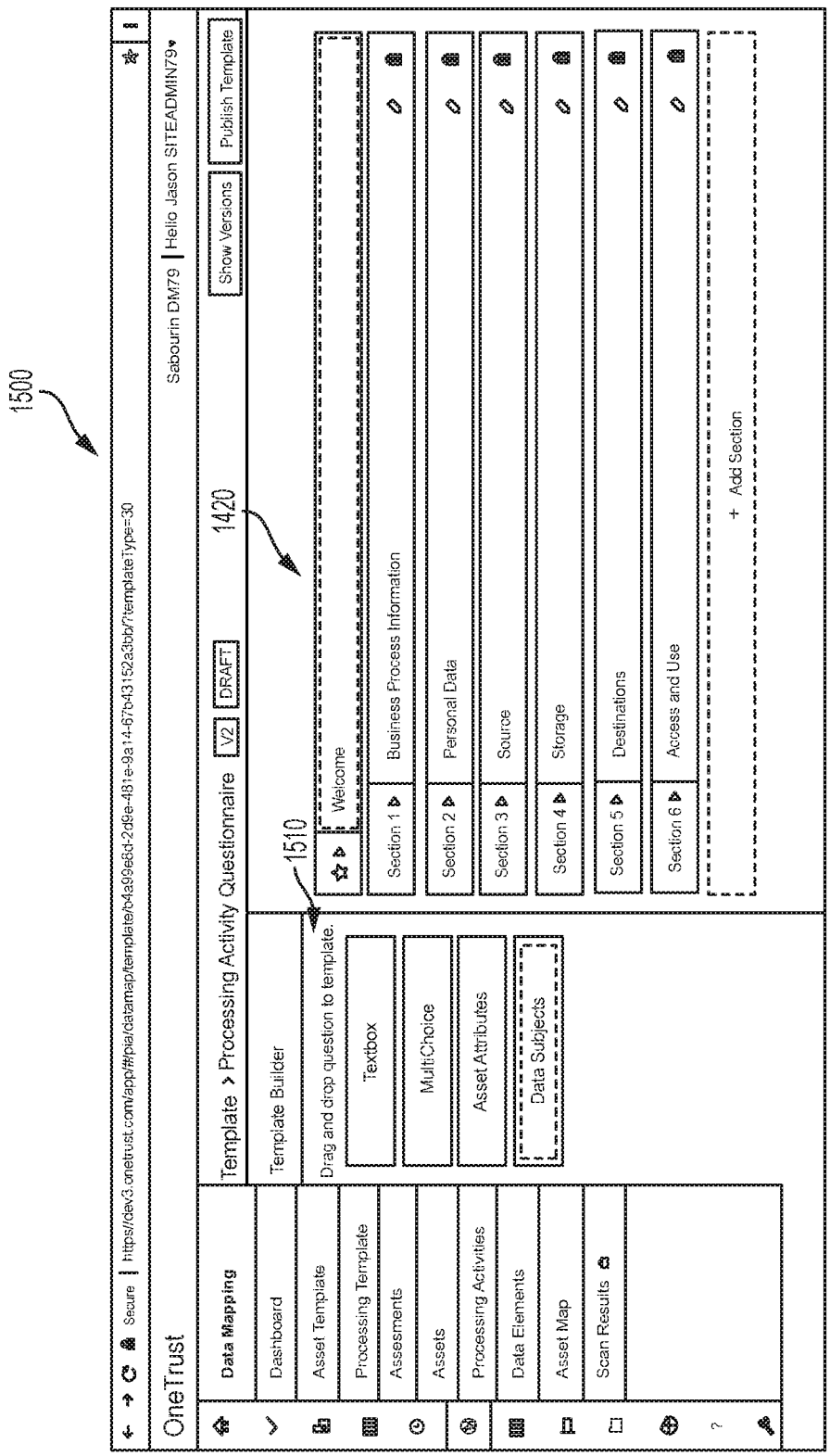

FIG. 15 depicts an exemplary screen display of a processing activity questionnaire template builder 1500. The screen display shown in FIG. 15 is similar to the template builder shown in FIG. 14 with respect to the data asset based template builder. As may be understood from FIG. 15, the template builder may enable a user to generate a processing activity based questionnaire template that includes one or more sections 1520 related to the processing activity (e.g., business process information, personal data, source, storage, destinations, access and use, etc.). As may be understood in light of this disclosure, the system may be configured to substantially automatically generate a processing activity based questionnaire template based at least in part on the one or more unpopulated inventory attributes related to the processing activity (e.g., as discussed above). The system may, for example, be configured to generate a template that is configured to populate the one or more unpopulated attributes (e.g., by eliciting responses, via a questionnaire to one or more questions that are mapped to the attributes within the data inventory).

In various embodiments, the system is configured to enable a user to modify a default template (e.g., or a system-created template) by, for example, adding additional sections, adding one or more additional questions to a particular section, etc. In various embodiments, the system may provide one or more tools for modifying the template. For example, in the embodiment shown in FIG. 15, the system may provide a user with a draft and drop question template 1510, from which the user may select a question type (e.g., textbox, multiple choice, asset attributes, data subjects, etc.). The system may be further configured to enable a user to publish a completed template (e.g., for use in a particular assessment). In other embodiments, the system may be configured to substantially automatically publish the template.

In various embodiments, a template for a processing activity may include, for example: (1) one or more questions related to the type of business process that involves a particular data asset; (2) one or more questions regarding what type of personal data is acquired from data subjects for use by a particular data asset; (3) one or more questions related to a source of the acquired personal data; (4) one or more questions related to how and/or where the personal data will be stored and/or for how long; (5) one or more questions related to one or more other data assets that the personal data will be transferred to; and/or (6) one or more questions related to who will have the ability to access and/or use the personal data.

Figure 16:
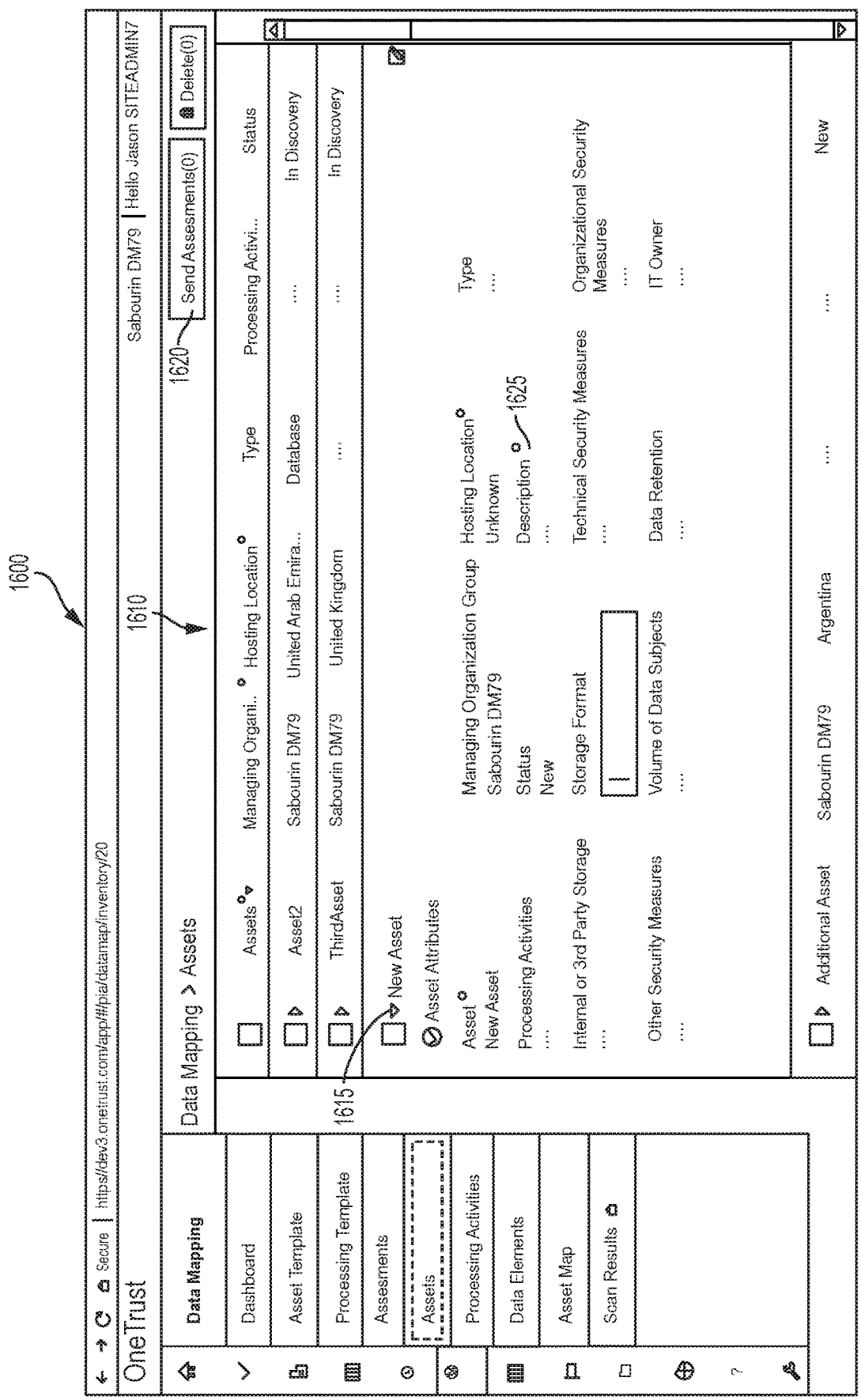

Continuing to FIG. 16, an exemplary screen display 1600 depicts a listing of assets 1610 for a particular entity. These may, for example, have been identified as part of the data model generation system described above. As may be understood from this figure, a user may select a drop down indicator 1615 to view more information about a particular asset. In the exemplary embodiment shown in FIG. 16, the system stores the managing organization group for the "New Asset", but is missing some additional information (e.g., such as a description 1625 of the asset). In order to fill out the missing inventory attributes for the "New Asset", the system, in particular embodiments, is configured to enable a user to select a Send Assessment indicia 1620 in order to transmit an assessment related to the selected asset to an individual tasked with providing one or more pieces of information related to the asset (e.g., a manager, or other individual with knowledge of the one or more inventory attributes).

In response to the user selecting the Send Assessment indicia 1620, the system may create the assessment based at least in part on a template associated with the asset, and transmit the assessment to a suitable individual for completion (e.g., and/or transmit a request to the individual to complete the assessment).

Figure 17:
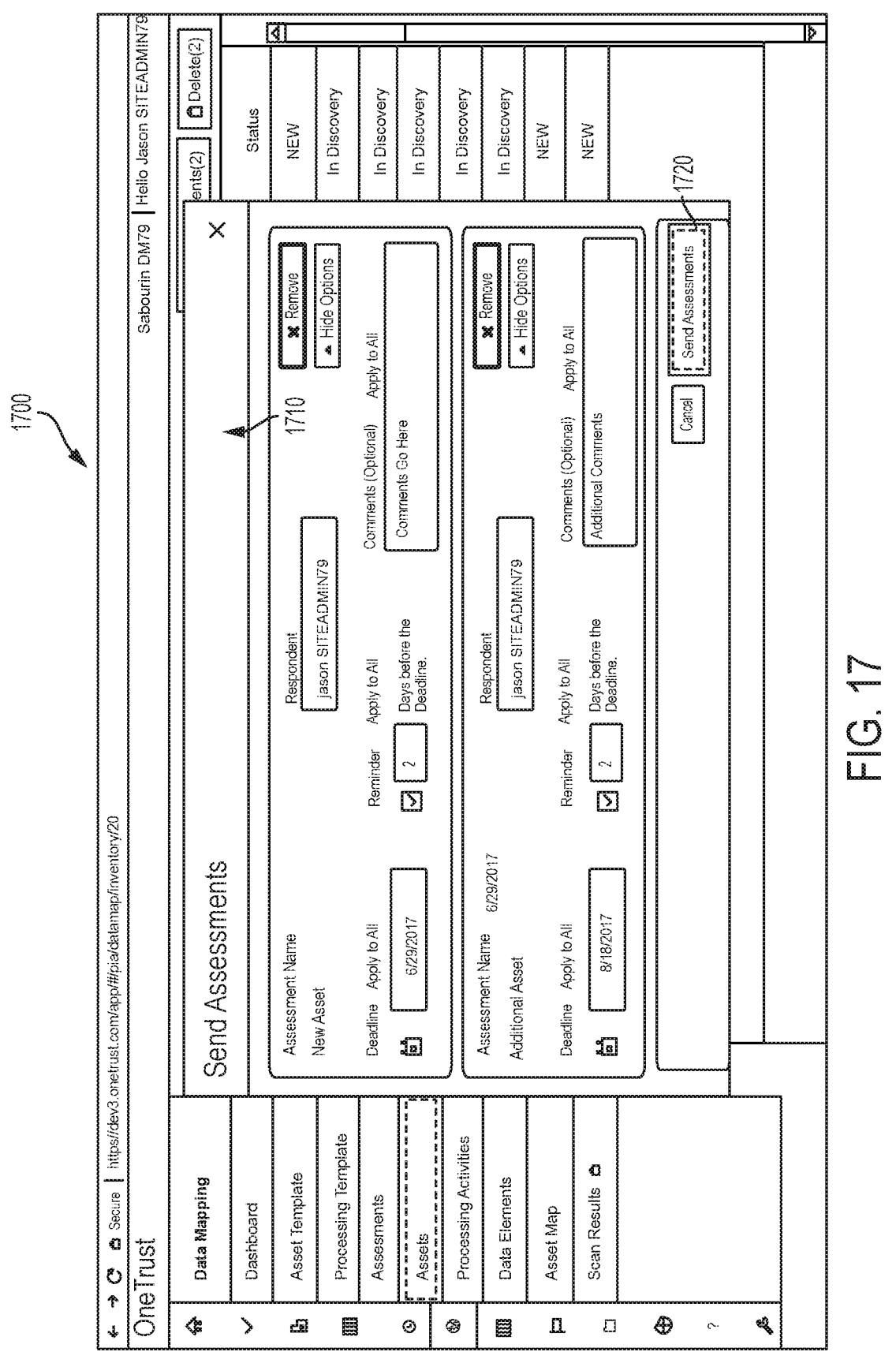

FIG. 17 depicts an exemplary assessment transmission interface 1700 via which a user can transmit one or more assessments for completion. As shown in this figure, the user may assign a respondent, provide a deadline, indicate a reminder time, and provide one or more comments using an assessment request interface 1710. The user may then select a Send Assessment(s) indicia 1720 in order to transmit the assessment.

Figure 18:
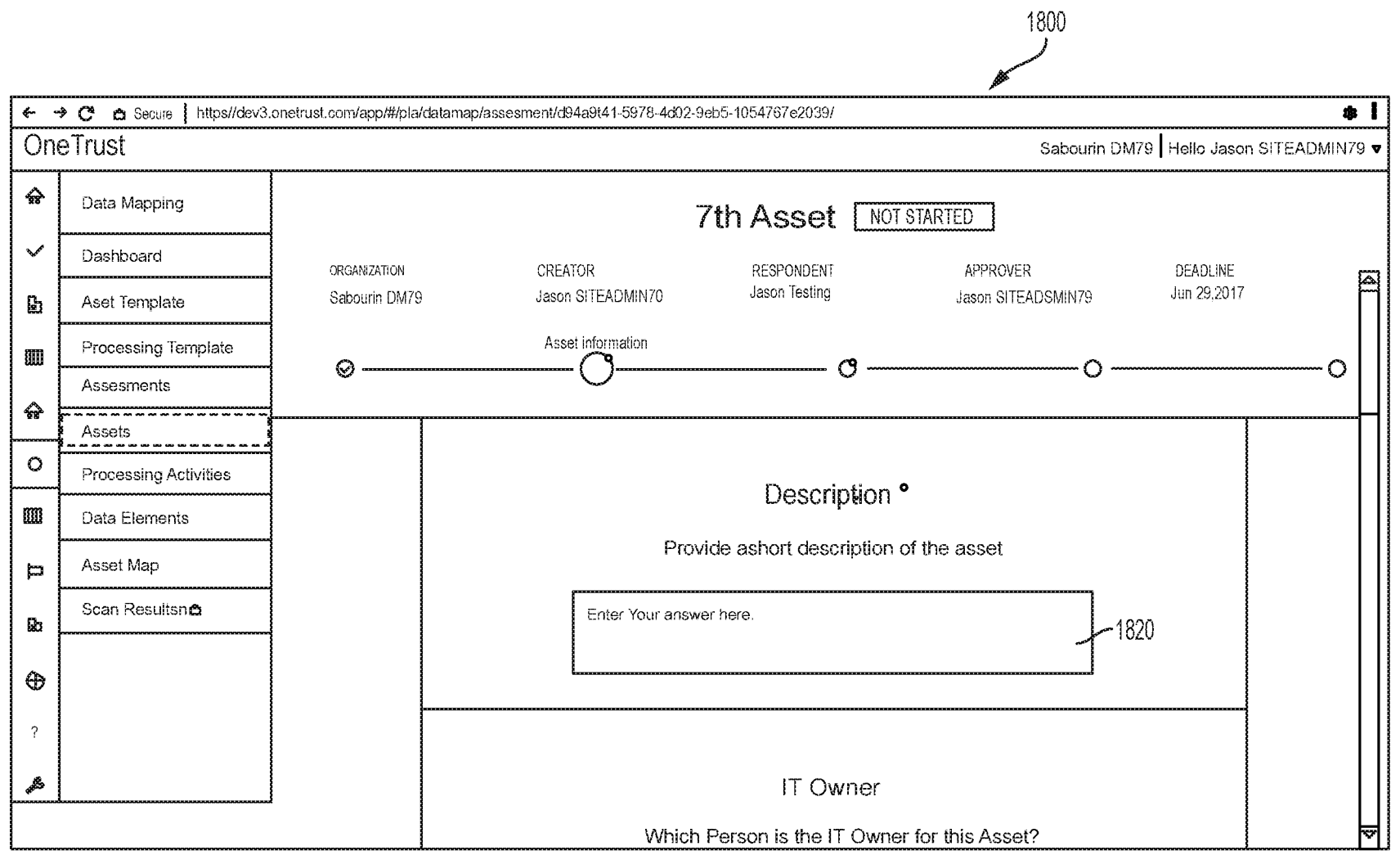
Figure 19:
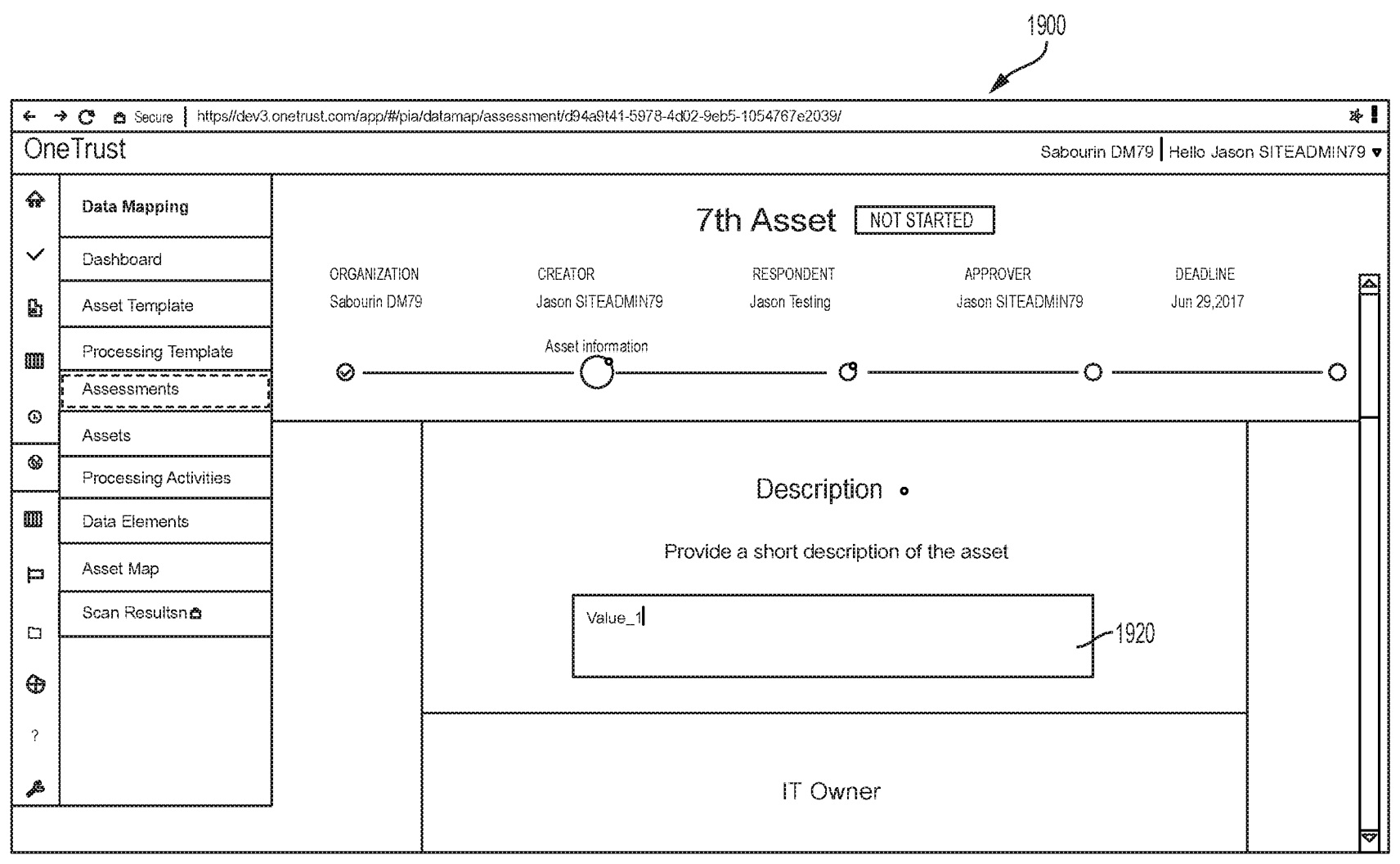

FIG. 18 depicts an exemplary assessment 1800 which a user may encounter in response to receiving a request to complete the assessment as described above with respect to FIGS. 16 and 17. As shown in FIG. 18, the assessment 1800 may include one or more questions that map to the one or more unpopulated attributes for the asset shown in FIG. 16. For example, the one or more questions may include a question related to a description of the asset, which may include a free form text box 1820 for providing a description of the asset. FIG. 19 depicts an exemplary screen display 1900 with the text box 1920 completed, where the description includes a value of "Value_1". As shown in FIGS. 18 and 19, the user may have renamed "New Asset" (e.g., which may have included a default or placeholder name) shown in FIGS. 16 and 17 to "7th Asset."

Figure 20:

Continuing to FIG. 20, the exemplary screen display 2000 depicts the listing of assets 2010 from FIG. 16 with some additional attributes populated. For example, the Description 2025 (e.g., "Value_1") provided in FIG. 19 has been added to the inventory. As may be understood in light of this disclosure, in response to a user providing the description via the assessment shown in FIGS. 18 and 19, the system may be configured to map the provided description to the attribute value associated with the description of the asset in the data inventory. The system may have then modified the data inventory for the asset to include the description attribute. In various embodiments, the system is configured to store the modified data inventory as part of a data model (e.g., in computer memory).

Figure 21:
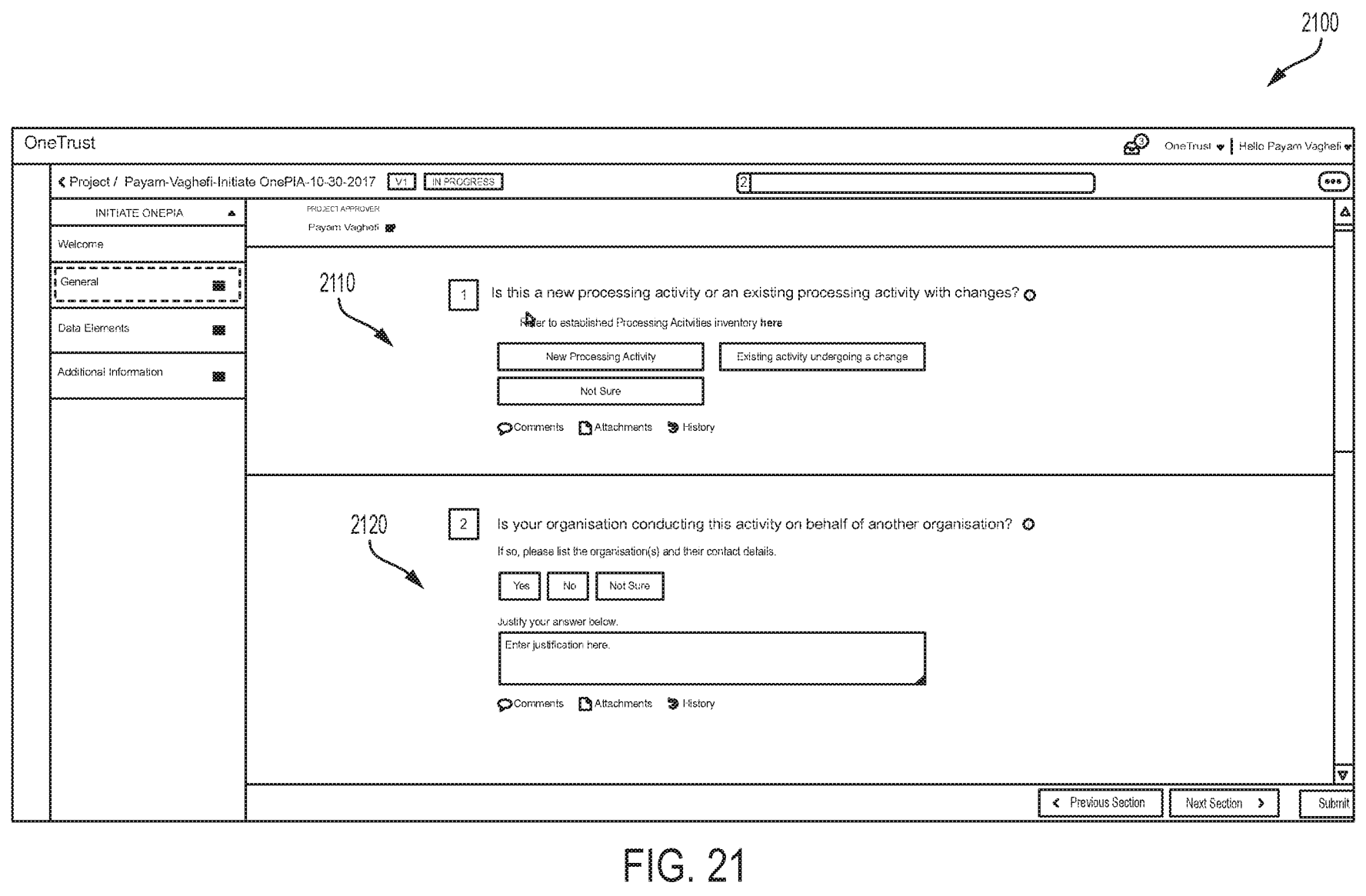

FIGS. 21-24 depict exemplary screen displays showing exemplary questions that make up part of a processing activity questionnaire (e.g., assessment). FIG. 21 depicts an exemplary interface 2100 for responding to a first question 2110 and a second question 2120. As shown in FIG. 21, the first question 2110 relates to whether the processing activity is a new or existing processing activity. The first question 2110 shown in FIG. 21 is a multiple choice question. The second question 2120 relates to whether the organization is conducting the activity on behalf of another organization. As shown in this figure, the second question 2120 includes both a multiple choice portion and a free-form response portion.

Figure 22:
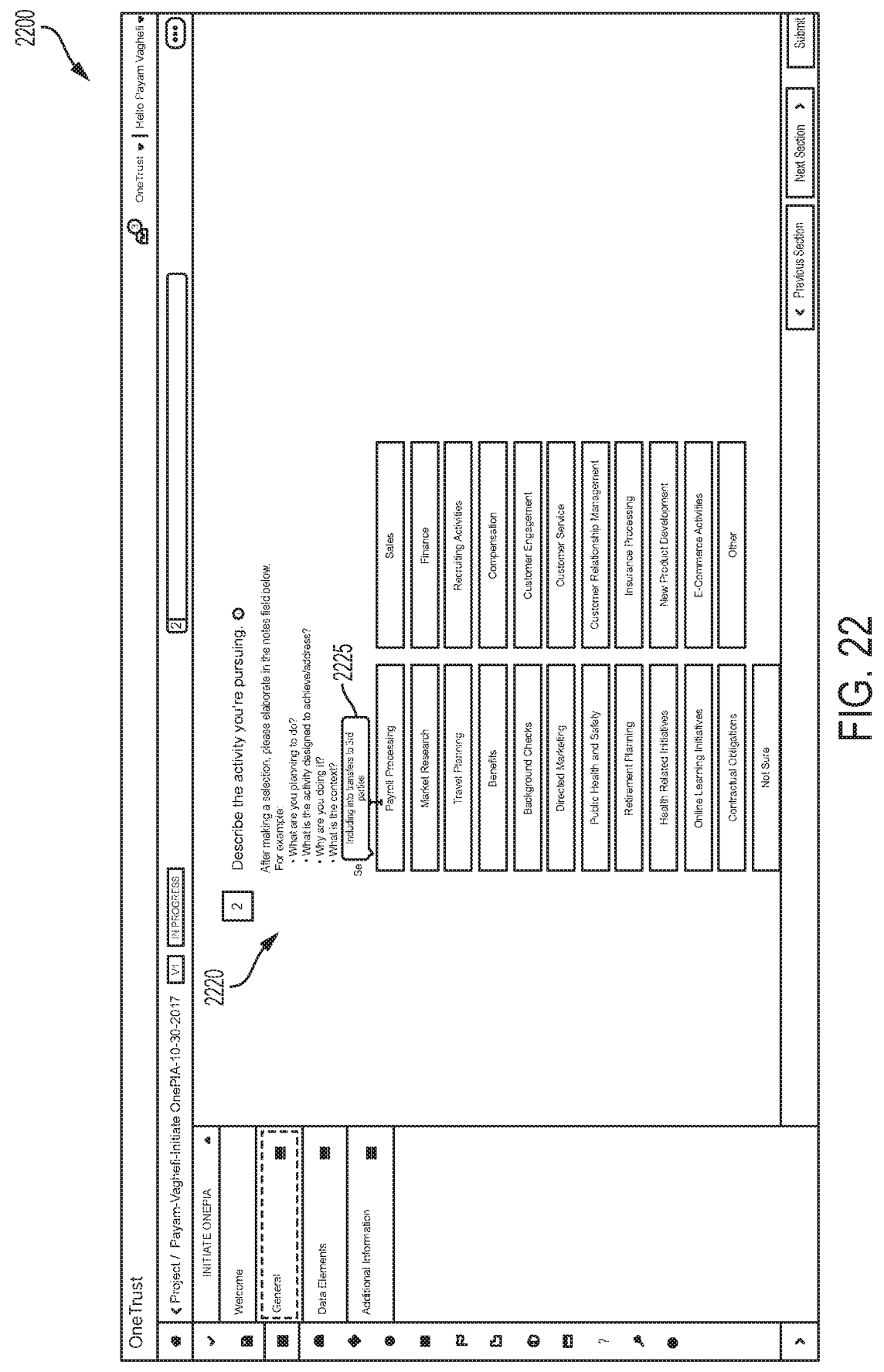

As discussed above, in various embodiments, the system may be configured to modify a questionnaire in response to (e.g., based on) one or more responses provided by a user completing the questionnaire. In particular embodiments, the system is configured to modify the questionnaire substantially on-the-fly (e.g., as the user provides each particular answer). FIG. 22 depicts an interface 2200 that includes a second question 2220 that differs from the second question 2120 shown in FIG. 21. As may be understood in light of this disclosure, in response to the user providing a response to the first question 2110 in FIG. 21 that indicates that the processing activity is a new processing activity, the system may substantially automatically modify the second question 2120 from FIG. 21 to the second question 2220 from FIG. 22 (e.g., such that the second question 2220 includes one or more follow up questions or requests for additional information based on the response to the first question 2110 in FIG. 21).

As shown in FIG. 22, the second question 2220 requests a description of the activity that is being pursued. In various embodiments (e.g., such as if the user had selected that the processing activity was an existing one), the system may not modify the questionnaire to include the second question 2220 from FIG. 22, because the system may already store information related to a description of the processing activity at issue. In various embodiments, any suitable question described herein may include a tooltip 2225 on a field name (e.g., which may provide one or more additional pieces of information to guide a user's response to the questionnaire and/or assessment).

Figure 23:
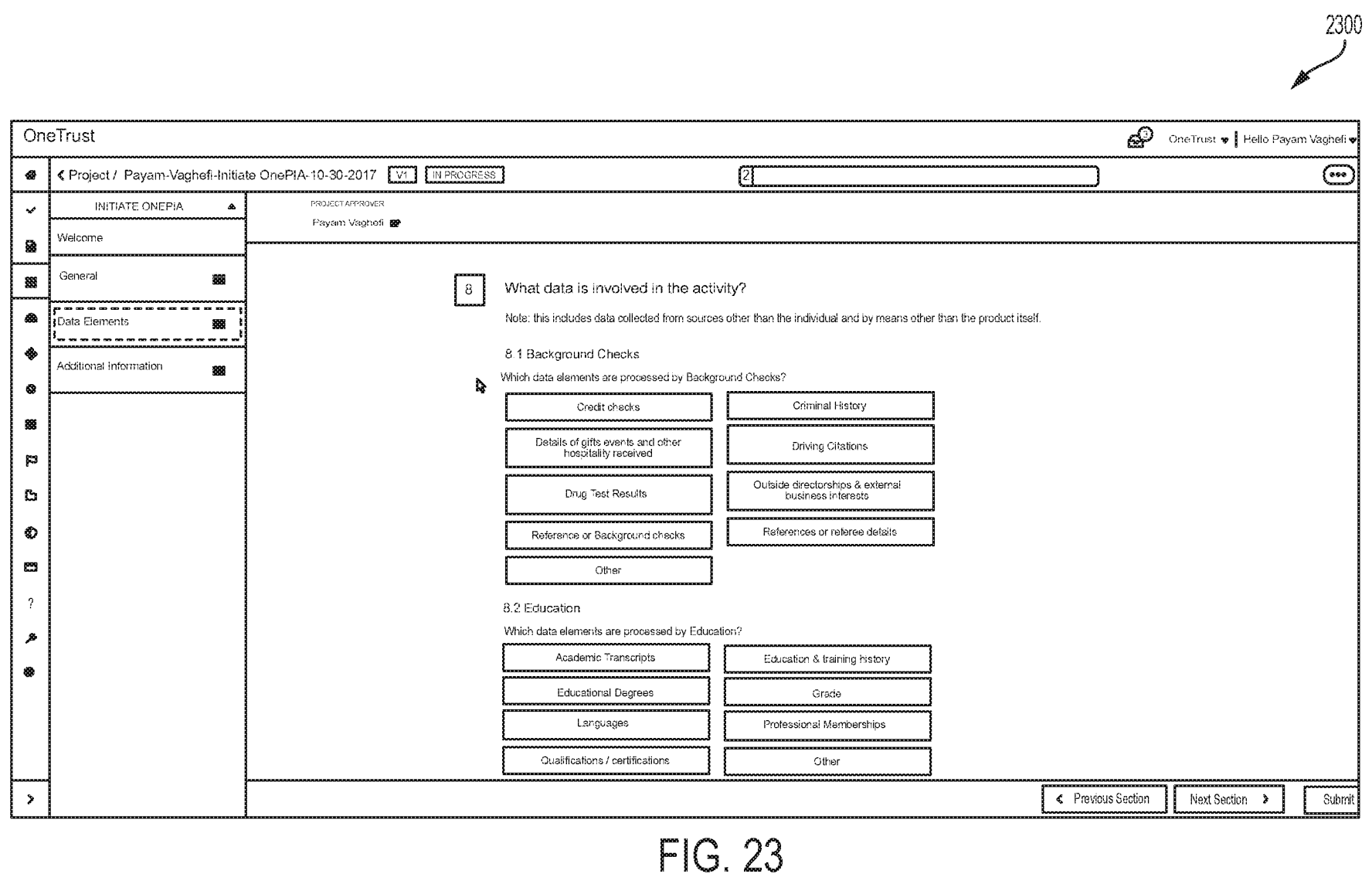
Figure 24:
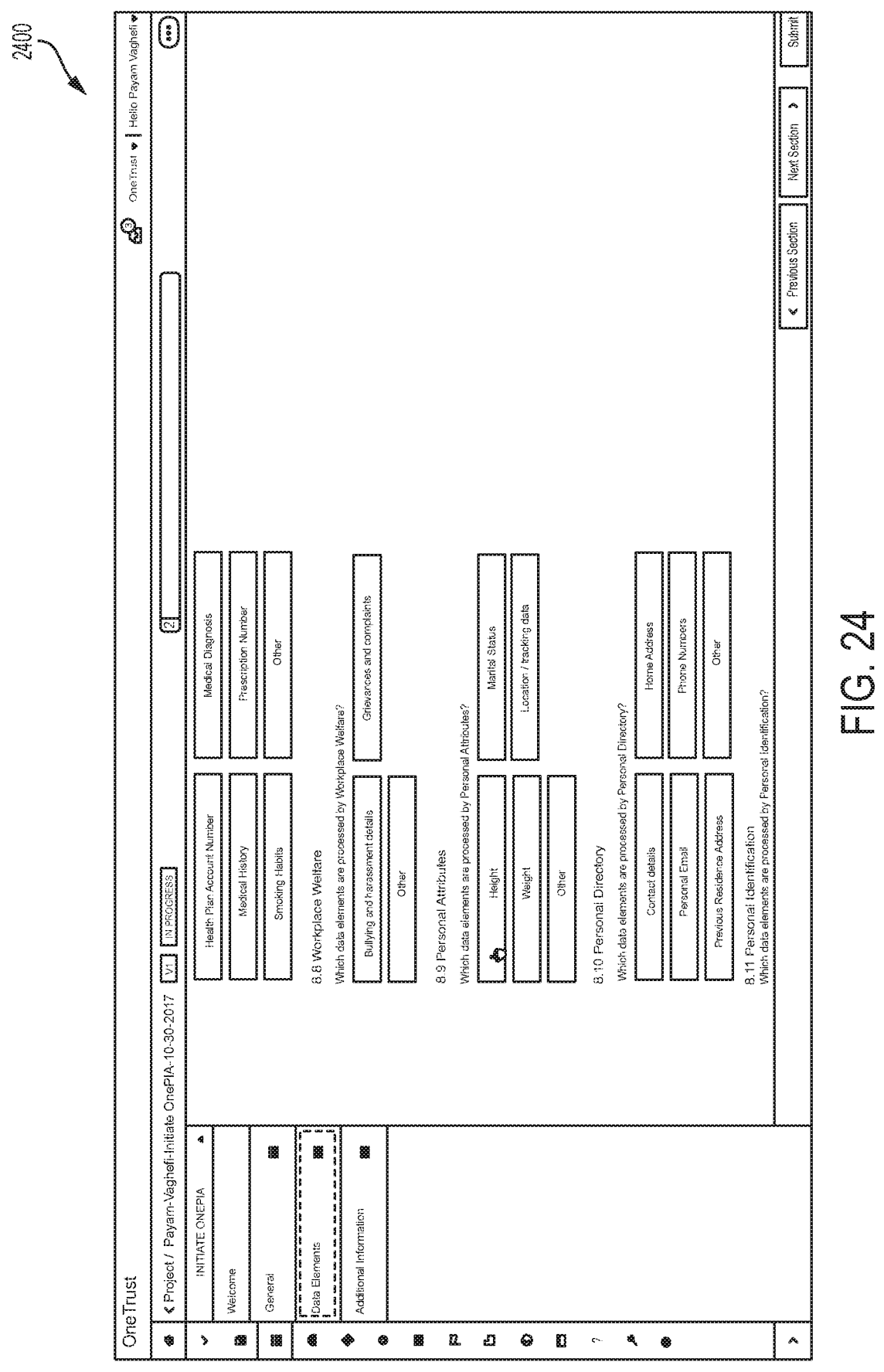

FIGS. 23 and 24 depict additional exemplary assessment questions. The questions shown in these figures relate to, for example, particular data elements processed by various aspects of a processing activity.

Figure 25:
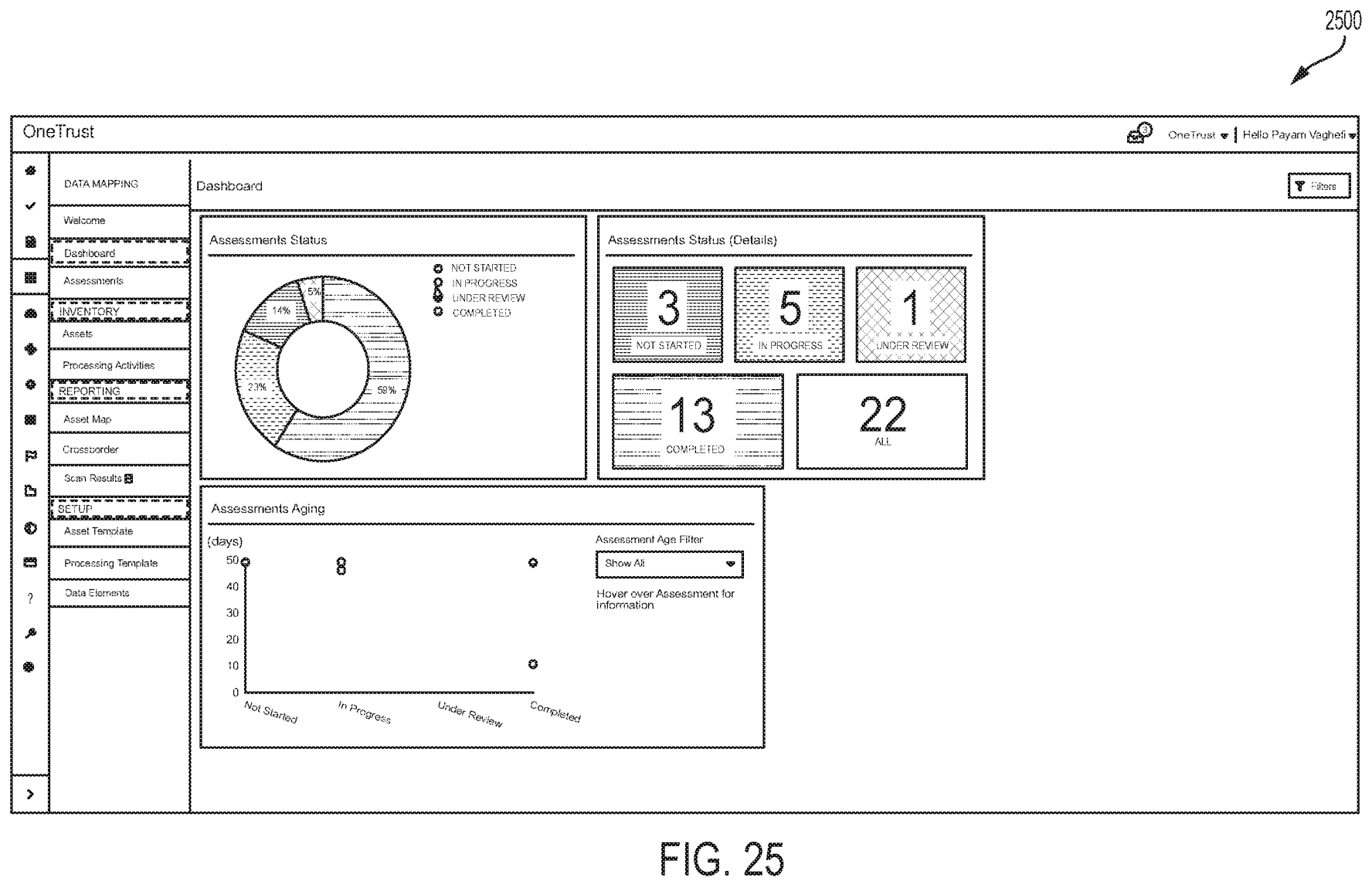

FIG. 25 depicts a dashboard 2500 that includes an accounting of one or more assessments that have been completed, are in progress, or require completion by a particular organization. The dashboard 2500 shown in this figure is configured to provide information relate to the status of one or more outstanding assessments. As may be understood in light of this disclosure, because of the volume of assessment requests, it may be necessary to utilize one or more third party organizations to facilitate a timely completion of one or more assessment requests. In various embodiments, the dashboard may indicate that, based on a fact that a number of assessments are still in progress or incomplete, that a particular data model for an entity, data asset, processing activity, etc. remains incomplete. In such embodiments, an incomplete nature of a data model may raise one or more flags or indicate a risk that an entity may not be in compliance with one or more legal or industry requirements related to the collection, storage, and/or processing of personal data.

Intelligent Identity Scanning Module

Figure 26:
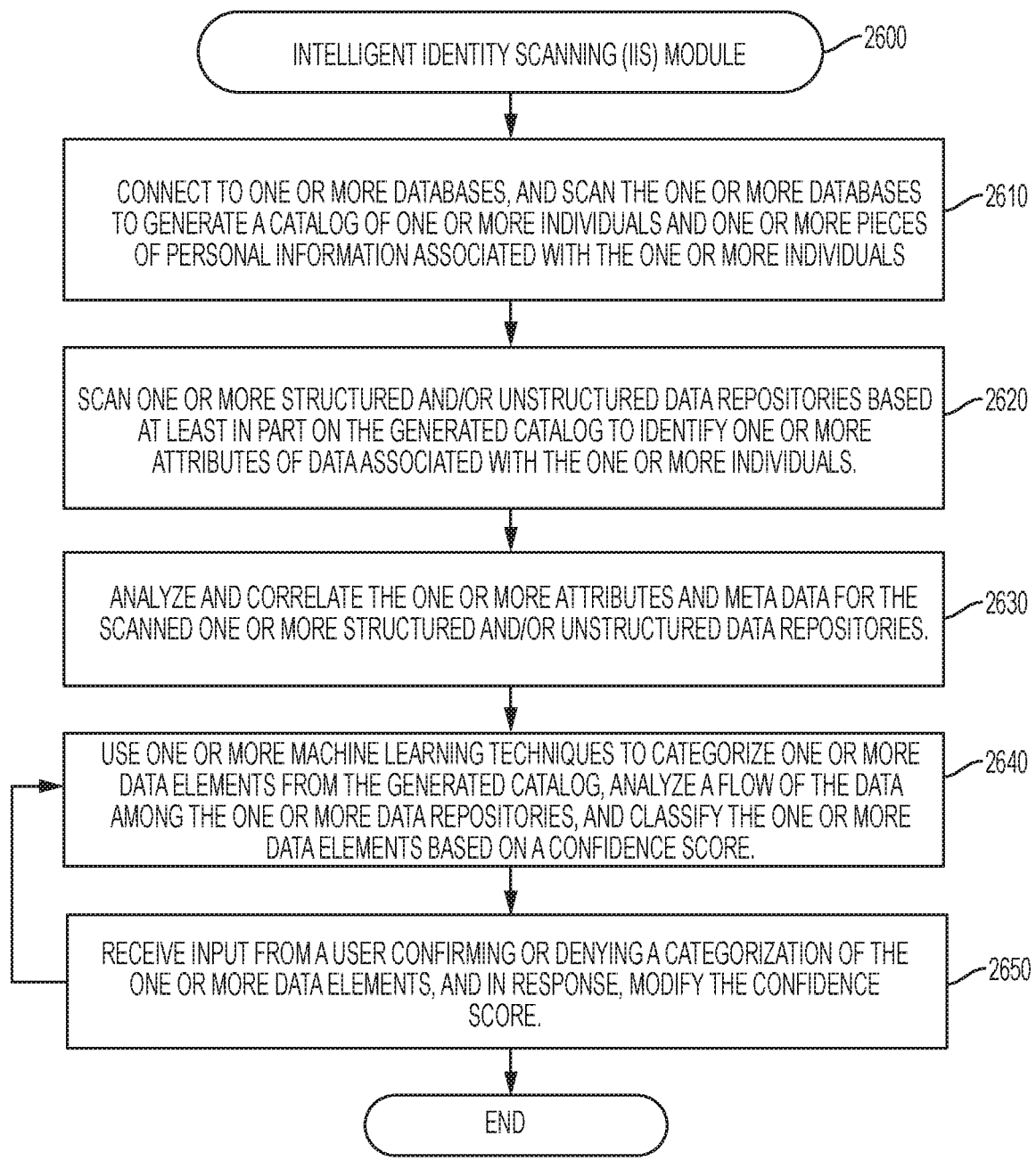
FIG. 26 is a flowchart showing an example of steps performed by an Intelligent Identity Scanning Module.

Turning to FIG. 26, in particular embodiments, the Intelligent Identity Scanning Module 2600 is configured to scan one or more data sources to identify personal data stored on one or more network devices for a particular organization, analyze the identified personal data, and classify the personal data (e.g., in a data model) based at least in part on a confidence score derived using one or more machine learning techniques. The confidence score may be and/or comprise, for example, an indication of the probability that the personal data is actually associated with a particular data subject (e.g., that there is at least an 80% confidence level that a particular phone number is associated with a particular individual.)

When executing the Intelligent Identity Scanning Module 2600, the system begins, at Step 2610, by connecting to one or more databases or other data structures, and scanning the one or more databases to generate a catalog of one or more individuals and one or more pieces of personal information associated with the one or more individuals. The system may, for example, be configured to connect to one or more databases associated with a particular organization (e.g., one or more databases that may serve as a storage location for any personal or other data collected, processed, etc. by the particular organization, for example, as part of a suitable processing activity. As may be understood in light of this disclosure, a particular organization may use a plurality of one or more databases (e.g., the One or More Databases 140 shown in FIG. 1), a plurality of servers (e.g., the One or More Third Party Servers 160 shown in FIG. 1), or any other suitable data storage location in order to store personal data and other data collected as part of any suitable privacy campaign, privacy impact assessment, processing activity, etc.

In particular embodiments, the system is configured to scan the one or more databases by searching for particular data fields comprising one or more pieces of information that may include personal data. The system may, for example, be configured to scan and identify one of more pieces of personal data such as: (1) name; (2) address; (3) telephone number; (4) e-mail address; (5) social security number; (6) information associated with one or more credit accounts (e.g., credit card numbers); (7) banking information; (8) location data; (9) internet search history; (10) non-credit account data; and/or (11) any other suitable personal information discussed herein. In particular embodiments, the system is configured to scan for a particular type of personal data (e.g., or one or more particular types of personal data).

The system may, in various embodiments, be further configured to generate a catalog of one or more individuals that also includes one or more pieces of personal information (e.g., personal data) identified for the individuals during the scan. The system may, for example, in response to discovering one or more pieces of personal data in a particular storage location, identify one or more associations between the discovered pieces of personal data. For example, a particular database may store a plurality of individuals' names in association with their respective telephone numbers. One or more other databases may include any other suitable information.

The system may, for example, generate the catalog to include any information associated with the one or more individuals identified in the scan. The system may, for example, maintain the catalog in any suitable format (e.g., a data table, etc.).

In still other embodiments, in addition to connecting to a database, the system may be configured to: (1) access an application through one or more application programming interfaces (APIs); (2) use one or more screen scraping techniques on an end user page to identify and analyze each field on the page; and/or (3) connect to any other suitable data structure in order to generate the catalog of individuals and personal information associated with each of the individuals. In some embodiments, the system may be configured to analyze one or more access logs and applications set up through a system active directory or SSO portal for which one or more applications might contain certain data for user groups. The system may then be configured to analyze an email environment to identify one or more links to particular business applications, which may, for example, be in use by an entity and contain certain data. In still other embodiments, the system may be configured to analyze one or more system log files (Syslog) from a security environment to capture which particular applications an entity may be using in order to discover such applications.

Continuing to Step 2620, the system is configured to scan one or more structured and/or unstructured data repositories based at least in part on the generated catalog to identify one or more attributes of data associated with the one or more individuals. The system may, for example, be configured to utilize information discovered during the initial scan at Step

2610 to identify the one or more attributes of data associated with the one or more individuals.

For example, the catalog generated at Step 2610 may include a name, address, and phone number for a particular individual. The system may be configured, at Step 2620, to scan the one or more structured and/or unstructured data repositories to identify one or more attributes that are associated with one or more of the particular individual's name, address and/or phone number. For example, a particular data repository may store banking information (e.g., a bank account number and routing number for the bank) in association with the particular individual's address. In various embodiments, the system may be configured to identify the banking information as an attribute of data associated with the particular individual. In this way, the system may be configured to identify particular data attributes (e.g., one or more pieces of personal data) stored for a particular individual by identifying the particular data attributes using information other than the individual's name.

Returning to Step 2630, the system is configured to analyze and correlate the one or more attributes and metadata for the scanned one or more structured and/or unstructured data repositories. In particular embodiments, the system is configured to correlate the one or more attributes with metadata for the associated data repositories from which the system identified the one or more attributes. In this way, the system may be configured to store data regarding particular data repositories that store particular data attributes.

In particular embodiments, the system may be configured to cross-reference the data repositories that are discovered to store one or more attributes of personal data associated with the one or more individuals with a database of known data assets. In particular embodiments, the system is configured to analyze the data repositories to determine whether each data repository is part of an existing data model of data assets that collect, store, and/or process personal data. In response to determining that a particular data repository is not associated with an existing data model, the system may be configured to identify the data repository as a new data asset (e.g., via asset discovery), and take one or more actions (e.g., such as any suitable actions described herein) to generate and populate a data model of the newly discovered data asset. This may include, for example: (1) generating a data inventory for the new data asset; (2) populating the data inventory with any known attributes associated with the new data asset; (3) identifying one or more unpopulated (e.g., unknown) attributes of the data asset; and (4) taking any suitable action described herein to populate the unpopulated data attributes.

In particular embodiments, the system my, for example: (1) identify a source of the personal data stored in the data repository that led to the new asset discovery; (2) identify one or more relationships between the newly discovered asset and one or more known assets; and/or (3) etc.

Continuing to Step 2640, the system is configured to use one or more machine learning techniques to categorize one or more data elements from the generated catalog, analyze a flow of the data among the one or more data repositories, and/or classify the one or more data elements based on a confidence score as discussed below.

Continuing to Step 2650, the system, in various embodiments, is configured to receive input from a user confirming or denying a categorization of the one or more data elements, and, in response, modify the confidence score. In various embodiments, the system is configured to iteratively repeat Steps 2640 and 2650. In this way, the system is configured to modify the confidence score in response to a user confirming or denying the accuracy of a categorization of the one or more data elements. For example, in particular embodiments, the system is configured to prompt a user (e.g., a system administrator, privacy officer, etc.) to confirm that a particular data element is, in fact, associated with a particular individual from the catalog. The system may, in various embodiments, be configured to prompt a user to confirm that a data element or attribute discovered during one or more of the scans above were properly categorized at Step 2640.

In particular embodiments, the system is configured to modify the confidence score based at least in part on receiving one or more confirmations that one or more particular data elements or attributes discovered in a particular location during a scan are associated with particular individuals from the catalog. As may be understood in light of this disclosure, the system may be configured to increase the confidence score in response to receiving confirmation that particular types of data elements or attributes discovered in a particular storage location are typically confirmed as being associated with particular individuals based on one or more attributes for which the system was scanning.

Exemplary Intelligent Identity Scanning Technical Platforms

Figure 27:
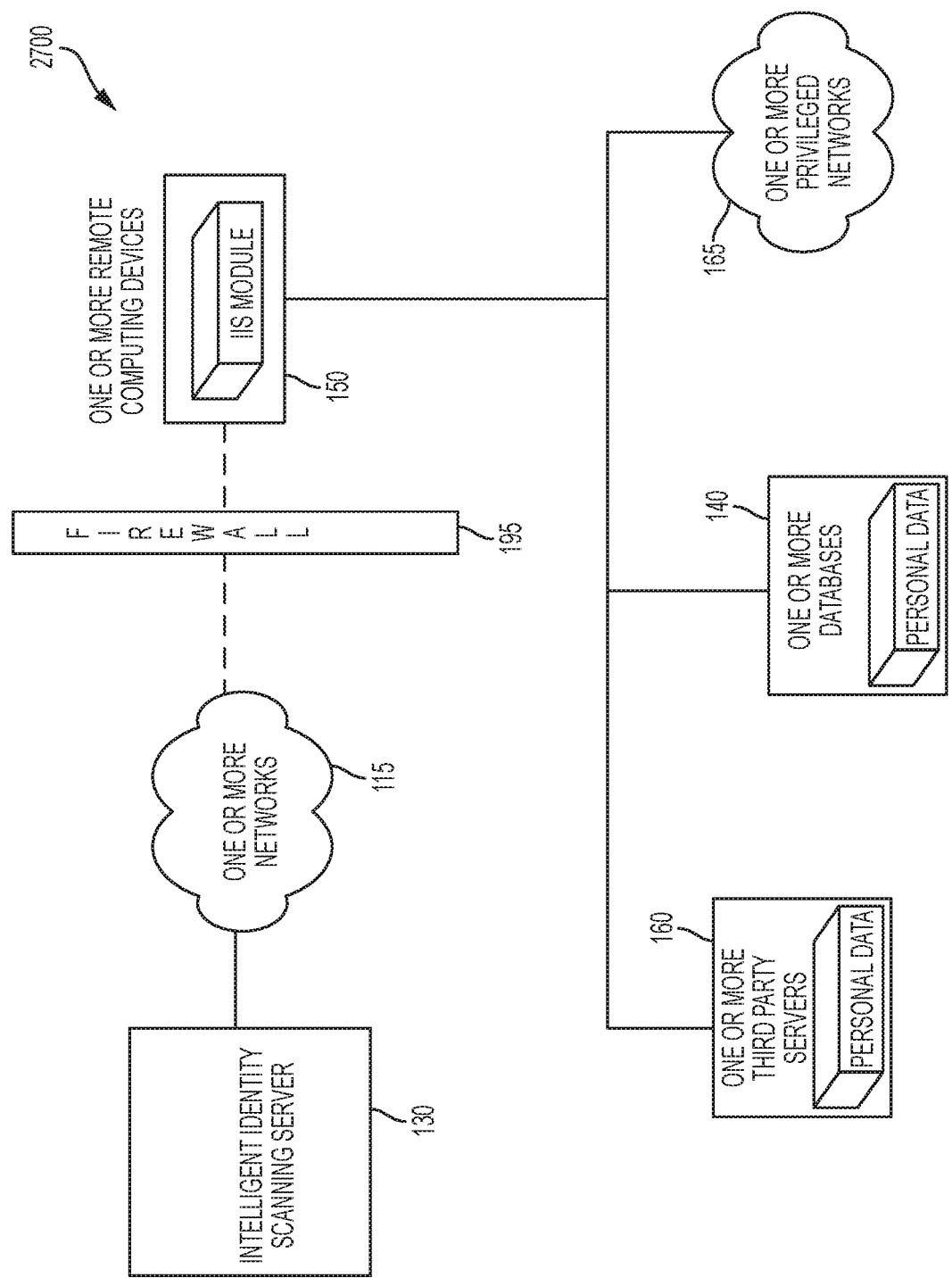
FIG. 27 is schematic diagram of network architecture for an intelligent identity scanning system 2700 according to a particular embodiment.

FIG. 27 depicts an exemplary technical platform via which the system may perform one or more of the steps described above with respect to the Intelligent Identity Scanning Module 2600. As shown in the embodiment in this figure, an Intelligent Identity Scanning System 2600 comprises an Intelligent Identity Scanning Server 130, such as the Intelligent Identity Scanning Server 130 described above with respect to FIG. 1. The Intelligent Identity Scanning Server 130 may, for example, comprise a processing engine (e.g., one or more computer processors). In some embodiments, the Intelligent Identity Scanning Server 130 may include any suitable cloud hosted processing engine (e.g., one or more cloud-based computer servers). In particular embodiments, the Intelligent Identity Scanning Server 130 is hosted in a Microsoft Azure cloud.

In particular embodiments, the Intelligent Identity Scanning Server 130 is configured to sit outside one or more firewalls (e.g., such as the firewall 195 shown in FIG. 26). In such embodiments, the Intelligent Identity Scanning Server 130 is configured to access One or More Remote Computing Devices 150 through the Firewall 195 (e.g., one or more firewalls) via One or More Networks 115 (e.g., such as any of the One or More Networks 115 described above with respect to FIG. 1).

In particular embodiments, the One or More Remote Computing Devices 150 include one or more computing devices that make up at least a portion of one or more computer networks associated with a particular organization. In particular embodiments, the one or more computer networks associated with the particular organization comprise one or more suitable servers, one or more suitable databases, one or more privileged networks, and/or any other suitable device and/or network segment that may store and/or provide for the storage of personal data. In the embodiment shown in FIG. 27, the one or more computer networks associated with the particular organization may comprise One or More Third Party Servers 160, One or More Databases 140, etc. In particular embodiments, the One or More Remote Computing Devices 150 are configured to access one or more segments of the one or more computer networks associated with the particular organization. In some embodiments, the one or more computer networks associated with the particular organization comprise One or More Privileged Networks 165. In still other embodiments, the one or more computer networks comprise one or more network segments connected via one or more suitable routers, one or more suitable network hubs, one or more suitable network switches, etc.

As shown in FIG. 27, various components that make up one or more parts of the one or more computer networks associated with the particular organization may store personal data (e.g., such as personal data stored on the One or More Third Party Servers 160, the One or More Databases 140, etc.). In various embodiments, the system is configured to perform one or more steps related to the Intelligent Identity Scanning Server 2600 in order to identify the personal data for the purpose of generating the catalog of individuals described above (e.g., and/or identify one or more data assets within the organization's network that store personal data)

As further shown in FIG. 27, in various embodiments, the One or More Remote Computing Devices 150 may store a software application (e.g., the Intelligent Identity Scanning Module). In such embodiments, the system may be configured to provide the software application for installation on the One or More Remote Computing Devices 150. In particular embodiments, the software application may comprise one or more virtual machines. In particular embodiments, the one or more virtual machines may be configured to perform one or more of the steps described above with respect to the Intelligent Identity Scanning Module 2600 (e.g., perform the one or more steps locally on the One or More Remote Computing Devices 150).

In various embodiments, the one or more virtual machines may have the following specifications: (1) any suitable number of cores (e.g., 4, 6, 8, etc.); (2) any suitable amount of memory (e.g., 4 GB, 8 GB, 16 GB etc.); (3) any suitable operating system (e.g., CentOS 7.2); and/or (4) any other suitable specification. In particular embodiments, the one or more virtual machines may, for example, be used for one or more suitable purposes related to the Intelligent Identity Scanning System 2700. These one or more suitable purposes may include, for example, running any of the one or more modules described herein, storing hashed and/or non-hashed information (e.g., personal data, personally identifiable data, catalog of individuals, etc.), storing and running one or more searching and/or scanning engines (e.g., Elasticsearch), etc.

In various embodiments, the Intelligent Identity Scanning System 2700 may be configured to distribute one or more processes that make up part of the Intelligent Identity Scanning Process (e.g., described above with respect to the Intelligent Identity Scanning Module 1800). The one or more software applications installed on the One or more Remote Computing Devices 150 may, for example, be configured to provide access to the one or more computer networks associated with the particular organization to the Intelligent Identity Scanning Server 130. The system may then be configured to receive, from the One or more Remote Computing Devices 150 at the Intelligent Identity Scanning Server 130, via the Firewall 195 and One or More Networks 115, scanned data for analysis.

In particular embodiments, the Intelligent Identity Scanning System 2700 is configured to reduce an impact on a performance of the One or More Remote Computing Devices 150, One or More Third Party Servers 160 and other components that make up one or more segments of the one or more computer networks associated with the particular organization. For example, in particular embodiments, the Intelligent Identity Scanning System 2700 may be configured to utilize one or more suitable bandwidth throttling techniques. In other embodiments, the Intelligent Identity Scanning System 2700 is configured to limit scanning (e.g., any of the one or more scanning steps described above with respect to the Intelligent Identity Scanning Module 2600) and other processing steps (e.g., one or more steps that utilize one or more processing resources) to non-peak times (e.g., during the evening, overnight, on weekends and/or holidays, etc.). In other embodiments, the system is configured to limit performance of such processing steps to backup applications and data storage locations. The system may, for example, use one or more sampling techniques to decrease a number of records required to scan during the personal data discovery process.

Figure 28:
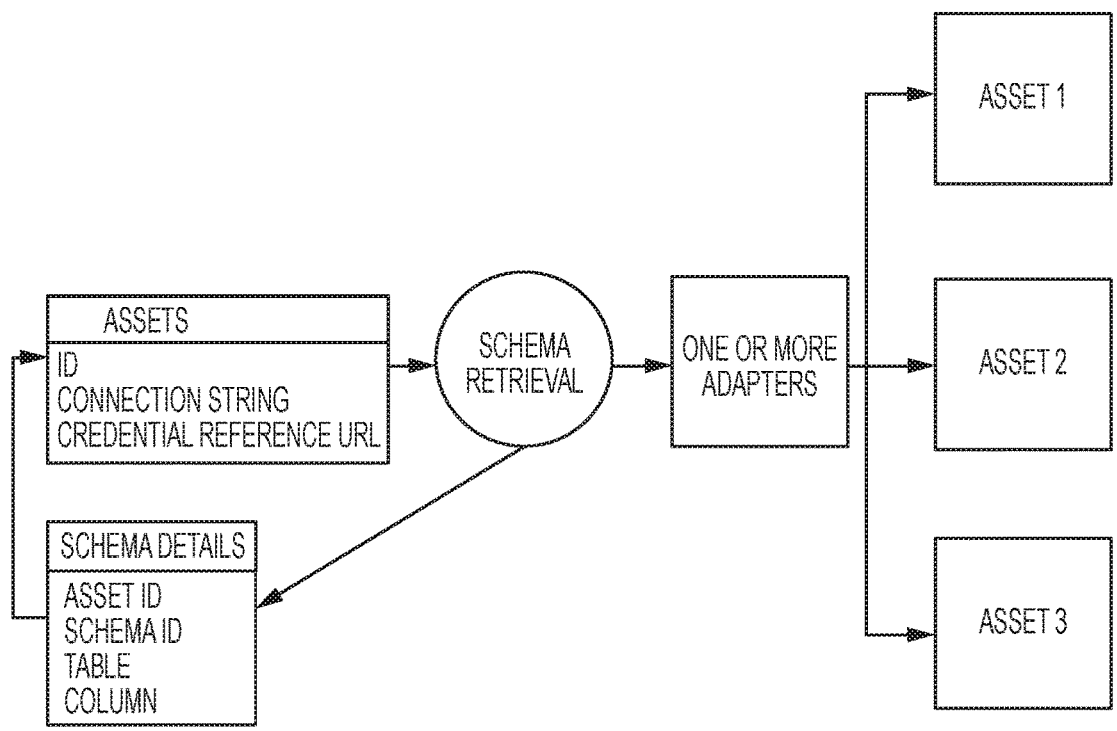
FIG. 28 is a schematic diagram of an asset access methodology utilized by an intelligent identity scanning system 2700 in various embodiments of the system.

FIG. 28 depicts an exemplary asset access methodology that the system may utilize in order to access one or more network devices that may store personal data (e.g., or other personally identifiable information). As may be understood from this figure, the system may be configured to access the one or more network devices using a locally deployed software application (e.g., such as the software application described immediately above). In various embodiments, the software application is configured to route identity scanning traffic through one or more gateways, configure one or more ports to accept one or more identity scanning connections, etc.

As may be understood from this figure, the system may be configured to utilize one or more credential management techniques to access one or more privileged network portions. The system may, in response to identifying particular assets or personally identifiable information via a scan, be configured to retrieve schema details such as, for example, an asset ID, Schema ID, connection string, credential reference URL, etc. In this way, the system may be configured to identify and store a location of any discovered assets or personal data during a scan.

Data Subject Access Request Fulfillment Module

Figure 29:
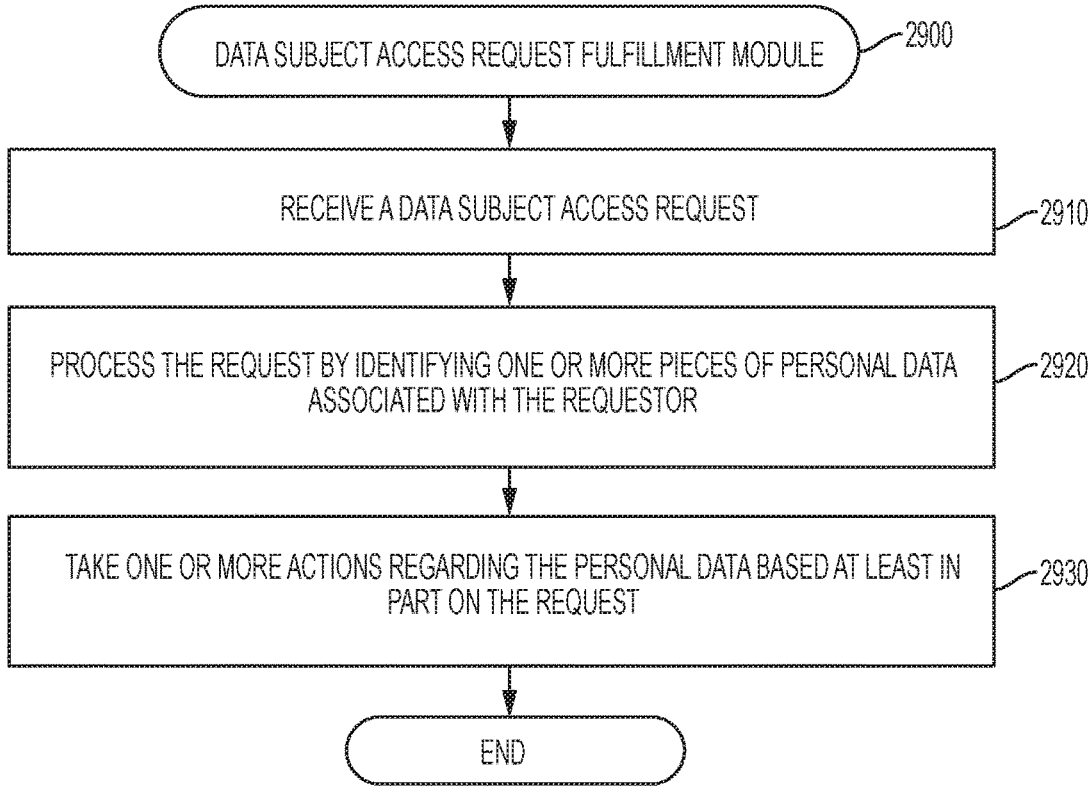
FIG. 29 is a flowchart showing an example of processes performed by a Data Subject Access Request Fulfillment Module 2900 according to various embodiments.

Turning to FIG. 29, in particular embodiments, a Data Subject Access Request Fulfillment Module 2900 is configured to receive a data subject access request, process the request, and fulfill the request based at least in part on one or more request parameters. In various embodiments, an organization, corporation, etc. may be required to provide information requested by an individual for whom the organization stores personal data within a certain time period (e.g., 30 days). As a particular example, an organization may be required to provide an individual with a listing of, for example: (1) any personal data that the organization is processing for an individual, (2) an explanation of the categories of data being processed and the purpose of such processing; and/or (3) categories of third parties to whom the data may be disclosed.

Various privacy and security policies (e.g., such as the European Union's General Data Protection Regulation, and other such policies) may provide data subjects (e.g., individuals, organizations, or other entities) with certain rights related to the data subject's personal data that is collected, stored, or otherwise processed by an organization. These rights may include, for example: (1) a right to obtain confirmation of whether a particular organization is processing their personal data; (2) a right to obtain information about the purpose of the processing (e.g., one or more reasons for which the personal data was collected); (3) a right to obtain information about one or more categories of data being processed (e.g., what type of personal data is being collected, stored, etc.); (4) a right to obtain information about one or more categories of recipients with whom their personal data may be shared (e.g., both internally within the organization or externally); (5) a right to obtain information about a time period for which their personal data will be stored (e.g., or one or more criteria used to determine that time period); (6) a right to obtain a copy of any personal data being processed (e.g., a right to receive a copy of their personal data in a commonly used, machine-readable format); (7) a right to request erasure (e.g., the right to be forgotten), rectification (e.g., correction or deletion of inaccurate data), or restriction of processing of their personal data; and (8) any other suitable rights related to the collection, storage, and/or processing of their personal data (e.g., which may be provided by law, policy, industry or organizational practice, etc.).

As may be understood in light of this disclosure, a particular organization may undertake a plurality of different privacy campaigns, processing activities, etc. that involve the collection and storage of personal data. In some embodiments, each of the plurality of different processing activities may collect redundant data (e.g., may collect the same personal data for a particular individual more than once), and may store data and/or redundant data in one or more particular locations (e.g., on one or more different servers, in one or more different databases, etc.). In this way, a particular organization may store personal data in a plurality of different locations which may include one or more known and/or unknown locations. As such, complying with particular privacy and security policies related to personal data (e.g., such as responding to one or more requests by data subjects related to their personal data) may be particularly difficult (e.g., in terms of cost, time, etc.). In particular embodiments, a data subject access request fulfillment system may utilize one or more data model generation and population techniques (e.g., such as any suitable technique described herein) to create a centralized data map with which the system can identify personal data stored, collected, or processed for a particular data subject, a reason for the processing, and any other information related to the processing.

Turning to FIG. 21, when executing the Data Subject Access Request Module 2100, the system begins, at Step 2110, by receiving a data subject access request. In various embodiments, the system receives the request via a suitable web form. In certain embodiments, the request comprises a particular request to perform one or more actions with any personal data stored by a particular organization regarding the requestor. For example, in some embodiments, the request may include a request to view one or more pieces of personal data stored by the system regarding the requestor. In other embodiments, the request may include a request to delete one or more pieces of personal data stored by the system regarding the requestor. In still other embodiments, the request may include a request to update one or more pieces of personal data stored by the system regarding the requestor. In still other embodiments, the request may include a request based on any suitable right afforded to a data subject, such as those discussed above.

Continuing to Step 2120, the system is configured to process the request by identifying and retrieving one or more pieces of personal data associated with the requestor that are being processed by the system. For example, in various embodiments, the system is configured to identify any personal data stored in any database, server, or other data repository associated with a particular organization. In various embodiments, the system is configured to use one or more data models, such as those described above, to identify this personal data and suitable related information (e.g., where the personal data is stored, who has access to the personal data, etc.). In various embodiments, the system is configured to use intelligent identity scanning (e.g., as described above) to identify the requestor's personal data and related information that is to be used to fulfill the request.

In still other embodiments, the system is configured to use one or more machine learning techniques to identify such personal data. For example, the system may identify particular stored personal data based on, for example, a country in which a website that the data subject request was submitted is based, or any other suitable information.

In particular embodiments, the system is configured to scan and/or search one or more existing data models (e.g., one or more current data models) in response to receiving the request in order to identify the one or more pieces of personal data associated with the requestor. The system may, for example, identify, based on one or more data inventories (e.g., one or more inventory attributes) a plurality of storage locations that store personal data associated with the requestor. In other embodiments, the system may be configured to generate a data model or perform one or more scanning techniques in response to receiving the request (e.g., in order to automatically fulfill the request).

Returning to Step 2130, the system is configured to take one or more actions based at least in part on the request. In some embodiments, the system is configured to take one or more actions for which the request was submitted (e.g., display the personal data, delete the personal data, correct the personal data, etc.). In particular embodiments, the system is configured to take the one or more actions substantially automatically. In particular embodiments, in response a data subject submitting a request to delete their personal data from an organization's systems, the system may: (1) automatically determine where the data subject's personal data is stored; and (2) in response to determining the location of the data (which may be on multiple computing systems), automatically facilitate the deletion of the data subject's personal data from the various systems (e.g., by automatically assigning a plurality of tasks to delete data across multiple business systems to effectively delete the data subject's personal data from the systems). In particular embodiments, the step of facilitating the deletion may comprise, for example: (1) overwriting the data in memory; (2) marking the data for overwrite; (2) marking the data as free (e.g., and deleting a directory entry associated with the data); and/or (3) any other suitable technique for deleting the personal data. In particular embodiments, as part of this process, the system uses an appropriate data model (see discussion above) to efficiently determine where all of the data subject's personal data is stored.

Data Subject Access Request User Experience

Figure 30:
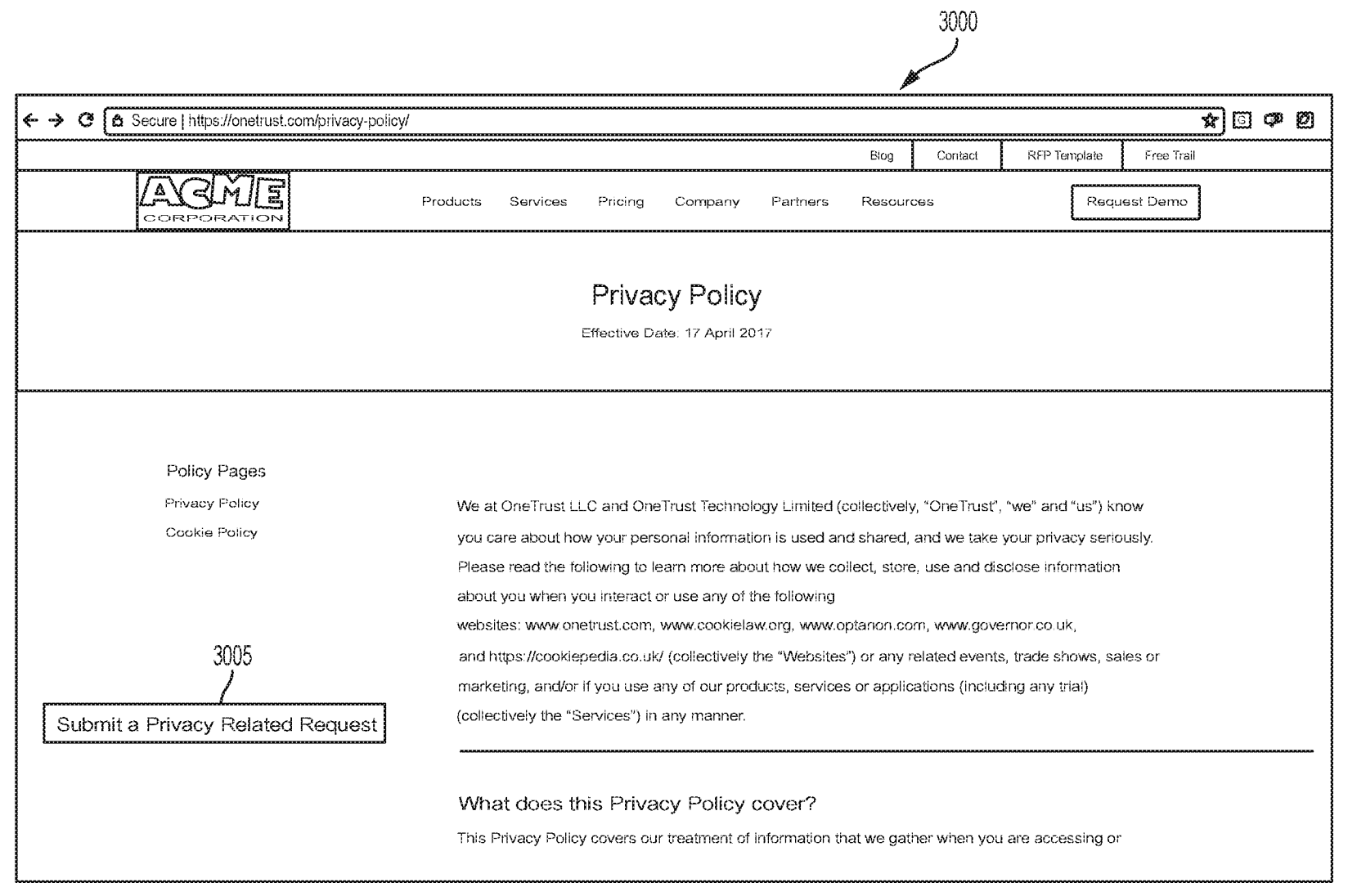
Figure 31:

FIGS. 30-31 depict exemplary screen displays that a user may view when submitting a data subject access request. As shown in FIG. 30, a website 30000 associated with a particular organization may include a user-selectable indicia 3005 for submitting a privacy-related request. A user desiring to make such a request may select the indicia 3005 in order to initiate the data subject access request process.

FIG. 31 depicts an exemplary data subject access request form in both an unfilled and filled out state. As shown in this figure, the system may prompt a user to provide information such as, for example: (1) what type of requestor the user is (e.g., employee, customer, etc.); (2) what the request involves (e.g., requesting info, opting out, deleting data, updating data, etc.); (3) first name; (4) last name; (5) email address; (6) telephone number; (7) home address; and/or (8) one or more details associated with the request.

As discussed in more detail above, a data subject may submit a subject access request, for example, to request a listing of any personal information that a particular organization is currently storing regarding the data subject, to request that the personal data be deleted, to opt out of allowing the organization to process the personal data, etc.

Alternative Embodiments

In particular embodiments, a data modeling or other system described herein may include one or more features in addition to those described. Various such alternative embodiments are described below.

Processing Activity and Data Asset Assessment Risk Flagging

In particular embodiments, the questionnaire template generation system and assessment system described herein may incorporate one or more risk flagging systems. FIGS. 32-35 depict exemplary user interfaces that include risk flagging of particular questions within a processing activity assessment. As may be understood from these figures, a user may select a flag risk indicia to provide input related to a description of risks and mitigation of a risk posed by one or more inventory attributes associated with the question. As shown in these figures, the system may be configured to substantially automatically assign a risk to a particular response to a question in a questionnaire. In various embodiments, the assigned risk is determined based at least in part on the template from which the assessment was generated.

In particular embodiments, the system may utilize the risk level assigned to particular questionnaire responses as part of a risk analysis of a particular processing activity or data asset. Various techniques for assessing the risk of various privacy campaigns are described in U.S. patent application Ser. No. 15/256,419, filed Sep. 2, 2016, entitled "Data processing systems and methods for operationalizing privacy compliance and assessing the risk of various respective privacy campaigns," which is hereby incorporated herein in its entirety.

Cross-Border Visualization Generation System

In particular embodiments, a Cross-Border Visualization Generation System is configured to analyze one or more data systems (e.g., data assets), identify data transfers between/among those systems, determine whether any particular regulations apply to the identified data transfers, and generate a visual representation of physical locations of the one or more data systems and the one or more data transfers between them. The system may, for example, color-code one or more lines or indicators showing a transfer of data between a first and second data system. The one or more indicators may convey, for example: (1) whether the data transfer is secure; (2) a type or level of security that is applied to the transfers; (3) one or more regulations that apply to the transfer; and/or (4) any other suitable information related to the transfer of particular data between the first and second data system.

Figure 36:
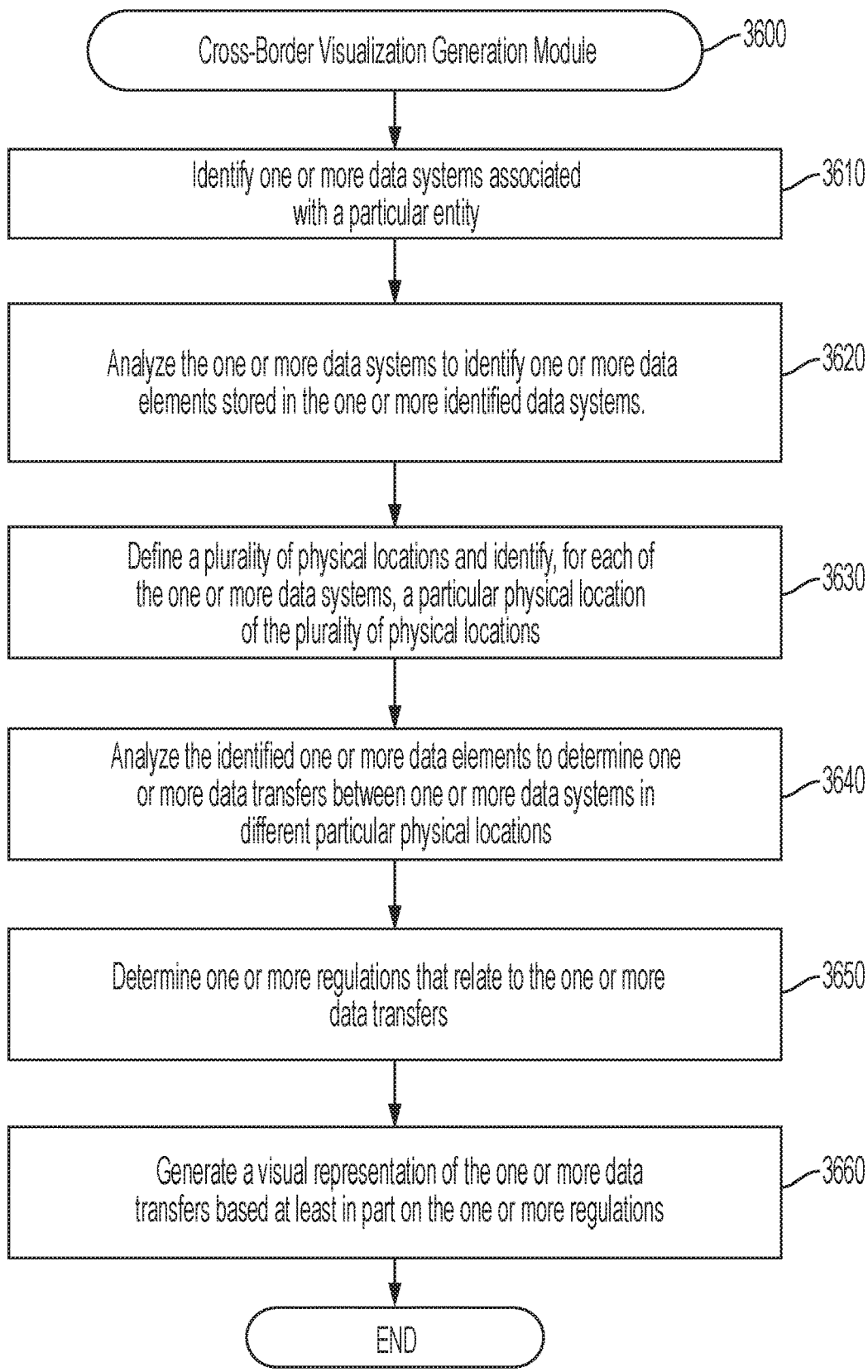
FIG. 36 is a flowchart showing an example of processes performed by a Cross-Border Visualization Generation Module 3600 according to various embodiments.

Various processes performed by the Cross-Border Visualization Generation System may be implemented by a Cross-Border Visualization Generation Module 3600. Referring to FIG. 36, in particular embodiments, the system, when executing the Cross-Border Visualization Generation Module 3600, is configured to: (1) identify data systems associated with a particular entity; (2) determine a location of the data systems; (3) identify one or more transfers of particular data elements between particular data systems of the one or more data systems; (4) determine one or more regulations that relate to the one or more data transfers; and (5) generate a visual representation of the one or more data transfers based at least in part on the one or more regulations.

When executing the Cross-Border Visualization Generation Module 3600, the system begins, at Step 3610, by identifying one or more data systems (e.g., data assets) associated with a particular entity. The particular entity may include, for example, a particular organization, company, sub-organization, etc. In particular embodiments, the one or more data assets (e.g., data systems) may include, for example, any entity that collects, processes, contains, and/or transfers data (e.g., such as a software application, "internet of things" computerized device, database, website, datacenter, server, etc.). For example, a first data asset may include any software or device utilized by a particular entity for such data collection, processing, transfer, storage, etc. In various embodiments, the first data asset may be at least partially stored on and/or physically located in a particular location. For example, a server may be located in a particular country, jurisdiction, etc. A piece of software may be stored on one or more servers in a particular location, etc.

In particular embodiments, the system is configured to identify the one or more data systems using one or more data modeling techniques. As discussed more fully above, a data model may store the following information: (1) the entity that owns and/or uses a particular data asset (e.g., such as a primary data asset, an example of which is shown in the center of the data model in FIG. 4); (2) one or more departments within the organization that are responsible for the data asset; (3) one or more software applications that collect data (e.g., personal data) for storage in and/or use by the data asset; (4) one or more particular data subjects (or categories of data subjects) that information is collected from for use by the data asset; (5) one or more particular types of data that are collected by each of the particular applications for storage in and/or use by the data asset; (6) one or more individuals (e.g., particular individuals or types of individuals) that are permitted to access and/or use the data stored in, or used by, the data asset; (7) which particular types of data each of those individuals are allowed to access and use; and (8) one or more data assets (destination assets) that the data is transferred to for other use, and which particular data is transferred to each of those data assets.

As may be understood in light of this disclosure, the system may utilize a data model (e.g., or one or more data models) of data assets associated with a particular entity to identify the one or more data systems associated with the particular entity.

Continuing to Step 3620, the system is configured to analyze the one or more data assets (e.g., data systems) to identify one or more data elements stored in the one or more identified data systems. In particular embodiments, the system is configured to identify one or more data elements stored by the one or more data systems that are subject to transfer (e.g., transfer to the one or more data systems such as from a source asset, transfer from the one or more data systems to a destination asset, etc.). In particular embodiments, the system is configured to identify a particular data element that is subject to such transfer (e.g., such as a particular piece of personal data or other data). In some embodiments, the system may be configured to identify any suitable data element that is subject to transfer and includes personal data. The system may be configured to identify such transfer data using any suitable technique described herein.

In any embodiment described herein, personal data may include, for example: (1) the name of a particular data subject (which may be a particular individual); (2) the data subject's address; (3) the data subject's telephone number; (4) the data subject's e-mail address; (5) the data subject's social security number; (6) information associated with one or more of the data subject's credit accounts (e.g., credit card numbers); (7) banking information for the data subject; (8) location data for the data subject (e.g., their present or past location); (9) internet search history for the data subject; and/or (10) any other suitable personal information, such as other personal information discussed herein.

As may be understood from this disclosure, the transfer of personal data may trigger one or more regulations that govern such transfer. In particular embodiments, personal data may include any data which relate to a living individual who can be identified: (1) from the data; or (2) from the data in combination with other information which is in the possession of, or is likely to come into the possession of a particular entity. In particular embodiments, a particular entity may collect, store, process, and/or transfer personal data for one or more customers, one or more employees, etc.

In various embodiments, the system is configured to use one or more data models of the one or more data assets (e.g., data systems) to analyze one or more data elements associated with those assets to determine whether the one or more data elements include one or more data elements that include personal data and are subject to transfer. In particular embodiments, the transfer may include, for example: (1) an internal transfer (e.g., a transfer from a first data asset associated with the entity to a second data asset associated with the entity); (2) an external transfer (e.g., a transfer from a data asset associated with the entity to a second data asset associated with a second entity); and/or (3) a collective transfer (e.g., a transfer to a data asset associated with the entity from an external data asset associated with a second entity).

Next, at Step 3630, the system is configured to define a plurality of physical locations and identify, for each of the one or more data systems, a particular physical location of the plurality of physical locations. In some embodiments, the system is configured to define the plurality of physical locations based at least in part on input from a user. The system may, for example, define each of the plurality of physical locations based at least in part on one or more geographic boundaries. These one or more geographic boundaries may include, for example: (1) one or more countries; (2) one or more continents; (3) one or more jurisdictions (e.g., such as one or more legal jurisdictions); (4) one or more territories; (5) one or more counties; (6) one or more cities; (7) one or more treaty members (e.g., such as members of a trade, defense, or other treaty); and/or (8) any other suitable geographically distinct physical locations.

The system may then be configured to identify, for each of the one or more data systems identified at Step 3610, an associated physical location. For example, the system may be configured to determine in which of the one or more defined plurality of physical locations each particular data system is physically located. In particular embodiments, the system is configured to determine the physical location based at least in part on one or more data attributes of a particular data asset (e.g., data system) using one or more data modeling techniques (e.g., using one or more suitable data modeling techniques described herein). In some embodiments, the system may be configured to determine the physical location of each data asset based at least in part on an existing data model that includes the data asset. In still other embodiments, the system may be configured to determine the physical location based at least in part on an IP address and/or domain of the data asset (e.g., in the case of a computer server or other computing device) or any other identifying feature of a particular data asset.

Returning to Step 3640, the system is configured to analyze the identified one or more data elements to determine one or more data transfers between one or more data systems in different particular physical locations. The system may, for example, analyze a data model based on each particular data asset to identify one or more data transfers between and/or among the one or more data assets (e.g., data systems). For example, as may be understood from FIG. 4, a particular asset (e.g., storage asset) may receive data, for example, from a data subject, a collection asset, or other suitable source (e.g., data asset). The particular asset may further, in some embodiments, transfer data to a transfer asset (e.g., an asset to which the particular asset transfers data). The system may be configured to identify such data transfers between and/or among one or more data assets for the purpose of generating a visual representation of such data transfers.

Continuing to Step 3650, the system is configured to determine one or more regulations that relate to (e.g., apply to) the one or more data transfers. As may understood in light of this disclosure, one or more regulations (e.g., industry regulations, legal regulations, etc.) may govern the transfer of personal data (e.g., between one or more jurisdictions, physical locations, and the like). In particular, the one or more regulations may impose one or more minimum standards on the handling of the transfer of such personal data in the interest of protecting the privacy of one or more data subjects or other individuals with whom the personal data is associated. In particular instances, it may be inevitable (e.g., as a result of the sharing of customer data, the centralization of IT services, etc.) that a particular entity or company (e.g., a particular entity whose business activities span a plurality of jurisdictions or locations) will undertake one or more data transfers that may triggers the one or more regulations.

In particular embodiments, the one or more regulations described above may include one or more transfer restrictions. In various embodiments, the one or more transfer restrictions may restrict transfer from a first location (e.g., jurisdiction) to a second location (e.g., jurisdiction) absent an adequate level of privacy protection. A particular exemplary transfer restriction may, for example, require data transferred from a first location to a second location to be subject to the same level of privacy protection at the second location that the data enjoys in the first location. For example, the first location may, for example, place any suitable limit on the collection and storage of personal data (e.g., one or more time limits, one or more encryption requirements, etc.). In particular embodiments, the one or more regulations may include a transfer restriction that prohibits transfer of personal data from the first location to a second location unless the second location places limits on the collection and storage of personal data that are at least as stringent as the first location.

In various embodiments, the system may, for example: (1) analyze one or more first storage restrictions on personal data stored in a first data asset; (2) analyze one or more second storage restrictions on personal data stored in a second data asset to which the first data asset transfers personal data; and (3) compare the one or more first storage restrictions with the one or more second storage restrictions. The system may then, for example, flag a transfer of data from the first data asset to the second data asset based at least in part on the comparison. For example, in response to determining that the one or more second restrictions are less stringent than the one or more first restrictions, the system may flag the transfer as risky or noncompliant. In another example, in response to determining that the one or more second restrictions are at least as stringent as the one or more first restrictions, the system may flag (e.g., automatically flag) the transfer as acceptable or compliant.

In particular embodiments, the system may be configured to substantially automatically determine that a transfer to a particular location is adequate. The system may, for example, store a listing (e.g., in memory) of one or more locations (e.g., countries) deemed automatically adequate as destinations of transferred personal data. In such embodiments, the one or more regulations may include a regulation that any location on the 'safe list' provides adequate privacy protection for personal data. The system may then substantially automatically determine that a transfer of data that includes a 'safe list' location as a target destination in a transfer would automatically meet an adequacy standard for data transfer. In a particular example, the one or more locations on the 'safe list' may include one or more countries (e.g., Argentina, Canada, Israel, Switzerland, Uruguay, Jersey, Guernsey, the Isle of Man, etc.).

In various other embodiments, the one or more regulations may include a regulation that a transfer of personal data to a location that is part of a safe harbor is acceptable. In various embodiments, a safe harbor may include a commitment to adhere to a set of safe harbor principles related to data protection. In a particular example, a United States company wishing to identify as a safe harbor entity may be required to self-certify to the U.S. Department of Commerce that it adheres to the Safe Harbor principles and to make a public declaration of the adherence.

In particular other embodiments, the system may identify a particular privacy shield arrangement between a first and second location in order to determine an adequacy of a transfer of data from the first location to the second location. In particular, a privacy shield arrangement may facilitate monitoring of an entity's compliance with one or more commitments and enforcement of those commitments under the privacy shield. In particular, an entity entering a privacy shield arrangement may, for example: (1) be obligated to publicly commit to robust protection of any personal data that it handles; (2) be required to establish a clear set of safeguards and transparency mechanisms on who can access the personal data it handles; and/or (3) be required to establish a redress right to address complaints about improper access to the personal data.

In a particular example of a privacy shield, a privacy shield between the United States and Europe may involve, for example: (1) establishment of responsibility by the U.S. Department of Commerce to monitor an entity's compliance (e.g., a company's compliance) with its commitments under the privacy shield; and (2) establishment of responsibility of the Federal Trade Commission having enforcement authority over the commitments. In a further example, the U.S. Department of Commerce may designate an ombudsman to hear complaints from Europeans regarding U.S. surveillance that affects personal data of Europeans.

In some embodiments, the one or more regulations may include a regulation that allows data transfer to a country or entity that participates in a safe harbor and/or privacy shield as discussed herein. The system may, for example, be configured to automatically identify a transfer that is subject to a privacy shield and/or safe harbor as 'low risk.'

In some embodiments, the one or more regulations may include a regulation that a location that is not deemed automatically adequate as a data transfer target (e.g., a location to which data is being transferred) may be deemed adequate by entering one or more contracts (e.g., standard clauses) with an entity that is the source of the transferred data. For example, the system may automatically determine that a particular data transfer is adequate by identifying a contract that exists between a first entity and a second entity, where the first entity is transferring data from a first asset to a second asset associated with the second entity. In various embodiments, the one or more data elements that make up a data model (e.g., for the first data asset) may indicate the existence of any contracts that the first entity has executed related to the transfer of data with one or more other entities. In various embodiments, the system is configured to analyze the one or more contracts to determine whether the one or more contracts apply to a particular data transfer of the one or more transfers identified at Step 3640.

In particular embodiments, the one or more contracts may include one or more third party beneficiary rights to the one or more data subjects whose personal data is subject to transfer. In such embodiments, such contracts may, for example, be enforced by an exporting entity (e.g., the entity that is transferring the data) as well as the data subject themselves.

In particular embodiments, a further method of legitimizing a transfer of data between one or more data assets may include implementing one or more binding corporate rules. In particular embodiments, the one or more binding corporate rules may be approved by a regulating authority. In such embodiments, the one or more regulations referred to in step 3650 may include one or more regulations related to the existence of one or more binding corporate rules (e.g., that have been approved by a regulating authority).

In various embodiments, the one or more binding corporate rules may include a scheme that involves an entity (e.g., corporate group) setting up an internal suite of documents that set out how the entity intends to provide adequate safeguards to individuals whose personal data is being transferred to a second location (e.g., country). In particular embodiments, the one or more binding corporate rules may include one or more safeguards that are no less than those required by the location in which the personal data is originally stored.

At Step 3660, the system continues by generating a visual representation of the one or more data transfers based at least in part on the one or more regulations. The system may, for example, generate a visual representation of a map that includes the plurality of physical locations described above. The system may then indicate, on the visual representation, a location of each of the one or more data systems (e.g., using a suitable marker or indicia). In particular embodiments, the system may color code one or more of the plurality of physical locations based on, for example, an existence of a privacy shield, a prevailing legal requirement for a particular jurisdiction, etc.

In various embodiments, the system may be configured to generate, on the map, a visual representation of a data transfer between at least a first data asset and a second data asset (e.g., where the first and second data asset are in two different physical locations). For example, the system may generate a linear representation of the transfer, or other suitable representation. In particular embodiments, they system is configured to color code the visual representation of the transfer based at least in part on the physical locations, one or more regulations, etc. In still other embodiments, the system is configured to color code the visual representation of the transfer based at least in part on the one or more regulations that the system has determined apply to the transfer (e.g., one or more binding corporate rules, privacy shield, etc.). This may, for example, indicate a legal basis of each particular identified data transfer.

In various embodiments, the system may be configured to substantially automatically flag a particular transfer of data as problematic (e.g., because the transfer does not comply with an applicable regulation). For example, a particular regulation may require data transfers from a first asset to a second asset to be encrypted. The system may determine, based at least in part on the one or more data elements, that the transfer is not encrypted. In response, the system may flag the transfer as High risk (e.g., using a particular color such as red). In various other embodiments, the system may be configured to determine a risk level of a particular transfer based at least in part on the physical location of each of the data assets, the one or more regulations, the type of data being transferred (e.g., whether the data contains personal data), etc.

In particular embodiments, the visual representation may be used by a particular entity to demonstrate compliance with respect to one or more regulations related to the transfer of personal data. In such embodiments, the visual representation may serve as a report that indicates the legal basis of any transfer performed by the entity (e.g., and further serve as documentation of the entity's compliance with one or more legal regulations).

Risk Identification for Cross-Border Data Transfers

In various embodiments, the Cross-Border Visualization Generation System may identify one or more risk associated with a cross-border data transfer. In various embodiments, a data transfer record may be created for each transfer of data between a first asset in a first location and a second asset in a second location where the transfer record may also include information regarding the type of data being transferred, a time of the data transfer, an amount of data being transferred, etc. The system may apply data transfer rules to each data transfer record. The data transfer rules may be configurable to support different privacy frameworks (e.g., a particular data subject type is being transferred from a first asset in the European Union to a second asset outside of the European Union) and organizational frameworks (e.g., to support the different locations and types of data assets within an organization). The applied data transfer rules may be automatically configured by the system (e.g., when an update is applied to privacy rules in a country or region) or manually adjusted by the particular organization (e.g., by a privacy officer of the organization). The data transfer rules to be applied may vary based on the data being transferred. For example, if the data being transferred includes personal data, then particular data transfer rules may be applied (e.g., encryption level requirements, storage time limitations, access restrictions, etc.).

In particular embodiments, the system may perform a data transfer assessment on each data transfer record based on the data transfer rules to be applied to each data transfer record. The data transfer assessment performed by the system may identify risks associated with the data transfer record, and in some embodiments, a risk score may be calculated for the data transfer. For example, a data transfer that contains sensitive data that includes a customer credit card, has a source location in one continent (e.g., at a merchant), and has a destination location in a different continent (e.g., in a database), may have a high risk score because of the transfer of data between two separate continents and the sensitivity of the data being transferred.

The risk score may be calculated in any suitable way, and may include risk factors such as a source location of the data transfer, a destination location of the data transfer, the type of data being transferred, a time of the data transfer, an amount of data being transferred, etc. Additionally, the system may apply weighting factors (e.g., custom weighting factors or automatically determined ones) to the risk factors. Further, in some implementation, the system can include a threshold risk score where a data transfer may be terminated (e.g., automatically) if the data transfer risk score indicates a higher risk than the threshold risk score (e.g., the data transfer risk score being higher than the threshold risk score). When the data transfer risk score indicates a lower risk than the threshold risk score, then the system may process the data transfer. In some implementations, if one or more of the risk factors indicate a heightened risk for the data transfer, then the system can notify an individual associated with the particular organization. For example, the individual associated with the particular organization may enable the data transfer to process, flag the data transfer for further evaluation (e.g., send the data transfer information to another individual for input), or terminate the data transfer, among other actions.

The system may process the data transfer after evaluating the data transfer assessment and/or the risk score for the data transfer. Additionally, in some implementations, the system may initiate the data transfer via a secure terminal or secure link between a computer system of the source location and a computer system of the destination location where the system to prevent interception of the data or unwarranted access to the additional information.

Cross-Border Visualization Generation User Experience

Figure 37:
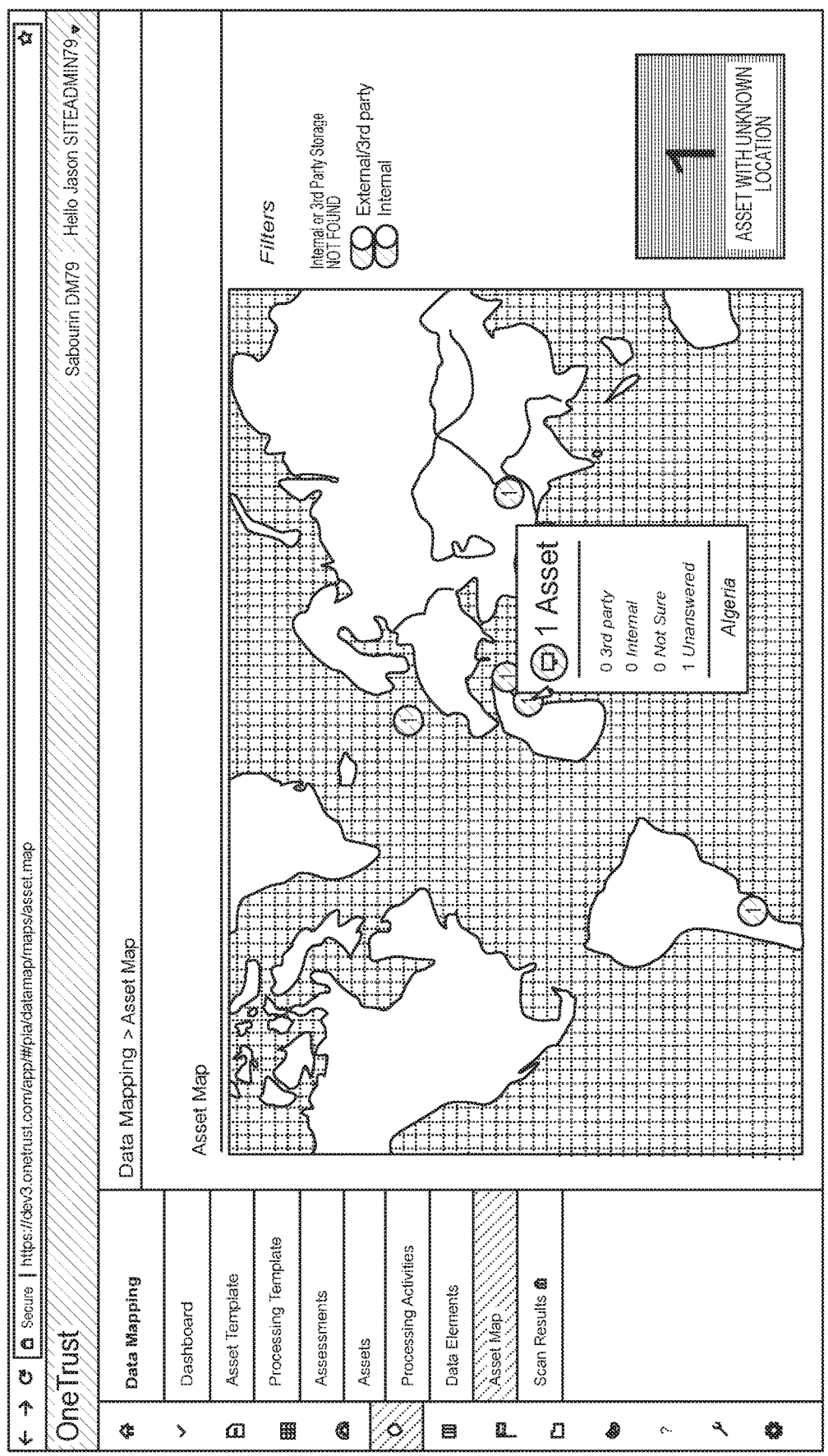
FIGS. 37-38 depict exemplary screen displays and graphical user interfaces (GUIs) according to various embodiments of the system, which may display information associated with the system or enable access to, or interaction with, the system by one or more users (e.g., related to cross-border visualization).
Figure 38:
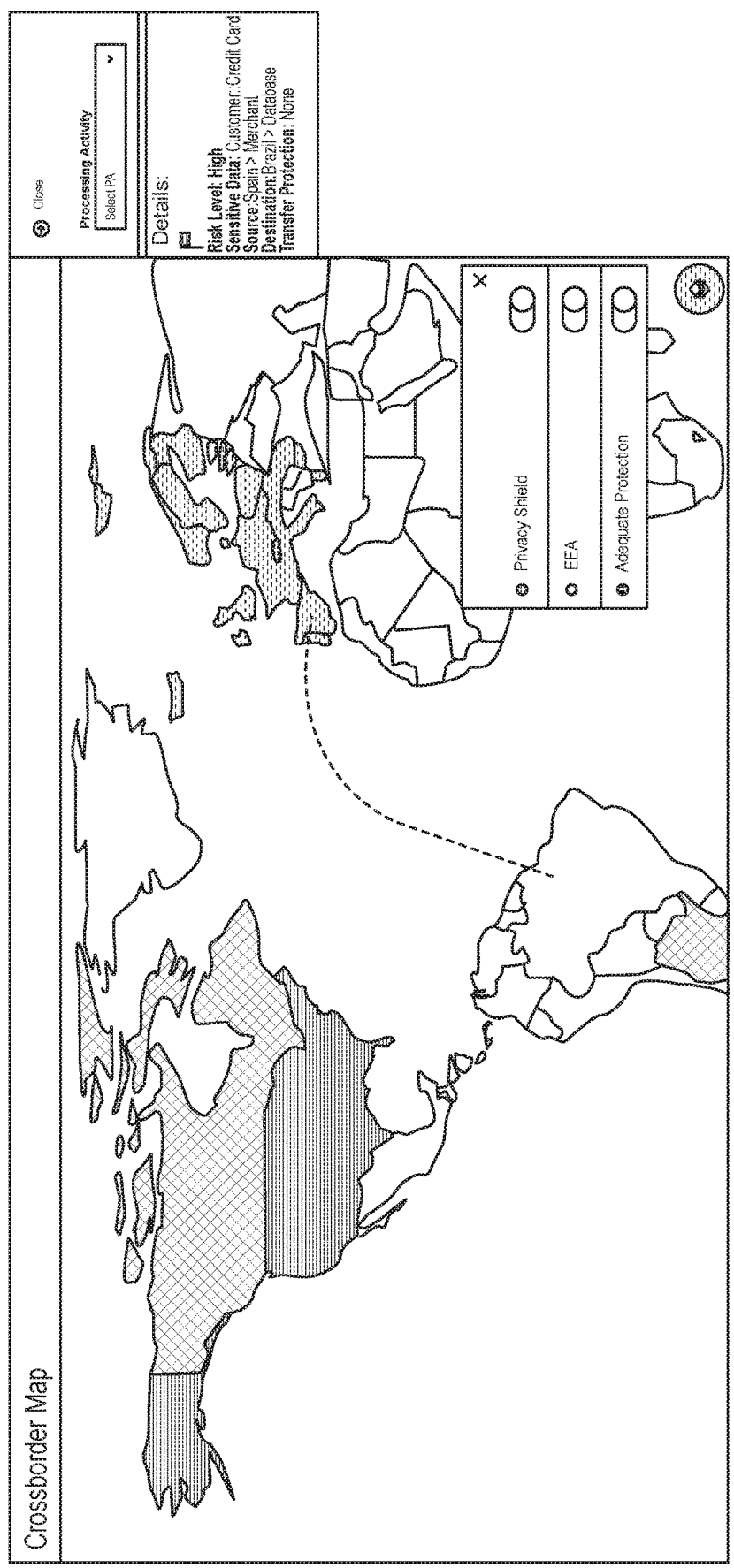

FIGS. 37-38 depict exemplary screen displays that a user may view when reviewing a cross-border visualization generated by the system as described above. As shown in FIG. 37, the system may be configured to generate a visual representation of an asset map (e.g., a data asset map, data system map, etc.). As may be understood from this figure, the system may be configured to generate a map that indicates a location of one or more data assets for a particular entity. In the embodiment shown in this figure, locations that contain a data asset are indicated by circular indicia that contain the number of assets present at that location. In the embodiment shown in this figure, the locations are broken down by country. In particular embodiments, the asset map may distinguish between internal assets (e.g., first party servers, etc.) and external/third party assets (e.g., third party owned servers that the entity utilizes for data storage, transfer, etc.).

In some embodiments, the system is configured to indicate, via the visual representation, whether one or more assets have an unknown location (e.g., because the data model described above may be incomplete with regard to the location). In such embodiments, the system may be configured to: (1) identify the asset with the unknown location; (2) use one or more data mapping techniques described herein to determine the location (e.g., pinging the asset); and (3) update a data model associated with the asset to include the location.

As shown in FIG. 38, the system may be further configured to indicate, via a suitable line or other visual, a transfer of data between a first asset in a first location and a second asset in a second location. As may be understood from this figure, the transfer indicated by the line has a "High" risk level, contains sensitive data that includes a customer credit card, has a source location of Spain (e.g., at a merchant), and has a destination location of Brazil (e.g., in a database). In various other embodiments, the system may generate a visual representation that includes a plurality of transfers between a plurality of asset locations.

Adaptive Execution on a Data Model

In various embodiments, a Data Model Adaptive Execution System may be configured to take one or more suitable actions to remediate an identified risk trigger in view of one or more regulations (e.g., one or more legal regulations, one or more binding corporate rules, etc.). For example, in order to ensure compliance with one or more legal or industry standards related to the collection and/or storage of private information (e.g., personal data), an entity may be required to modify one or more aspects of a way in which the entity collects, stores, and/or otherwise processes personal data (e.g., in response to a change in a legal or other requirement). In order to identify whether a particular change or other risk trigger requires remediation, the system may be configured to assess a relevance of the risk posed by the potential risk trigger and identify one or more processing activities or data assets that may be affected by the risk.

Figure 39:
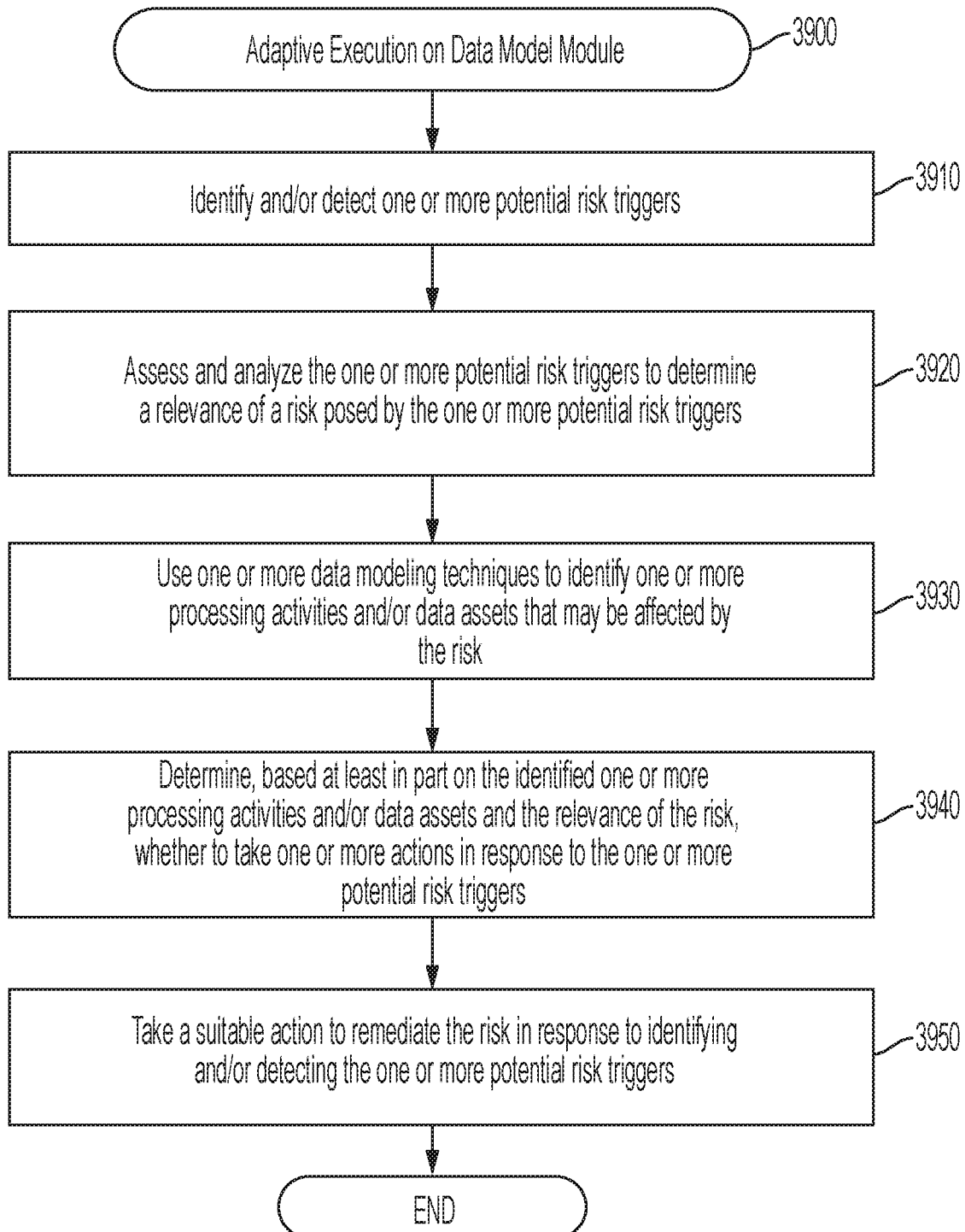
FIG. 39 is a flowchart showing an example of processes performed by an Adaptive Execution on a Data Model Module 3900 according to various embodiments.

Certain functionality of a Data Model Adaptive Execution System may be implemented via an Adaptive Execution on a Data Model Module 3900. A particular embodiment of the Adaptive Execution on a Data Model Module 3900 is shown in FIG. 39. When executing the Adaptive Execution on a Data Model Module 3900, the system may be configured, at Step 3910, to identify and/or detect one or more potential risk triggers. In particular embodiments, the system is configured to identify one or more potential risk triggers in response to receiving a notification of a security breach (e.g., data breach) of one or more data assets (e.g., one or more data assets utilized by a particular organization). For example, in response to receiving an indication that Salesforce (e.g., a customer relationship management platform) has had a data breach, the system may identify one or more potential risk triggers in the form of any data that the system receives from, or processes via Salesforce.

In still other embodiments, the system is configured to identify one or more potential risk triggers in response to determining (e.g., receiving an input or indication) that one or more legal or industry requirements that relate to the collection, storage, and/or processing of personal data have changed. For example, a particular legal regulation related to an amount of time that personal data can be stored, an encryption level required to be applied to personal data, etc. may change. As another example, a safe harbor arrangement (e.g., such as the safe harbor arrangement discussed above) may be determined to be inadequate justification for a transfer of data between a first and second location. In this example, the system may be configured to receive an indication that 'safe harbor' is no longer an adequate justification for data transfer from a first asset in a first location to a second asset in a second location.

Continuing to Step 3920, the system is configured to assess and analyze the one or more potential risk triggers to determine a relevance of a risk posed by the one or more potential risk triggers. The system may, for example, determine whether the one or more potential risk triggers are related to one or more data assets (e.g., one or more data elements of one or more data assets) and/or processing activities associated with a particular entity. When analyzing the one or more potential risk triggers to determine a relevance of a risk posed by the one or more potential risk triggers, the system may be configured to utilize (e.g., use) a formula to determine a risk level of the identified one or more potential risk triggers. The system may, for example, determine the risk level based at least in part on: (1) an amount of personal data affected by the one or more potential risk triggers; (2) a type of personal data affected by the one or more potential risk triggers; (3) a number of data assets affected by the one or more potential risk triggers; and/or (4) any other suitable factor.

For example, in response to identifying a data breach in Salesforce, the system may, for example: (1) determine whether one or more systems associated with the entity utilize Salesforce; and (2) assess the one or more systems utilized by Salesforce to evaluate a risk posed by the data breach. The system may, for example, determine that the entity utilizes Salesforce in order to store customer data such as name, address, contact information, etc. In this example, the system may determine that the Salesforce data breach poses a high risk because the data breach may have resulted in a breach of personal data of the entity's customers (e.g., data subjects).

In still another example, in response to determining that safe harbor is no longer a valid justification for a data transfer between two locations, the system may be configured to: (1) determine whether one or more data transfers involving one or more data assets associated with the particular entity are currently justified via a safe harbor arrangement; and (2) in response to determining that the one or more data transfers are currently justified via a safe harbor arrangement, assessing a risk of the one or more transfers in view of the determined inadequacy of safe harbor as a data transfer justification. In particular embodiments, the system may identify one or more supplemental justifications and determine that the determined inadequacy of safe harbor poses a low risk. In other embodiments, the system may be configured to determine that the determined inadequacy of safe harbor poses a high risk (e.g., because the system is currently performing one or more data transfers that may be in violation of one or more legal, internal, or industry regulations related to data transfer).

Returning to Step 3930, the system is configured to use one or more data modeling techniques to identify one or more processing activities and/or data assets that may be affected by the risk. As discussed above, the system may utilize a particular data model that maps and/or indexes data associated with a particular data asset. The data model may, for example, define one or more data transfers, one or more types of data, etc. that are associated with a particular data asset and/or processing activity. In some embodiments, the system is configured to use the data model to identify one or more data assets and/or processing activities that may be affected by the risk assessed at Step 3920. In various embodiments, the system is configured to identify, using any suitable data modeling technique described herein, one or more pieces of personal data that the system is configured to collect, store, or otherwise process that may be affected by the one or more potential risk triggers.

Next, at Step 3940, the system is configured to determine, based at least in part on the identified one or more processing activities and/or data assets and the relevance of the risk, whether to take one or more actions in response to the one or more potential risk triggers. In particular embodiments, the system may, for example: (1) determine to take one or more actions in response to determining that a calculated risk level is above a threshold risk level; (2) determine to take the one or more actions in response to determining that the one or more potential risk triggers may place the entity in violation of one or more regulations (e.g., legal and/or industry regulations); etc.

In some embodiments, the system may determine whether to take one or more actions based at least in part on input from one or more individuals associated with the entity. The one or more individuals may include, for example, one or more privacy officers, one or more legal representatives, etc.

In particular embodiments, the system is configured to receive input from the one or more individuals, and determine whether to take one or more actions in response to the input.

Continuing to Step 3950, the system is configured to take one or more suitable actions to remediate the risk in response to identifying and/or detecting the one or more potential risk triggers.

In particular embodiments, the one or more actions may include, for example: (1) adjusting one or more data attributes of a particular data asset (e.g., an encryption level of data stored by the data asset, one or more access permissions of data stored by the particular data asset, a source of data stored by the particular data asset, an amount of time the data is stored by a particular asset, etc.); (2) generating a report indicating the risk level and the identified one or more risk triggers; (3) providing the report to one or more individuals (e.g., a privacy officer or other individual); and/or (4) taking any other suitable action, which may, for example, be related to the identified one or more potential risk triggers.

Automatic Risk Remediation Process

In various embodiments, a system may be configured to substantially automatically determine whether to take one or more actions in response to one or more identified risk triggers as discussed above in the context of the Adaptive Execution on a Data Model Module 3900. In particular embodiments, the system is configured to substantially automatically perform one or more steps related to the analysis of and response to the one or more potential risk triggers discussed above. For example, the system may substantially automatically determine a relevance of a risk posed by (e.g., a risk level) the one or more potential risk triggers based at least in part on one or more previously-determined responses to similar risk triggers. This may include, for example, one or more previously determined responses for the particular entity that has identified the current risk trigger, one or more similarly situated entities, or any other suitable entity or potential trigger.

In particular embodiments, the system may, for example, when determining whether to take one or more actions in response to the one or more potential risk triggers (e.g., as discussed above with respect to Step 3940 of the Adaptive Execution on a Data Model Module): (1) compare the potential risk trigger to one or more previous risks triggers experienced by the particular entity at a previous time; (2) identify a similar previous risk trigger (e.g., one or more previous risk triggers related to a similar change in regulation, breach of data, type of issue identified, etc.); (3) determine the relevance of the current risk trigger based at least in part on a determined relevance of the previous risk trigger; and (4) determine whether to take one or more actions to the current risk trigger based at least in part on one or more determined actions to take in response to the previous, similar risk trigger.

Similarly, in particular embodiments, the system may be configured to substantially automatically determine one or more actions to take in response to a current potential risk trigger based on one or more actions taken by one or more similarly situated entities to one or more previous, similar risk triggers. For example, the system may be configured to: (1) compare the potential risk trigger to one or more previous risk triggers experienced by one or more similarly situated entities at a previous time; (2) identify a similar previous risk trigger (e.g., one or more previous risk triggers related to a similar change in regulation, breach of data, and/or type of issue identified, etc. from the one or more previous risk triggers experienced by the one or more similarly-situated entities at the previous time; (3) determine the relevance of the current risk trigger based at least in part on a determined relevance of the previous risk trigger (e.g., a relevance determined by the one or more similarly situated entities); and (4) determine one or more actions to take in response to the current risk trigger based at least in part on one or more previously determined actions to take in response to the previous, similar risk trigger (e.g., one or more determined actions by the one or more similarly situated entities at the previous time).

In various embodiments, the one or more similarly-situated entities may include, for example: (1) one or more other entities in a geographic location similar to a geographic location of the entity that has identified the one or more potential risk triggers (e.g., a similar country, jurisdiction, physical location, etc.); (2) one or more other entities in a similar industry (e.g., banking, manufacturing, electronics, etc.); (3); one or more entities of a similar size (e.g., market capitalization, number of employees, etc.); (4) one or more entities that are governed by one or more similar regulations (e.g., such as any suitable regulation discussed herein); and/or (5) any other suitably similarly situated entity.

In various embodiments, the system is configured to use one or more machine learning techniques to analyze one or more risk levels assigned to previously identified risk triggers, determine a suitable response to similar, currently-identified risk triggers based on previously determined responses, etc.

In particular embodiments, the system may, for example, be configured to: (1) receive risk remediation data for a plurality of identified risk triggers from a plurality of different entities; (2) analyze the risk remediation data to determine a pattern in assigned risk levels and determined response to particular risk triggers; and (3) develop a model based on the risk remediation data for use in facilitating an automatic assessment of and/or response to future identified risk triggers.

In a particular example of a reactive system for automatically determining a suitable action to take in response to an identified risk trigger, the system may take one or more suitable actions in response to identifying a data beach in Salesforce (e.g., as discussed above). In particular embodiments, the system may, for example: (1) substantially automatically identify one or more actions taken by the system in response to a similar data breach of one or more different vendors; and (2) determine a suitable action to take in response to the data breach based on the one or more actions taken in response to the similar data breach. The similar data breach may include, for example, a breach in data of a similar type, or any other similar breach.

In another example, the system may be configured to identify one or more similarly situated entities that have experienced a data breach via Salesforce or other similar vendor. The system, may, for example, be configured to determine a suitable action to take based at least in part on an action taken by such a similar entity to a similar data breach. In still another example, the system may be configured, based on one or more previous determinations related to a data breach by a vendor (e.g., such as by Salesforce) to take no action in response to the identified risk trigger (e.g., because the identified risk may pose no or minimal danger).

Systems and Methods for Automatically Remediating Identified Risks

A data model generation and population system, according to particular embodiments, is configured to generate a data model (e.g., one or more data models) that maps one or more relationships between and/or among a plurality of data assets utilized by a corporation or other entity (e.g., individual, organization, etc.) in the context, for example, of one or more business processes. In particular embodiments, each of the plurality of data assets (e.g., data systems) may include, for example, any entity that collects, processes, contains, and/or transfers data (e.g., such as a software application, "internet of things" computerized device, database, website, data-center, server, etc.). For example, a first data asset may include any software or device (e.g., server or servers) utilized by a particular entity for such data collection, processing, transfer, storage, etc.

In particular embodiments, a system may be configured to generate and maintain one or more disaster recovery plans for particular data assets based on one or more relationships between/among one or more data assets operated and/or utilized by a particular entity.

In various embodiments, a system may be configured to substantially automatically determine whether to take one or more actions in response to one or more identified risk triggers. For example, an identified risk trigger include any suitable risk trigger such as that a data asset for an organization is hosted in only one particular location thereby increasing the scope of risk if the location were infiltrated (e.g., via cybercrime). In particular embodiments, the system is configured to substantially automatically perform one or more steps related to the analysis of and response to the one or more potential risk triggers discussed above. For example, the system may substantially automatically determine a relevance of a risk posed by (e.g., a risk level) the one or more potential risk triggers based at least in part on one or more previously-determined responses to similar risk triggers. This may include, for example, one or more previously determined responses for the particular entity that has identified the current risk trigger, one or more similarly situated entities, or any other suitable entity or potential trigger.

In particular embodiments, the system may, for example, be configured to: (1) receive risk remediation data for a plurality of identified risk triggers from a plurality of different entities; (2) analyze the risk remediation data to determine a pattern in assigned risk levels and determined response to particular risk triggers; and (3) develop a model based on the risk remediation data for use in facilitating an automatic assessment of and/or response to future identified risk triggers.

In some embodiments, in response to a change or update is made to one or more processing activities and/or data assets (e.g., a database associated with a particular organization), the system may use data modeling techniques to update the risk remediation data for use in facilitating an automatic assessment of and/or response to future identified risk triggers. For example, the system may be configured to use a data map and/or data model described herein to, for example: (1) particular systems that may require some remedial action in response to an identified breach/incident for one or more related systems; (2) automatically generate a notification to an individual to update a disaster recovery plan for those systems; and/or (3) automatically generate a disaster recovery plan that includes one or more actions in response to identifying an incident in one or more related systems identified using the data mapping techniques described herein. In various embodiments, in response to modification of a privacy campaign, processing activity, etc. of the particular organization (e.g., add, remove, or update particular information), the system may update the risk remediation data for use in facilitating an automatic assessment of and/or response to future identified risk triggers. For example, the system may be configured to (1) identify one or more changes to one or more relationships between/among particular data assets in response to a change in one or more business processes; and (2) modify (e.g., and/or generate a notification to modify) one or more disaster recovery plans for any affected data assets.

In particular embodiments, the system may, for example, be configured to: (1) access risk remediation data for an entity that identifies one or more suitable actions to remediate a risk in response to identifying one or more data assets of the entity that may be affected by one or more potential risk triggers; (2) receive an indication of an update to the one or more data assets; (3) identify one or more potential updated risk triggers for an entity; (4) assess and analyze the one or more potential updated risk triggers to determine a relevance of a risk posed to the entity by the one or more potential updated risk triggers; (5) use one or more data modeling techniques to identify one or more data assets associated with the entity that may be affected by the risk; and (6) update the risk remediation data to include the one or more actions to remediate the risk in response to identifying the one or more potential updated risk triggers.

Webform Crawling to Map Processing Activities in a Data Model

In particular embodiments, a data mapping system (e.g., such as any suitable data mapping and/or modeling system described herein) may be configured to generate a data model that maps one or more relationships between and/or among a plurality of data assets utilized by a corporation or other entity (e.g., individual, organization, etc.) in the context, for example, of one or more business processes and/or processing activities. In various embodiments, when generating the data model, the system may identify one or more webforms utilized by the system in the collection and processing of personal data and determine one or more particular data assets and/or processing activities that utilize such data. Although in the course of this description, the system is described as crawling (e.g., and/or scanning) one or more webforms, it should be understood that other embodiments may be utilized to scan, crawl or analyze any suitable electronic form in order to map any data input via the electronic form in any suitable manner.

In particular embodiments, the system may be configured to use one or more website scanning tools to, for example: (1) identify a webform (e.g., on a website associated with a particular entity or organization); (2) robotically complete the webform; (3) and analyze the completed webform to determine one or more particular processing activities, and/or business processes, etc. that use one or more pieces of data submitted via the webform.

As may be understood in light of this disclosure, one or more legal and/or industry regulations may require an entity to, for example, maintain a record of one or more processing activities undertaken by the entity that includes: (1) a name and contact details of a controller responsible for the processing activity; (2) a purpose of the processing; (3) a description of one or more categories of data subjects and/or of one or more categories of personal data collected as part of the processing activity; (4) one or more categories of recipients to whom the personal data may be disclosed, including recipients in one or more second countries or other locations; (5) one or more transfers of the personal data to a second country or an international organization; (6) a time limit for erasure of the personal data, if applicable; (7) an identification of one or more security measures taken in the collection and/or storage of the personal data; and/or (8) any other suitable information.

As may be further understood in light of this disclosure, a particular organization may undertake a plurality of different privacy campaigns, processing activities, etc. that involve the collection and storage of personal data. In some embodiments, each of the plurality of different processing activities may collect redundant data (e.g., may collect the same personal data for a particular individual more than once), and may store data and/or redundant data in one or more particular locations (e.g., on one or more different servers, in one or more different databases, etc.). Additionally, one or more sub-organizations (e.g., subgroups) of an organization or entity may initiate a processing activity that involves the collection of personal data without vetting the new processing activity with a privacy compliance officer or other individual within the company tasked with ensuring compliance with one or more prevailing privacy regulations. In this way, a particular organization may collect and store personal data in a plurality of different locations which may include one or more known and/or unknown locations, or may collect personal data for a purpose that is not immediately apparent (e.g., using one or more webforms). As such, it may be desirable for an entity to implement a system that is configured to scan one or more webforms that collect personal data to identify which particular processing activity (e.g., or processing activities) that personal data is utilized in the context of.

Figure 43:
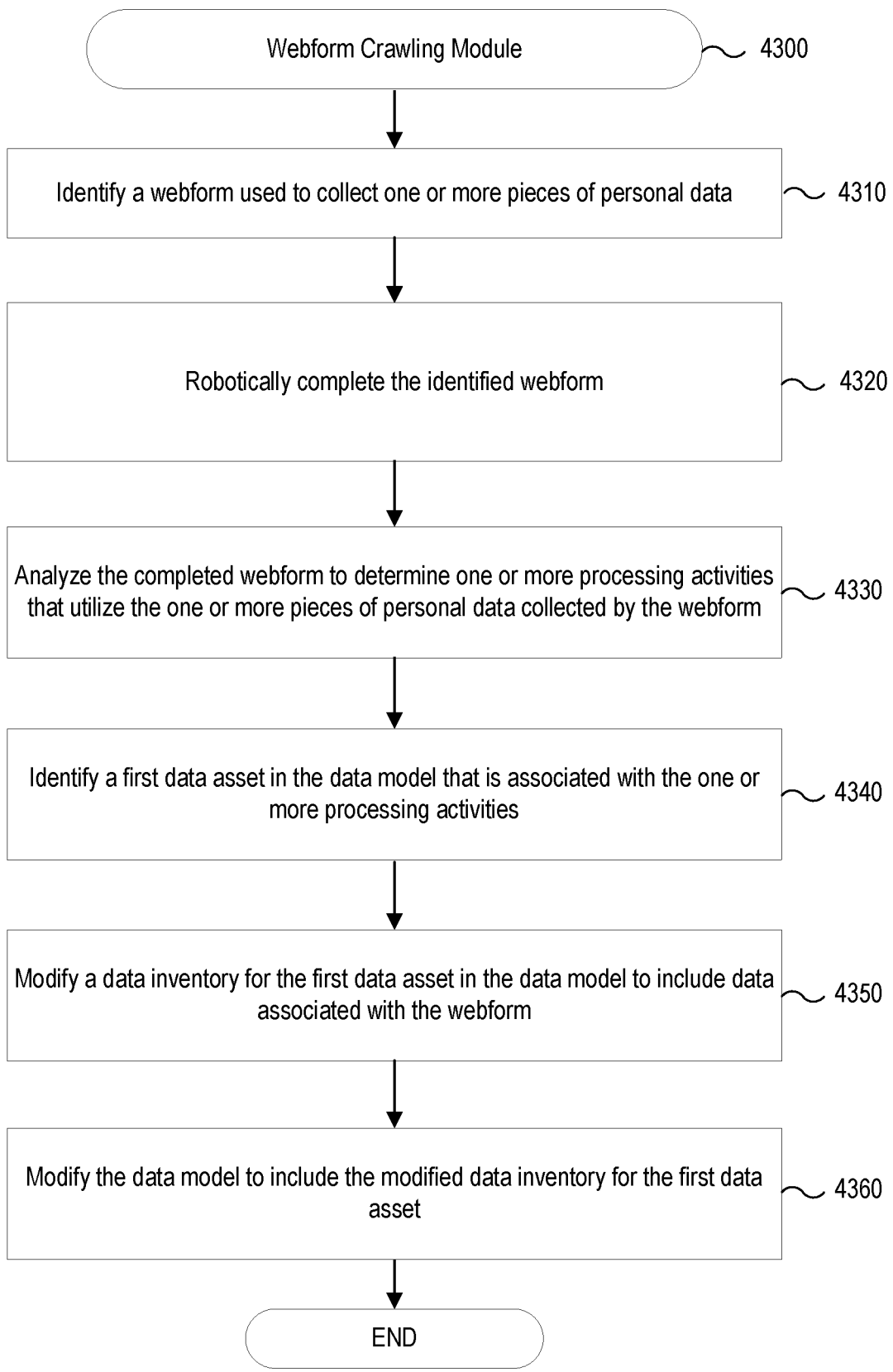
FIG. 43 is a flowchart showing an example of processes performed by a Webform Crawling Module 4300 according to various embodiments.

Various processes are performed by the Data Access Webform Crawling System and may be implemented by a Webform Crawling Module 4300. Referring to FIG. 43, in particular embodiments, the system, when executing the Webform Crawling Module 4300, is configured to: (1) identify a webform used to collect one or more pieces of personal data; (2) robotically complete the identified webform; (3) analyze the completed webform to determine one or more processing activities that utilize the one or more pieces of personal data collected by the webform; (4) identify a first data asset in the data model that is associated with the one or more processing activities; (5) modify a data inventory for the first data asset in the data model to include data associated with the webform; and (6) modify the data model to include the modified data inventory for the first data asset.

When executing the Webform Crawling Module 4300, the system begins, at Step 4310, by identifying a webform used to collect one or more pieces of personal data. The system may use one or more website scanning tools to identify the webform. The webform may be a website associated with a particular entity or organization. For example, the webform may be a "Contact Us" form that is on the particular organization's website or any other type of webform associated with the particular organization. At Step 4320, the system is configured to robotically complete the identified webform. The identified webform may be completed by using a virtual profile that emulates a user profile, and the virtual profile may include an e-mail address. The system may monitor the e-mail account associated with the e-mail address for a confirmation e-mail related to the completion of the identified webform where the system may receive and interact with the confirmation e-mail. Additionally, the system may analyze (e.g., scrape) the confirmation e-mail for the data associated with the webform. The data associated with the webform may identify one or more processing activities and one or more pieces of personal data collected by the webform.

Next, at Step 4330, the system is configured to analyze the completed webform to determine one or more processing activities that utilize the one or more pieces of personal data collected by the webform. In some implementations, the system may analyze one or more pieces of computer code associated with the webform to determine the one or more processing activities that utilize the one or more pieces of personal data collected by the webform. Further, the system may analyze the one or more pieces of computer code to identify a storage location to which the one or more pieces of personal data collected by the webform are routed. At Step 4340, the system is configured to identify a first data asset in the data model that is associated with the one or more processing activities. In some implementations, the system may identify a processing activity based on the storage location of the identified one or more pieces of personal data, and an asset may be associated with a particular storage location.

Continuing to Step 4350, the system is configured to modify a data inventory for the first data asset in the data model to include data associated with the webform. The system may include an indication that the one or more processing activities operate with data included in the first data asset. Additionally, the system may indicate that the one or more pieces of personal data are utilized by the identified one or more processing activities.

At Step 4360, the system continues by modifying the data model to include the modified data inventory for the first data asset. In some implementations, the system may include a mapping of the first data asset to the one or more processing activities that utilize the one more pieces of personal data. The mapping may be based on the analysis of the computer code associated with the webform. Moreover, in some implementations, the system may add the first data asset to a third-party data repository, and the first data asset may include an electronic link to the webform. The third-party repository is further discussed below.

Central Consent Repository

In particular embodiments, any entity (e.g., organization, company, etc.) that collects, stores, processes, etc. personal data may require one or more of: (1) consent from a data subject from whom the personal data is collected and/or processed; and/or (2) a lawful basis for the collection and/or processing of the personal data. In various embodiments, the entity may be required to, for example, demonstrate that a data subject has freely given specific, informed, and unambiguous indication of the data subject's agreement to the processing of his or her personal data for one or more specific purposes (e.g., in the form of a statement or clear affirmative action). As such, in particular embodiments, an organization may be required to demonstrate a lawful basis for each piece of personal data that the organization has collected, processed, and/or stored. In particular, each piece of personal data that an organization or entity has a lawful basis to collect and process may be tied to a particular processing activity undertaken by the organization or entity.

A particular organization may undertake a plurality of different privacy campaigns, processing activities, etc. that involve the collection and storage of personal data. In some embodiments, each of the plurality of different processing activities may collect redundant data (e.g., may collect the same personal data for a particular individual more than once), and may store data and/or redundant data in one or more particular locations (e.g., on one or more different servers, in one or more different databases, etc.). In this way, because of the number of processing activities that an organization may undertake, and the amount of data collected as part of those processing activities over time, one or more data systems associated with an entity or organization may store or continue to store data that is not associated with any particular processing activity (e.g., any particular current processing activity). Under various legal and industry standards related to the collection and storage of personal data, such data may not have or may no longer have a legal basis for the organization or entity to continue to store the data. As such, organizations and entities may require improved systems and methods to maintain an inventory of data assets utilized to process and/or store personal data for which a data subject has provided consent for such storage and/or processing.

In various embodiments, the system is configured to provide a third-party data repository system to facilitate the receipt and centralized storage of personal data for each of a plurality of respective data subjects, as described herein. Additionally, the third-party data repository system is configured to interface with a centralized consent receipt management system.

In various embodiments, the system may be configured to, for example: (1) identify a webform used to collect one or more pieces of personal data, (2) determine a data asset of a plurality of data assets of the organization where input data of the webform is transmitted, (3) add the data asset to the third-party data repository with an electronic link to the webform, (4) in response to a user submitting the webform, create a unique subject identifier to submit to the third-party data repository and the data asset along with the form data provided by the user in the webform, (5) submit the unique subject identifier and the form data provided by the user in the webform to the third-party data repository and the data asset, and (6) digitally store the unique subject identifier and the form data provided by the user in the webform in the third-party data repository and the data asset.

In some embodiments, the system may be further configured to, for example: (1) receive a data subject access request from the user (e.g., a data subject rights' request, a data subject deletion request, etc.), (2) access the third-party data repository to identify the unique subject identifier of the user, (3) determine which data assets of the plurality of data assets of the organization include the unique subject identifier, (4) access personal data of the user stored in each of the data assets of the plurality of data assets of the organization that include the unique subject identifier, and (5) take one or more actions based on the data subject access request (e.g., delete the accessed personal data for a data subject deletion request).

The system may, for example: (1) generate, for each of a plurality of data subjects, a respective unique subject identifier in response to submission, by each data subject, of a particular webform; (2) maintain a database of each respective unique subject identifier; and (3) electronically link each respective unique subject identifier to each of: (A) a webform initially submitted by the user; and (B) one or more data assets that utilize data received from the data subject via the webform.

Figure 44:
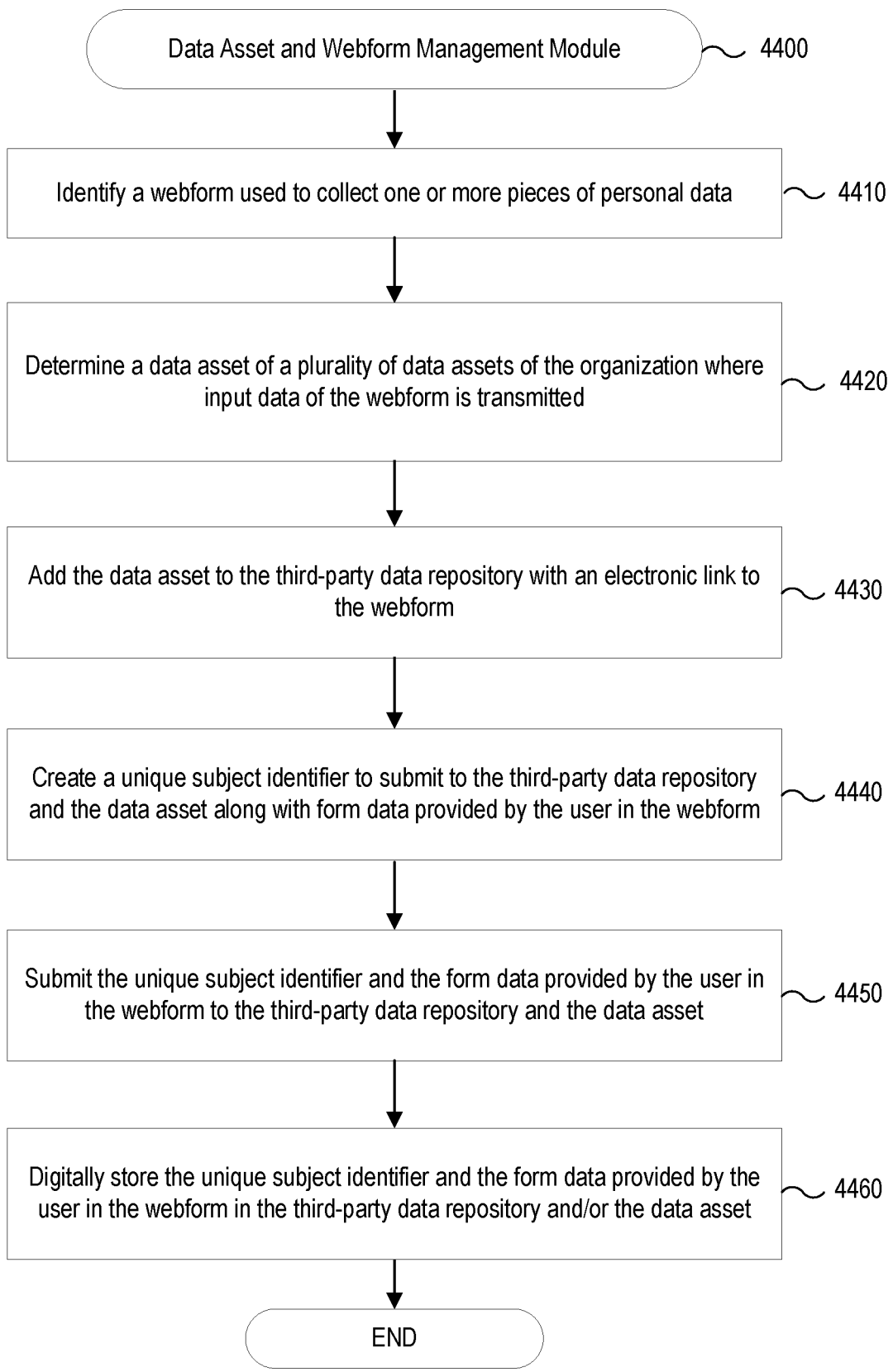
FIG. 44 is a flowchart showing an example of processes performed by a Data Asset and Webform Management Module 4400 according to yet another embodiment.

The Webform Crawling Data System may also implement a Data Asset and Webform Management Module 4400. Referring to FIG. 44, in particular embodiments, the system, when executing the Data Asset and Webform Management Module 4400, is configured for: (1) identifying a webform used to collect one or more pieces of personal data; (2) determining a data asset of a plurality of data assets of the organization where input data of the webform is transmitted; (3) adding the data asset to the third-party data repository with an electronic link to the webform; (4) in response to a user submitting the webform, creating a unique subject identifier to submit to the third-party data repository and the data asset along with form data provided by the user in the webform; (5) submitting the unique subject identifier and the form data provided by the user in the webform to the third-party data repository and the data asset; and (6) digitally storing the unique subject identifier and the form data provided by the user in the webform in the third-party data repository and the data asset.

When executing the Data Asset and Webform Management Module 4400, the system begins, at Step 4410, by identifying a webform used to collect one or more pieces of personal data. In particular embodiments, the system may be configured to use one or more website scanning tools to, for example, identify a webform. The webform may be a website associated with a particular entity or organization. For example, the webform may be a "Contact Us" form that is on the particular organization's website or any other type of webform associated with the particular organization.

At Step 4420, the system is configured to determine a data asset of a plurality of data assets of the organization where input data of the webform is transmitted. The system may perform the determination by identifying where the input data of the webform is transmitted (e.g., Salesforce). Continuing to Step 4430, the system is configured to add the data asset to the third-party data repository with an electronic link to the webform. The system may provide the third-party data repository with a reference to the data asset, or in some implementations, the system may provide the one or more pieces of personal data that were transmitted to the one or more data assets to the third-party repository. The system may associate the electronic link to the webform with the identified data asset that includes the one or more pieces of personal data.

Returning to Step 4440, the system is configured to create a unique subject identifier to submit to the third-party data repository and the data asset along with form data provided by the user in the webform in response to a user submitting the webform. In response to a user inputting form data (e.g., name, address, credit card information, etc.) at the webform and submitting the webform, the system may, based on the link to the webform, create a unique subject identifier to identify the user. The unique subject identifier may be any type of numerical, alphabetical, or any other type of identifier to identify the user.

Continuing to Step 4450, the system is configured to submit the unique subject identifier and the form data provided by the user in the webform to the third-party data repository and the data asset. The system is configured to submit the unique subject identifier to the third-party data repository and the data asset along with the form data. Further, the system may use the unique subject identifier of a user to access and update each of the data assets of the particular organization (i.e., including the other data assets of the particular organization where the form data is not transmitted). For example, in response to a user submitting a data subject access request to delete personal data the particular organization has stored of the user, the system may use the unique subject identifier of the user to access and retrieve the user's personal data stored in all of the data assets (e.g., Salesforce, Eloqua, Marketo, etc.) utilized by the particular organization. At Step 4460, the system continues by digitally storing the unique subject identifier and the form data provided by the user in the webform in the third-party data repository and the data asset.

Further, in some implementations, the system may be configured to receive a data subject access request from the user. The data subject access request may be one or more different types of data subject access requests, and may be, for example, a data subject deletion request or a data subject rights request. Upon the system receiving the data subject access request, the system may be configured to access the third-party data repository to identify the unique subject identifier of the user, determine which data assets of the plurality of data assets of the organization include the unique subject identifier, and access personal data of the user stored in each of the data assets of the plurality of data assets of the organization that include the unique subject identifier. Upon the data subject access request being a data subject deletion request, then the system may delete the accessed personal data of the user stored in each of the data assets of the plurality of data assets of the organization that include the unique subject identifier. When the data subject access request is a data subject rights request, the system may generate a data subject rights request report that includes the accessed personal data of the user stored in each of the data assets of the plurality of data assets of the organization that include the unique subject identifier. Further, the data subject rights request report may be transmitted to the user. In some implementations, the system may transmit the data subject rights request report to the user via a secure electronic link.

Webform Generation User Experience

FIG. 40 depicts an exemplary webform that a particular entity may include on a website for completion by one or more customers or users of the website. As may be understood from FIG. 40, the webform may collect personal data such as, for example: (1) first name; (2) last name; (3) organization name; (4) country of residence; (5) state; (6) phone number; (7) e-mail address; (8) website; and/or (9) any other suitable personal data. As may be further understood from this figure, an entity (e.g., or a system controlled by the entity) may use the webform to collect such personal data as part of one or more processing activities (e.g., e-mail marketing, online surveys, event marketing, etc.). In various embodiments, the system may be configured to scan a particular webform to identify a particular processing activity for which the entity is collecting the personal data.

In various embodiments, the system may, for example: (1) robotically fill out the webform (e.g., using one or more virtual profiles); (2) analyze one or more pieces of computer code associated with the webform (e.g., JavaScript, HTML, etc.); and (3) map one or more business processes that utilize the data collected via the webform based at least in part on the analyzed one or more pieces of computer code. In particular embodiments, a particular entity that utilizes a webform to collect personal data for use in a particular processing activity (e.g., business process) may analyze one or more pieces of computer code associated with the webform to determine: (1) one or more systems associated with the entity to which data entered the webform is routed (e.g., one or more data assets that serve as a destination asset to data entered via the webform); (2) a purpose for the collection of the data entered via the webform (e.g., a processing activity that utilizes the destination asset discussed above; (3) a type of data collected via the webform; and/or (4) any other suitable information related to the collection of data via the webform.

In particular embodiments, a system may be configured to transmit a webform completion confirmation e-mail to a user that completes the webform. In various embodiments, the system may be configured to analyze the e-mail or other message to identify one or more business processes that utilize the data collected by the webform (e.g., by analyzing/scraping one or more contents of the e-mail or other message). The system may then determine a purpose of the data collection and/or an associated processing activity based at least in part on the analysis.

Scanning Electronic Correspondence to Facilitate Automatic Data Subject Access Request Submission In various embodiments, any system described herein may be configured for: (1) analyzing electronic correspondence associated with a data subject (e.g., the emails within one or more email in-boxes associated with the data subject, or a plurality of text messages); (2) based on the analysis, identifying one or more entities (e.g., corporate entities) that that the data subject does not actively do business with (e.g., as evidenced by the fact that the data subject no longer opens emails from the entity, has set up a rule to automatically delete emails received from the entity, has blocked texts from the entity, etc.); (3) in response to identifying the entity as an entity that the data subject no longer does business with, at least substantially automatically generating a data subject access request and, optionally, automatically submitting the data subject access request to the identified entity.

The system may, for example, be configured to determine whether the data subject still uses one or more services from a particular e-mail sender (e.g., service provider) based at least in part on one more determined interactions of the data subject with one or more e-mails, or other electronic correspondence, from the service provider (e.g., whether the data subject reads the e-mail, selects one or more links within the e-mail, deletes the e-mail without reading it, etc.). The system may then substantially automatically generate and/or complete a data subject access request on behalf of the data subject that includes a request to be forgotten (e.g., a request for the entity to delete some or all of the data subject's personal data that the entity is processing).

For purposes of simplicity, various embodiments will now be described in which the system scans a plurality of emails associated with a data subject in order to identify one or more entities that the data subject no longer does business with. However, it should be understood that, in other embodiments, the same or similar techniques may be used in analyzing other types of electronic or other correspondence to identify entities that the data subject no longer does business with. For example, the system may analyze text messages, social media posts, scans of paper mail, or any other correspondence and/or other documents associated with the data subject to determine whether the data subject does business with particular entities. In various embodiments, the system bases this determination on its analysis of multiple different types of electronic correspondence between the data subject and one or more entities (which may include one-way correspondence in which the recipient of a particular correspondence doesn't respond, or two-way correspondence, in which the recipient of the correspondence responds to the correspondence).

Figure 41:
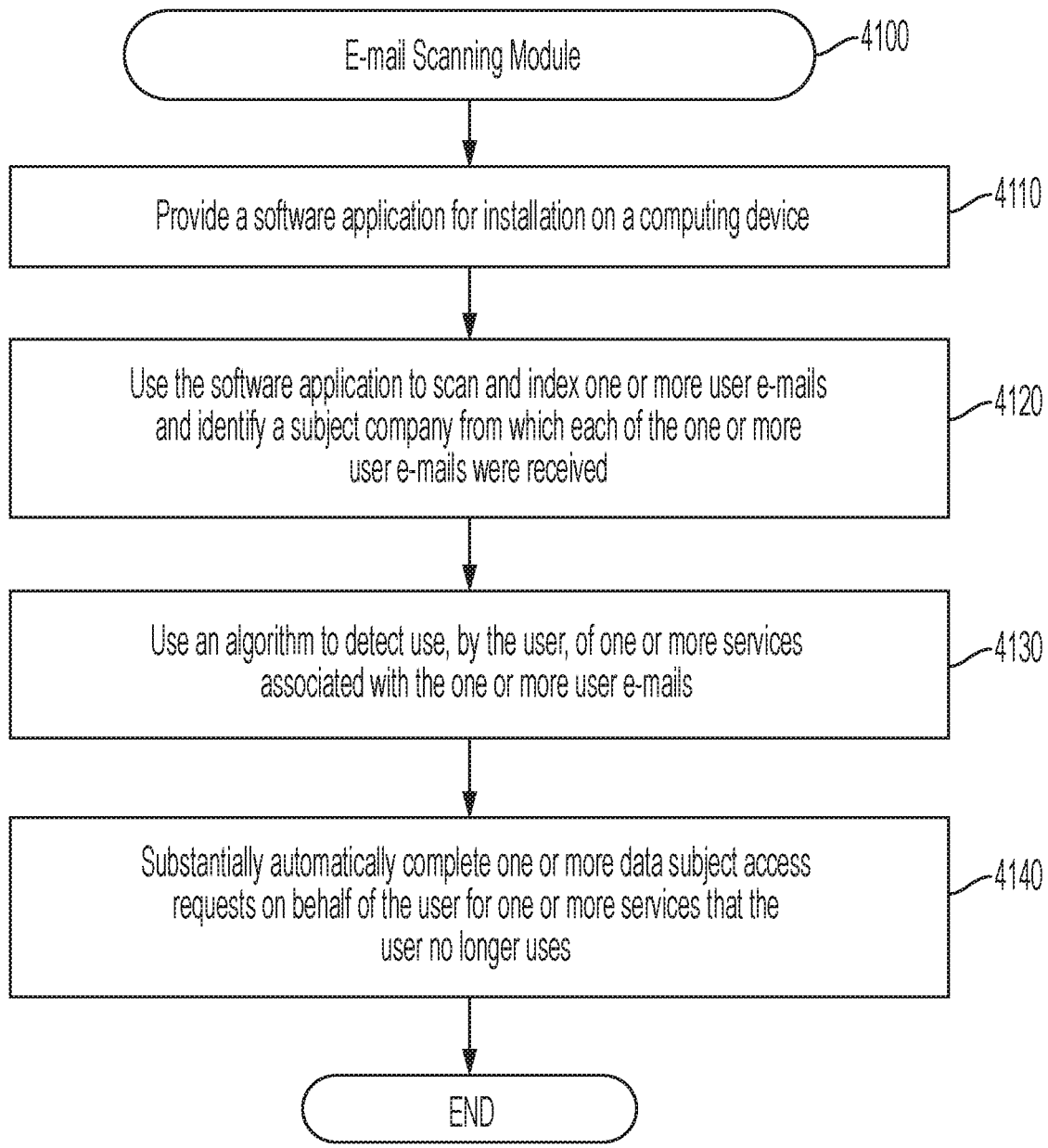
FIG. 41 is a flowchart showing an example of processes performed by an E-mail Scanning Module 4100 according to various embodiments.

In various embodiments, various functions performed by an E-mail Scanning System may be implemented via an E-mail Scanning Module 4100. FIG. 41 depicts an E-mail Scanning Module 4100 according to a particular embodiment, which may be executed, for example, on any of the servers 110, 120, 130, 160 shown in FIG. 1, or on one or more remote computing devices 150. When executing an exemplary E-mail Scanning Module 4100, the system begins, at Step 4110, by providing a software application for installation on a computing device. In particular embodiments, the software application may be configured to integrate with an e-mail service (e.g., Gmail, yahoo, live, Microsoft Exchange, etc.) in order to provide access to a data subject's e-mail (e.g., a data subject's e-mail). In particular embodiments, the software application may be embodied as a software plugin that interfaces with a particular software application (e.g., Microsoft Outlook) in order to provide access to the data subject's e-mail to the systems. In other embodiments, the software application may be embodied as a browser plugin for use with a web browser to provide access to the data subject's web-based e-mail service. In particular embodiments, the system is configured to provide the software application for installation on a data subject's computing device (e.g., mobile computing device, etc.). In such embodiments, the software application may be embodied as a client-side software application that executes one or more of the processes described below on a client computing device (e.g., such as the data subject's computing device on which the data subject accesses his or her e-mails).

In still other embodiments, the system is configured to provide the software application for installation on one or more suitable servers (e.g., one or more suitable servers that host a particular e-mail service). In particular embodiments, for example, the system is configured to: (1) receive authorization from a data subject to access his or her e-mails; and (2) use a software application installed on one or more remote servers to perform one or more of the functions described below. In such embodiments, the system may be configured to provide the software application to the one or more remote servers. In particular other embodiments, the system may be at least partially integrated in one or more remote servers (e.g., via a direct server integration). In such embodiments, the system may be at least partially integrated with one or more remote e-mail servers (e.g., one or more remote servers that store and/or process a data subject's emails).

Returning to Step 4120, the system is configured to use the software application to scan and optionally index one or more data subject e-mails, and then analyze information derived from the emails to identify a subject entity (e.g., corporate or non-corporate entity) from which each of the one or more data subject e-mails was received by a data subject. The system may, for example, be configured to scan and/or index the data subject's emails to identify one or more subject entities as the sender of the emails. In particular embodiments, the one or more subject entities may include one or more subject entities (e.g., corporate entities) that would be required to respond to a data subject access request, if received from the data subject. For example, the one or more subject entities may include any subject company that collects, stores, or otherwise processes the data subject's personal data. The system may, for example, be configured to identify particular e-mails of the data subject's indexed e-mails that were received from any suitable entity (e.g., Target, Home Depot, etc.). The system may, for example, scan an e-mail's subject field, body, sender, etc. to identify, for example: (1) a name of the subject company; (2) an e-mail domain associated with the subject company; and/or (3) any other suitable information which may identify the subject entity as the sender of the e-mail.

In some embodiments, the system may be configured to identify e-mail messages from a subject entity based at least in part on an email mailbox in which the messages are located in the data subject's e-mail account. For example, the data subject's e-mail account may already pre-sort incoming messages into one or more categories (e.g., which may include, for example, a promotions category, a junk category, etc.). In such embodiments, the system may be configured to limit the one or more e-mails that the system scans and/or indexes to e-mails that have been identified as promotional in nature (or that have been placed into any other pre-defined category, such as Spam) by the data subject's e-mail service.

Continuing to Step 4130, the system is configured to use an algorithm to determine whether the data subject actively does business with the entity. In particular embodiments, the system is configured to make this determination based at least in part on (e.g., partially or entirely on): (1) whether the data subject opens any of the one or more e-mails received from the subject company; (2) how long the data subject spends reviewing one or more of the e-mails that the data subject does open from the subject company; (3) whether the data subject deletes one or more of the e-mails from the subject company without reading them; (4) what portion (e.g., percentage) of e-mails received from the subject company the data subject opens; (5) whether the data subject selects one or more links contained in one or more e-mails received from the subject company; (6) how much time the data subject spends viewing a website to which a link is provided in the one or more e-mails from the subject company; (7) whether the data subject has set up a rule (e.g., a software-based rule) to auto-delete or block emails from the subject company; (8) whether the data subject has set up a rule (e.g., a software-based rule) to redirect emails received from the subject company to a specific folder or other location (e.g., a folder designated for commercial correspondence, or a folder designated for unwanted correspondence); (9) whether the data subject has submitted a request to the particular entity for the particular entity not to send emails to the data subject; (10) whether the data subject has submitted a request to the particular entity for the particular entity not to send text messages to the data subject; (11) whether the data subject has submitted a request to the particular entity for the particular entity not to call the data subject; and/or (12) any other suitable information related to the data subject's use of one or more services, or purchase of goods, related to the one or more e-mails or other electronic correspondence received by the data subject from the subject company. In particular embodiments, the system is configured to automatically (e.g., using one or more computer processors) determine the information of any of the items listed above (e.g., whether the data subject has set up a rule to redirect emails received from the subject company to a specific folder) using any suitable technique.

As noted above, the system may, in addition, or alternatively, make the determination described above by analyzing electronic correspondence other than emails, such as texts, social media postings, etc. that involve the data subject and the entity. For example, the system may determine that the data subject no longer actively does business with a particular entity if the data subject configures software (e.g., messaging software on the data subject's smartphone) to block texts from the particular entity.

In various embodiments, the system is configured to utilize an algorithm that takes into account one or more of the various factors discussed above to determine whether the data subject still actively does business with the subject entity (e.g., and therefore would likely be interested in continuing to receive e-mails from the subject company). In doing so, the system may assign any appropriate value to each of the factors in determining whether to determine that the data subject no longer does business with the subject entity. Similarly, the system may allow the calculation to be customized by allowing users to assign weighting factors to each particular variable.

As a simple example, the system may use the following formula to determine whether the data subject does business with a particular entity:

Data Subject Disengagement Rating=(Emails Opened Value)+(Texts Read Value)+(Emails Automatically Deleted Value)+(Texts Blocked Value)

In a particular example, the system is configured to determine that the data subject no longer actively does business with the entity if the Data Subject Disengagement Rating is above 80. In this example, the system may assign: (1) a value of 80 to the Emails Read Value if the data subject opens fewer than 5% of emails received from the from the entity; (2) a value of 50 to the Emails Read Value if the data subject opens between 5%-25% of emails received from the entity; and (3) a value of 0 to the Emails Read Value if the data subject opens over 25% of emails received from the from the entity. The system may assign similar values to the other variables based on the user's other email and text related activities. For example, the system may assign a value of 100 to Text Blocked Value if the data subject has actively blocked (e.g., via software instructions) texts from the entity, and a value of 0 to Text Blocked Value if the data subject has not actively blocked texts from the entity. Similarly, the system may assign a value of 100 to Emails Automatically Deleted Value if the data subject has set software to automatically delete (e.g., immediately delete or route to a junk folder) emails from the entity, and a value of 0 to Emails Automatically Deleted Value if the data subject has not initiated such a setting.

As noted above, the system may allow users to customize the calculation above by assigning a weighting value to any of the values included in the Data Subject Disengagement Rating calculation. For example, the system may allow the user to assign a weighting value of 1.2 to Emails Opened Value if that particular user believes that this factor should be weighted 20% higher than usual in the calculation.

In various embodiments, the system is configured to, in response to determining that the data subject no longer actively does business with the entity, automatically generate, populate, and/or submit a data subject access request to the entity. In various embodiments, the data subject access request may include: (1) a request to delete some or all of the data subject's personal data that is being processed by the entity (e.g., in the form of a "right to be forgotten" request); (2) a request to rectify inaccurate personal data of the data subject that is being processed by the entity; (3) a request to access of a copy of personal information of the data subject processed by the entity; (4) a request to restrict the processing of the data subject's data by the entity; and/or (5) a request to transfer the data subject's data from the entity to a specified controller.

As a particular example, the system may generate a focused request to have the entity delete all of the data subject's personal data that the entity is processing in conjunction with a particular service offered by the entity. For example, at Step 4140, the system is configured to substantially automatically complete one or more data subject access requests on behalf of the data subject for one or more services that the data subject no longer uses.

Figure 42:
FIG. 42 depicts an exemplary screen display and graphical user interface (GUI) according to various embodiments of the system, which may display information associated with the system or enable access to, or interaction with, the system by one or more users.

FIG. 42 depicts an exemplary data subject access request form that the system may substantially automatically generate, complete and/or submit for the data subject on the data subject's behalf. As shown in this figure, the system may complete information such as, for example: (1) what type of requestor the data subject is (e.g., employee, customer, etc.); (2) what the request involves (e.g., deleting data, etc.); (3) the requestor's first name; (4) the requestor's last name; (5) the requestor's email address; (6) the requestor's telephone number; (7) the requestor's home address; and/or (8) one or more details associated with the request. In particular embodiments, the system is configured to use an index of information about a particular entity or service to automate filling out the data subject access request.

In various embodiments, the system may receive at least some data from the data subject in order to complete the data subject access request. In other embodiments, the system is configured to scan one or more e-mails from the subject company to obtain one or more particular pieces of information for use in filling out the data subject access request (e.g., by identifying a shipping address in a particular e-mail, billing address, first name, last name, and/or phone number of the data subject from a previous order that the data subject placed with the subject company, etc.). In particular embodiments, the system may automatically identify all of the information needed to populate the data subject access request by identifying the information from within one or more individual electronic correspondence associated with the data subject (e.g., one or more texts or emails from the entity to the data subject).

In particular embodiments, the system may be configured to send a message to the data subject (e.g., via e-mail) prior to automatically completing the data subject access request. The message may, for example, require the data subject to confirm that the data subject would like the system to complete the request on the data subject's behalf. In various embodiments, in response to the data subject confirming that the data subject would like the system to complete the request, the system automatically populates the request and submits the request to the entity on the data subject's behalf.

In other embodiments, the system may automatically submit the request without explicit authorization from the data subject (e.g., the data subject may have provided a blanket authorization for submitting such requests when configuring the system's settings.)

In some embodiments, the Email Scanning System may comprise a third party system that is independent from the one or more subject entities. In such embodiments, the Email Scanning System may be implemented as part of a service for data subjects who may desire to exercise one or more privacy rights, but who aren't necessarily aware of which companies may be storing or processing their personal data, or who don't want to spend the time to submit data subject access requests manually. Similarly, various embodiments of the system may be implemented as part of a service that advantageously provides a data subject with an automated way of submitting data subject access requests to subject companies whose services the data subject no longer uses.

In still other embodiments, the system may be provided by a subject entity (e.g., company) for use by data subjects. Because subject companies are subject to requirements (e.g., in the form of laws and regulations) related to the storage and processing of personal data, it may benefit the subject company to no longer burden itself with storing or processing data related to a data subject that is no longer purchasing the subject entity's goods or utilizing the subject entity's services (e.g., that is no longer actively engaged with the entity). In such embodiments, the system may be configured to: (1) substantially automatically submit the data subject access request; and (2) respond to and fulfill the data subject access request (e.g., the same system or related systems utilized by a particular subject entity may be configured to both submit and fulfill the data subject access request). In other embodiments, the subject entity may unilaterally modify (e.g., edit or delete) the data subject's personal data within one or more of its systems in response to determining that the data subject does not actively do business with the subject entity.

In particular embodiments for example, in response to the system submitting a request to delete the data subject's personal data from a subject entity's systems, the system may: (1) automatically determine where the data subject's personal data, which is processed by the subject entity, is stored; and (2) in response to determining the location of the data (e.g., which may be on multiple computing systems), automatically facilitate the deletion of the data subject's personal data from the various systems (e.g., by automatically assigning one or more tasks to delete data across one or more computer systems to effectively delete the data subject's personal data from the systems). In particular embodiments, the step of facilitating the deletion of the personal data may comprise, for example: (1) overwriting the data in memory; (2) marking the data for overwrite; (2) marking the data as free (e.g., and deleting a directory entry associated with the data); and/or (3) any other suitable technique for deleting the personal data. In particular embodiments, as part of this process, the system uses an appropriate data model (see discussion above) to efficiently determine where all of the data subject's personal data is stored.

Exemplary Data Subject Access Request Processing System Architecture

Figure 45:
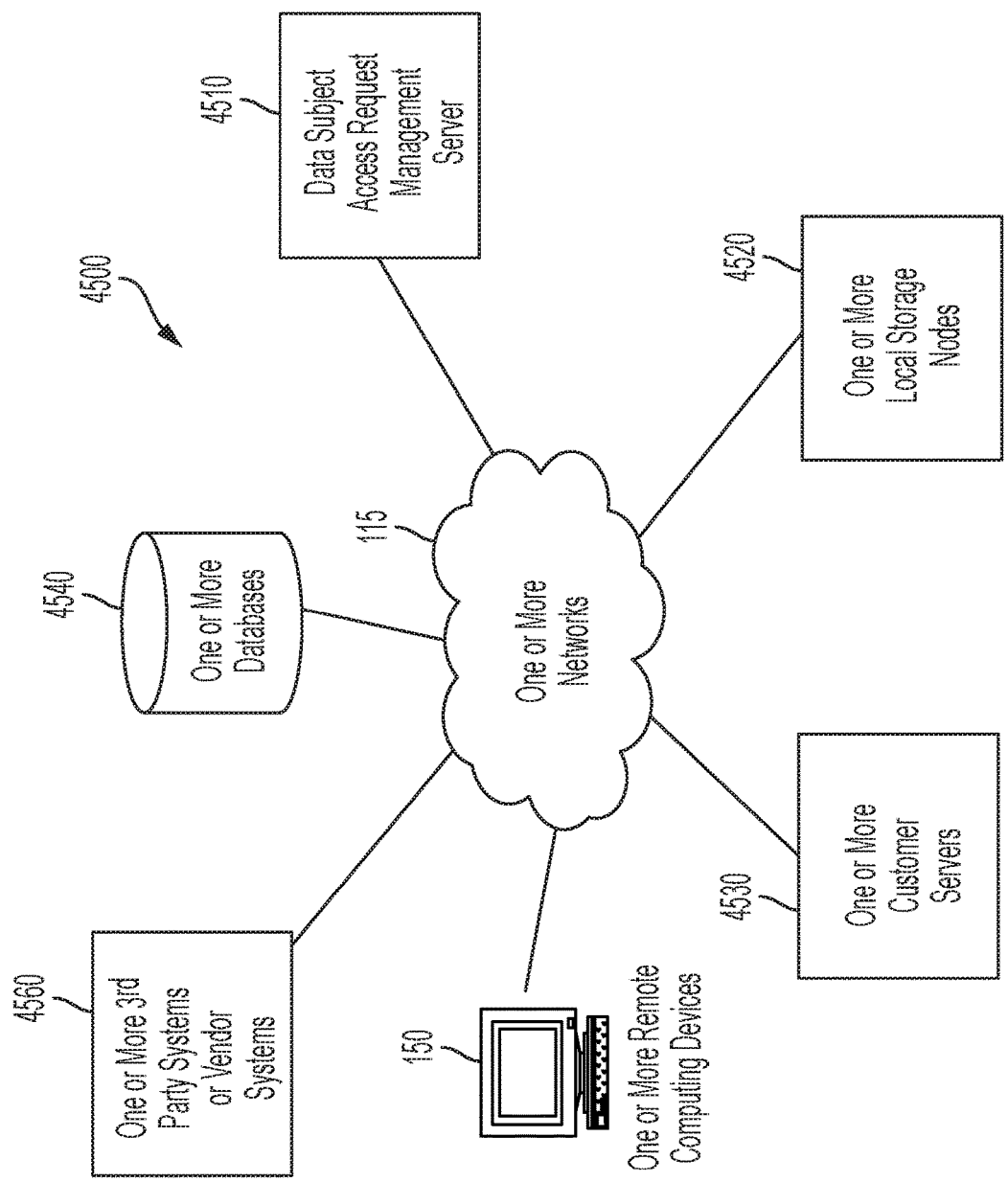
FIG. 45 depicts a data subject access request processing system according to particular embodiments.

FIG. 45 is a block diagram of a Data Subject Access Request Processing System 4500 according to a particular embodiment. In various embodiments, the Data Subject Access Request Processing System 4500 is part of a privacy compliance system (also referred to as a privacy management system), or other system, which may, for example, be associated with a particular organization and be configured to aid in compliance with one or more legal or industry regulations related to the collection and storage of personal data. In some embodiments, the Data Subject Access Request Processing System 4500 is configured to: (1) receive a data subject access request from a data subject, the data subject access request comprising one or more requests related to the one or more rights described herein (e.g., a request for a copy of the data subject's personal data, a request regarding how long personal data associated with the data subject is being stored by the system, etc.); (2) process the request in any suitable manner described herein; (3) fulfill the request based at least in part on one or more request parameters; (4) store one or more pieces of metadata associated with the processing of, fulfilment of, and/or response to the request; and/or (5) archive one or more pieces of data associated with the request based on one or more data retention rules.

Figure 47:
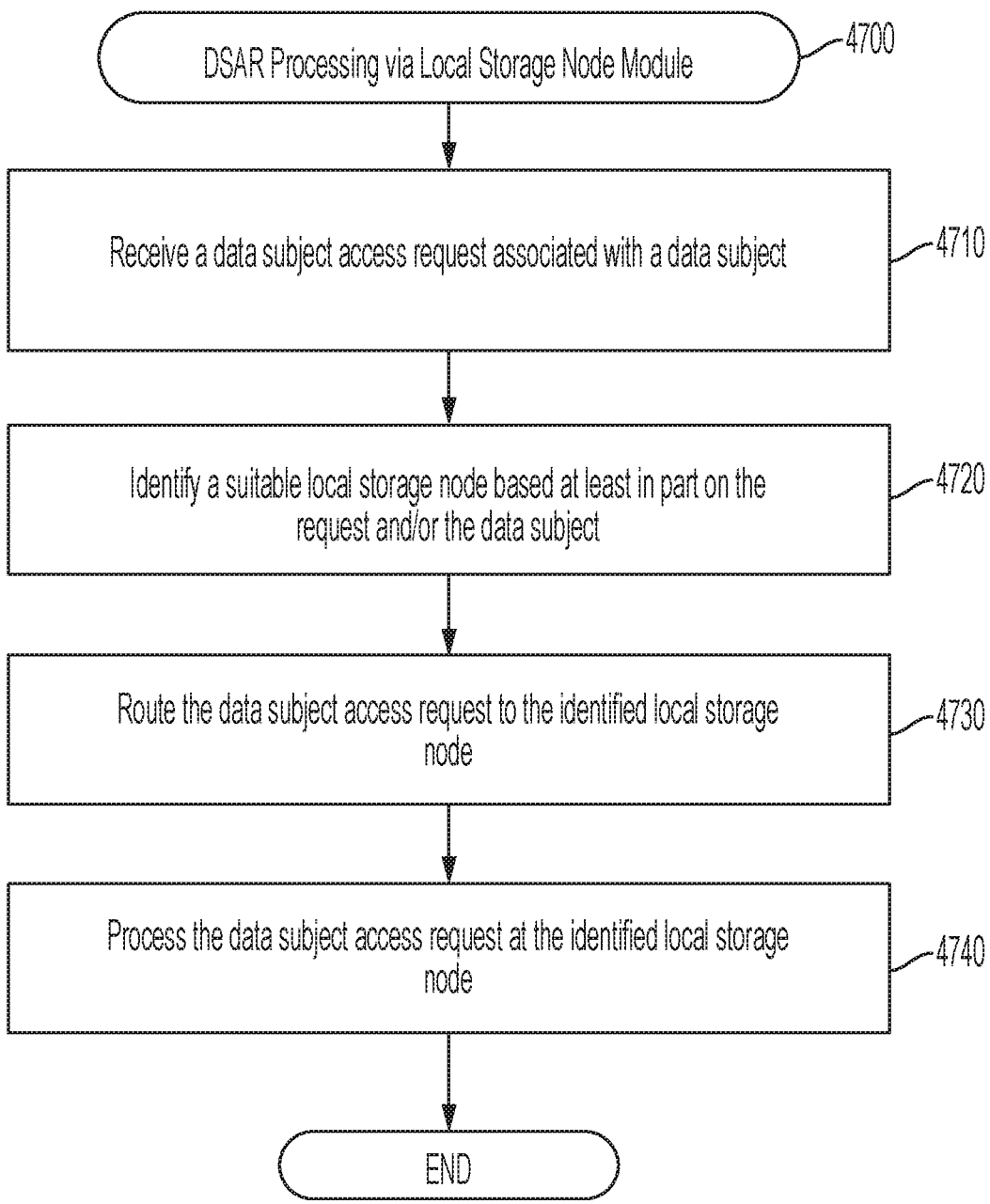
FIG. 47 is a flowchart showing an example of steps performed by a Data Subject Access Request (DSAR) Processing via Local Storage Node Module 4700 according to particular embodiments.

As may be understood from FIG. 47, the Data Subject Access Request Processing System 4500 includes one or more computer networks 115, a Data Subject Access Request Management Server 4510, One or More Local Storage Nodes 4520, One or More Customer Servers 4530, One or More Databases 140 or other data structures, one or more remote computing devices 150 (e.g., a desktop computer, laptop computer, tablet computer, smartphone, etc.), and One or More 3rd Party Systems or Vendor Systems 4560. In particular embodiments, the one or more computer networks 115 facilitate communication between the Data Subject Access Request Management Server 4510, One or More Local Storage Nodes 4520, One or More Customer Servers 4530, One or More Databases 140 or other data structures, and one or more remote computing devices 150. Although in the embodiment shown in FIG. 45, the Data Subject Access Request Management Server 4510, One or More Local Storage Nodes 4520, One or More Customer Servers 4530, One or More Databases 140 or other data structures, and one or more remote computing devices 150 are shown as separate servers (e.g., and/or computing devices), it should be understood that in other embodiments, one or more of these servers and/or computing devices may comprise a single server, a plurality of servers, one or more cloud-based servers, or any other suitable configuration.

In various embodiments, the one or more local storage nodes 4520 may comprise, for example, one or more physical servers (e.g., each having one or more hard disk drives, solid state drives, or other data storage devices) that are each located in a particular respective physical location. In some embodiments, a particular storage node may comprise one or more virtual machines (e.g., and/or one or more virtual LANs) having access to one or more hard disk drives and/or solid-state drives (e.g., or combinations thereof). In still other embodiments, the one or more local storage nodes 4520 may comprise a collection of storage nodes, which may, for example, be clustered together and managed (e.g., through software) as a single pool of storage. In various embodiments, a single pool of storage made up of one or more local storage nodes may have a particular defined location (e.g., geographic location, region, country, jurisdiction, etc.).

The one or more computer networks 115 may include any of a variety of types of wired or wireless computer networks such as the Internet, a private intranet, a public switch telephone network (PSTN), or any other type of network. The communication link between the Data Subject Access Request Management Server 4510 and the One or More Local Storage Nodes 4520 may be, for example, implemented via a Local Area Network (LAN) or via the Internet. In other embodiments, the One or More Databases 140 may be stored either fully or partially on any suitable server or combination of servers described herein.

Figure 46:
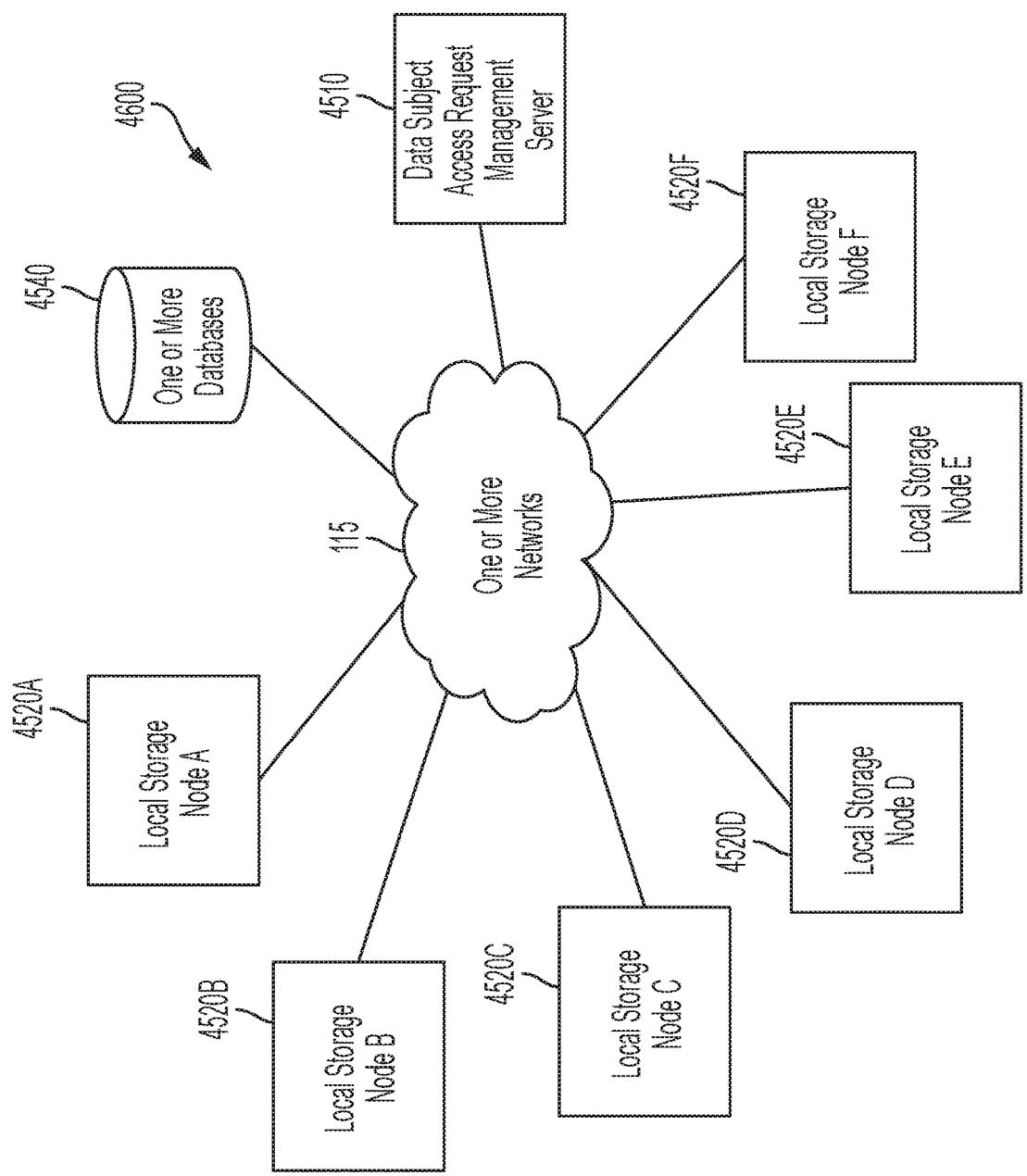
FIG. 46 depicts a data subject access request processing system according to yet another embodiment.

FIG. 46 is a block diagram of a Data Subject Access Request Processing System 4600 according to another embodiment of the system. In the embodiment shown in this figure, the Data Subject Access Request Processing System 4500 includes one or more computer networks 115, a Data Subject Access Request Management Server 4510, a plurality of Local Storage Nodes 4520A-F, One or More Databases 140 or other data structures, and one or more remote computing devices 150 (e.g., a desktop computer, laptop computer, tablet computer, smartphone, etc.). As may be understood in light of this disclosure, each of the plurality of Local Storage Nodes 4520A-F may be disposed in a distinct location (e.g., a distinct jurisdiction, country, geographic area, etc.) and configured to communicate with the Data Subject Access Request Management Server 4510. In various embodiments, the system is configured to route a data subject access request received at the Data Subject Access Request Management Server 4510 to a suitable, identified local storage node of the plurality of Local Storage Nodes 4520A-F (e.g., Local Storage Node C 4520C).

Exemplary Data Subject Access Request Processing System Platform

Various embodiments of a Data Subject Access Request Processing System 4500 (e.g., and/or 4600) may be implemented in the context of any suitable system (e.g., a privacy compliance system). For example, the Data Subject Access Request Processing System 4500 may be implemented to facilitate processing of one or more data subject access requests from one or more data subjects. In particular embodiments, the system may implement one or more modules in order to at least partially ensure compliance with one or more regulations (e.g., legal requirements) related to the collection and/or storage of personal data. Various aspects of the system's functionality may be executed by certain system modules, including a Data Subject Access Request (DSAR) Processing via Local Storage Node Module 4700 and a Personally Identifiable Information Archiving Module 5000. These modules are discussed in greater detail below.

Although the system may be configured to execute the functions described in the modules as a series of steps, it should be understood in light of this disclosure that various embodiments of the Data Subject Access Request (DSAR) Processing via Local Storage Node Module 4700 and Personally Identifiable Information Archiving Module 5000 described herein may perform the steps described below in an order other than in which they are presented. In still other embodiments, the Data Subject Access Request (DSAR) Processing via Local Storage Node Module 4700 and Personally Identifiable Information Archiving Module 5000 may omit certain steps described below. In various other embodiments, the Data Subject Access Request (DSAR) Processing via Local Storage Node Module 4700 and Personally Identifiable Information Archiving Module 5000 may perform steps in addition to those described (e.g., such as one or more steps described with respect to one or more other modules, etc.).

DSAR Processing via Local Storage Node Module

Turning to FIG. 47, when executing the DSAR Processing via Local Storage Node Module 4700, the system is configured to receive a data subject access request, identify a suitable local storage node based at least in part on the request or a data subject associated with the request, route the request to the identified storage node, and process the request. In various embodiments, an organization, corporation, etc. may be required to provide information requested by an individual for whom the organization stores personal data within a certain time period (e.g., 30 days). As a particular example, an organization may be required to provide an individual with a listing of, for example: (1) any personal data that the organization is processing for an individual, (2) an explanation of the categories of data being processed and the purpose of such processing; and/or (3) categories of third parties to whom the data may be disclosed.

Various privacy and security policies (e.g., such as the European Union's General Data Protection Regulation, and other such policies) may provide data subjects (e.g., individuals, organizations, or other entities) with certain rights related to the data subject's personal data that is collected, stored, or otherwise processed by an organization. These rights may include, for example: (1) a right to obtain confirmation of whether a particular organization is processing their personal data; (2) a right to obtain information about the purpose of the processing (e.g., one or more reasons for which the personal data was collected); (3) a right to obtain information about one or more categories of data being processed (e.g., what type of personal data is being collected, stored, etc.); (4) a right to obtain information about one or more categories of recipients with whom their personal data may be shared (e.g., both internally within the organization or externally); (5) a right to obtain information about a time period for which their personal data will be stored (e.g., or one or more criteria used to determine that time period); (6) a right to obtain a copy of any personal data being processed (e.g., a right to receive a copy of their personal data in a commonly used, machine-readable format); (7) a right to request erasure (e.g., the right to be forgotten), rectification (e.g., correction or deletion of inaccurate data), or restriction of processing of their personal data; and (8) any other suitable rights related to the collection, storage, and/or processing of their personal data (e.g., which may be provided by law, policy, industry or organizational practice, etc.).

As may be understood in light of this disclosure, a particular organization may undertake a plurality of different privacy campaigns, processing activities, etc. that involve the collection and storage of personal data. In some embodiments, each of the plurality of different processing activities may collect redundant data (e.g., may collect the same personal data for a particular individual more than once), and may store data and/or redundant data in one or more particular locations (e.g., on one or more different servers; in one or more different databases; across a plurality of different jurisdictions, countries, geographic locations; etc.). In this way, a particular organization may store personal data in a plurality of different locations which may include one or more known and/or unknown locations. As such, complying with particular privacy and security policies related to personal data (e.g., such as responding to one or more requests by data subjects related to their personal data) may be particularly difficult (e.g., in terms of cost, time, etc.). Additionally, receiving and processing a data subject access request may include the collection and processing of personal data associated with a data subject in order to facilitate a fulfilment of the request.

In various embodiments, as shown in FIG. 47, when executing the DSAR Processing via Local Storage Node Module 4700, the system begins, at Step 4710, by receiving a data subject access request associated with a data subject. In various embodiments, the system receives the request via a suitable web form. In certain embodiments, the request comprises a particular request to perform one or more actions with any personal data stored by a particular organization regarding the requestor. For example, in some embodiments, the request may include a request to view one or more pieces of personal data stored by the system regarding the requestor. In other embodiments, the request may include a request to delete one or more pieces of personal data stored by the system regarding the requestor. In still other embodiments, the request may include a request to update one or more pieces of personal data stored by the system regarding the requestor. In still other embodiments, the request may include a request based on any suitable right afforded to a data subject, such as those discussed above.

In particular embodiments, the system is configured to receive the request from the One or More Remote Computing Devices 150 at the Data Subject Access Request Management Server 4510 via One or More Networks 115 as may be understood from FIG. 45. In some embodiments, the system may receive the request from the data subject. In other embodiments, the system may receive the request from one or more individuals on behalf of the data subject (e.g., a legal guardian of the data subject or other individual authorized to make the request on the data subject's behalf).

Continuing to Step 4720, the system is configured to identify a suitable local storage node based at least in part on the request and/or the data subject. For example, the system may be configured to identify the suitable local storage node (e.g., suitable one or more local storage nodes) based at least in part on: (1) a jurisdiction in which the data subject resides; (2) a country in which the data subject resides; (3) a jurisdiction from which the data subject made the request; (4) a country from which the data subject made the request; (5) a particular geographic area in which the data subject resides or made the request; (6) a proximity of one or more potential local storage nodes to the data subject (e.g., to a location of residence of the data subject and/or a location from which the data subject placed the request; and/or (7) any other suitable factor.

In various embodiments, the system may be configured to define each of a plurality of physical locations based at least in part on one or more geographic boundaries. These one or more geographic boundaries may include, for example: (1) one or more countries; (2) one or more continents; (3) one or more jurisdictions (e.g., such as one or more legal jurisdictions); (4) one or more territories; (5) one or more counties; (6) one or more cities; (7) one or more treaty members (e.g., such as members of a trade, defense, or other treaty); and/or (8) any other suitable geographically distinct physical locations. In particular embodiments, each of these defined geographic boundaries may comprise at least one local storage node (e.g., at least one local storage node may be physically located within each of the defined geographic boundaries. The system may then be configured to: (1) determine a location of the data subject based on the request (e.g., based on an IP address from which the request was made, based on an address or other location provided by the data subject as part of the request, etc.); (2) identify a particular defined geographic boundary that comprises the determined location of the data subject; and (3) identify at least one local storage node within the identified particular geographic boundary.

In some embodiments, the system may identify the suitable storage node based at least in part on one or more residency laws about storage, one or more country-based business rules, one or more rules defined by one or more privacy administrators, etc.

Next, at Step 4730, the system is configured to route the data subject access request to the identified local storage node. The system may, for example, route the data subject access request from the Data Subject Access Request Management Server 4510 to the identified local storage node (e.g., Local Storage Node D 4520D). The system may, for example, transmit data associated with the request to the identified local storage node. The data may include, for example: (1) sufficient data to complete processing of the request at the local storage node (e.g., sufficient identifying data associated with the data subject; (2) data submitted by the data subject or requestor as part of the request (e.g., via one or more web forms); and/or (3) any other suitable data associated with the request.

In particular embodiments, the system is configured to route one or more pieces of data to the local storage node that the system retrieved in response to receiving the request (e.g., one or more pieces of information associated with data collect, stored and/or processed about the data subject). In some embodiments, the system is configured to route a data subject request through the local node directly so that no data is centrally transferred to a master/global system prior to storage at the local node.

Continuing to Step 440, the system is configured to process the data subject access request at the identified local storage node. In various embodiments, processing the data subject access request may include, for example: (1) identifying one or more pieces of personal data associated with the data subject (e.g., one or more pieces of personal data stored, processed and/or collected by the particular organization or one or more data systems associated with the organization); and (2) fulfilling the request based on one or more request parameters (e.g., providing the requested data, deleting the data that is the subject of the request, etc.). In various embodiments, the system is configured to identify the one or more pieces of personal data using one or more data modelling or data mapping techniques. The system may, for example, analyze one or more data assets utilized by the organization for the collection or storage of personal data. In particular embodiments, each of the one or more data assets (e.g., data systems) may include, for example, any entity that collects, processes, contains, and/or transfers data (e.g., such as a software application, "internet of things" computerized device, database, website, data-center, server, etc.). For example, a first data asset may include any software or device (e.g., server or servers) utilized by a particular entity for such data collection, processing, transfer, storage, etc.

In particular embodiments, system is configured to process the request at the local storage node by identifying and retrieving one or more pieces of personal data associated with the requestor that are being processed by the system. For example, in various embodiments, the system is configured to identify any personal data stored in any database, server, or other data repository associated with a particular organization. In various embodiments, the system is configured to use one or more data models to identify this personal data and suitable related information (e.g., where the personal data is stored, who has access to the personal data, etc.). In various embodiments, the system is configured to use intelligent identity scanning (e.g., or other suitable scanning technique) to identify the requestor's personal data and related information that is to be used to fulfill the request.

In still other embodiments, the system is configured to use one or more machine learning techniques to identify such personal data. For example, the system may identify particular stored personal data based on, for example, a country in which a website that the data subject request was submitted is based, or any other suitable information.

In particular embodiments, the system is configured to scan and/or search one or more existing data models (e.g., one or more current data models) in response to receiving the request in order to identify the one or more pieces of personal data associated with the requestor. The system may, for example, identify, based on one or more data inventories (e.g., one or more inventory attributes) a plurality of storage locations that store personal data associated with the requestor. In other embodiments, the system may be configured to generate a data model or perform one or more scanning techniques in response to receiving the request (e.g., in order to automatically fulfill the request).

In various embodiments, the system is configured to process the data subject access request by taking one or more actions based at least in part on the request. In some embodiments, the system is configured to take one or more actions for which the request was submitted (e.g., display the personal data, delete the personal data, correct the personal data, etc.). In particular embodiments, the system is configured to take the one or more actions substantially automatically. The systems may, for example, take the one or more actions at the local storage node (e.g., execute one or more steps related to the one or more actions at the local storage node).

In particular embodiments, in response a data subject submitting a request to delete their personal data from an organization's systems, the system may: (1) automatically determine where the data subject's personal data is stored;

and (2) in response to determining the location of the data (which may be on multiple computing systems), automatically facilitate the deletion of the data subject's personal data from the various systems (e.g., by automatically assigning a plurality of tasks to delete data across multiple business systems to effectively delete the data subject's personal data from the systems). In particular embodiments, the step of facilitating the deletion may comprise, for example: (1) overwriting the data in memory; (2) marking the data for overwrite; (3) marking the data as free (e.g., and deleting a directory entry associated with the data); and/or (4) any other suitable technique for deleting the personal data. In particular embodiments, as part of this process, the system uses an appropriate data model to efficiently determine where all of the data subject's personal data is stored.

In other embodiments, for example, where the data subject access request includes a request to view any data stored about the data subject, the system may be configured to compile the data associated with the data subject (e.g., as described above) and store the data (e.g., at least temporarily) at the local storage node. The system may then provide the data subject with one or more links to view at least a portion of the data at the local storage node, a summary of the data stored at the local storage node, etc. When compiling the data at the local storage node, the system may, for example, be configured to automatically archive the personal data at the source location of the data. For example, in response to identifying a piece of personal data associated with the data subject at a first data asset, the system may be configured to: (1) route the personal data to the local storage note; (2) at least temporarily store the personal data at the local storage node (e.g., for viewing and/or provision to the data subject); and (3) automatically archive and/or delete the data at the first data asset. In this way, the system may be configured to comply with the data subject access request substantially without undertaking additional instances of personal data storage, collection, and/or processing which may be governed by one or more legal and/or industry requirements.

In particular embodiments, the system is configured to transmit the personal data identified when processing the request to One or More Customer Servers 4530 (e.g., such as shown in FIG. 45). In this way, the system may be configured to eliminate personal data from the system itself to reduce liability of storing such data. By transferring the data to the One or More Customer Servers 4530, the system may transfer potential liability associated with the storage of the data to the organization that had collected, stored, and/or processed the data that was the subject of the data subject access request.

In various embodiments, the system is configured to at least partially ensure that data is stored only at the local node in the particular geographic location (e.g., country, jurisdiction, etc.).

DSAR Processing via Local Storage Example

Figure 48:
FIG. 48 depicts an exemplary screen display and graphical user interface (GUI) according to various embodiments of the system, which may display information associated with the system or enable access to, or interaction with, the system by one or more users (e.g., for the purpose of submitting a data subject access request or other suitable request).

FIG. 48 depicts and exemplary screen display that a user may view when submitting a data subject access request. As may be understood from this figure, an exemplary data subject access request form (e.g., web form) may prompt a user to provide identifying information necessary for the completion of the request and a purpose for the request. As shown in this figure, the system may prompt a user to provide information such as, for example: (1) what type of requestor the user is (e.g., employee, customer, etc.); (2) what the request involves (e.g., requesting info, opting out, deleting data, updating data, etc.); (3) first name; (4) last name; (5) email address; (6) telephone number; (7) home address; and/or (8) one or more details associated with the request.

As discussed in more detail above, a data subject may submit a subject access request, for example, to request a listing of any personal information that a particular organization is currently storing regarding the data subject, to request that the personal data be deleted, to opt out of allowing the organization to process the personal data, etc.

Figure 49:
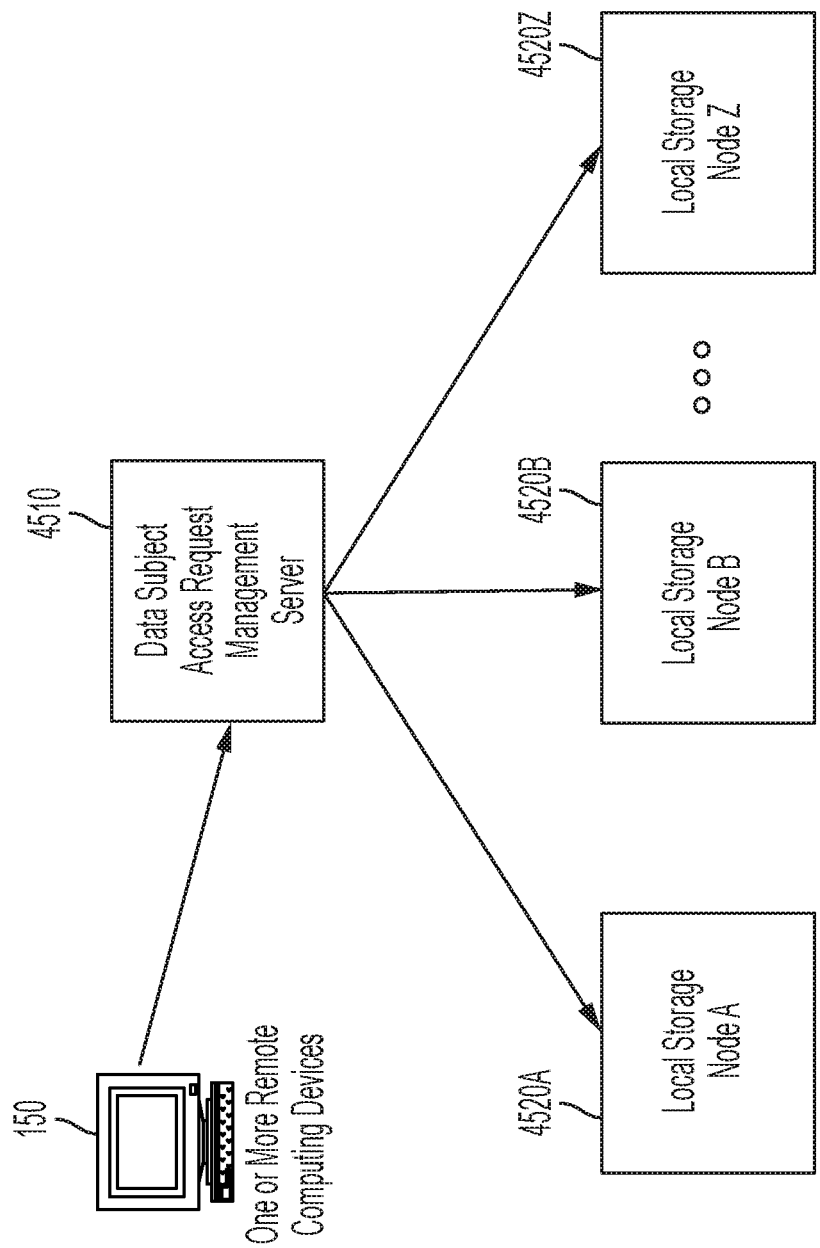
FIG. 49 depicts an exemplary process flow for a data subject access request according to various embodiments.

FIG. 49 depicts an exemplary routing of a data subject access request for processing by the system. As may be understood in light of this disclosure, a user (e.g., a data subject or an individual on behalf of the data subject) may submit a data subject access request using a remote computing device 150. The user may, for example, submit the request via a web form such as the web form depicted in FIG. 48. The system may then receive the data subject access request at a Data Subject Access Request Management Server 4510. The system may then identify, based on the data subject and the request, a suitable local storage node for processing the request. In various embodiments, the system may, for example: (1) identify Local Storage Node A 4520A; (2) route the request to Local Storage node A 4520A; and (3) process and fulfill the request at Local Storage Node A. In this way, the system may be configured to maintain any personally identifiable information associated with the request in the country, jurisdiction, or geographic region of the data subject (e.g., rather than storing the data centrally).

Personally Identifiable Information Archiving Module

Figure 50:
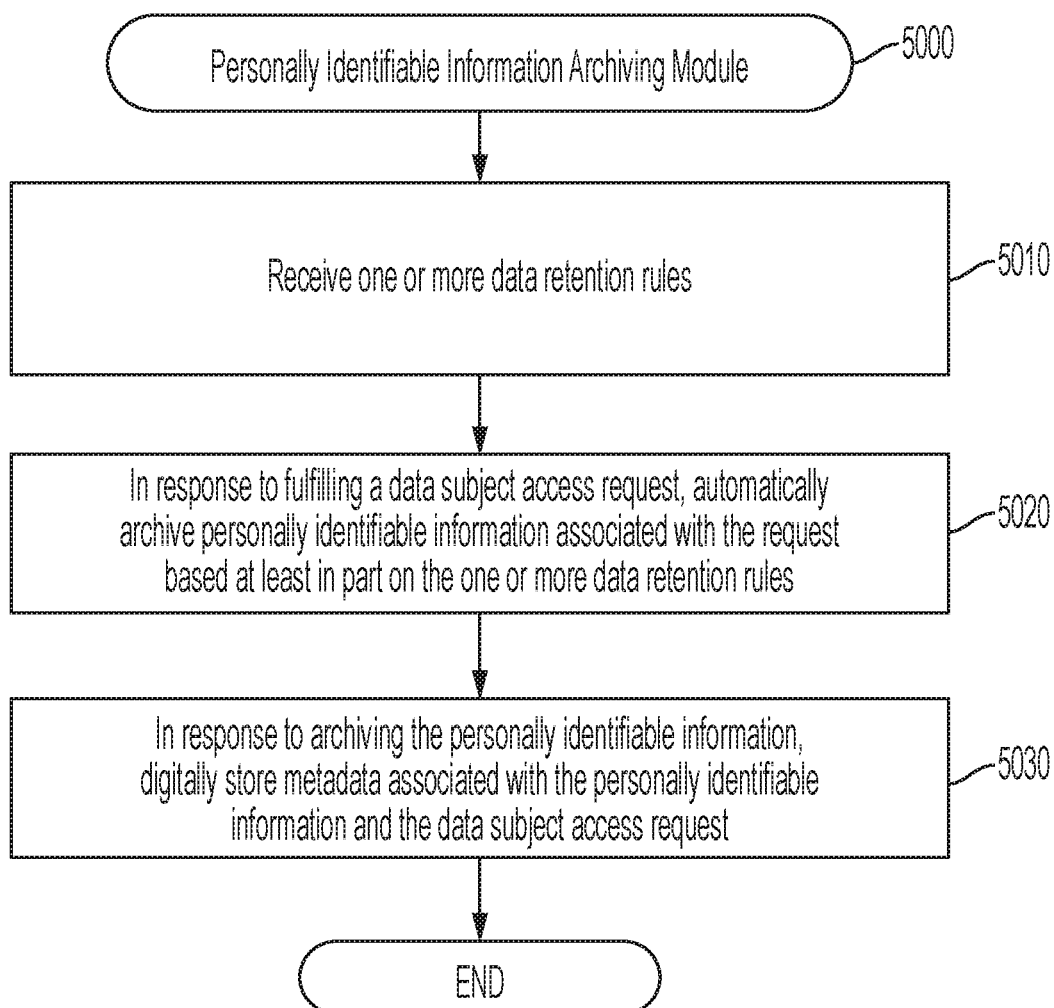
FIG. 50 is a flowchart showing an example of steps performed by a Personally Identifiable Information Archiving Module 5000 according to particular embodiments.

Turning to FIG. 50, when executing the Personally Identifiable Information Archiving Module 5000, the system may be configured to substantially automatically archive (e.g., at least partially delete) personally identifiable information based on one or more data retention rules. For example, as may be understood in light of this disclosure, an organization may be required to comply with one or more legal or industry requirements related to the storage of personal data (e.g., which may, for example, include personally identifiable information). In particular, when responding to a data subject access request, the system may compile one or more pieces of personal data for provision to a data subject. The system may, for example, store this compilation of personal data at least temporarily in order to provide access to the data to the data subject (e.g., or to another individual on behalf of the data subject). As such, the system may be configured to implement one or more data retention rules in order to ensure compliance with any legal or industry requirements related to the temporary storage of the collected data while still fulfilling any requirements related to providing the data to data subjects that request it, deleting the data at least partially in response to such a request, etc.

When executing the Personally Identifiable Information Archiving Module 5000, the system begins, at Step S010, by receiving one or more data retention rules. The one or more data retention rules may include, for example: (1) one or more rules relating to maintaining the data in storage until the data is viewed by the data subject; (2) one or more rules relating to maintaining the data for no more than a particular amount of time, regardless of whether the data subject has viewed the data prior to the expiration of the time period (e.g., for no more than thirty days, for no more than one week, etc.); (3) one or more rules based on the data subject (e.g., based on the data subject's country of origin, based on the type of data being stored, etc.); (4) one or more legal or industry requirements related to the storage of personal data;

and/or (5) any other suitable data retention rule or combination of data retention rules (e.g., storage capacity, etc.).

Figure 51:
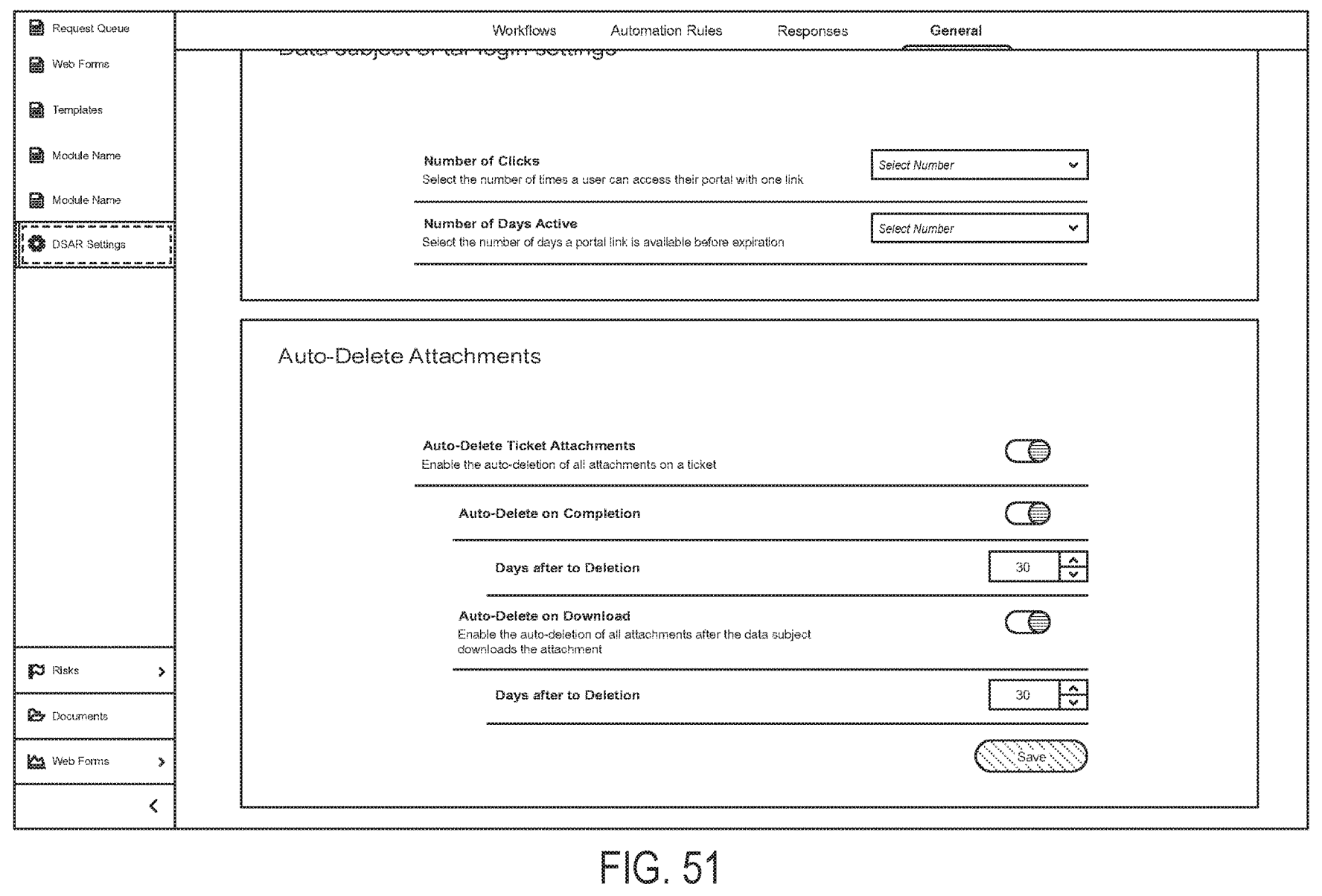

FIG. 51 depicts an exemplary interface via which a user (e.g., a privacy officer or other suitable user) may provide the one or more data retention rules. As shown in this figure, the system may be configured to enable a user to define: (1) a number of times a user can access a portal for viewing the collected personal data; (2) a number of days the portal link is active; (3) whether to auto-delete the data on completion; (4) etc.

Continuing to Step S020, the system is configured to, in response to fulfilling a data subject access request, automatically archive personally identifiable information (e.g., personal data) associated with the request based at least in part on the one or more data retention rules. The system may, for example, be configured to at least temporarily store (e.g., at a local storage node) personal data identified when processing the request for at least an amount of time determined by the one or more retention rules. The system may then substantially automatically archive the at least temporarily stored data in response to a triggering of the one or more data retention rules. For example, if the one or more data retention rules dictate that the system should store the data until the data subject access the data, but for no longer than thirty days, the system may be configured to automatically archive the personal data in response to the data subject accessing the personal data (e.g., prior to thirty days) or the passage of thirty days.

When archiving the personal day, the system may, for example: (1) automatically determine where the data subject's personal data is stored (e.g., at the local storage node); and (2) in response to determining the location of the data (e.g., which may be on multiple computing systems), automatically facilitate the deletion of the data subject's personal data from the system (e.g., by automatically assigning a plurality of tasks to delete data across multiple computer systems to effectively delete the data subject's personal data from the system or systems). In particular embodiments, the step of facilitating the deletion may comprise, for example: (1) overwriting the data in memory; (2) marking the data for overwrite; (2) marking the data as free (e.g., and deleting a directory entry associated with the data); and/or (3) any other suitable technique for deleting the personal data.

Returning to Step S030, the system may be configured to, in response to archiving the personally identifiable information, digitally store metadata associated with the personally identifiable information and the data subject access request. The system may, for example, store metadata that includes data such as: (1) a time and date of the completion of the data subject access request; (2) a type of data provided in response to the request (e.g., but not the actual data); (3) an access time of the data by the data subject (e.g., if the data subject actually accessed the data); (4) one or more retention rules that triggered the archiving of the data (e.g., a certain number of days elapsed, the data subject accessed the date, etc.); and/or any other suitable data related to the completion of the request (e.g., that a download of the data was successful, etc.). In this way, the system may be configured to ensure compliance with one or more reporting requirements related to the fulfilment of data subject access requests, without having to maintain personal data on the system (e.g., which may be subject to certain rules described herein).

DSAR Processing Guidance

In particular embodiments, the system is configured to provide guidance for processing one or more data subject access requests based at least in part on one or more data subject attributes (e.g., country, region, type, etc.) and a type of the data subject access request (e.g., deletion, correction, etc.). The system may, for example, automatically identify one or more regulatory rules (e.g., laws) based on the data subject and the request, and provide guidance to a privacy officer or admin with how to process the request based on the relevant regulatory rule(s).

Data Subject Access Request Chat Robots and Related Methods

In particular embodiments, the system is configured to provide (e.g., by running software on any suitable system component, such as any suitable server described herein) a conversational chatbot that is configured to request information from a data subject (e.g., high-level, generic information that does not include personal data for the data subject; or more specific information that does include personal data for the data subject). The system may then use the provided information to retrieve information from any suitable data structure regarding one or more types of data (e.g., personal data or other data) that a particular entity (e.g., company or other organization) may store about the data subject, and/or how the entity uses that data.

For example, the chatbot may be configured for, first, obtaining generic information from the data subject, such as information regarding the data subject's relationship with the entity (e.g., the data subject is a customer of the entity, is a vendor for the entity, is a current or former employee of the entity, is on a mailing list of the entity, etc.), or other suitable information (e.g., the data subject's state of residence, country of residence, age, national origin, or any other suitable information). Next, the chatbot may use the generic information along with information from a suitable data source, such as a suitable privacy-related data map and/or a privacy-related data model, such as those described herein, to obtain general information regarding, for example, one or more types of personal data that the system stores regarding the data subject and/or one or more purposes for which the entity (and/or the system) uses the personal data.

The chatbot may then provide this general information to the data subject, for example, at a general level (e.g. without providing the actual values of the data that are unique to the specific data subject). For example, the chatbot may inform the user that it stores the data subject's email address and uses the email address for distributing a particular email newsletter every week, but not provide the data subject's actual email address and/or the name of the newsletter. In this way, the system may be configured to educate a data subject as to what particular type(s) of personal data the system stores regarding the data subject and how the data is used, so that the data subject can make a more informed decision regarding whether to submit a data subject access request (DSAR).

In some cases, the general, generic information that the system provides may be enough information to satisfy the data subject's current needs, so the data subject may choose to not submit a full DSAR request. This may be advantageous in: (1) saving the data subject the time that would have otherwise been required to submit the DSAR and to review the results of the DSAR; and (2) saving the system the processing resources that would have otherwise been needed to fulfill a full DSAR request. Accordingly, the chatbot may serve to make the computer system more efficient by reducing the amount of processing resources that the system needs to complete its DSAR-related activities within a particular timeframe.

In particular embodiments, the chatbot may be adapted for, after providing the general information to the data subject, asking the user if they would like to submit a data subject access request (DSAR). In particular embodiments, the chatbot may be configured to automatically receive and fulfill such requests by, for example: (1) receiving a data subject access request; (2) after receiving the request, verifying, and/or facilitating the verification of, the requestor's identity; (3) taking one or more actions requested in the data subject access request (e.g., providing, deleting, and/or modifying personal data, stored by the entity, for the data subject that is the subject of the request); and/or (4) confirming to the data subject that the data subject access request has been completed.

Alternatively, or in addition, the chatbot may be configured to facilitate the submission of a DSAR request through another mechanism. For example, the chatbot may ask the user if they would like to submit a DSAR and, if the user responds in the affirmative, the chatbot may provide instructions to the user regarding one or more next steps to take in order to submit a DSAR through a website, call center, or other DSAR submission platform associated with the entity.

It is noted that, in various embodiments, a chatbot may include an artificial intelligence (AI) program that simulates interactive human conversation (e.g., through exchanges, between the chatbot and the user, of written text, verbal communications, and/or exchanges of non-verbal, visual cues and/or displays). In various embodiments, a chatbot may use pre-determined phrases that are input (e.g., typed or spoken) by the user as keys to determine one or more actions to be taken by the system and/or one or more responses to be communicated to the user (e.g., text, visual, and/or audio responses). Examples of chatbots include text chatbots and verbally-operated chatbots, such as Apple's Siri digital assistant or Amazon's Alexa digital assistant.

Data Subject Access Request Chat Robot—Example User Experience

An example operation of a DSAR chatbot according to a particular embodiment will now be provided. It should be understood that this embodiment is only a particular example and that other embodiments may be adapted to perform differently.

To begin, a user may use a suitable Internet browser on their computing device to access a website that is served by the entity and that is configured for allowing a user to submit a data subject access request. For example, the user may access a DSAR-submission webpage that is associated with the website and that includes a suitable graphical user interface for use in submitting data subject access requests to the entity.

When the user accesses the webpage, the system may automatically display a pop-up window that includes a graphical user interface between the chatbot and the user. In a particular example, the chatbot may display this message, in text form, in the pop-up window: "Would you like to know what types of your personal data that ABC Company currently has on file for you?" In response, the user may enter the following text into a text box in the pop-up window: "Yes." The chatbot may then display the following text reply in the pop-up window: "Please enter your relationship to ABC Company. For example, are you a customer or employee of ABC Company?" The user may then enter "I am a customer of the company." into the text box.

In response to receiving the entered generic relationship information (that the user is a customer of the company), the chatbot may use the relationship information and a privacy-related data map associated with ABC Company and/or data from a privacy-related data model associated with ABC Company to determine the type(s) of personal data (e.g., personal information) that ABC Company stores for its customers. In a particular simplified example, ABC Company may store, in memory, the name, street address, email address, and phone number for each of its customers (to the extent that ABC Company has this information). In this example, the chatbot may accordingly display the following message to the user in the pop-up window "ABC company stores the following information for its customers: Name, Street Address, Email Address, and Phone Number. Would you like to submit a data subject access request to obtain the exact information that ABC Company has on file for you?"

If the user is satisfied with the information provided (e.g., the user just wanted to make sure that ABC Company isn't storing more detailed personal data regarding the user), the user may enter "No." into the text box. As noted above, in this scenario, the use of the chatbot would likely have resulted in a more processing-efficient interaction with the user because the interaction with the user would have been satisfied without having to retrieve the user's actual personal data which, in various embodiments, would require more processing capacity than generically determining and communicating the general types of personal data that ABC Company obtains and stores for all of its customers.

If the user would like more specific information, the user may type "Yes." into the text box. In response, the chatbot may provide instructions as to how the user may use the webpage to submit a DSAR. Alternatively, the chatbot may automatically fulfill the DSAR without requiring the user to use the webpage to submit the DSAR.

Malicious Data Subject Access Request Prevention

In various embodiments, an organization, corporation, etc. may be required to provide information requested by an individual for whom the organization stores personal data. As a particular example, an organization may be required to provide an individual with a listing of, for example: (1) any personal data that the organization is processing for an individual, (2) an explanation of the categories of data being processed and the purpose of such processing; (3) one or more categories of third parties to whom the data may be disclosed; (4) etc. In particular embodiments, when processing a data subject access request (e.g., a request for such information), a data subject access request (DSAR) processing system may be configured to: (1) receive a data subject access request from a data subject, the data subject access request comprising one or more requests related to the one or more rights described herein (e.g., a request for a copy of the data subject's personal data, a request regarding how long personal data associated with the data subject is being stored by the system, a request to be forgotten, etc.); (2) process the request in any suitable manner described herein; (3) fulfill the request based at least in part on one or more request parameters; (4) store one or more pieces of metadata associated with the processing of, fulfilment of, and/or response to the request; and/or (5) archive one or more pieces of data associated with the request based on one or more data retention rules.

In various embodiments, a data subject access request processing system (e.g., the Data Subject Access Request Processing System 4500) may be implemented in the context of any suitable privacy management system that is configured to ensure compliance with one or more legal or industry standards related to the collection and/or storage of private information (e.g., such as personal data). In various embodiments, a particular organization, sub-group, or other entity may initiate a privacy campaign or other activity (e.g., processing activity) as part of its business activities. In such embodiments, the privacy campaign may include any undertaking by a particular organization (e.g., such as a project or other activity) that includes the collection, entry, and/or storage (e.g., in computer memory) of any personal data associated with one or more individuals (e.g., data subjects). In particular embodiments, a privacy campaign may include any project undertaken by an organization that includes the use of personal data, or any other activity that could have an impact on the privacy of one or more individuals.

In any embodiment described herein, personal data may include, for example: (1) the name of a particular data subject (which may be a particular individual); (2) the data subject's address; (3) the data subject's telephone number; (4) the data subject's e-mail address; (5) the data subject's social security number; (6) information associated with one or more of the data subject's credit accounts (e.g., credit card numbers); (7) banking information for the data subject; (8) location data for the data subject (e.g., their present or past location); (9) internet search history for the data subject; and/or (10) any other suitable personal information, such as other personal information discussed herein. In particular embodiments, such personal data may include one or more cookies (e.g., where the individual is directly identifiable or may be identifiable based at least in part on information stored in the one or more cookies). In still other embodiments, the personal data may include any data that may be used either alone or in conjunction with other data or information to potentially identify a particular data subject (e.g., individual).

As discussed above, various privacy and security policies (e.g., such as the European Union's General Data Protection Regulation, and other such policies) may provide data subjects (e.g., individuals, organizations, or other entities) with certain rights related to the data subject's personal data that is collected, stored, or otherwise processed by an organization. These rights may include, for example: (1) a right to obtain confirmation of whether a particular organization is processing their personal data; (2) a right to obtain information about the purpose of the processing (e.g., one or more reasons for which the personal data was collected); (3) a right to obtain information about one or more categories of data being processed (e.g., what type of personal data is being collected, stored, etc.); (4) a right to obtain information about one or more categories of recipients with whom their personal data may be shared (e.g., internally within the organization and/or externally); (5) a right to obtain information about a time period for which their personal data will be stored (e.g., or one or more criteria used to determine that time period); (6) a right to obtain a copy of any personal data being processed (e.g., a right to receive a copy of their personal data in a commonly used, machine-readable format); (7) a right to request erasure (e.g., the right to be forgotten), rectification (e.g., correction or deletion of inaccurate data), and/or restriction of processing of their personal data; and (8) any other suitable rights related to the collection, storage, and/or processing of their personal data (e.g., which may be provided by law, policy, industry or organizational practice, etc.).

As may be understood in light of this disclosure, a particular organization may undertake a plurality of different privacy campaigns, processing activities, etc. that involve the collection and/or storage of personal data. In some embodiments, each of the plurality of different processing activities may collect redundant data (e.g., may collect the same personal data for a particular individual more than once) and/or may store data and/or redundant data in one or more particular locations (e.g., on one or more different servers, in one or more different databases, etc.). In this way, a particular organization may store personal data in a plurality of different locations that may include one or more known and/or unknown locations. As such, complying with particular privacy and security policies related to personal data (e.g., such as responding to one or more requests by data subjects related to their personal data) may be particularly difficult (e.g., in terms of cost, time, etc.).

In particular embodiments, entities may be required to respond to such data subject access requests within a particular amount of time (e.g., following the request). As such, handling a particularly large volume of requests at one time may be difficult in terms of requiring a large number of resources (e.g., computing resources, business resources, time of one or more entity employees, etc.).

Some companies may offer services that are designed to automate (e.g., at least partially automate) or otherwise simplify the submission, by a particular data subject, of one or more data subject access requests across multiple companies. Tools that are designed to automate the submission of such data subject access requests (e.g., across multiple entities) may result in a much larger volume of data subject access requests for each particular entity to handle (e.g., because the tools may enable a data subject to automatically submit thousands of data subject access requests rather than having to submit each one to every respective entity individually). In light of the above, there is a need for improved systems and methods with which particular entities can limit such automated and/or robotic data subject access requests (e.g., and require individual data subjects to submit a data subject access to the entity directly on their own). Such improved systems and methods may, for example, help to reduce an entity's burden in processing an inflated number of data subject access requests.

Various embodiments of exemplary systems for reducing and/or eliminating automated and/or robotic data subject access requests are described below.

In particular embodiments, a data subject access request fulfillment system (which may, for example, be the Data Subject Access Request Processing System 4500 described above) is configured to generate a unique URL (e.g., a unique URL that is permanently or temporarily only configured for use with the particular request) in response to receiving a data subject access request. In such embodiments, the system may, for example, by configured to: (1) receive a request to complete a data subject access request; (2) generate the unique URL in response to receiving the request; and (3) at least temporarily host (e.g., provide access to) a web form or other means for completing a data subject access request at the unique URL. In alternative embodiments, the system may use a non-unique URL for this purpose.

In particular embodiments, the system is configured to use JavaScript to generate a unique session ID for a user requesting to complete a data subject access request. The system may then be configured to generate a unique, or non-unique, URL for the session ID (e.g., as opposed to hosting a data subject access request form or web form on a static URL). In this way, an entity may be able to prevent a third party from robotically completing data subject access requests on behalf of a data subject by only accepting such requests through the uniquely-generated URLs.

In various embodiments, the system is configured to set a session cookie on a client's browser in order access a DSAR webform. In various embodiments, the session cookie is configured to enable the system to determine whether the visitor originated from a domain associated with a third-party entity (e.g., a third-party aggregator) through which the data subject is attempting to place the DSAR. This may, for example, prevent the third party aggregator from directly connecting to a webform for DSAR submissions.

In still other embodiments, the system is configured to dynamically modify a DSAR webform, for example, by: (1) dynamically changing an order of DSAR form questions (e.g., to prevent robotic completion of a standardized, static webform); (2) dynamically adding and/or removing particular questions to the webform; and/or (3) taking any other suitable action to manipulate the webform to prevent one or more users from scripting the completion of the webform (e.g., automatically filling the form out).

In still other embodiments, the system may utilize one or more HTML tagging techniques to at least partially prevent a bot tool from automatically matching the form to a known form that the bot can complete. The system may, for example, dynamically change one or more HTML tags associated with the webform to prevent such botting.

According to various embodiments, the system is configured to track a requestor and/or a source associated with each DSAR and analyze each DSAR to identify requestors and/or sources from which: (1) the company receives a large volume of requests; (2) the company receives a large number of repeat requests; and/or (3) the company receives a request from a requestor or source for which the company does not legally have to respond and/or does not legally have to respond at no cost. The sources may include, for example: (1) one or more particular IP addresses; (2) one or more particular domains; (3) one or more particular countries; (4) one or more particular institutions; (5) one or more particular geographic regions; (6) one or more political groups; and/or (7) one or more protesting groups (e.g., groups that are currently protesting against one or more activities of the entity to which the DSAR is being submitted). In response to analyzing the sources of the requests, the system may identify one or more requestors and/or sources that may be malicious (e.g., are submitting excessive requests).

In some embodiments, the system is configured to identify web traffic to the webform that has a non-human (e.g., robotic) source. The system may identify non-human sources based on, for example: (1) a number of requests received from the source (e.g., per second); (2) an existing database of known robotic sources (e.g., MAC addresses, IP addresses, etc.); etc.

In still other embodiments, the system is configured to embed a challenge question, CAPTCHA, and/or other robotic submission prevention mechanism into the webform that is utilized in the submission of DSARs in order to prevent DSARs from being submitted by automated sources.

Example

As a particular example, an automated source of DSARs, such as a DSAR submission bot tool, may be configured to submit 100 different data subject access requests—each for a different data subject—to a particular entity (e.g., Home Depot) at around the same particular time. To do this, the DSAR submission bot tool may begin by establishing electronic communications with a web page associated with the particular entity (e.g., via the Internet) and then attempting to auto-populate a DSAR submission web form on the web page with information for a first one of the 100 data subjects.

In this example, a DSAR processing system that processes DSAR's submitted via the web form may detect (e.g., in any suitable way, such as using any of the techniques discussed above) that the DSAR is being submitted by an automated source. At least partially in response to making this determination, the DSAR processing system may take a defensive action (such as any of those discussed above) to inhibit and/or prevent the DSAR submission bot tool from submitting the DSAR for the first data subject.

For example, the system may: (1) generate a unique URL for a session ID that the system has generated for the current DSAR submission; and (2) only accept the current data subject access request via the unique URL. The system may, alternatively, or in addition: (1) dynamically change an order of DSAR-related questions on the webform (e.g., to prevent robotic completion of a standardized, static webform); (2) dynamically add and/or remove particular questions from the webform; (3) use one or more HTML tagging techniques to at least partially prevent a bot tool from automatically matching a form for use in submitting one or more data subject access requests to a known form that an automated source can complete; and/or (4) take any other suitable action to manipulate the webform to prevent one or more users from scripting the completion of the webform (e.g., from automatically filling out the form).

In various embodiments, such defensive actions may discourage or prevent the automated submission of DSARs and make it necessary, or at least more desirable, for DSAR's to be submitted manually (e.g., by a human, such as the data subject that is the subject of the DSAR). In various embodiments, this may reduce the number of DSARs that are submitted to the DSAR processing system for fraudulent or malicious purposes.

In particular embodiments, the system may be configured for, in response to determining that a particular DSAR has been submitted by a human (rather than an automated source), automatically fulfilling the DSAR.

Data Migration Between Data Centers

In particular embodiments, the system is configured to migrate data (e.g., personal data) collected and/or stored by one or more systems to one or more other systems. For example, in anticipation of, or in the event of, a data center outage, data stored on a data asset located in that data center may be migrated to another data asset in another data center. This process may be at least substantially automatic and may provide one or more safeguards against data center failure, data asset failure, data loss and/or other failures or undesirable occurrences. In various embodiments, one or more planned outages may be accommodated in such a fashion, by transferring the data stored at a data asset that will be affected by a planned outage to another data asset that may not be affected by the planned outage. When transferring data from one data asset to another, the system may be configured to take into account one or more regulations related to the transfer of such data.

In particular embodiments, a transfer (e.g., migration) of data associated with a particular entity from one data asset to another may be one of, for example: (1) an internal transfer (e.g., a transfer of data from a first data asset associated with the entity to a second data asset associated with the entity); (2) an external transfer (e.g., a transfer of data from a first data asset associated with the entity to a second data asset associated with a different entity); and/or (3) a collective transfer (e.g., a transfer of data to a first data asset associated with the entity from an external data asset associated with a different entity). In various embodiments, where data associated with a particular entity is transferred to an asset associated with a different entity, such a different entity may, for example, be a vendor engaged by the particular entity (e.g., as a backup storage provider, etc.).

The system may be configured to determine where and/or how data is to be transferred based on the type of data to be transferred. For example, where the data to be transferred is personal data, the transfer of such personal data may trigger one or more regulations governing the transfer. In particular embodiments (e.g., as described herein), personal data may include any data that may relate to an individual who can be identified: (1) from the data; and/or (2) from the data in combination with other information that is in the possession of, or is likely to come into the possession of, a particular entity. In particular embodiments, a particular entity may collect, store, process, and/or transfer personal data for one or more customers, one or more employees, etc.

In various embodiments, the system may be configured to use one or more data models associated with one or more data assets (e.g., data systems) to analyze one or more data elements associated with those one or more data assets to determine one or more types of data stored on the one or more data assets. In particular embodiments, the system may use a data map associated with a particular data asset to determine whether one or more data elements of that particular data asset include personal data that may be subject to transfer. The system may then be configured to determine the regulations, requirements, and/or restrictions applicable to a transfer of such personal data, in various examples based at least in part on one or more data models. For example, the system may be configured to identify, based at least in part on the type of data to be transferred and/or the applicable regulations, requirements, and/or restrictions, one or more suitable target data assets (e.g. from a plurality of candidate target data assets) to which such personal data may be transferred. Upon locating the one or more target data assets, the system may be configured to proceed with the transfer of such personal data.

In particular embodiments, the system may be configured to use one or more data maps (e.g., that may be based on one or more data models), such as those described elsewhere herein, to determine one or more communicative connections and/or electronic associations between data assets in the process of locating one or more suitable target data assets for a particular data transfer. Based on such connections and/or associations, the system may be configured to determine one or more potential target data assets to which data from a data asset is eligible to be transferred while remaining in compliance with any applicable regulations, requirements, and/or restrictions. The system may be configured to select, from such one or more potential target data assets, one or more particular target data assets to which to transfer such data.

As a particular example, the GDPR may dictate that data cannot be transferred outside of the country in which it is stored. In this example, the system may be configured to identify at least one intra-country backup data asset to serve as a target data asset for each of one or more of its data assets (e.g., storage assets) in the event of, or in anticipation of, a failure of such one or more data assets.

In various embodiments, the system may be configured to perform a risk analysis of a transfer of data from a particular data asset to any other particular data asset. For example, the system may be configured to perform a risk analysis associated with any planned and/or contingent transfer of data between data assets prior to the transfer. In various examples, the entity may determine one or more preferred target data assets to receive a transfer of data from a particular data asset in the event of, or in anticipation of, a failure of (e.g., a full or partial failure of) that particular data asset. The system may be configured to store such determined one or more preferred target data assets (e.g., store one or more indications of such one or more preferred target data assets) in one or more data models and/or to indicate such one or more preferred target data assets in one or more data maps associated with the particular data asset. In this way, when an actual or anticipated failure at the particular data asset necessitates a transfer of data from that data asset to another data asset, the transfer of data may be expedited because the preferred one or more target data assets are already known from the one or more data models and/or data maps associated with the particular data asset. In the event that one or more preferred target data assets are not available at the time of transfer from the particular data asset, the system may be configured to responsively determine one or more alternative target data assets to which to transfer data from the particular data asset.

In various embodiments, the system may be configured to identify one or more suitable data assets to which to transfer data at least partially in response to the failure of, or the anticipation of the failure of, a particular data asset. In various embodiments, the "failure" of a particular data asset may include, for example, an anticipated shutdown of the data asset for routine maintenance. The system may, for example: (1) identify a first data asset; (2) identify a second data asset; (3) determine one or more regulations, requirements, and/or restrictions that relate to a transfer of data between the first data asset and the second data asset; (4) determine one or more types of data stored by the first data asset; (5) determine, based on the one or more types of data stored by the first data asset and the one or more regulations relating to the transfer of data between the first data asset and the second data asset, whether the second data asset is a suitable target data asset for the first data asset's data; and/or (6) at least partially in response to determining that the second data asset is a suitable target data asset for the first data asset's data, initiate a transfer of data from the first data asset to the second data asset.

In various embodiments, the system may instead, or in addition, be configured to identify a suitable data asset to which to transfer data at least partially in response to the failure of a particular data asset and/or the system anticipating (e.g., via one or more data asset maintenance schedules and/or by determining that the data asset is likely to fail based on past or current data received by the system regarding the particular data asset) the full or partial failure of the particular data asset. In particular embodiments, the system may identify the suitable data asset by: (1) identifying a first data asset; (2) determining one or more types of data stored on the first data asset; (3) determining one or more regulations, requirements, and/or restrictions that relate to a transfer of such one or more types of data; (4) determining one or more potentially suitable target data assets to which a transfer of data stored on the first data asset would satisfy the one or more regulations, requirements, and/or restrictions that relate to a transfer of such one or more types of data; and (5) selecting one or more of the one or more potentially suitable target data assets as one or more suitable target data assets for receiving data from the first data asset. The system may then, at least partially in response to selecting one or more of the one or more potentially suitable target data assets as one or more suitable target data assets for receiving data from the first data asset (and/or in response to determining that the first data asset has at least partially failed or is likely to fail), initiate a transfer of some or all of the first data asset's data to the one or more suitable target data assets.

In various embodiments, the system may be configured to assign one or more suitable target data assets to serve as one or more fail-over assets for each respective one of a plurality of particular data assets maintained, utilized, and/or associated with a particular entity. In this way, the system may be configured to identify at least one respective data asset (e.g., storage asset) that is suitable to receive data transferred from each respective source data asset in the event of, or in anticipation of, at least partial failure by the respective source data asset.

Figure 52:
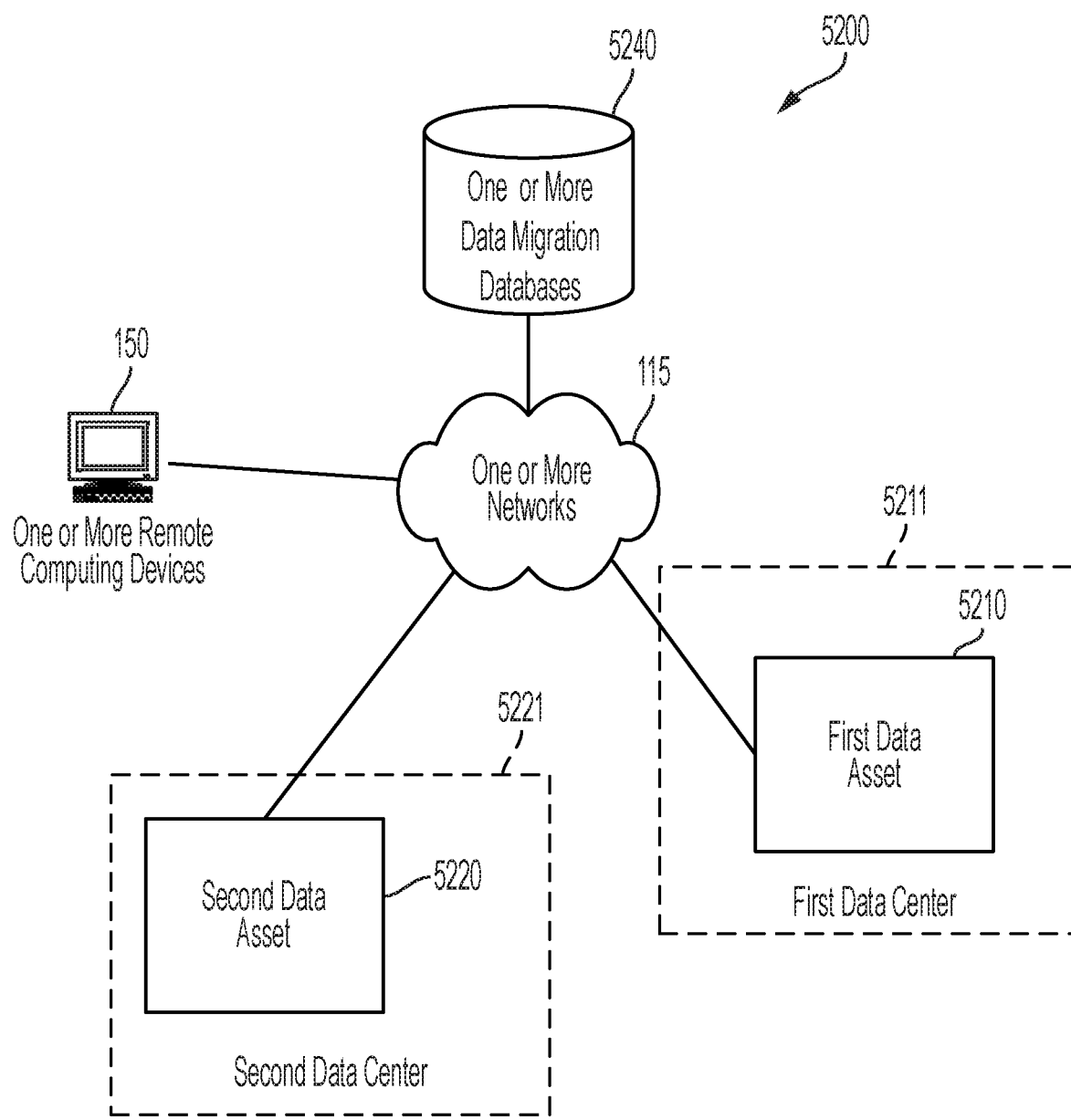
FIG. 52 depicts a data asset data migration system according to particular embodiments.

FIG. 52 is a block diagram of a Data Asset Data Migration System 5200 according to a particular embodiment. In various embodiments, the Data Asset Data Migration System 5200 is part of a privacy compliance system (also referred to as a privacy management system), or other system, which may, for example, be associated with a particular organization and be configured to aid in compliance with one or more legal and/or industry regulations related to the collection and storage of personal data. In various embodiments, the Data Asset Data Migration System 5200 is configured to, for example: (1) receive and/or detect an indication that a first data asset (e.g., the First Data Asset 5210) or its associated data center (e.g., the First Data Center 5211) is anticipated to, or has experienced a failure, or otherwise receive and/or detect an instruction to migrate data from a first data asset (e.g., the First Data Asset 5210) to another data asset; (2) determine one or more types of data to be transferred in such a migration of data; (3) determine one or more regulations, requirements, and/or restrictions that apply to the transfer of the data from the first data asset to one or more potentially suitable target data assets; (4) based at least in part on the one or more regulations, requirements, and/or restrictions (which may be based, for example, on the type of data, the respective locations of the transferring and receiving data assets, etc.), identify (e.g., from a plurality of candidate target data assets) one or more suitable second data assets (e.g., the Second Data Asset 5220) as one or more suitable target data assets for the transfer; and (5) at least partially in response to identifying the one or more suitable second data assets, initiate or otherwise perform the transfer of data (e.g., all, or a subset of, the data) from the first data asset to the one or more second data assets.

As may be understood from FIG. 52, in a particular embodiment, the Data Asset Data Migration System 5200 includes one or more computer networks 115, the First Data Asset 5210 (e.g., which may be any one or more data asset of any type described herein) located in the First Data Center 5211, the Second Data Asset 5220 (e.g., which may be any one or more data asset of any type described herein) located in the Second Data Center 5221, One or More Data Migration Databases 5240 or other data structures that may store data used to make data migration determinations, and One or More Remote Computing Devices 150 (e.g., a desktop computer, laptop computer, tablet computer, smartphone, etc.). In particular embodiments, the One or More Computer Networks 115 facilitate communication between any of the First Data Asset 5210, the Second Data Asset 5220, the One or More Databases 5240, and/or the One or More Remote Computing Devices 150. It should be understood that in various embodiments, any one or more of these servers and/or computing devices may comprise a single server, a plurality of servers, one or more cloud-based servers, or any other suitable configuration.

In various embodiments, the First Data Asset 5210 and the Second Data Asset 5220 may each be a storage asset (or other suitable asset) that may comprise, for example, one or more physical servers (e.g., each having one or more hard disk drives, solid state drives, and/or other data storage devices) that are each located in a particular respective physical location (e.g., the First Data Center 5211 and the Second Data Center 5221, respectively). In some embodiments, a particular storage asset may comprise one or more virtual machines (e.g., and/or one or more virtual LANs) having access to one or more hard disk drives and/or solid-state drives (e.g., or combinations thereof). In still other embodiments, the First Data Asset 5210 and the Second Data Asset 5220 may each comprise a collection of storage assets that may, for example, be clustered together and managed (e.g., through software) as a single storage asset. In various embodiments, a storage asset made up of one or more storage devices or systems may have a particular defined location (e.g., geographic location, region, country, jurisdiction, etc.).

The One or More Computer Networks 115 may include any of a variety of types of wired and/or wireless computer networks such as the Internet, a private intranet, a public switch telephone network (PSTN), and any other type of network. The communication link between the First Data Asset 5210 and the Second Data Asset 5220 may be, for example, implemented via a Wide Area Network (WAN) or via the Internet. In various embodiments, the One or More Databases 5240 may be stored either fully or partially on any suitable server or combination of servers described herein.

In various embodiments, and as described in more detail herein, when the First Data Center 5211 and/or the First Data Asset 5210 fails and/or is anticipated to fail, the system may be configured to determine that the Second Data Asset 5220 located in the Second Data Center 5221 should serve as a backup data asset for the First Data Asset 5210, receiving and storing at least a subset of the data stored on the First Data Asset 5210. As described herein, the system may determine that the Second Data Asset 5220 is a suitable backup data asset based on, for example: (1) one or more attributes of data stored on the First Data Asset 5210; (2) the respective physical locations of the First Data Asset 5210 and the Second Data Asset 5220; and/or (3) one or more applicable regulations, requirements, and/or restrictions that would apply to a potential transfer of data from the First Data Asset 5210 to the Second Data Asset 5220. The system may, at least partially in response to determining that the Second Data Asset 5220 is a suitable backup data asset for the First Data Asset 5210, transfer data from the First Data Asset 5210 to the Second Data Asset 5220 via the One or More Computer Networks 115.

Figure 53:
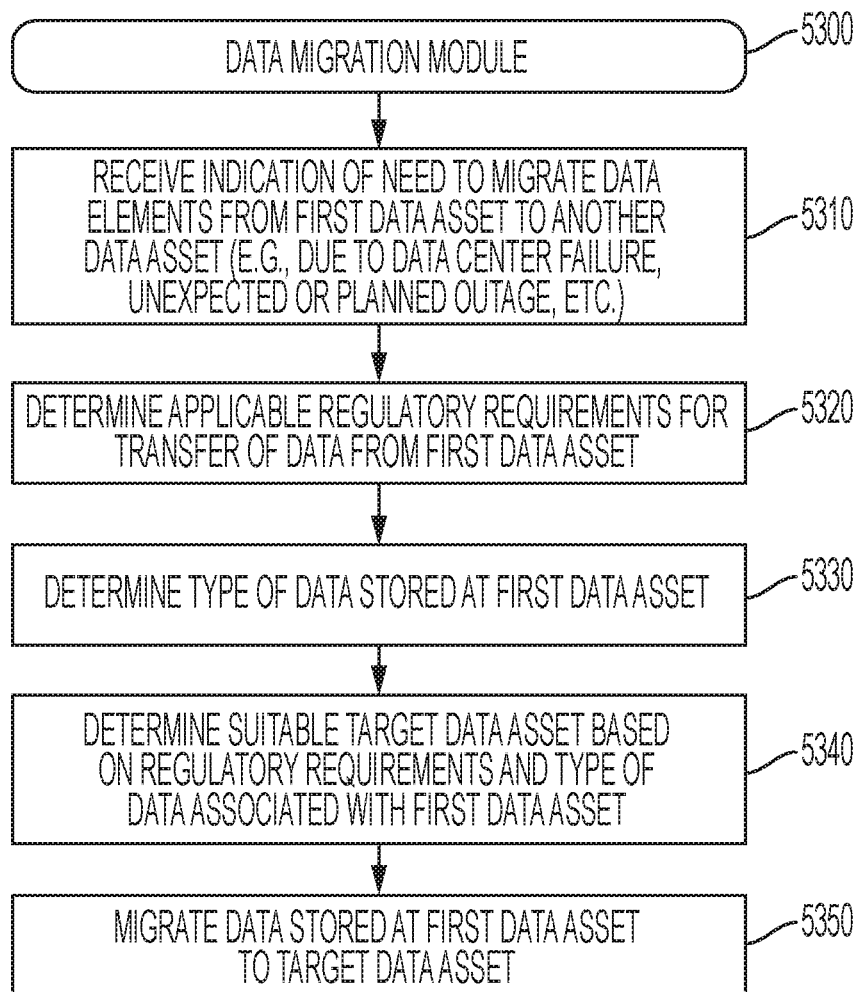
FIG. 53 is a flowchart showing an example of steps performed by a Data Migration Module 5300 according to particular embodiments.

FIG. 53 shows an example process that may be performed by a Data Migration Module 5300. In executing the Data Migration Module 5300, the system begins at Step S310, where it receives an indication of a need to migrate data from a first data asset to another data asset. Such an indication may be received at least partially in response to the detection of an outage (e.g., an outage of a data center housing the first data asset, an unexpected outage of the first data asset, a planned outage of the first data asset, etc.). Alternatively, or in addition, such an indication may be received as one or more instructions to migrate data from the first data asset to another data asset, for example, via a graphical user interface in response to a user selecting a control to generate such one or more instructions.

At Step S320, the system may determine any applicable regulations, requirements, and/or restrictions that relate to a transfer of data from the first data asset to another, potentially suitable target data asset. The system may make this determination based, for example, at least in part, on a location of the first data asset and/or the data center in which the first data asset may be located. For example, the system may determine that the first data asset is located and Germany and therefore is subject to the GDPR. Instead, or in addition, other information may be used to determine the applicable regulations, requirements, and/or restrictions that relate to a transfer of data from the first data asset, such as the jurisdiction to which the first data asset is subject, the location of the associated entity or operator of the first data asset, etc. To determine the information needed to determine the applicable regulations, requirements, and/or restrictions, or to directly determine the applicable regulations, requirements, and/or restrictions that relate to a transfer of data from the first data asset, the system may, for example, be configured to use information from one or more data models associated with the first data asset (e.g., one or more data models as described herein).

At Step S330, the system may determine one or more types of data stored at the first data asset and/or otherwise to be transferred from the first data asset to another data asset. For example, the system may determine that the data stored at the first data asset and to be transferred to another data asset includes the personal data of one or more minors. As noted above, the system may be configured to use one or more data models associated with the first data asset (e.g., one or more data models as described herein) to determine the one or more types of data stored at the first data asset and to be transferred to another data asset.

At Step S340, the system may be configured to determine, based on the determined one or more types of data to be transferred and the applicable regulations, requirements, and/or restrictions, one or more target data assets to which the data stored at the first data asset is to be transferred. In various embodiments, the system may determine one or more potential target data assets for the transfer and then select one or more suitable target data assets from the one or more potential target data assets. The system may prioritize a listing of the one or more potential target data assets using any suitable criteria, such as a respective privacy risk score associated with each potential target data asset and/or its operator, etc.

In the course of executing Step S340, the system may be configured to use one or more data models associated with the first data asset to identify one or more suitable target data assets for one or more data transfers from the first data asset to a second data asset. Alternatively, or in addition, the system may be configured to use one or more data maps (e.g., that may be based on one or more data models) associated with the first data asset to determine one or more communicative connections and/or electronic associations between the first data asset and one or more potential target data assets to identify one or more suitable target data assets for one or more data transfers. In various embodiments, the system may be configured to select, from one or more potentially suitable target data assets, a particular one or more target data assets that would accommodate a transfer of the type of data to be transferred from the first data asset without violating any applicable regulations, requirements, and/or restrictions.

The system may be configured, at least partially in response to the identification of the one or more suitable target assets, to proceed with the transfer of data (e.g., at least a subset of data stored at the first data asset) from the first data asset to the one or more target data assets at Step S350.

In various embodiments, following a transfer of data from one data asset to another, any suitable evaluation and/or assessment may be performed (e.g., automatically by the system) to generate updated evaluation and/or assessment information that takes into account the new location of the transferred data. For example, following a migration of data from a first data asset to a second data asset, the system may automatically facilitate the completion of (e.g., generate or facilitate the completion and generation of) one or more new privacy impact assessments that take into account the storage of the data in the second data asset rather than in the first data asset. In various embodiments, this step may be performed substantially automatically in response to the migration of the data from the first data asset to the second data asset and may include performing any suitable processes and/or using any system described herein. In other embodiments, the system may use any other suitable technique for reassessing one or more privacy-related risks associated with storing the data at the second data asset rather than at the first data asset.

Conclusion

Although embodiments above are described in reference to various privacy management systems, it should be understood that various aspects of the system described above may be applicable to other privacy-related systems, or to other types of systems, in general.

Also, although various embodiments are described as having the system analyze a data subject's interaction with email, text messages (e.g., SMS or MMS messages), or other electronic correspondence to determine whether the data subject actively does business with a particular entity, in other embodiments, the system may make this determination without analyzing electronic correspondence (e.g., emails or texts) or a data subject's interaction with electronic correspondence. For example, in particular embodiments, the system may automatically determine whether a data subject has requested that a particular entity not send emails to the data subject and, at least partially in response to making this determination, automatically generate, populate, and/or submit a data subject access request to the particular entity. Such a data subject access request may include, for example, any of the various data subject access requests described above (e.g., a request to delete all of the data subject's personal data that is being processed by the particular entity). The system may execute similar functionality in response to determining that the data subject has requested that the particular entity not send text (e.g., SMS or MMS) messages to the data subject, call the data subject, etc.

It should be understood that, in various embodiments, the system may generate, populate, and/or submit any of the data subject access requests referenced above electronically (e.g., via a suitable computing network).

While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed:

1. A computer-implemented data processing method for migrating personal data between data centers, the method comprising:
   receiving, by one or more computer processors, an indication that data stored at a first data asset is to be migrated to a target data asset;
   at least partially in response to receiving the indication that the data stored at the first data asset is to be migrated to the target data asset:
      accessing, by one or more processors, a first data model associated with the first data asset and a privacy-related data map, wherein the privacy-related data map identifies one or more electronic associations between the first data asset and a second data asset;
      accessing, by one or more processors based at least in part on the privacy-related data map, a second data model associated with the second data asset;
      determining, by one or more processors based at least in part on the first data model associated with the first data asset, that the data stored at the first data asset comprises personal data;
      determining, by one or more processors based at least in part on the first data model associated with the first data asset, a first regulatory jurisdiction for the first data asset;
      determining, by one or more processors based at least in part on the second data model associated with the second data asset, a second regulatory jurisdiction for the second data asset;
      determining, by one or more processors, that the first regulatory jurisdiction for the first data asset is a same regulatory jurisdiction as the second regulatory jurisdiction for the second data asset; and
      at least partially in response to determining that the first regulatory jurisdiction for the first data asset is the same regulatory jurisdiction as the second regulatory jurisdiction for the second data asset, selecting, by one or more processors based at least in part on the first data model associated with the first data asset, the privacy-related data map, and the determination that the data stored at the first data asset comprises personal data, the second data asset as the target data asset; and
      initiating, by one or more processors, a transfer of the data stored at the first data asset to the second data asset.

2. The computer-implemented data processing method of claim 1, wherein the first data asset is located in a first data center at a first geographical location, wherein the second data asset is located in a second data center at a second geographical location, and wherein the first geographical location is distinct from the second geographical location.

3. The computer-implemented data processing method of claim 1, wherein receiving the indication that data stored at the first data asset is to be migrated to the target data asset comprises receiving an indication that a data center in which the first data asset is located has failed or is anticipated to fail.

4. The computer-implemented data processing method of claim 1, wherein selecting the second data asset as the target data asset comprises:
   determining, based at least in part on the first data model associated with the first data asset, that the data stored at the first data asset is subject to one or more regulations associated with data transfers; and
   determining that the transfer of the data stored at the first data asset to the second data asset complies with the one or more regulations associated with data transfers.

5. The computer-implemented data processing method of claim 1, wherein:
   the method further comprises determining based at least in part on the first data model associated with the first data asset, regulatory requirements associated with the first data asset; and
   selecting the second data asset as the target data asset is further based at least in part on the regulatory requirements associated with the first data asset.

6. The computer-implemented data processing method of claim 5, wherein the regulatory requirements associated with the first data asset are associated with a particular geographical location.

7. The computer-implemented data processing method of claim 1, wherein the first data asset comprises a plurality of storage assets managed as a single storage asset.

8. A computer system for migrating personal data between data assets, the system comprising:
   at least one computer processor; and
   computer memory storing computer-executable instructions that, when executed by the at least one computer processor, are operable for:
      detecting, by the at least one computer processor, an indication that a data center in which a first data asset is located has failed or is anticipated to fail;
      at least partially in response to detecting the indication that the data center in which the first data asset is located has failed or is anticipated to fail, determining, by the at least one computer processor, to migrate data from the first data asset to a target data asset;
      at least partially in response to determining to migrate the data from the first data asset to the target data asset:
         accessing, by the at least one computer processor, a first data model associated with the first data asset;
         determining, by the at least one computer processor using the first data model associated with the first data asset, a first regulatory jurisdiction for the first data asset, wherein the first regulatory jurisdiction comprises one or more regulations associated with data transfers between the first data asset and a second data asset;
         determining, by the at least one computer processor using the first data model associated with the first data asset, a type of data stored on the first data asset to be transferred to the target data asset;

accessing, by the at least one computer processor, a second data model associated with the second data asset;

determining, by the at least one computer processor based at least in part on the second data model associated with the second data asset, a second regulatory jurisdiction for the second data asset;

determining, by the at least one computer processor, that the first regulatory jurisdiction for the first data asset is a same regulatory jurisdiction as the second regulatory jurisdiction for the second data asset;

at least partially in response to determining that the first regulatory jurisdiction for the first data asset is the same regulatory jurisdiction as the second regulatory jurisdiction for the second data asset, selecting, by the at least one computer processor based at least in part on the one or more regulations associated with data transfers between the first data asset and the second data asset and the type of data stored on the first data asset to be transferred to the target data asset, the second data asset as the target data asset; and transferring, by the at least one computer processor, the data from the first data asset to the second data asset.

9. The computer system of claim 8, wherein determining the type of data stored on the first data asset to be transferred to the target data asset comprises using data from a privacy-related data map to determine the type of data stored on the first data asset to be transferred to the target data asset.

10. The computer system of claim 8, wherein determining the type of data stored on the first data asset to be transferred to the target data asset comprises determining that the data stored on the first data asset to be transferred to the target data asset comprises personal data.

11. The computer system of claim 8, wherein determining the first regulatory jurisdiction for the first data asset comprises using data from a privacy-related data map to determine the one or more regulations associated with data transfers between the first data asset and the second data asset.

12. The computer system of claim 11, wherein the privacy-related data map identifies one or more electronic associations between the first data asset and the second data asset within a data model.

13. The computer system of claim 8, wherein the first data asset comprises a plurality of storage assets managed as a single storage asset.

14. The computer system of claim 8, wherein the first data asset is operated by a first entity and the second data asset is operated by a second entity, and wherein the first entity is distinct from the second entity.

15. A non-transitory computer-readable medium storing computer-executable instructions for:

receiving, by one or more computer processors, an instruction to migrate data stored at a first data asset to a target data asset;

determining, by one or more processors based at least in part on a first data model associated with the first data asset, one or more data elements associated with the first data asset;

determining, by one or more processors based at least in part on the first data model associated with the first data asset, one or more respective attributes of each of the one or more data elements associated with the first data asset;

determining, by one or more processors based at least in part on the one or more respective attributes of each of the one or more data elements associated with the first data asset, data transfer requirements associated with each of the one or more data elements associated with the first data asset, wherein the data transfer requirements comprise regulatory requirements for a first regulatory jurisdiction in which the first data asset is located;

determining, by one or more processors based at least in part on a second data model associated with a second data asset, a second regulatory jurisdiction in which the second data asset is located;

determining, by one or more processors, that the first regulatory jurisdiction in which the first data asset is located is a same regulatory jurisdiction as the second regulatory jurisdiction in which the second data asset is located;

at least partially in response to determining that the first regulatory jurisdiction in which the first data asset is located is the same regulatory jurisdiction as the second regulatory jurisdiction in which the second data asset is located, selecting, by one or more processors based at least in part on the data transfer requirements associated with each of the one or more data elements associated with the first data asset, the second data asset as the target data asset; and initiating, by one or more processors, a transfer of a subset of the data stored at the first data asset to the second data asset.

16. The non-transitory computer-readable medium of claim 15, wherein determining the one or more respective attributes of each of the one or more data elements associated with the first data asset comprises determining that at least one of the one or more data elements associated with the first data asset is associated with personal data.

17. The non-transitory computer-readable medium of claim 16, wherein determining the data transfer requirements associated with each of the one or more data elements associated with the first data asset comprises determining data transfer requirements associated with personal data.

18. The non-transitory computer-readable medium of claim 17, wherein determining the data transfer requirements associated with personal data comprises:

determining one or more regulations associated with data transfers of personal data based at least in part on the regulatory requirements for the first regulatory jurisdiction in which the first data asset is located; and determining that the transfer of the subset of the data stored at the first data asset to the second data asset complies with the one or more regulations associated with data transfers of personal data.

19. The non-transitory computer-readable medium of claim 15, wherein the second data asset is selected as the target data asset further based on a privacy-related data map associated with the first data model associated with the first data asset.

20. The non-transitory computer-readable medium of claim 19, wherein the first data model associated with the first data asset identifies one or more electronic associations between the first data asset and the second data asset.

* * * * *

UNITED STATES PATENT AND TRADEMARK OFFICE
CERTIFICATE OF CORRECTION

Page 1 of 2

PATENT NO. : 10,944,725 B2
APPLICATION NO. : 16/863226
DATED : March 9, 2021
INVENTOR(S) : Arockia Gunasingam et al.

It is certified that error appears in the above-identified patent and that said Letters Patent is hereby corrected as shown below:

On the Title Page

Other Publications, on page 10, left column, Lines 51-52, "Notice of Allowance, dated May 11, 2020, from corresponding U.S. Appl. No. 16/186,196" should read --Notice of Allowance, dated May 11, 2020, from corresponding U.S. Appl. No. 16/786,196--;

Other Publications, on page 13, right column, Lines 68-69, "Final Office Action, dated Mar. 5, 2019, from corresponding U.S. Appl. No. 16/055,96t" should read --Final Office Action, dated Mar. 5, 2019, from corresponding U.S. Appl. No. 16/055,961--;

Other Publications, on page 14, left column, Lines 29, "Office Action, dated Aug. 13, 2019, from corresponding U.S. Appl. No. 16/512,031" should read --Office Action, dated Aug. 13, 2019, from corresponding U.S. Appl. No. 16/512,033--;

Other Publications, on page 14, right column, Lines 31-32, "Office Action, dated Jul. 24, 2020, from corresponding U.S. Appl. No. 16/404,49t" should read --Office Action, dated Jul. 24, 2020, from corresponding U.S. Appl. No. 16/404,491--;

Other Publications, on page 14, left column, Lines 37-38, "Office Action, dated Aug. 24, 2017, from corresponding U.S. Appl. No. 15/169,641" should read --Office Action, dated Aug. 24, 2017, from corresponding U.S. Appl. No. 15/169,643--; and Other Publications, on page 15, right column, Lines 5-6, "Notice of Allowance, dated Feb. 13, 2019, from corresponding U.S. Appl. No. 16/041,561" should read --Notice of Allowance, dated Feb. 13, 2019, from corresponding U.S. Appl. No. 16/041,563--.

In the Specification

Column 76, Line 55, "Step S010" should read --Step 5010--;

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,944,725 B2

Column 77, Line 11, "Step S020" should read --Step 5020--;

Column 77, Line 44, "Step S030" should read --Step 5030--;

Column 88, Line 46, "Step S310" should read --Step 5310--;

Column 88, Line 58, "Step S320" should read --Step 5320--;

Column 89, Line 13, "Step S330" should read --Step 5330--;

Column 89, Line 24, "Step S340" should read --Step 5340--;

Column 89, Line 37, "Step S340" should read --Step 5340--; and

Column 89, Lines 59-60, "Step S350" should read --Step 5350--.